(12) United States Patent
Ozana et al.

(10) Patent No.: US 11,559,170 B2
(45) Date of Patent: Jan. 24, 2023

(54) SINGLE-USE FOOD PREPARATION CONTAINER ASSEMBLY, SYSTEM AND METHOD

(71) Applicant: BLIX LTD., Valletta (MT)

(72) Inventors: Shalom Ozana, Or Akiva (IL); Ariel Sterngold, Jerusalem (IL); Marcel Hendrikus Simon Weijers, Assen (NL); Andreas Jacobus Louis Nijsen, Enschede (NL); Johannes Gabriel Kuster, Enschede (NL); Joris Bronkhorst, Enschede (NL); Hans Constant Dikhoff, Eindhoven (NL); Sybren Yme Leijenaar, Sint Nicolaasga (NL); Krijn Maltha, Dokkum (NL)

(73) Assignee: BLIX LTD., Valletta (MT)

( * ) Notice: Subject to any disclaimer, the term of this patent is extended or adjusted under 35 U.S.C. 154(b) by 992 days.

(21) Appl. No.: 16/318,627

(22) PCT Filed: Jul. 20, 2017

(86) PCT No.: PCT/IL2017/050823
§ 371 (c)(1),
(2) Date: Jan. 17, 2019

(87) PCT Pub. No.: WO2018/015962
PCT Pub. Date: Jan. 25, 2018

(65) Prior Publication Data
US 2019/0282034 A1     Sep. 19, 2019

Related U.S. Application Data

(60) Provisional application No. 62/533,743, filed on Jul. 18, 2017, provisional application No. 62/383,639, (Continued)

(51) Int. Cl.
*A47J 43/042* (2006.01)
*A47J 43/044* (2006.01)
(Continued)

(52) U.S. Cl.
CPC ............. *A47J 43/042* (2013.01); *A47J 43/00* (2013.01); *A47J 43/04* (2013.01); *A47J 43/044* (2013.01);
(Continued)

(58) Field of Classification Search
CPC ...... A47J 43/042; A47J 43/044; A47J 43/046; A47J 43/0727; A47J 47/02
See application file for complete search history.

(56) References Cited

U.S. PATENT DOCUMENTS

| 4,355,446 A | 10/1982 | Shimajiri et al. |
| 4,446,979 A | 5/1984 | Gach et al. |

(Continued)

FOREIGN PATENT DOCUMENTS

| CH | 1832698 | 9/2006 |
| CH | 101184420 | 5/2008 |

(Continued)

OTHER PUBLICATIONS

European Search Report dated Feb. 10, 2020, which issued during the prosecution of Applicant's European App No. 17830613.0.
(Continued)

*Primary Examiner* — Omar Flores Sanchez
(74) *Attorney, Agent, or Firm* — McDonnell Boehnen Hulbert & Berghoff LLP

(57) ABSTRACT

A product preparation system and method wherein a single-use product container assembly and a multiple motion intelligent driving device are employed to process contents of the container assembly.

12 Claims, 155 Drawing Sheets

Related U.S. Application Data filed on Sep. 6, 2016, provisional application No. 62/364,491, filed on Jul. 20, 2016.

(51) Int. Cl.

| | |
|---|---|
| *A47J 43/046* | (2006.01) |
| *A47J 43/07* | (2006.01) |
| *A47J 47/02* | (2006.01) |
| *A47J 43/04* | (2006.01) |
| *A47J 43/00* | (2006.01) |
| *B01F 27/88* | (2022.01) |
| *B01F 27/171* | (2022.01) |
| *B01F 27/213* | (2022.01) |
| *B01F 27/1123* | (2022.01) |
| *B01F 33/35* | (2022.01) |
| *B01F 33/501* | (2022.01) |

(52) U.S. Cl.
CPC ......... *A47J 43/046* (2013.01); *A47J 43/0727* (2013.01); *A47J 47/02* (2013.01); *B01F 27/1123* (2022.01); *B01F 27/171* (2022.01); *B01F 27/213* (2022.01); *B01F 27/88* (2022.01); *B01F 33/35* (2022.01); *B01F 33/5014* (2022.01)

(56) References Cited

U.S. PATENT DOCUMENTS

| | | | |
|---|---|---|---|
| D313,975 S | 1/1991 | Horie | |
| D315,335 S | 3/1991 | Frischer | |
| D334,564 S | 4/1993 | Basara et al. | |
| D349,888 S | 8/1994 | Yamamoto et al. | |
| D352,910 S | 11/1994 | Yamamoto et al. | |
| D352,911 S | 11/1994 | Yamamoto et al. | |
| 6,179,139 B1 | 1/2001 | Heilman | |
| 8,113,379 B2 | 2/2012 | Cai et al. | |
| 8,794,822 B2 | 8/2014 | Serra | |
| 10,399,050 B1 * | 9/2019 | Bertsch | A47J 43/042 |
| 2002/0048215 A1 | 4/2002 | McGill | |
| 2002/0127307 A1 | 9/2002 | McGill | |
| 2006/0209627 A1 * | 9/2006 | McGill | A47J 43/0727 366/205 |
| 2008/0037360 A1 | 2/2008 | McGill | |
| 2010/0191823 A1 | 7/2010 | Archer et al. | |
| 2010/0208549 A1 | 8/2010 | Kitson | |
| 2010/0308046 A1 | 12/2010 | Serra | |
| 2012/0152131 A1 | 6/2012 | Sands | |
| 2013/0121105 A1 | 5/2013 | Denize | |
| 2017/0208998 A1 | 7/2017 | Dickson, Jr. et al. | |
| 2017/0340170 A1 | 11/2017 | Brunner | |

FOREIGN PATENT DOCUMENTS

| | | |
|---|---|---|
| CH | 201822691 | 5/2011 |
| CH | 102933291 | 2/2013 |
| CH | 202829556 | 3/2013 |
| CH | 104042131 | 9/2014 |
| CH | 104488367 | 4/2015 |
| CH | 106395129 | 2/2017 |
| CN | 101188960 | 5/2008 |
| CN | 201527370 | 7/2010 |
| CN | 201958462 | 9/2011 |
| CN | 102249036 | 11/2011 |
| DE | 6939265 | 1/1970 |
| EP | 2676539 | 12/2013 |
| JP | H0958716 | 3/1997 |
| JP | 2001-520901 | 11/2001 |
| JP | 2008-545467 | 12/2008 |
| JP | 2011-188763 | 9/2011 |
| JP | 2015-062461 | 4/2015 |
| JP | 5777833 | 9/2015 |
| JP | 2015-226780 | 12/2015 |
| KR | 10-2009-0008837 | 1/2009 |
| WO | 00/76875 | 12/2000 |
| WO | 2001/030663 | 5/2001 |
| WO | 02/28735 | 4/2002 |
| WO | 2006/126009 | 11/2006 |
| WO | 2008/068416 | 6/2008 |
| WO | 2015081381 | 6/2015 |
| WO | 2015/128091 | 9/2015 |
| WO | 2016/067074 | 5/2016 |
| WO | 2018/015962 | 1/2018 |
| WO | 2019/016790 | 1/2019 |
| WO | 2019/142182 | 7/2019 |

OTHER PUBLICATIONS

Nov. 25, 2021, which issued during the prosecution of Chinese Patent Application No. 201980015733.3.
Partial European Search Report dated Nov. 12, 2021 which issued during the prosecution of Applicant's European App No. 19740812.3.
U.S. Appl. No. 62/364,491, filed Jul. 20, 2016.
U.S. Appl. No. 62/383,639, filed Sep. 6, 2016.
U.S. Appl. No. 62/533,743, filed Jul. 18, 2017.
U.S. Appl. No. 62/340,648, filed May 24, 2016.
An Invitation to pay additional fees dated Jan. 15, 2019, which issued during the prosecution of Applicant's PCT/IL2019/050056, two pages.
An International Search Report and a Written Opinion both dated Jun. 19, 2019, which issued during the prosecution of Applicant's PCT/IL2019/050056, 13 pages.
An International Search Report and a Written Opinion both dated Jul. 10, 2019, which issued during the prosecution of Applicant's PCT/IL2019/050374, 14 pages.
An International Search Report and a Written Opinion both dated Jun. 6, 2018, which issued during the prosecution of Applicant's PCT/IL2018/050057, 16 pages.
An International Search Report and a Written Opinion both dated Dec. 5, 2017, which issued during the prosecution of Applicant's PCT/IL2017/050823, 19 pages.
An International Preliminary Report on Patentability dated Jan. 22, 2019, which issued during the prosecution of Applicant's PCT/IL2017/050823, 13 pages.
An Office Action dated Mar. 21, 2019, which issued during the prosecution of Design U.S. Appl. No. 29/624,319 6 pages.
An Office Action summarized English translation and Search Report dated Jul. 1, 2021 which issued during the prosecution of Chinese Patent Application No. 201780057822.5.
An Office Action summarized English translation and Search Report dated May 18, 2021, which issued during the prosecution of Chinese Patent Application No. 201880047466.3.
An Office Action dated Jul. 20, 2021, which issued during the prosecution of Japanese Patent Application No. 2019-524547.
An Office Action dated Jun. 17, 2021, which issued during the prosecution of Brazilian Patent Application No. BR1120190009752.
European Search Report dated May 16, 2022 which issued during the prosecution of Applicant's European App No. 22156559.1.
An Office Action dated Jun. 27, 2022, which issued during the prosecution of Australia Patent Application No. 2017301047.
An Office Action summarized English translation and Search Report dated May 6, 2022, which issued during the prosecution of Chinese Patent Application No. 201980015733.3.
Notice of Allowance dated May 31, 2022, which issued during the prosecution of Japanese Patent Application No. 2019-524547 showing previously cited references.
An Office Action together with summarized English translation dated Sep. 1, 2022, which issued during the prosecution of Korea Patent Application No. 10-2022-7023412.
Partial European Search Report dated Sep. 6, 2022 which issued during the prosecution of Applicant's European App No. 19910439.9.
An Office Action dated Sep. 2, 2022, which issued during the prosecution of Australia Patent Application No. 2017301047.

* cited by examiner

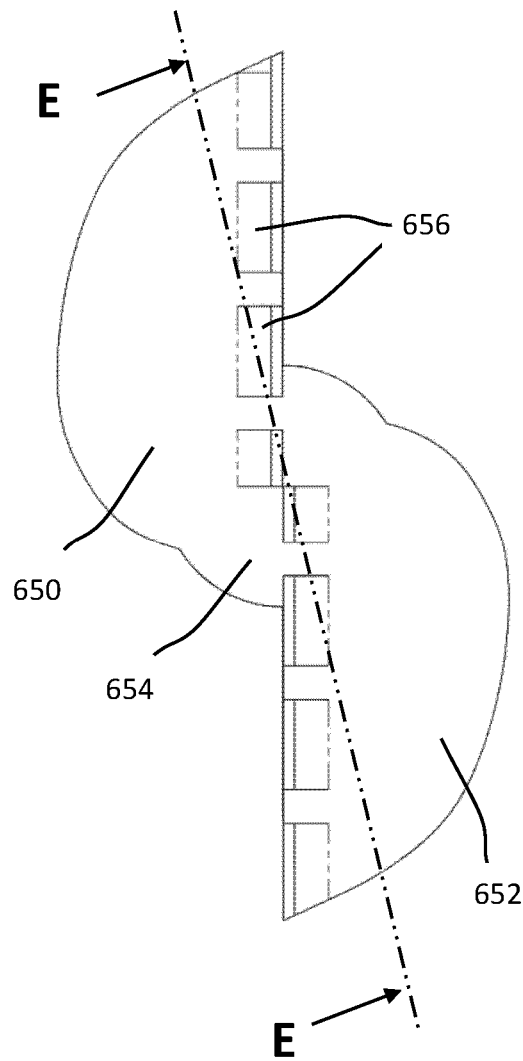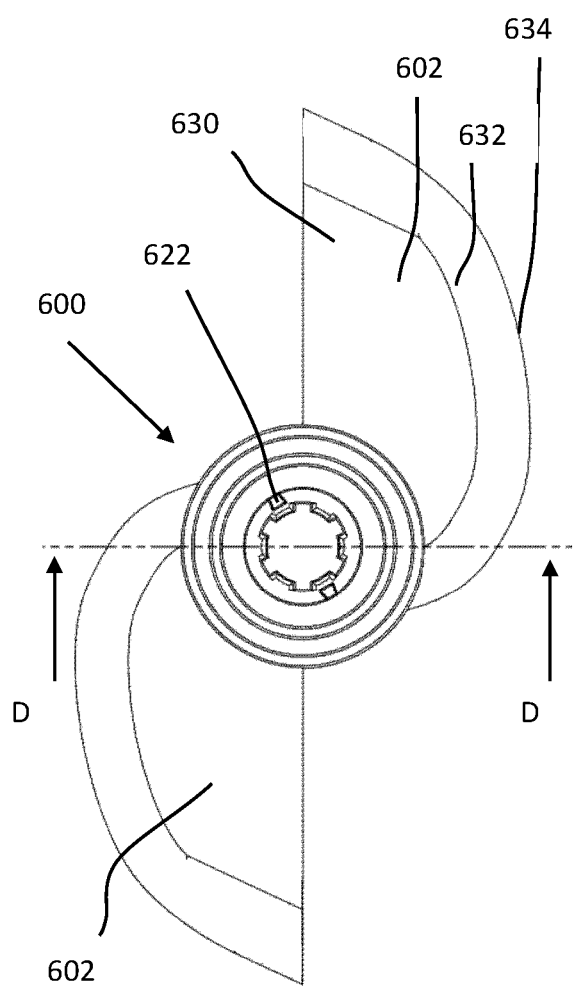
FIG. 8A
FIG. 8B

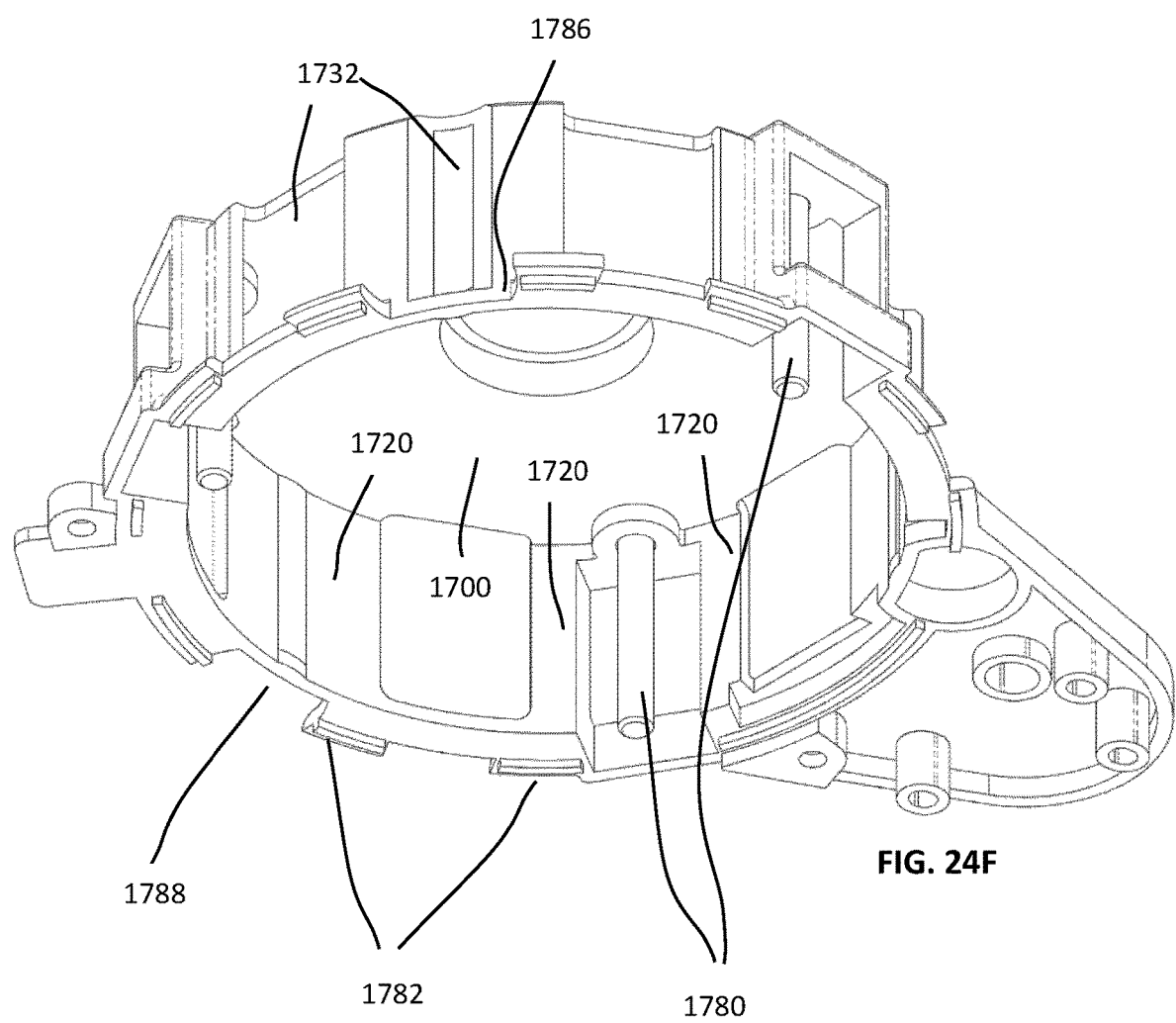

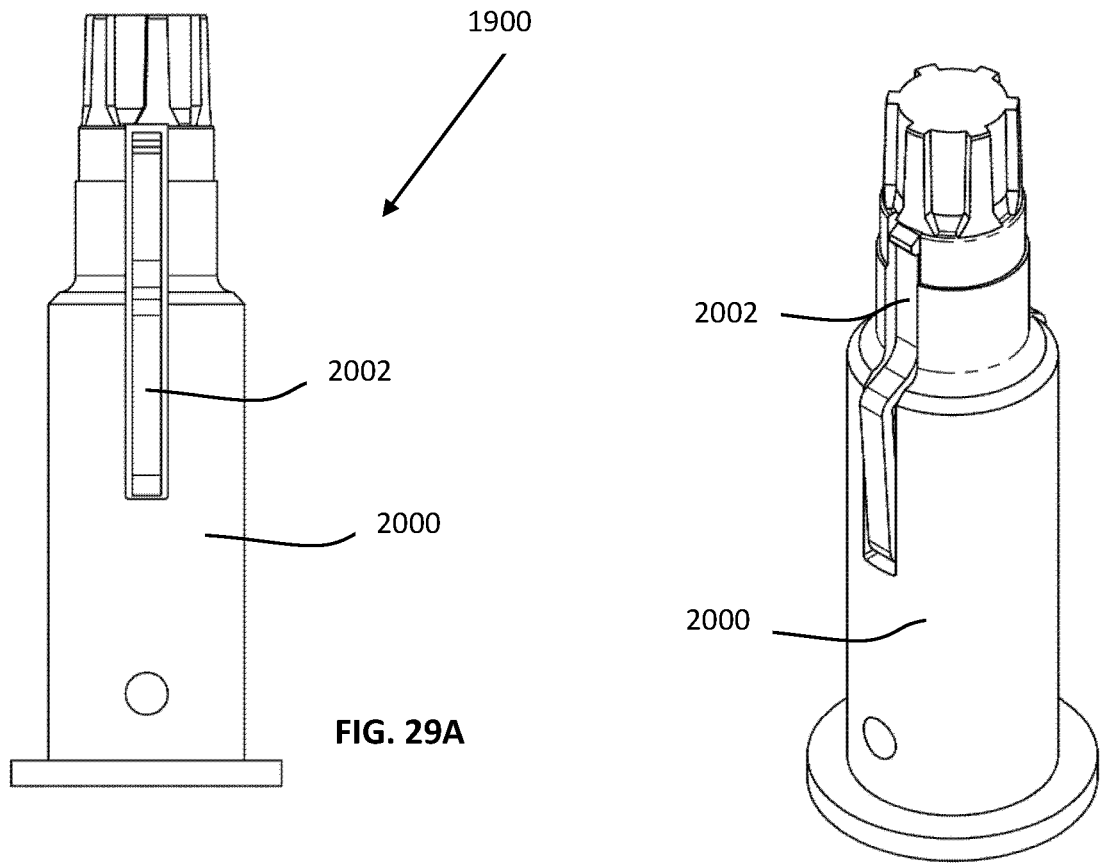
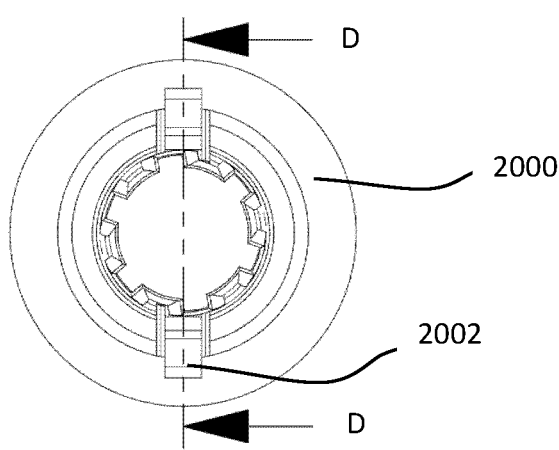
FIG. 29A
FIG. 29B
FIG. 29C

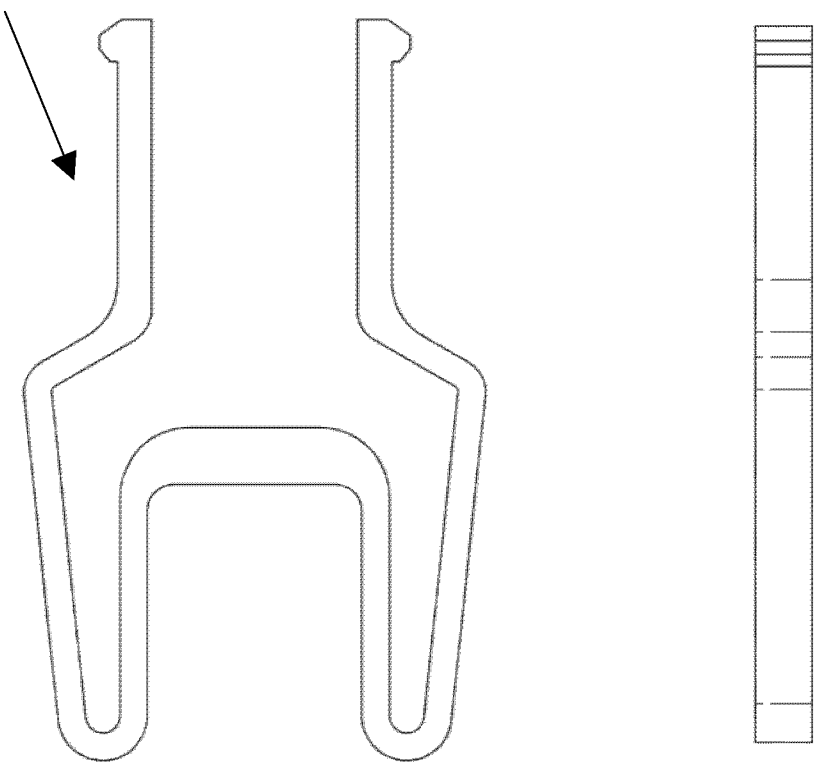
FIG. 31A
FIG. 31B
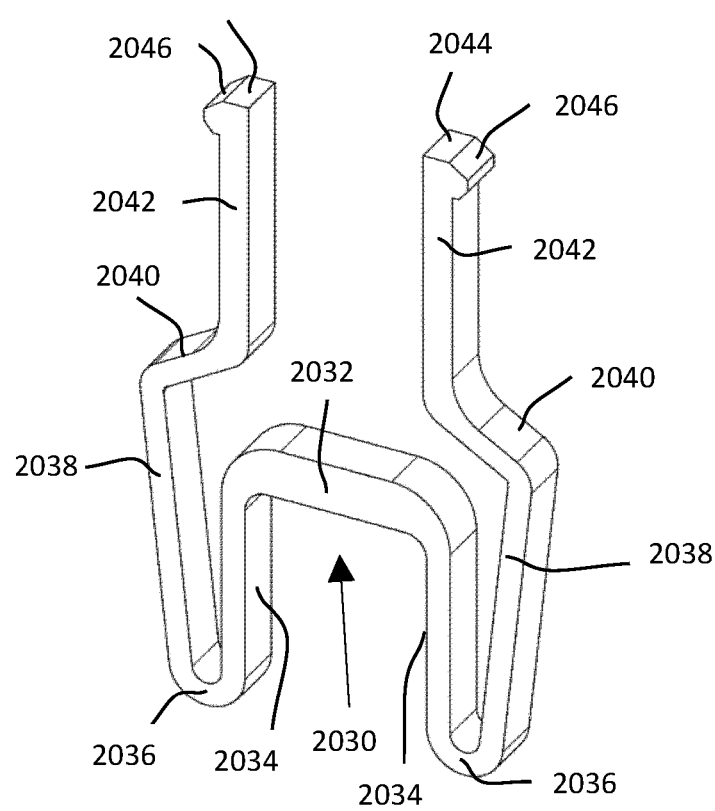
FIG. 31C

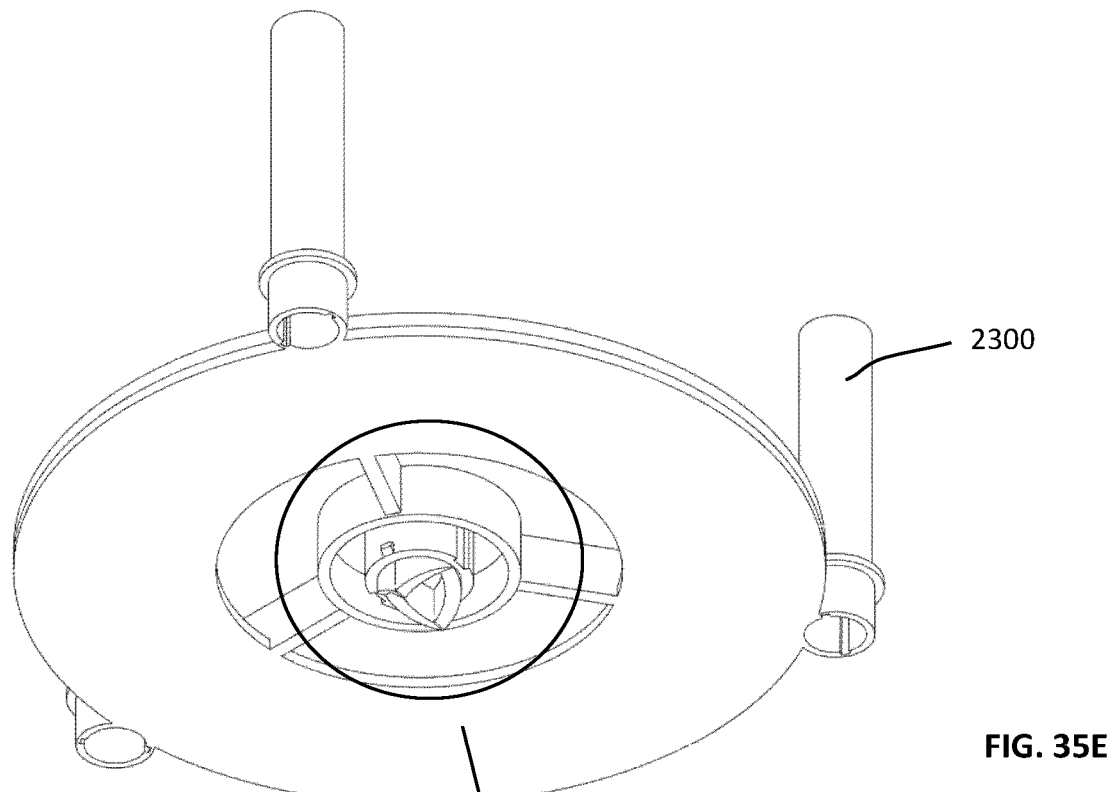
FIG. 35E
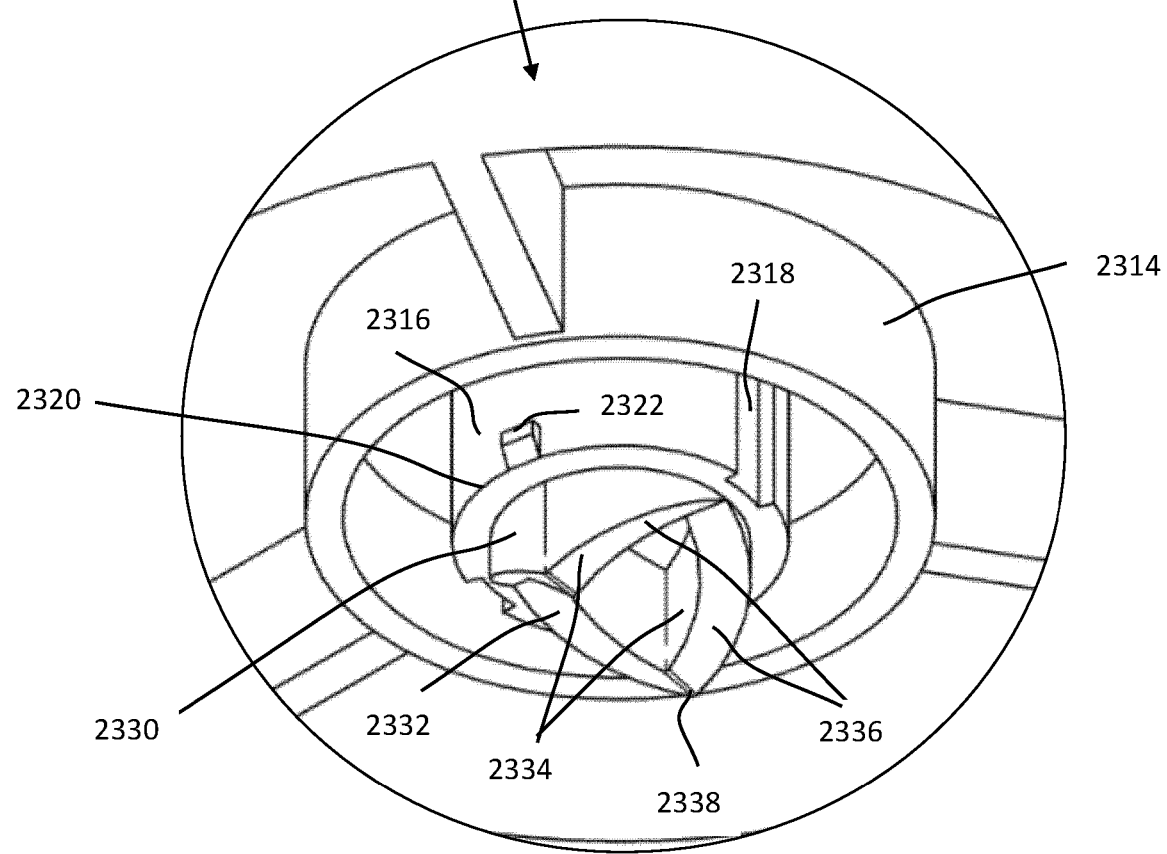

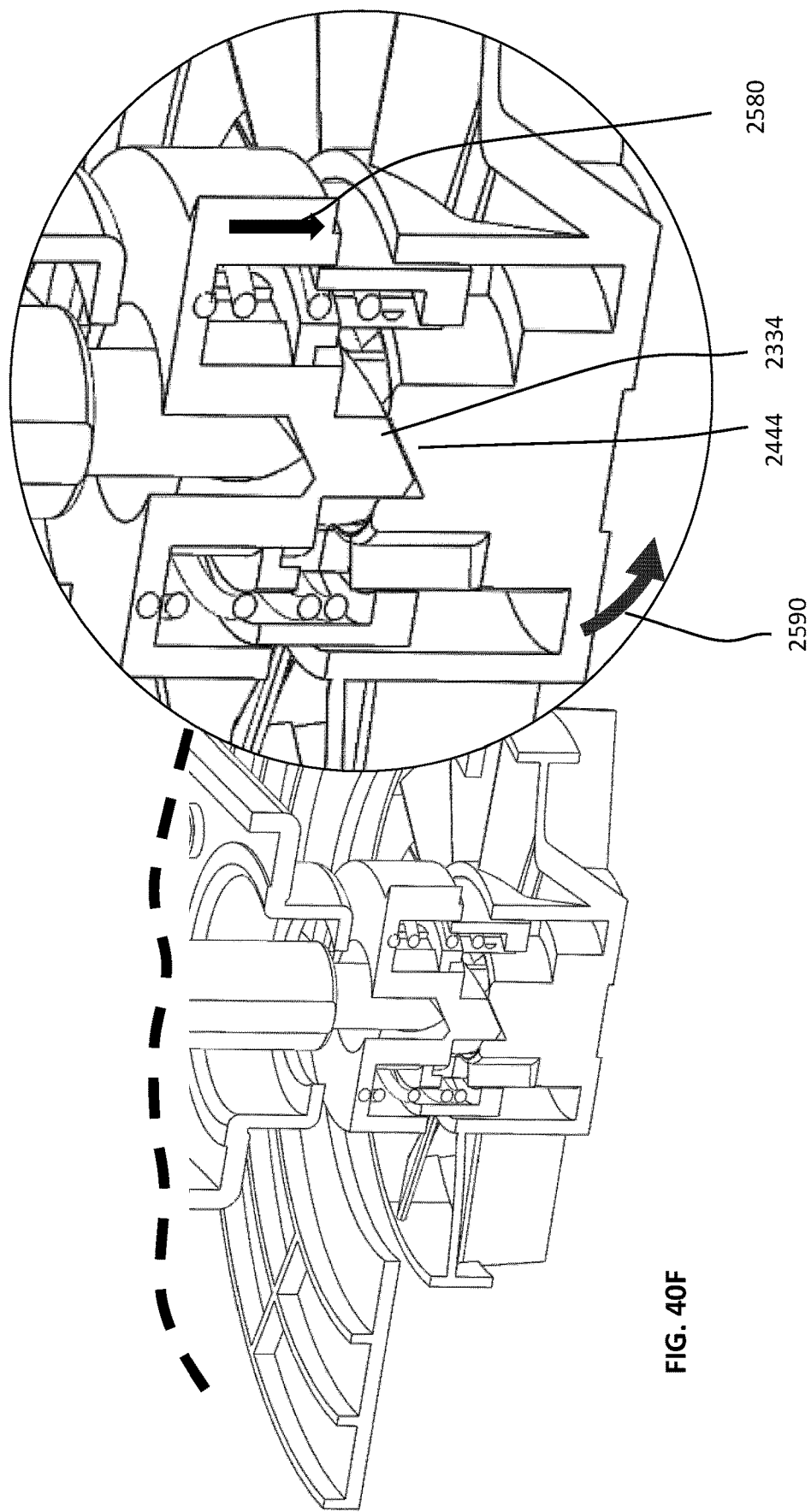

SINGLE-USE FOOD PREPARATION CONTAINER ASSEMBLY, SYSTEM AND METHOD

REFERENCE TO RELATED APPLICATIONS

This application is a U.S. national phase of International Application No. PCT/IL2017/050823, filed Jul. 20, 2017, which claims priority to U.S. Provisional Application No. 62/364,491, filed Jul. 20, 2016; U.S. Provisional Application No. 62/383,639, filed Sep. 6, 2016 and U.S. Provisional Application No. 62/533,743, filed Jul. 18, 2017, all of which are incorporated by reference herein in their entirety.

FIELD OF THE INVENTION

The present invention relates to computerized and automated processing of products, preferably food products, within a single use-container.

BACKGROUND OF THE INVENTION

Various types of devices for computerized processing of products, including food products are known.

SUMMARY OF THE INVENTION

The present invention seeks to provide an improved product preparation container assembly which is suitable for being processed by an intelligent driving device. The product preparation container assembly and the intelligent driving device together define a product preparation system which is particularly suitable for use with food products but is not limited to use therewith.

There is thus provided in accordance with a preferred embodiment of the present invention a single-use product preparation container assembly including:
  a container body for containing a product prior to, during and following preparation thereof; and
  a single-use container body closure assembly defining with the container body a product preparation enclosure and including an externally rotatably drivable rotary product engagement assembly characterized in that:
    it limits ingress therethrough of contaminants from outside into the product preparation enclosure;
    it limits egress therethrough of product from the enclosure; and
    it limits contamination of product in the enclosure by disengaged components thereof.

There is also provided in accordance with a preferred embodiment of the present invention a single-use food product storage, preparation and consumption container assembly including:
  a container body for containing a food product prior to, during and following food preparation; and
  a single-use container body closure assembly defining with the container body a product preparation enclosure, the single-use container body closure assembly normally remaining fully attached to the single-use container body prior to, during and following food preparation, the single-use container body closure assembly including at least one selectably openable and resealable opening.

There is additionally provided in accordance with a preferred embodiment of the present invention a single-use product preparation container assembly including:
  a container body; and
  a single-use container body closure assembly cooperating with the container body and including a blade assembly for engaging contents of the container body, the blade assembly being rotatable about a rotation axis and displaceable along the rotation axis with respect to the container body at least between a first position and a second position.

There is further provided in accordance with a preferred embodiment of the present invention a product preparation container assembly including:
  a container body; and
  a container body closure assembly cooperating with the container body and including a rotatable blade assembly, the rotatable blade assembly being linearly displaceable along an axis within the container body.

There is still further provided in accordance with a preferred embodiment of the present invention a product preparation container assembly including:
  a container body;
  a container body closure assembly cooperating with the container body and including:
    a lid having a recess formed therein; and
    a rotatable blade assembly located on the lid for engaging contents of the container body, the blade assembly and the lid being relatively at least linearly moveable with respect to each other at least between a first retracted orientation wherein the rotatable blade assembly is at least partially located within the recess and a second extended orientation wherein the rotatable blade assembly is outside of the recess.

There is yet further provided in accordance with a preferred embodiment of the present invention a product preparation container assembly including:
  a container body; and
  a container body closure assembly including a lid cooperating with the container body, at least one of the lid and the container body defining a mechanical indicator indicating previous disengagement of the container body and the lid.

Additionally there is provided in accordance with a preferred embodiment of the present invention a product preparation container assembly including:
  a container body;
  a container body closure assembly including a lid cooperating with the container body;
  a blade assembly; and
  a liquid ingress/egress preventing blade mounting and rotatable sealing assembly for mounting the blade assembly onto the lid, the liquid ingress/egress preventing blade mounting and rotatable sealing assembly having a first static liquid sealing operative orientation and having a second dynamic low friction liquid sealing operative orientation.

Further additionally there is provided in accordance with a preferred embodiment of the present invention a product preparation container assembly including:
  a container body; and
  a container body closure assembly including a lid cooperating with the container body, the lid including at least one liquid leakage collection reservoir.

Still additionally there is provided in accordance with a preferred embodiment of the present invention a product preparation container assembly including:
  a container body for containing a food product prior to, during and following food preparation; and
  a container body closure assembly including a single-use lid for the container body and defining with the container body a food preparation enclosure, the single-use lid having first and second selectably openable and resealable openings.

Yet additionally there is provided in accordance with a preferred embodiment of the present invention a product preparation container assembly including:

a container body for containing a product prior to, during and following preparation;

a single-use container body closure assembly defining with the container body a product preparation enclosure, the single-use container body closure assembly including:

a lid having first and second apertures; and a cover, sealingly engaging the lid and having at first and second selectably openable and resealable aperture covers for providing selectable resealable access to the interior of the container body via respective the first and second apertures.

Preferably the externally rotatably drivable rotary product engagement assembly is characterized in that:

it prevents ingress therethrough of contaminants from outside into the product preparation enclosure;

it limits egress therethrough of product from the enclosure; and it prevents contamination of product in the enclosure by disengaged components thereof.

Preferably, the externally rotatably drivable rotary product engagement assembly includes a blade assembly for mixing contents of the container body, the blade assembly being rotatable about a rotation axis and displaceable along the rotation axis at least between a first position and a second position with respect to the container body.

Preferably, the blade assembly is rotatable about a rotation axis and displaceable along the rotation axis with respect to the container body at least between a first position and a second position.

Preferably, the container assembly includes a rotatable blade assembly which is linearly displaceable along a rotation axis with respect to the container body at least between a first position and a second position.

Preferably, the lid has a recess formed therein and the blade assembly is moveable with respect to the lid at least between a first retracted position at least partially located within the recess and a second extended position outside of the recess.

Preferably, the container body closure assembly defines a mechanical indicator indicating previous disengagement of the container body and the single-use container body closure assembly.

Preferably the externally rotatably drivable rotary engagement assembly includes a liquid ingress/egress preventing blade mounting and rotatable sealing assembly for mounting a blade assembly onto the container body closure assembly, the liquid ingress/egress preventing blade mounting and rotatable sealing assembly having a first static liquid sealing operative orientation and having a second dynamic low friction liquid sealing operative orientation.

Preferably the container assembly includes a liquid ingress/egress limiting blade mounting and rotatable sealing assembly for mounting a blade assembly onto the lid, the liquid ingress/egress limiting blade mounting and rotatable sealing assembly having a first static liquid sealing operative orientation and having a second dynamic low friction liquid sealing operative orientation.

Preferably, the container body closure assembly normally remains fully attached to the single-use container body prior to, during and following preparation and consumption of the product, the container body closure assembly including at least one selectably openable and sealable opening.

Preferably, the container body closure assembly includes a lid cooperating with the container body, the lid including at least one liquid leakage collection reservoir.

Preferably, the container body closure assembly includes a single-use lid for the container body and defining with the container body a food preparation enclosure, the single-use lid having first and second selectably openable and resealable openings.

Preferably, the container body closure assembly defines with the container body a product preparation enclosure, the single-use container body closure assembly including:

a lid having first and second apertures; and a cover, sealingly engaging the lid and having at first and second selectably openable and resealable aperture covers for providing selectable resealable access to the interior of the container body via respective the first and second apertures.

Preferably, the single-use container body closure assembly includes an externally rotatably drivable rotary product engagement assembly characterized in that:

it prevents ingress therethrough of contaminants from outside into the product preparation enclosure;

it limits egress therethrough of product from the enclosure; and it prevents contamination of product in the enclosure by disengaged components thereof.

Preferably, the container body closure assembly includes a single-use cover seal and externally rotatably drivable rotary engagement assembly providing both human and machine sensible tamper-evident and reuse preventing fluid sealing engagement with the container body.

Preferably, the container body closure assembly is suitable for use with multiple sizes of container bodies having an identical rim configuration.

Preferably, the container body closure assembly includes a cover and a lid which are fixedly connected to each other.

Preferably, the container body closure assembly includes a machine-readable information source.

Preferably, the machine-readable information source contains encrypted information relating to required processing of contents of the container body.

Preferably, the container body closure assembly includes a pivotably openable straw ingress opening cover, including at least one human visually sensible tamper-evident frangible portion which is normally necessarily broken when opening the straw ingress opening cover.

Preferably, the container body closure assembly includes an integrally hinged liquid ingress cover including at least one human visually sensible tamper-evident frangible portion which is normally necessarily broken when opening the liquid ingress cover.

Preferably, the container body closure assembly includes a plurality of integrally hinged tamper and reuse indicating tabs Preferably, the container body closure assembly is formed with a plurality of cut outs which enable clamping thereof to a support surface of a processing device.

Preferably, the container body closure assembly includes a rotary drive aperture surrounded by a multiple walled sealing structure having a plurality of leaked fluid egress apertures which communicate with one or more sealed leaked fluid reservoir volumes.

Preferably, the multiple walled sealing structure includes at least two mutually concentric downwardly-facing recesses, which are sealingly engaged by corresponding protrusions of an element rotating relative thereto.

Preferably walls of the recesses and of the protrusions define mutual static sealing surfaces.

Preferably, walls of the recesses and of the protrusions define mutual dynamic sealing surfaces.

Preferably, the container assembly contains a food product.

Preferably, the container assembly contains a frozen food product.

Preferably, container body closure assembly is opening monitorable.

Preferably, the container body closure assembly is tamper evident.

Preferably, the container body closure assembly is operable to seal an interior of the enclosure containing a food product prior to, during and following food preparation.

Preferably, the container body includes a light transmissive portion which allows contents thereof to be seen from the outside thereof.

Preferably, the container body includes at least one visually sensible marking indicating a maximum fill level therefor.

Preferably, the container body includes at least one protrusion adjacent a rim thereof for interacting with a reuse preventing tab forming part of the container body closure assembly.

Preferably, the at least one protrusion is operative to push the reuse preventing tab radially outwardly into a reuse preventing operative orientation upon rotational engagement therewith upon removing the container body closure assembly from the container body.

Preferably, the reuse preventing tab, once in the reuse preventing operative orientation cannot readily be repositioned readily inwardly.

Preferably, the container body closure assembly includes a rotary drive aperture surrounded by a multiple walled sealing structure which is linearly shiftable from a static sealing operative orientation to a dynamic sealing operative orientation.

Preferably, when the multiple walled sealing structure is in the static sealing operational orientation, rotational movement of the blade element within the container body is not possible.

Additionally in accordance with a preferred embodiment of the present invention there is provided a multiple motion intelligent driving device including:

a support for receiving a product container containing a product to be processed; and an electric motor having a drive shaft, the drive shaft and the support being mutually linearly displaceable.

Additionally in accordance with a preferred embodiment of the present invention the drive shaft and the support are mutually linearly displaceable only when the drive shaft is in at least one predetermined azimuthal orientation relative to the support.

Further in accordance with a preferred embodiment of the present invention there is provided a multiple motion intelligent driving device including:

a support for receiving a product container containing a product to be processed;

an electric motor for driving processing of the product; and an electric motor controller for controlling operation of the electric motor and the processing, the electric motor controller being responsive at least to at least one sensed parameter of the processing.

Still further in accordance with a preferred embodiment of the present invention there is provided a multiple motion intelligent driving device including:

a housing;

a product container support located within the housing an electric motor disposed within the housing and having a drive shaft; and a linear displacer assembly operative to selectably change a relative spatial orientation between the drive shaft and the product container support.

Preferably the multiple motion intelligent driving device includes:

a top housing assembly having door closed and door open operative orientations;

a base assembly; and a product container support and clamping assembly supported on the base assembly and surrounded by the top housing assembly.

Preferably, the top housing assembly includes a static housing assembly and a rotating door assembly which is rotatable relative to the static housing assembly.

Preferably, the product container support and clamping assembly includes:

a product container support element;

a cam element and a plurality of clamp elements, the support element rotatably supporting the cam element and pivotably and slidably supporting the plurality of clamp elements.

Preferably, the clamp element includes a planar generally rectangular portion having a radially outward-facing surface and a radially inward-facing surface.

Preferably, the radially outward-facing surface terminates at a radially inward tapered top surface of a clamping portion which defines a radially inwardly and downwardly directed clamping groove, which extends to the radially inward-facing surface.

Preferably, the tapered top surface and the clamping groove together define a clamping engagement edge.

Preferably, the clamp element includes a planar generally rectangular portion having a cam engagement protrusion, which extends radially inwardly at a bottom portion of a front surface.

Preferably, the multiple motion intelligent driving device also includes a support element pivotable and slidable engagement protrusion formed on the radially outward-facing surface.

Preferably, the multiple motion intelligent driving device also includes a tab engagement protrusion, which is configured for operative engagement with a reuse preventing tab of a product container in response to clamping operation of the clamp element and consequent irreversible radially outward displacement of the reuse preventing tab into a reuse preventing operative orientation.

Preferably, the support element includes a generally circular planar surface which is surrounded by a raised, generally annular planar cup support surface.

Preferably, the support element includes a spillage channel.

Preferably, the support element includes a drive shaft accommodating aperture, which is surrounded by an upstanding circumferential rim, thereby to help prevent leaking of spillage located on the planar surface below support element.

Preferably, the support surface is surrounded by a tapered wall which terminates in a circumferential planar annular top and radially outwardly extending wall having a top-facing surface.

Preferably, the cam element includes a generally circular planar element including:
a generally circular disk having a generally planar top surface and a generally planar bottom surface and being formed with a central aperture; and
a cylindrical circumferential wall surrounding the disk.

Preferably, the cylindrical circumferential wall is configured on a radially outward surface thereof with a plurality of cam channels each arranged to operate and selectably position a clamp element.

Preferably, the plurality of cam channels are each defined by a pair of radially outwardly extending mutually spaced circumferential walls, each the cam channels extending from a first location therealong to a second location therealong.

Preferably, an entry location is defined upstream along each cam channel of the first location, the entry location permitting insertion of a clamp element into the cam channel.

Preferably, each of the cam channels extends circumferentially and downwardly through approximately 100 degrees of azimuth.

Preferably, a width of each cam channel, as defined by the separation between the adjacent radially outward extending circumferential walls is at a maximum at the first location therealong.

Preferably, operation of the cam element in causing the clamp elements to assume a clamping operative orientation is produced both by the downward orientation of the cam channels from the first locations to the second locations and by varying the radial extent of a first circumferential wall defining each of the cam channels relative to the radial extend of a second circumferential wall defining each of the cam channels therealong.

Preferably, the cam channels each have a maximum width between adjacent circumferential walls at the first location therealong so as to accommodate radial outward biasing of the clamp element within the cam channel thereat.

Preferably, the cam channels are each constructed to have a flexible stopper portion downstream of the entry location and upstream of the first location therealong to permit insertion of each clamp element within a cam channel and to prevent inadvertent disengagement of the clamp element from the cam channel.

Preferably, the cam channels are each blocked at the second location therealong, thus preventing disengagement of the clamp element therefrom at the second location.

Preferably, the multiple motion intelligent driving device also includes a generally planar annular wall surface extending radially outwardly of the cylindrical circumferential wall and is formed with a downwardly facing circumferential leakage directing protrusion.

Preferably, the base assembly includes:
a base housing;
a bottom assembly; and
a vertically displacing rotary drive motor assembly.

Preferably, the vertically displacing rotary drive motor assembly includes a rotary drive gear which is rotatably mounted on a motor housing and support assembly.

Preferably, the motor housing and support assembly supports an auxiliary rotary drive motor and encloses an axially displaceable rotary drive assembly.

Preferably, the bottom assembly has load cells mounted therein.

Preferably, the rotary drive gear is driven by the auxiliary rotary drive motor.

Preferably, the rotary drive gear is formed on an outer circumferential surface thereof with a radially outwardly directed circumferentially extending gear train and is formed on an inner circumferential surface thereof with a radially inwardly directed circumferentially extending gear train.

Preferably, the gear trains have an identical pitch and are slightly out of phase.

Preferably, the motor housing and support assembly includes a top element and a bottom element.

Preferably, the top element includes a planar wall portion from which extends upwardly a central upstanding circumferential wall surface, which terminates at an annular generally planar wall surface, which rotatably supports an annular surface of the rotary drive gear.

Preferably, the top element accommodates a plurality of guiding pins which guide the axially displaceable rotary drive assembly in vertical displacement relative to the motor housing and support assembly.

Preferably, the bottom element defines a plurality of spindle accommodating channels, each of which is formed with a spindle locking socket for rotatably locking a spindle against vertical displacement relative to the bottom element.

Preferably, the axially displaceable rotary drive assembly includes:
an outer drive shaft assembly;
a motor support bracket assembly;
an AC motor;
a plurality of spindles
a motor lifting element
a linear to rotary converting adaptor; and
a linearly driven rotating ventilating element.

Preferably, the outer drive shaft assembly includes an outer drive shaft locking engagement element, which is partially seated within an outer drive shaft housing element.

Preferably, the motor support bracket assembly includes a support bracket element onto which is mounted an annular sealing ring.

Preferably, each of the plurality of spindles includes a gear portion at a top end thereof and a generally cylindrical portion below the gear portion, which terminates in a helically threaded portion.

Preferably, the motor lifting element includes a plurality of upstanding internally threaded spindle receiving sockets which are disposed about a generally planar annular wall and defining a central ventilation aperture having disposed centrally thereof a linearly displaceable ventilating element positioning hub.

Preferably, the linear to rotary converting adaptor includes an outer cylindrical wall and an inner cylindrical ring, arranged interiorly of the outer cylindrical wall adjacent the top thereof and attached thereto by integrally formed vertically extending interior ribs each of which have an inclined downward facing end surface.

Preferably, the linearly driven rotating ventilating element includes an outer cylindrical wall to which are connected integrally formed outer edges of a plurality of circumferentially distributed generally radially extending vanes and recesses retaining magnets which may serve for sensing rotational velocity of the rotating ventilating element.

Preferably, inner edges of the vanes are joined to an inner cylindrical wall, which terminates at a downward-facing edge thereof in a planar, generally circular wall having formed at a center thereof a socket, which is configured to lockably receive a bottom end of the drive shaft.

Preferably, the surrounding socket is an inner circular cylindrical wall defining an outer cylindrical wall surface and extending outwardly from cylindrical wall surface are a pair of protrusions, each of which has an inclined upward surface and interacts with a corresponding end surfaces of a corresponding interior ribs of the linear to rotary converting adaptor.

Preferably, interiorly of the inner circular cylindrical is a circumferential wall having a top edge defining a pair of symmetric upward facing teeth, each of which has a pair of inclined tooth surfaces, which meet at a point, the teeth interacting with corresponding teeth of the motor lifting element thereby to ensure desired azimuthal orientation thereof.

Preferably, upon retraction of the drive shaft, the drive shaft is rotated to ensure that it is in at least one acceptable azimuthal orientation with respect to the housing.

Preferably, prior and following operation thereof the drive shaft is in a retracted operative orientation relative to the housing.

There is also provided in accordance with a preferred embodiment of the present invention a product preparation system including:

at least one single-use product container assembly including any one or more of the features of the container assembly set forth hereinabove; and a multiple motion intelligent driving device, including any one or more of the features of the intelligent driving device set forth hereinabove, for processing contents of the at least one single-use product container assembly.

There is also provided in accordance with a preferred embodiment of the present invention a product preparation system including:

at least one single-use product container assembly; and a multiple motion intelligent driving device, including any one or more of the features of the intelligent driving device set forth hereinabove, for processing contents of the at least one single-use product container assembly.

There is additionally provided in accordance with a preferred embodiment of the present invention a product preparation system including:

at least one single-use product container assembly including any one or more of the features of the container assembly set forth hereinabove; and a multiple motion intelligent driving device for processing contents of the at least one single-use product container assembly.

There is further provided in accordance with a preferred embodiment of the present invention a product preparation system including:

at least one single-use product container assembly;

an intelligent driving device operative to process product contained in the container assembly and including weight measurement apparatus which measures the weight of the product in the at least one single-use product container assembly, the intelligent driving device including a computerized controller which varies at least one parameter of processing the product in response to the measured weight thereof.

Preferably, the computerized controller varies at least one parameter of processing the product in response to the measured weight thereof when the measured weight exceeds at least one first limit.

Preferably, the computerized controller varies at least one parameter of processing the product in response to the measured weight thereof when the measured weight does not exceed at least one second limit.

Preferably, the intelligent driving device is responsive to a plurality of different control instructions associated with corresponding different ones of the at least one single use product container assembly.

Preferably, the intelligent driving device is in a first driving device operative orientation, a vertically displacing rotary drive motor assembly of the intelligent driving device is in its rest position, an axially displaceable rotary drive assembly of the intelligent driving device is in its lowest vertical position, such that a motor lifting element of the intelligent driving device is at its lowest vertical position.

Preferably, when the vertically displacing rotary drive motor assembly of the intelligent driving device is in the rest position, first teeth of the motor lifting element operatively engage corresponding second teeth of a linearly driven rotating ventilating element of the intelligent driving device such that inclined surfaces the first teeth slidingly engage corresponding inclined surfaces of the second of teeth.

Preferably, when the intelligent driving device is in the first driving device operative orientation, a linear to rotary converting adaptor is in its highest vertical position.

Preferably, when the intelligent driving device is in a second driving device operative orientation, the vertically displacing rotary drive motor assembly is in a lower intermediate position and the axially displaceable rotary drive assembly is in a relatively low but not lowest vertical position, such that the motor lifting element is raised from its lowest vertical position by operation of spindles of the intelligent driving device while the first teeth of the motor lifting element still operatively engage the corresponding second teeth of the linearly driven rotating ventilating element such that the inclined surfaces of the first teeth slidingly engage corresponding inclined surfaces of the second teeth.

Preferably, when the intelligent driving device is in the second driving device operative orientation, the linear to rotary converting adaptor remains in the highest vertical position.

Preferably, raising of the motor lifting element provides corresponding raising of the motor support bracket assembly and of an AC motor of the intelligent driving device, a drive shaft of the intelligent driving device is raised together with the linearly driven rotating ventilating element.

Preferably, when the intelligent driving device is in a third driving device operative orientation, the vertically displacing rotary drive motor assembly is in an upper intermediate position, the motor support bracket assembly is at its highest position and the motor lifting element is in a relatively high but not its highest vertical position.

Preferably, when the intelligent driving device is in the third driving device operative orientation, the linear to rotary converting adaptor remains in the highest vertical position.

Preferably, further raising of the motor lifting element provides corresponding further raising of the motor support bracket assembly, of the AC motor and of the drive shaft, whereby the drive shaft is at its highest position and the linearly driven rotating ventilating element is at its highest position, while the first teeth of the motor lifting element still operatively engage the corresponding second teeth of the linearly driven rotating ventilating element that inclined surfaces of the first teeth slidingly engage corresponding inclined surfaces of the second teeth.

Preferably, when the intelligent driving device is in a fourth driving device operative orientation, the vertically displacing rotary drive motor assembly is in its highest vertical position, the motor support bracket assembly remains at its highest position and the motor lifting element is raised to its highest vertical position.

Preferably, when the intelligent driving device is in the fourth driving device operative orientation, the linear to rotary converting adaptor is lowered relative to the motor lifting element.

Preferably, in the fourth driving device operative orientation, the drive shaft remains at its highest position, the linearly driven rotating ventilating element remains in its highest position and is disengaged from the motor lifting element, thereby allowing rotation of the linearly driven rotating ventilating element relative to the motor lifting element.

Preferably, when the product container assembly and the intelligent driving device are in a first product processing operative orientation, the product container assembly is in an upside-down unclamped orientation on a product container support surface of the intelligent driving device in operative engagement with the intelligent driving device and a door assembly of the intelligent driving device is in a closed operative orientation.

Preferably, when the product container assembly and the intelligent driving device are in the first product processing operative orientation, clamp elements of the intelligent driving device are in a retracted operative orientation.

Preferably, when the product container assembly and the intelligent driving device are in the first product processing operative orientation, each of the clamp elements is arranged with respect to a cam element of the intelligent driving device at a first location of a corresponding cam channel of the cam element, whereby the radial extent of the upper circumferential wall defining the cam channel is at a maximum, forcing the clamp element located in the cam channel at the first location radially outwardly, thereby enabling insertion of the product container assembly into upside down engagement with the intelligent driving device provided that reuse preventing tabs of the product container assembly are not in an outwardly extended operative orientation.

Preferably, when the product container assembly and the intelligent driving device are in a second product processing operative orientation the product container assembly is in upside-down partially clamped operative engagement with the intelligent driving device.

Preferably, when the product container assembly and the intelligent driving device are in the second product processing operative orientation, an auxiliary motor of the intelligent driving device is in operative engagement with a rotary drive gear of the intelligent driving device, which causes rotation of spindles of the intelligent driving device to raise a motor housing and support assembly of the intelligent driving device producing corresponding raising of an outer drive shaft assembly, while the cam element, thereby reorienting the clamp elements an inward clamping orientation.

Preferably, when the product container assembly and the intelligent driving device are in the second product processing operative orientation, the outer drive shaft assembly is partially seated in a drive shaft seating recess of a blade element of the product container assembly.

Preferably, when the product container assembly and the intelligent driving device are in the second product processing operative orientation, a tab engagement protrusion of at least one of the clamp elements operatively engages a reuse preventing tab of the product container assembly and causes irreversible radially outward displacement of the tab, thereby providing single-use functionality for the product container assembly.

Preferably, when the product container assembly and the intelligent driving device are in a third product processing operative orientation the product container assembly is in upside-down fully clamped operative engagement with the intelligent driving device and the outer drive shaft assembly is fully seated in a drive shaft seating recess of the blade element, however the blade element remains within a blade recess in the product container assembly.

Preferably, when the product container assembly and the intelligent driving device are in a fourth product processing operative orientation the product container assembly is in upside-down fully clamped operative engagement with the intelligent driving device and the outer drive shaft assembly is fully seated in a drive shaft seating recess of the blade element, and the blade element is raised from within a blade recess in the product container assembly and is free to rotate within the product container assembly and thus process the contents thereof.

Preferably, at this stage, the intelligent driving device is in the fourth driving device operative orientation.

Preferably, when the product container assembly and the intelligent driving device are in a fifth product processing operative orientation the blade element is rotated to an azimuthal orientation which allows the blade element to be axially retracted into the blade recess.

Preferably, the rotation of the blade element to the azimuthal orientation which allows the blade element to be axially retracted into the blade recess may be in either a clockwise or counterclockwise direction.

Preferably, the rotation of the blade element to the azimuthal orientation which allows the blade element to be axially retracted into the blade recess is produced by mechanical interaction of teeth of the motor lifting element and teeth of the linearly driven rotating ventilating element.

Preferably, the rotation is preceded by a mechanical interaction of corresponding surfaces of the linear to rotary converting adaptor and the linearly driven rotating ventilating element, depending on the precise azimuthal orientation of the blade element prior to the rotation.

Preferably, when the product container assembly and the intelligent driving device are in a sixth product processing operative orientation the blade portion is axially retracted into the blade recess.

Preferably, when the product container assembly and the intelligent driving device are in a seventh product processing operative orientation the product container assembly is unclamped from the intelligent driving device.

Preferably, there is provided static/dynamic sealing for prevention and or collection of liquid leaking from the product container assembly when in an upside down state in operative orientation with the intelligent driving device.

Preferably, the static/dynamic sealing is provided an interaction of a blade element with other portions of the product container assembly.

Preferably, when the product container assembly and the intelligent driving device are in a first sealing operative orientation prior to rotational operation of the blade element, the blade element is fully seated in a downwardly-facing blade receiving recess of a lid forming part of the product container assembly.

Preferably, when the product container assembly and the intelligent driving device are in the first sealing operative orientation, the intelligent driving device is in the first intelligent driving device operative orientation.

Preferably, when the product container assembly and the intelligent driving device are in the first sealing operative orientation, a static seal is defined by pressure engagement between static sealing surface of the blade element and a corresponding static sealing surface of the lid.

Preferably, when the product container assembly and the intelligent driving device are in the first sealing operative orientation the blade element is mechanically locked to a cover forming part of the product container assembly against linear mutual displacement therebetween.

Preferably, when the product container assembly and the intelligent driving device are in a second sealing operative orientation, the blade is no longer seated in the downwardly-facing blade receiving recess by virtue of raising of the outer drive shaft assembly.

Preferably, when the product container assembly and the intelligent driving device are in the second sealing, the intelligent driving device is in the fourth intelligent driving device operative orientation.

Preferably, when the product container assembly and the intelligent driving device are in the second sealing operative orientation, a static seal is no longer defined by pressure engagement between the static sealing surface of the blade element and the corresponding static sealing surface of the lid.

Preferably when the product container assembly and the intelligent driving device are in the second sealing operative orientation, static sealing is provided by a slight underpressure produced within the region of walls of the blade element and walls of the lid by virtue of raising of the blade element.

Preferably, when the product container assembly and the intelligent driving device are in the second sealing operative orientation, static sealing is provided by underpressure resulting from defrosting of frozen contents of the product container assembly.

Preferably, the underpressure, combined with capillary effects between adjacent surfaces of walls blade element and walls of resists the leakage of liquid from the interior of the product container through a region of the product container defined by walls of the blade element and walls of the lid.

Preferably, when the product container assembly and the intelligent driving device are in the second sealing operative orientation, the blade element is no longer mechanically locked to the cover against linear mutual displacement therebetween in response to an axial force provided by raising of the outer drive shaft assembly.

Preferably, when the product container assembly includes leaked fluid egress apertures which communicate with sealed leaked fluid reservoir volumes.

Additionally in accordance with a preferred embodiment of the present invention there is provided a food preparation method including:
providing a single-use food preparation container assembly containing a food product and including:
a container body;
a single-use cover-seal for the container body and defining with the single-use container body a food preparation enclosure; and
an externally rotatably drivable rotary food engagement assembly; and
rotatably driving the rotary food engagement assembly for processing the food product for consumption without disengaging the single-use cover-seal from the container body.

Preferably, the method includes supplying liquid to the food product via a resealable opening communicating with the food preparation enclosure.

Further in accordance with a preferred embodiment of the present invention there is provided a food preparation method including:

providing a product within a single-use product container assembly including any one or more of the container assembly features set forth above; and
processing the product within the single-use product container assembly using a multiple motion intelligent driving device including any one or more of the driving device features set forth above.

Still further in accordance with a preferred embodiment of the present invention there is provided a food preparation method including:
providing a product within a single-use product container assembly; and
processing the product within the single-use product container assembly using a multiple motion intelligent driving device including any one or more of the driving device features set forth above.

Yet further in accordance with a preferred embodiment of the present invention there is provided a food preparation method including:
providing a product within a single-use product container assembly including any of the container assembly features set forth above; and
processing the product within the single-use product container assembly using a multiple motion intelligent driving device.

Still further in accordance with a preferred embodiment of the present invention there is provided a food preparation method including:
providing a product within a single-use product container assembly; and
processing the product within the single-use product container assembly using a multiple motion intelligent driving device;
measuring a weight of the product in the at least one single-use product container assembly; and
varying at least one parameter of processing the product in response to the measured weight thereof.

Preferably, the varying includes varying at least one parameter of processing the product in response to the measured weight thereof when the measured weight exceeds at least one first limit.

Preferably, the varying includes varying at least one parameter of processing the product in response to the measured weight thereof when the measured weight does not exceed at least one first limit.

Preferably, the varying includes varying at least one parameter of processing the product in response to the measured weight thereof when the measured weight does not exceed at least one second limit.

Preferably, the at least one single-use product container assembly includes a product container assembly having any one or more of the container assembly features set forth above.

Preferably, the intelligent driving device includes a multiple motion intelligent driving device having any one or more of the driving device features set forth above.

Preferably, the processing is responsive to a plurality of different control instructions associated with corresponding different ones of the at least one single use product container assembly containing different products.

Preferably, the container assembly and the intelligent driving device form part of a product preparation system having any one or more of the system features set forth hereinabove.

Preferably, the processing includes adding any required liquid to the product container assembly.

Preferably, the processing includes turning the container assembly upside down and inserting it, in an upside-down orientation into operative engagement with the intelligent driving device.

Preferably, the processing includes reading and decrypting machine readable information contained in the container assembly.

Preferably, the machine readable information includes at least one of:

a process recipe for processing of the product in the container assembly;

a reference weight of the container assembly including the product (RWF);

a reference weight of any liquid (RWL) to be added by the user to the container assembly prior to processing;

type of product specific ID;

unique ID for the container assembly including the product; and at least one Internet link to information of possible interest in relation to the product.

Preferably, the process recipe includes at least time sequencing of rotation of a blade element forming part of the container assembly including intended rpm, rpm threshold levels and timing.

Preferably, the processing includes weighing the container assembly together with the product contained therein and any liquid added thereto by means of load cells forming part of the intelligent driving device and generating a Measured Weight Output (MWO).

Preferably, the processing includes confirming based on the MWO that an acceptable filled container assembly has been inserted into operative engagement with the intelligent driving device.

Preferably, the processing includes processing in accordance with a predetermined process recipe if the MWO is within a predetermined range of the sum of the RWO and RWL.

Preferably, the processing includes processing in accordance with a modified process recipe if the MWO is not within a predetermined range of the sum of the RWO and RWL but is within predetermined limits.

Preferably, the processing includes not proceeding with processing in accordance with a modified process recipe if the MWO is not within a predetermined range of the sum of the RWO and RWL but is not within predetermined limits and prompting a user accordingly.

Preferably, the processing includes monitoring RPM of the blade element.

Preferably, the processing includes monitoring RPM of the blade element and when monitored RPM falls substantially from a predetermined level, indicating that processing is nearly complete, entering a processing completion mode of operation.

Preferably, the processing includes collecting leaked liquid in a leaked liquid reservoir in the container assembly.

BRIEF DESCRIPTION OF THE DRAWINGS

The present invention will be understood and appreciated more fully from the following detailed description, taken in conjunction with the drawings in which:

FIGS. 8A, 8B, 8C, 8D and 8E are simplified respective planar top, planar bottom, pictorial bottom, planar sectional and pictorial sectional illustrations of a further alternative embodiment of a blade of the single-use cover seal of FIGS. 2A-3B, FIGS. 8D and 8E being taken along respective section lines D-D in FIG. 8B and E-E in FIG. 8A;

FIGS. 24A, 24B, 24C, 24D, 24E and 24F are simplified respective planar top, planar bottom, planar side, sectional, pictorial top and pictorial bottom view illustrations of a top element forming part of the motor housing and support assembly of FIGS. 23A-23D, FIG. 24D being taken along lines D-D in FIG. 24A;

FIGS. 29A, 29B, 29C, 29D and 29E are simplified respective planar side, pictorial, planar top, first sectional and second sectional view illustrations of an outer drive shaft assembly forming part of the axially displaceable rotary drive assembly of FIGS. 26A-26E, FIGS. 29D and 29E being taken along lines D-D in FIG. 29C and illustrate two different operative orientations;

FIGS. 31A, 31B and 31C are simplified planar front, planar side and pictorial illustrations of an outer drive shaft locking engagement element forming part of the outer drive shaft assembly of FIGS. 29A-29E;

FIGS. 35A, 35B, 35C, 35D and 35E are simplified respective planar top, planar side, planar bottom, top-facing pictorial and bottom-facing pictorial view illustrations of a motor lifting element forming part of the axially displaceable rotary drive assembly of FIGS. 26A-26E;

FIGS. 40A, 40B, 40C, 40D, 40E, 40F and 40G are sectional illustrations showing part of the vertically displacing rotary drive motor assembly seen in FIGS. 39A-39D in six operative orientations;

DETAILED DESCRIPTION OF PREFERRED EMBODIMENTS

Figure 1A:
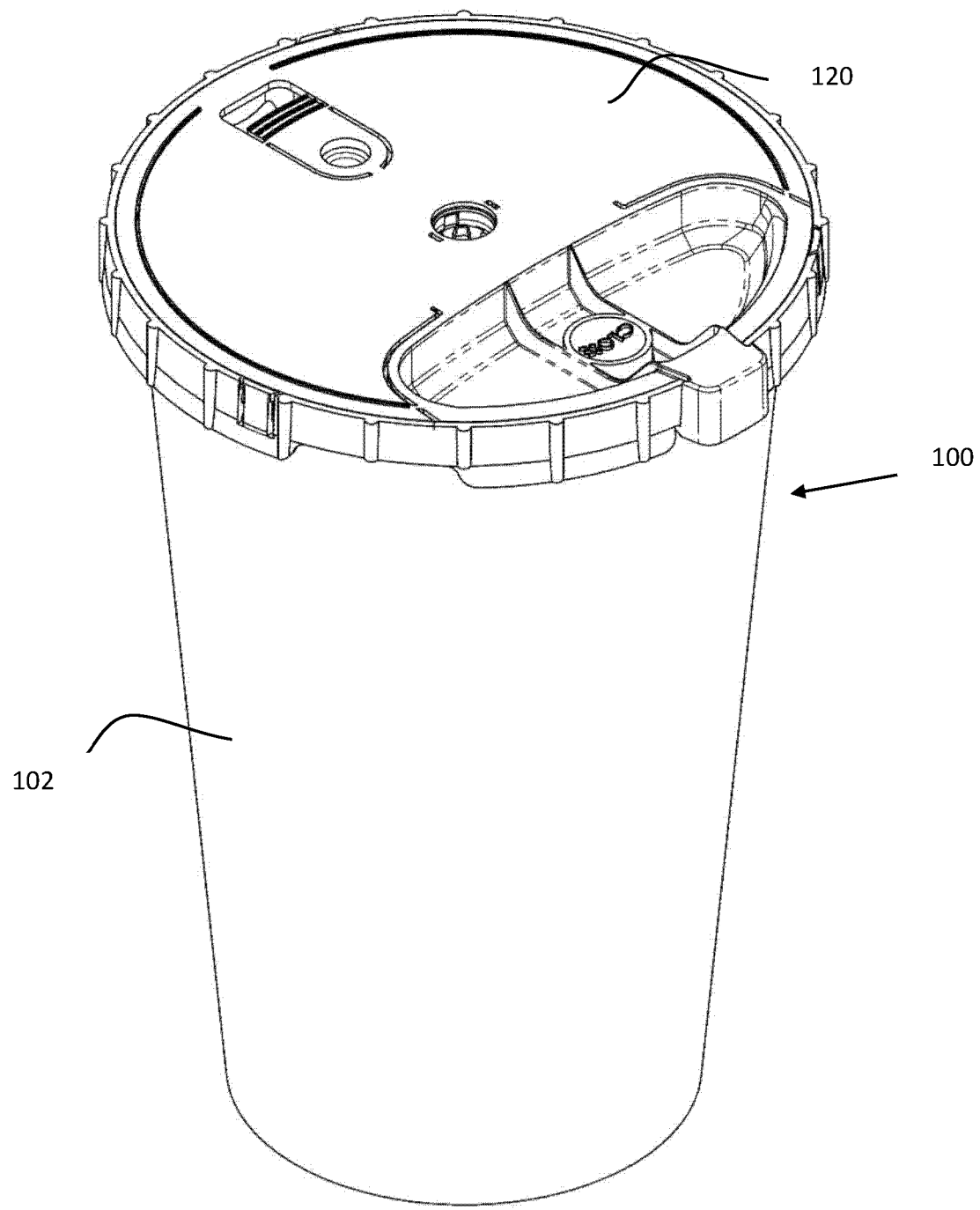
FIG. 1A is a simplified pictorial illustration of a single-use preparation container assembly (SUPCA) constructed and operative in accordance with a preferred embodiment of the present invention.
Figure 1B:
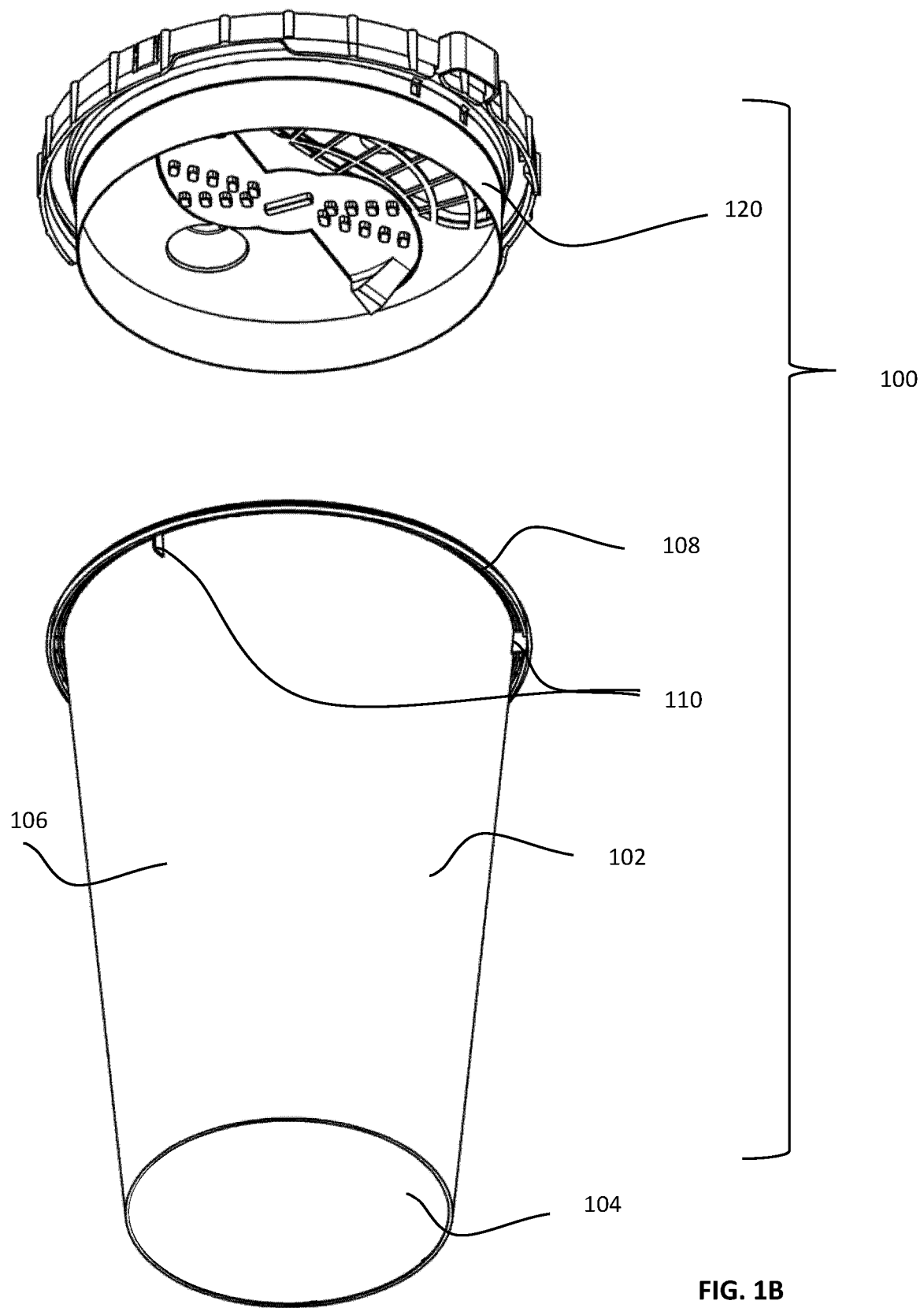
FIG. 1B is a simplified exploded view illustration of the SUPCA of FIG. 1A
Figure 2A:
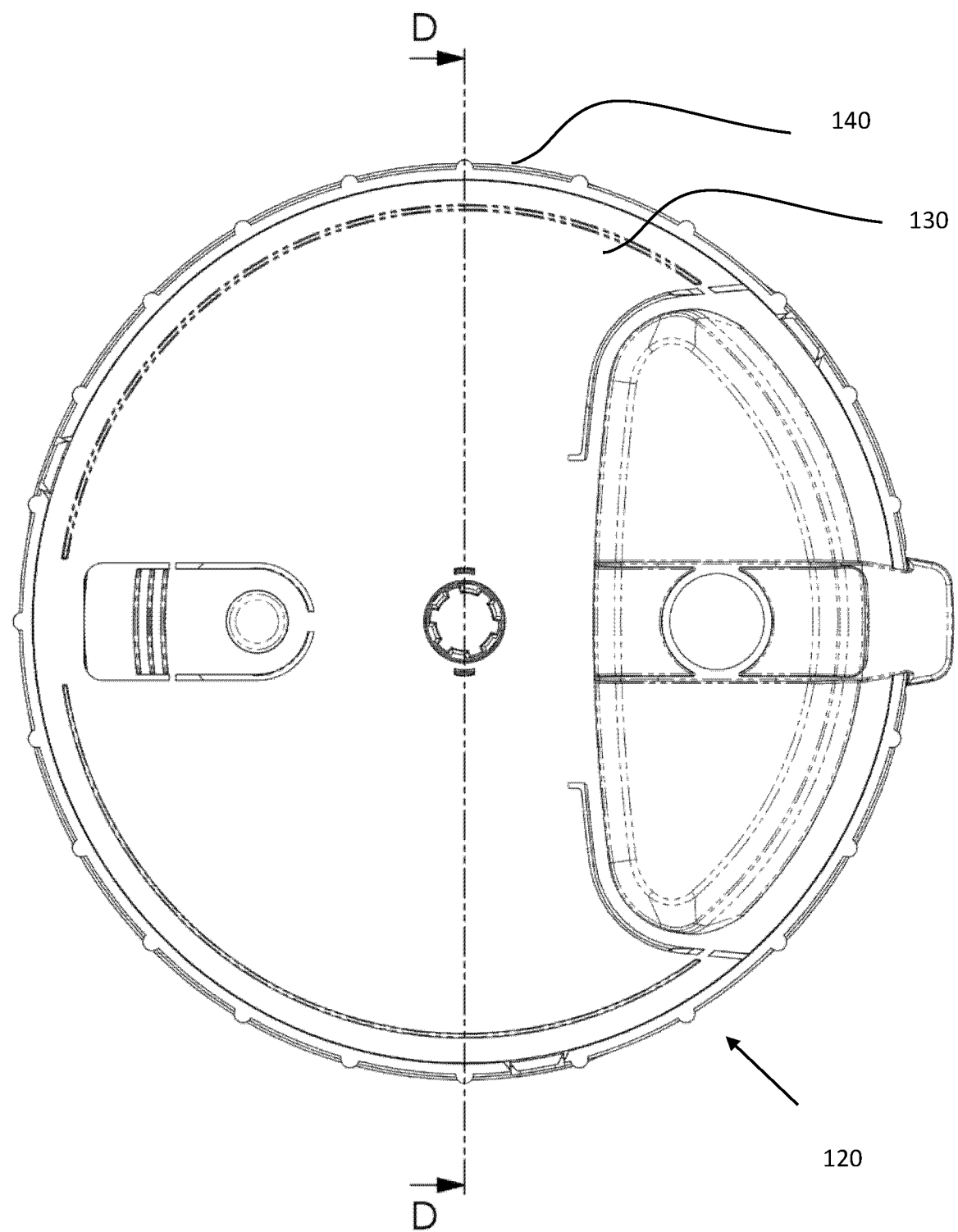
FIGS. 2A, 2B, 2C, and 2D are simplified respective planar top view, planar bottom view, planar side view and planar sectional illustrations of a single-use cover, seal and externally rotatably drivable rotary engagement assembly (SUCSERDREA) forming part of the SUPCA of FIGS. 1A & 1B, FIG. 2D being taken along lines D-D in FIG. 2A.
Figure 2B:
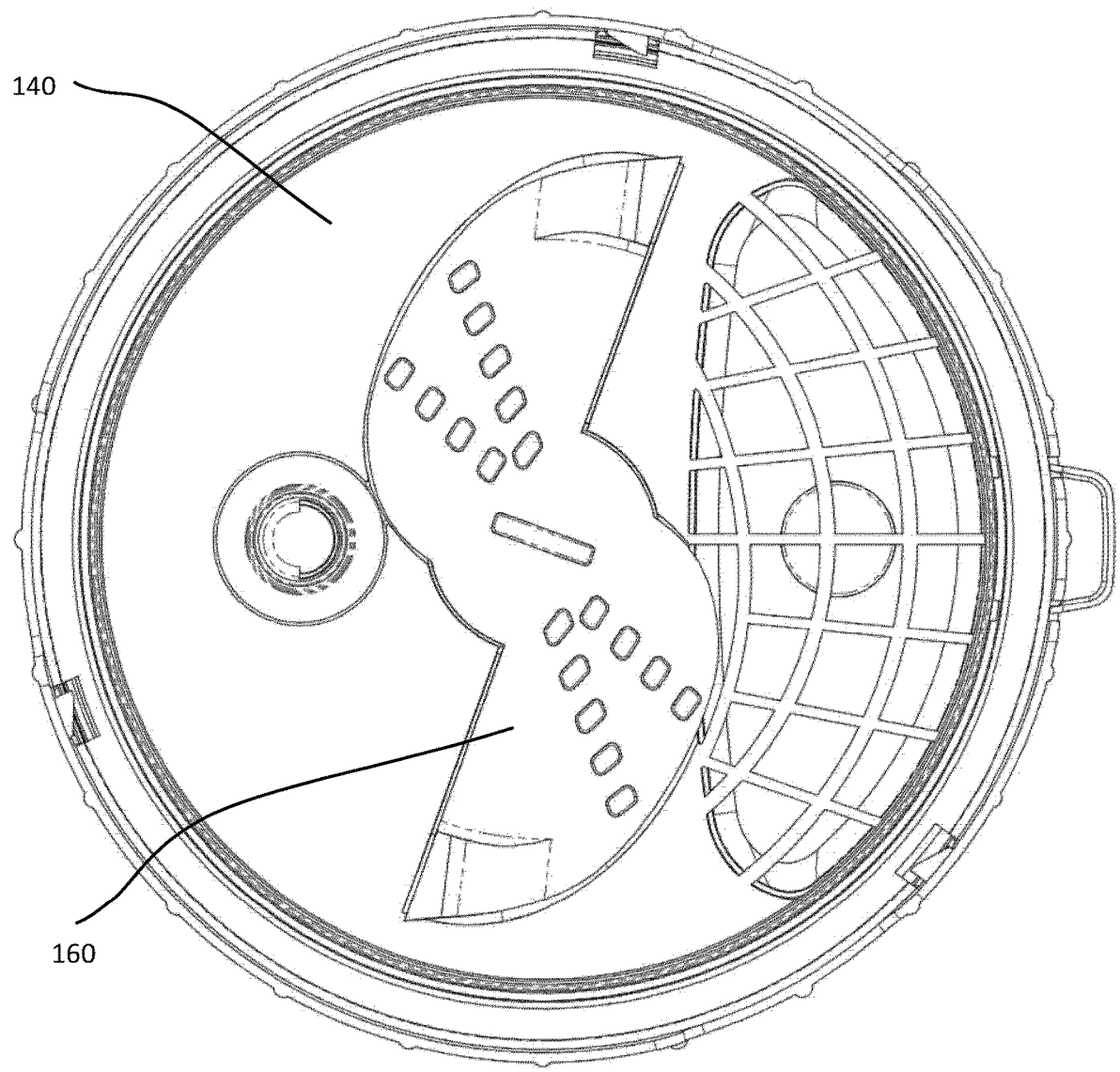
Figure 2C:
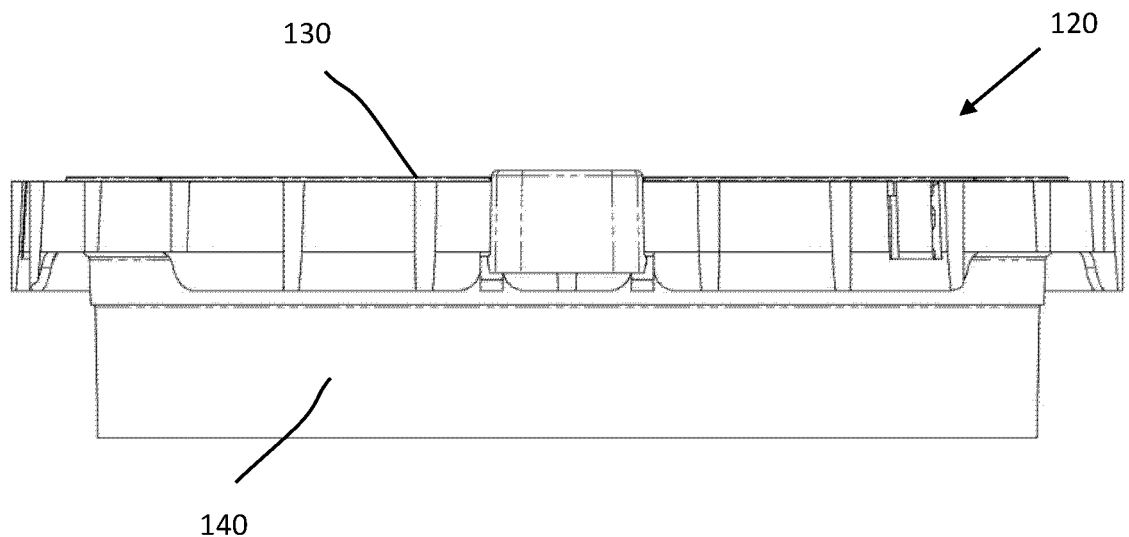
Figure 2D:
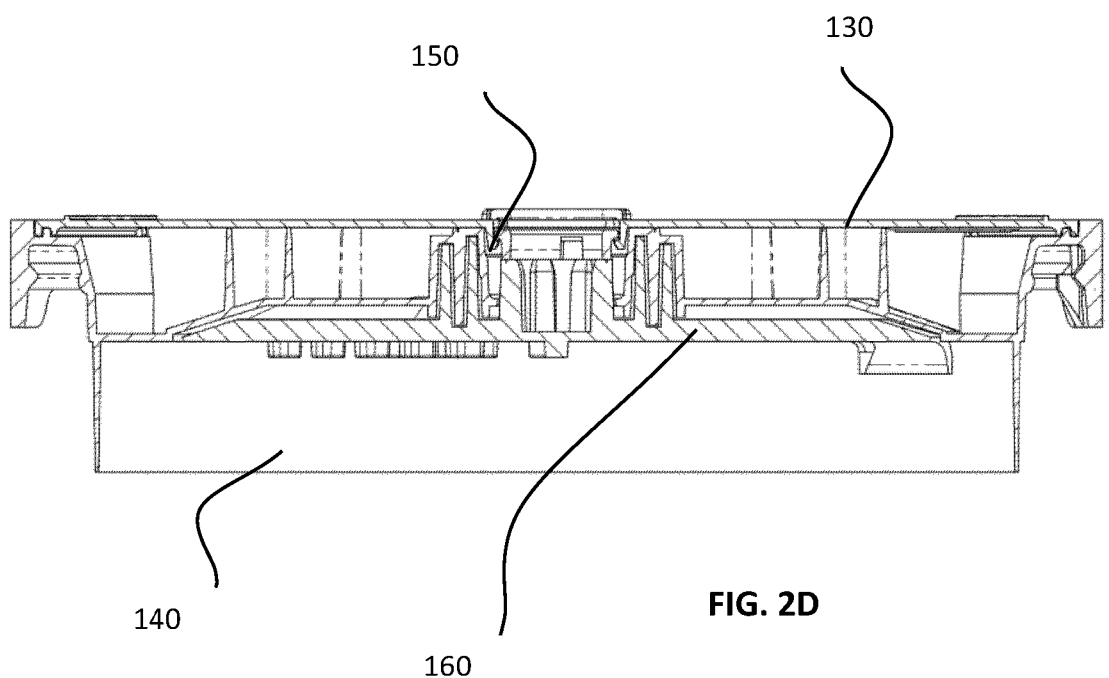

Reference is now made to FIGS. 1A and 1B, which are, respectively, a simplified pictorial illustration and a simplified exploded view illustration of a single-use preparation container assembly (SUPCA) 100, also referred to as a product container assembly, constructed and operative in accordance with a preferred embodiment of the present invention. SUPCA 100 is preferably used for food products but is not limited for use therewith unless explicitly stated hereinbelow.

As seen in FIGS. 1A and 1B, SUPCA 100 preferably comprises a single-use container body 102 for containing a food product prior to, during and following food preparation. Single-use container body 102 may be any suitable container body 102 and is preferably a truncated conical shaped container, preferably formed of polypropylene having a bottom wall 104, a truncated conical side wall 106, a circumferential rim 108 and a plurality of, typically three, radially outwardly extending tamper indicating tabs 110 underlying circumferential rim 108.

In accordance with a preferred embodiment of the invention, there is also provided a single-use cover seal and externally rotatably drivable rotary engagement assembly (SUCSERDREA) 120 for both human and machine sensible tamper-evident and re-use preventing fluid sealing engagement with the single-use container body 102. SUCSERDREA 120 is preferably used for food products but is not limited for use therewith unless explicitly stated hereinbelow.

It is a particular feature of the present invention that the same SUCSERDREA 120 may be used for container bodies 102 having different sizes and configurations, provided that their circumferential rim 108 is uniform.

A preferred embodiment of SUCSERDREA 120 is illustrated in FIGS. 2A-3B. As seen in FIGS. 2A-3B, SUCSERDREA 120 preferably includes a cover 130, a lid 140, a hub 150 and a blade element 160. Cover 130 and lid 140 are preferably fixedly connected to each other, preferably by suitable welding techniques, preferably ultrasonic welding.

Hub 150 is preferably fixedly connected to blade element 160 and is arranged for sealed rotation with respect to cover 130 and lid 140. Alternatively, hub 150 and blade element 160 may be integrally formed.

SUCSERDREA 120 preferably includes a machine-readable information source 162, preferably an RFID chip, but alternatively a bar-coded label or any other suitable machine-readable information source. Preferably, the information contained on the machine-readable information source 162 is encrypted. Information source 162 may contain some or all of the relevant information and/or may provide a reference, such as a link to information available on the internet.

Figure 3A:
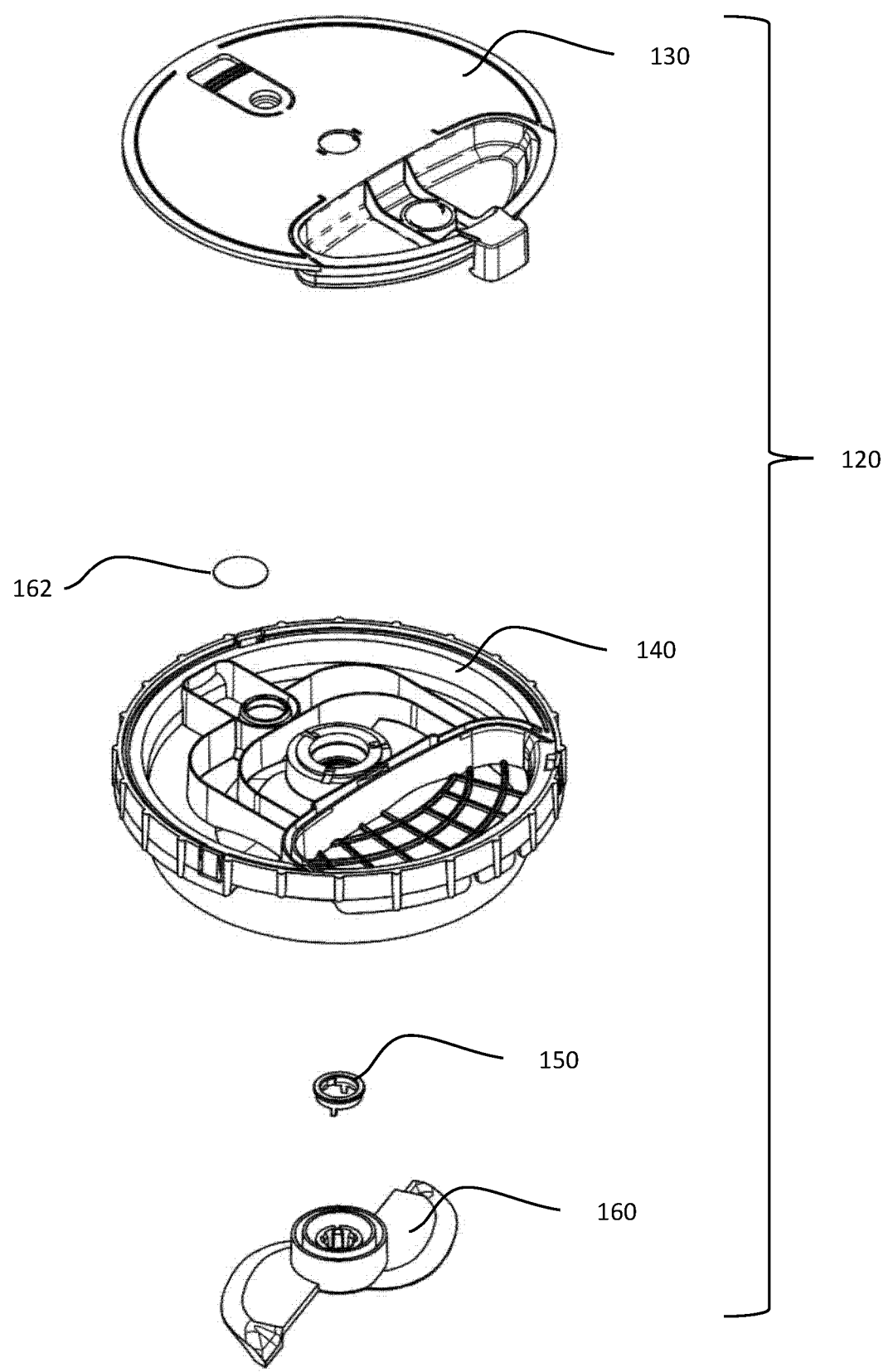
FIGS. 3A and 3B are simplified respective downward-facing and upward-facing exploded view illustrations of the SUCSERDREA of FIGS. 2A-2C.
Figure 3B:
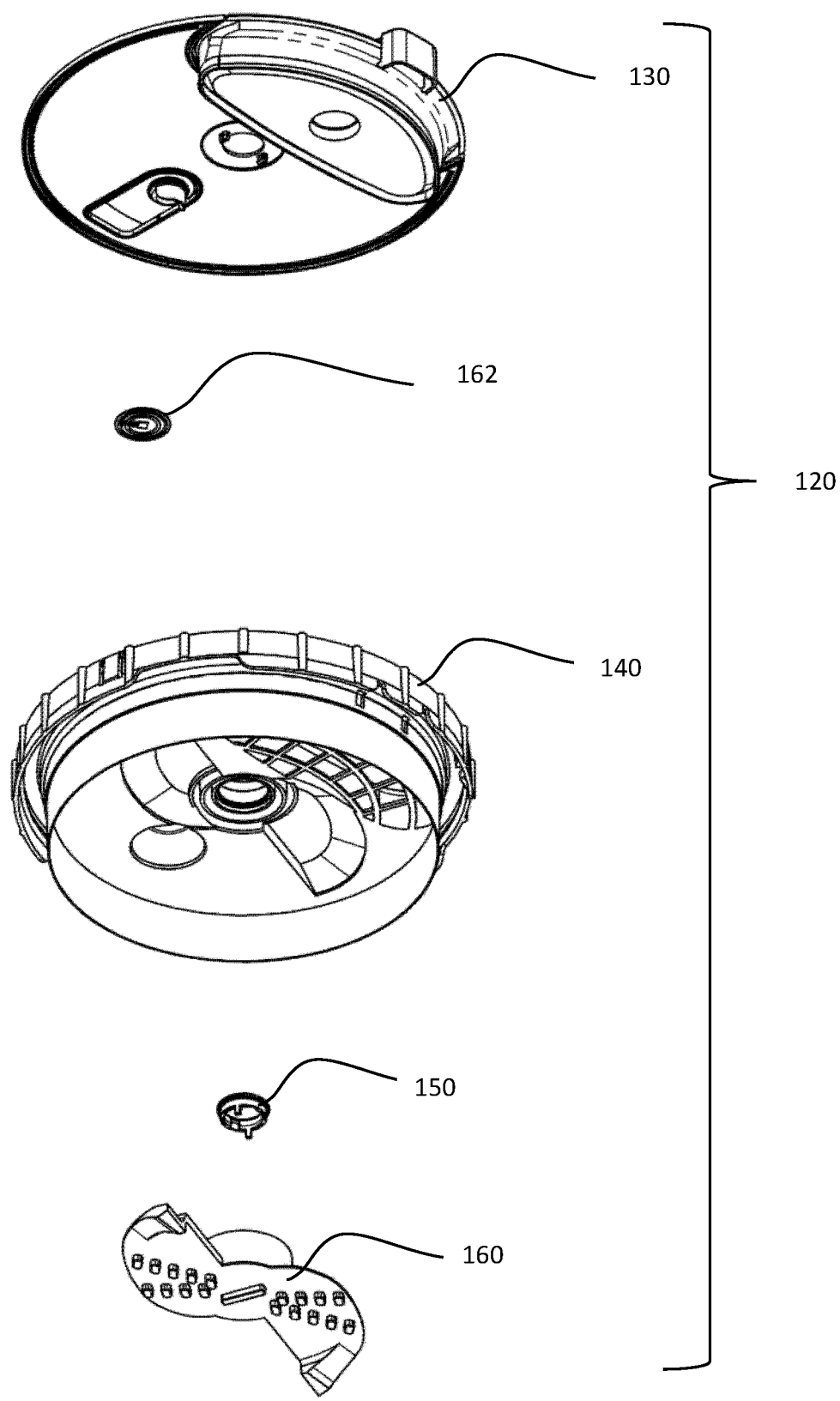
Figure 4A:
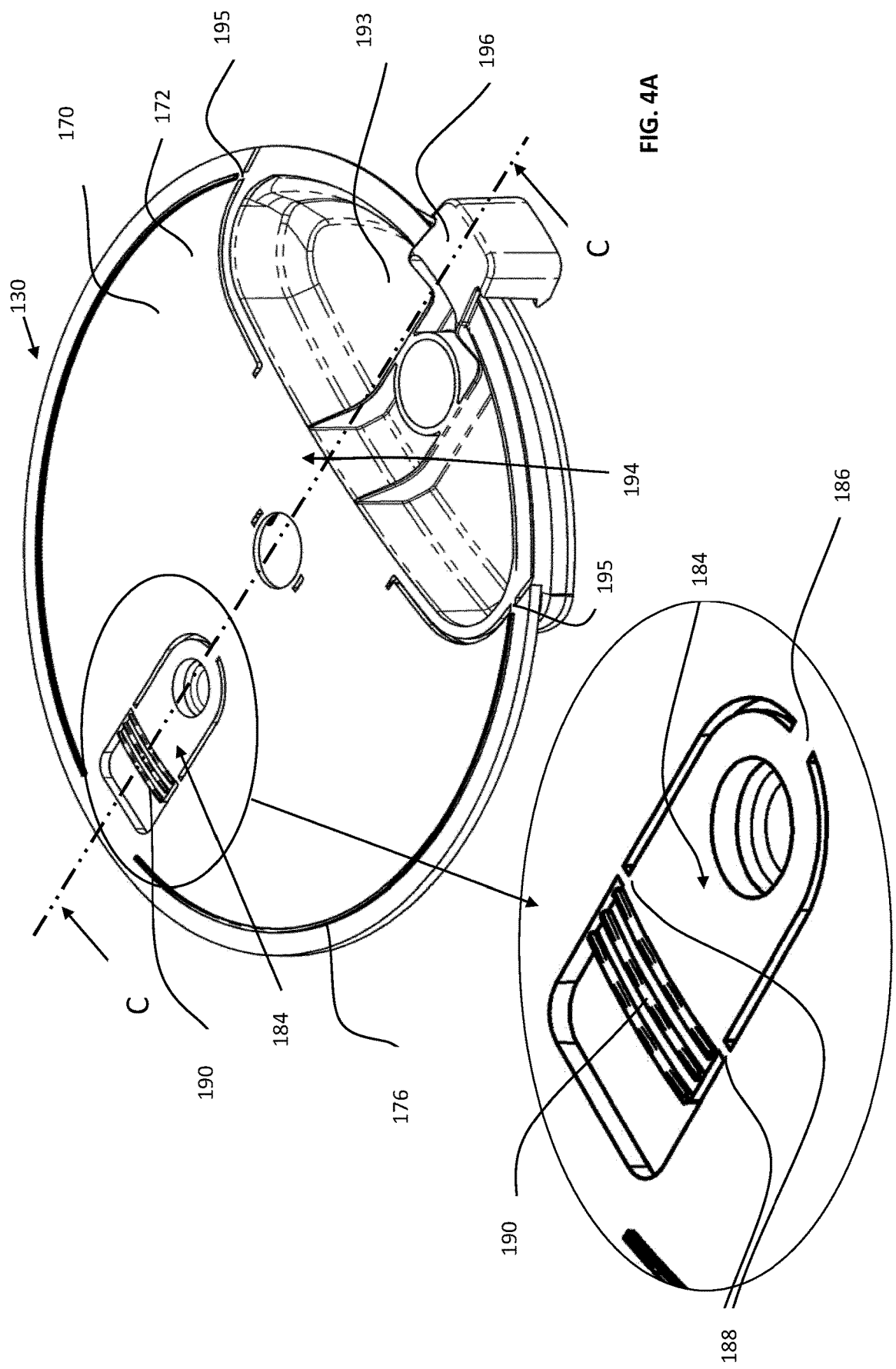
FIGS. 4A, 4B and 4C are simplified respective top, bottom and planar sectional illustrations of a cover of the single-use cover seal of FIGS. 2A-3B, FIG. 4C being taken along lines C-C in FIG. 4A.
Figure 4B:
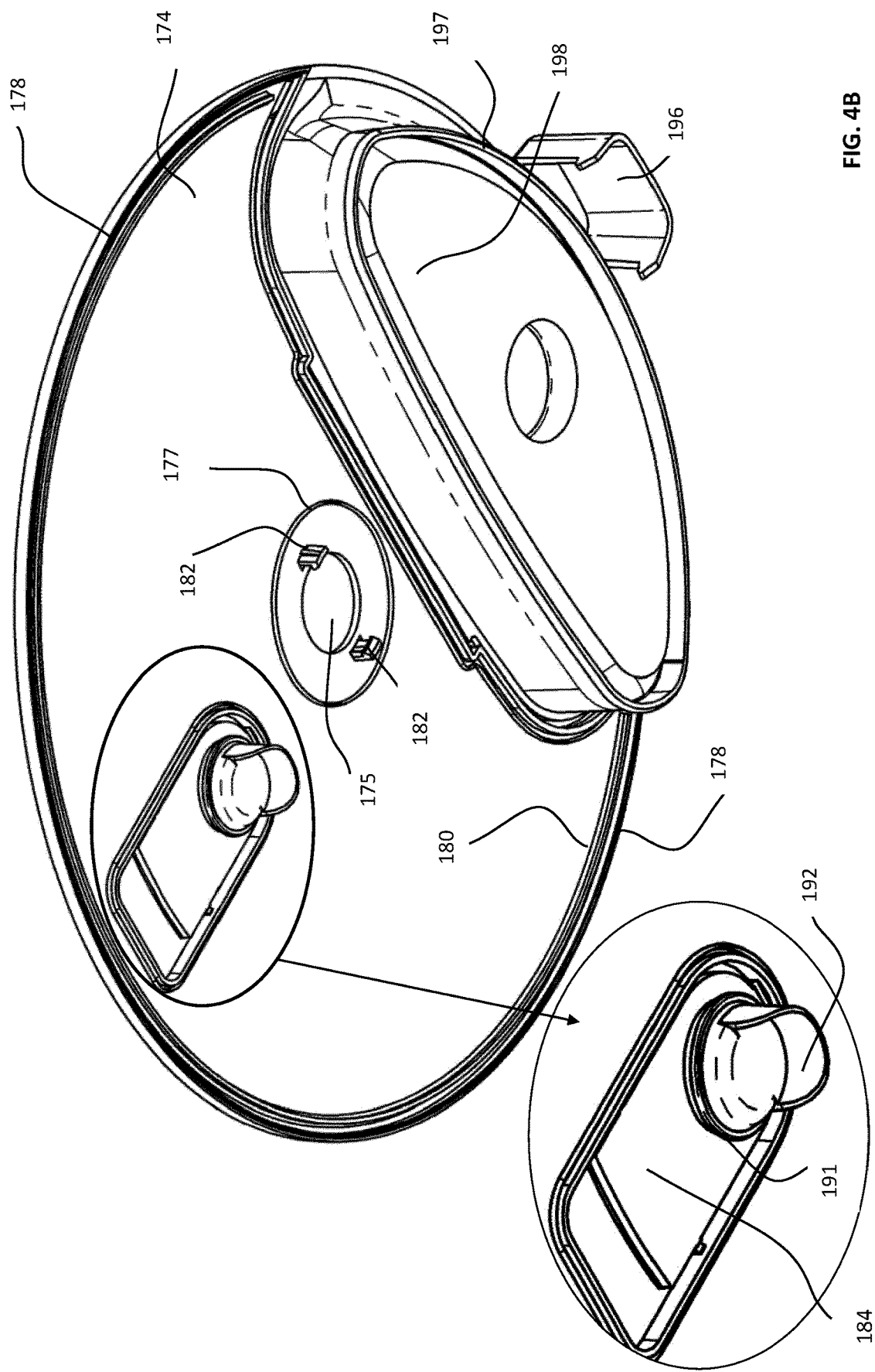
Figure 4C:
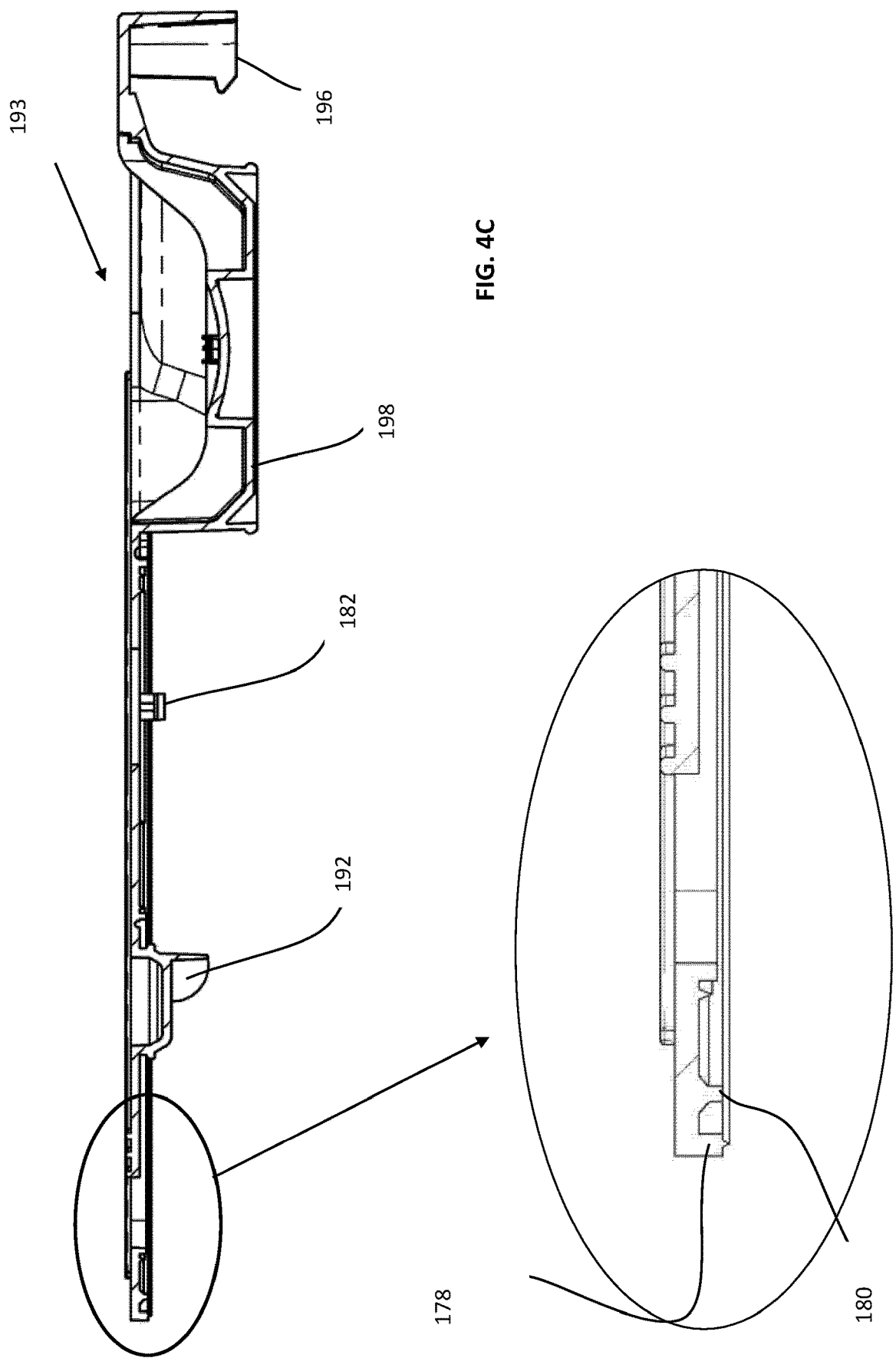

Reference is now additionally made to FIGS. 4A, 4B and 4C, which are respective simplified top, bottom and sectional illustrations of cover 130 of SUCSERDREA 120 of FIGS. 2A-3B. As seen in FIGS. 4A-4C, cover 130 preferably comprises a generally circular planar portion 170 having an upwardly-facing surface 172 in the sense of FIG. 3A and a downwardly-facing surface 174 in the sense of FIG. 3B. A central aperture 175 is formed in generally circular planar portion 170. An upwardly facing, in the sense of FIG. 3A, generally circular stacking positioning protrusion 176 is preferably formed on upwardly-facing surface 172. Three mutually concentric, mutually spaced downwardly-facing, in the sense of FIG. 3B, generally circular generally circumferential protrusions 177, 178 and 180 are formed on downwardly-facing surface 174 for welding to corresponding protrusions of lid 140. A pair of downward and inwardly facing hook protrusions 182 are also formed on downwardly-facing surface 174 adjacent aperture 175 for disengageable mounting of hub 150 onto cover 130.

Formed in generally circular planar portion 170 is an integrally hinged pivotably openable straw ingress opening cover 184, including an integral hinge portion 186 and a pair of human visually sensible tamper-evident frangible portions 188, which are normally necessarily broken when opening straw ingress opening cover 184. A finger engagement portion 190 is defined as an extension of straw ingress opening cover 184. Integrally hinged pivotably openable straw ingress opening cover 184 is preferably formed with an outer peripheral sealing surface 191, which removably sealably engages a corresponding straw ingress opening of lid 140 (FIGS. 5A-5M). A guiding lip portion 192 is preferably provided for guiding the straw ingress opening cover 184 when resealing straw ingress opening cover 184 with respect to corresponding straw ingress opening of lid 140.

Also formed in generally circular planar portion 170 is an integrally hinged liquid ingress cover 193 including an integral hinge 194 and a pair of human visually sensible tamper-evident frangible portions 195, which are normally necessarily broken when opening cover 193. A finger engagement portion 196 is defined as a radially outwardly extension of cover 193 and also serves for rotational orientation of SUPCA 100 onto a multiple motion intelligent driving device (MMIDD) (FIGS. 10A-10C), also referred to as an intelligent driving device, as is described hereinbelow.

Integrally hinged pivotably openable liquid ingress opening cover 193 is preferably formed with an outer peripheral sealing surface 197 which terminates in a recessed, generally planar, downwardly-facing in the sense of FIG. 3B, cover surface 198.

Reference is now made to FIGS. 5A-5M, which illustrate lid 140 of the SUCSERDREA 120 of FIGS. 2A-3B.

As seen in FIGS. 5A-5M, lid 140 preferably is a generally circular, generally planar element 200 having a generally circumferential edge surface 210 including a plurality of generally vertical radially outwardly extending elongate protrusions 212 distributed therealong. A plurality of, typically three, integrally hinged tamper and reuse indicating tabs 214 are formed in respective openings 215 in circumferential edge surface 210. Each of tabs 214 is formed with a pair of tapered mutually circumferentially spaced edge surfaces 216 and a radially inwardly facing cam 217 defining a cam engagement surface 218.

Figure 5A:
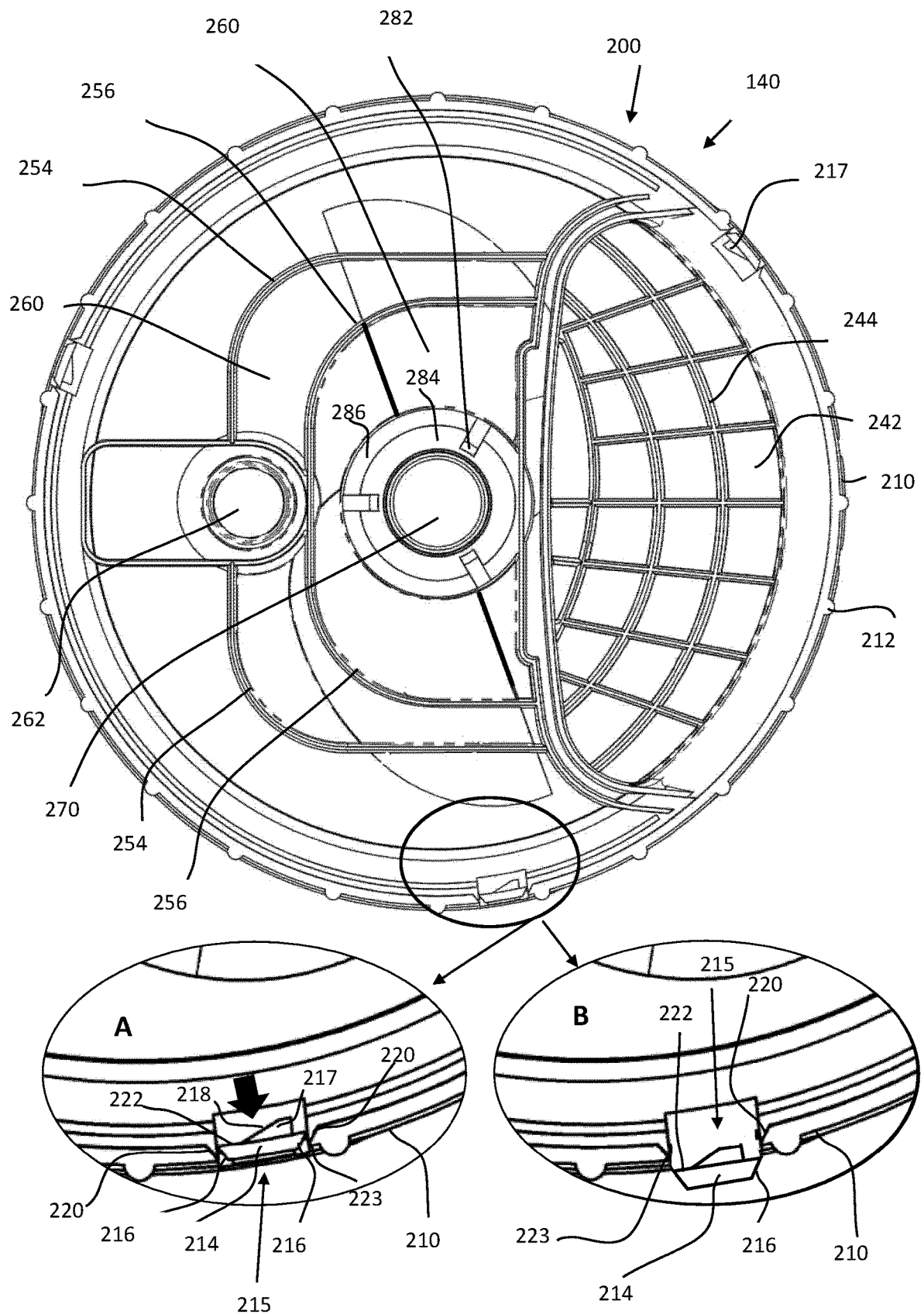
FIGS. 5A, 5B, 5C, 5D, 5E, 5F, 5G, 5H and 5I are simplified respective planar top, planar bottom, pictorial top, pictorial bottom, first planar sectional, second planar sectional, third planar sectional, pictorial sectional and bottom pictorial illustrations of a lid of the single-use cover seal of FIGS. 2A-3B, FIGS. 5E and 5F being taken along respective section lines E-E and F-F in FIG. 5B and FIGS. 5G and 5H both being taken along section lines G-G in FIG. 5B.
Figure 5B:
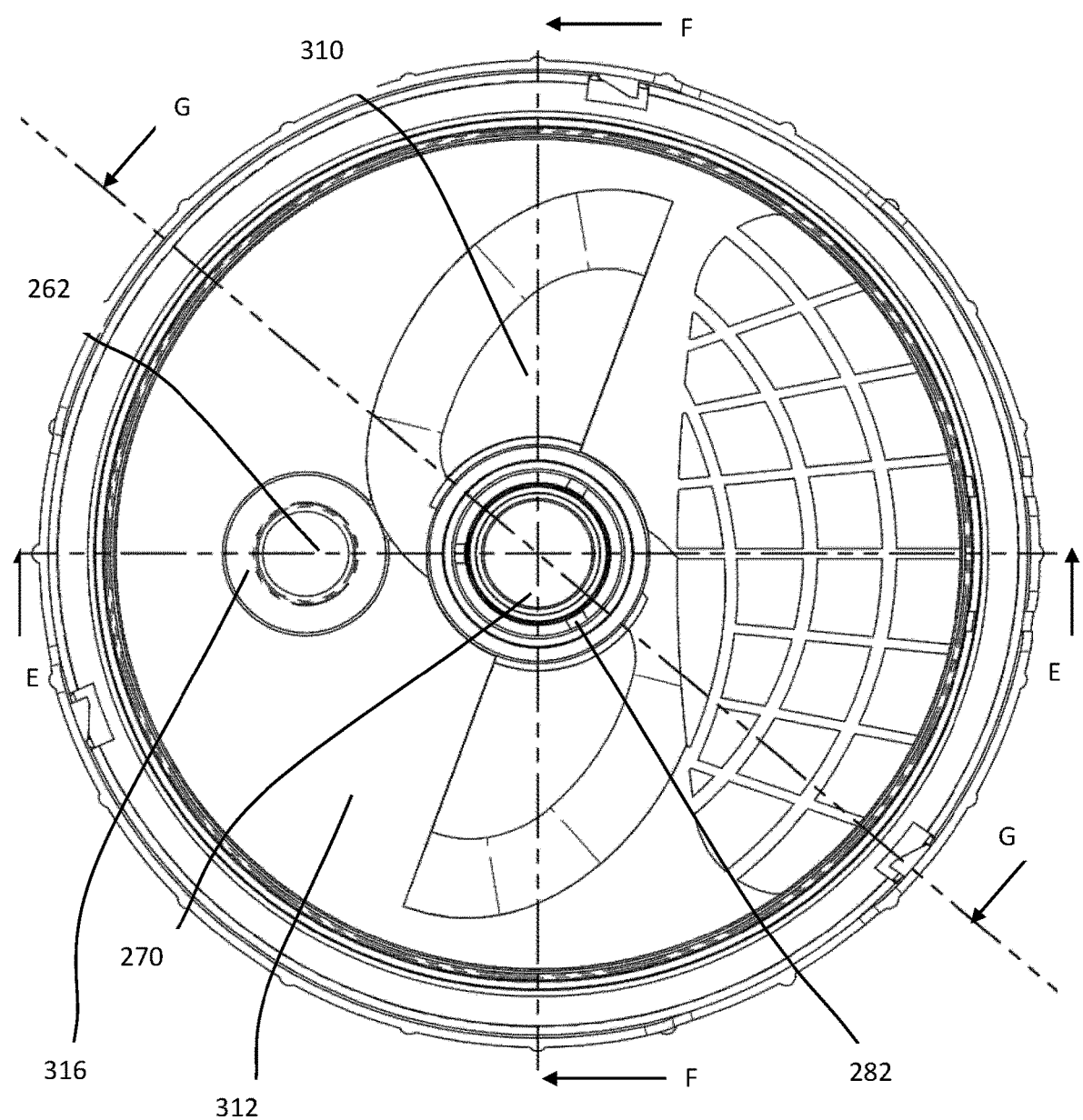
Figure 5C:
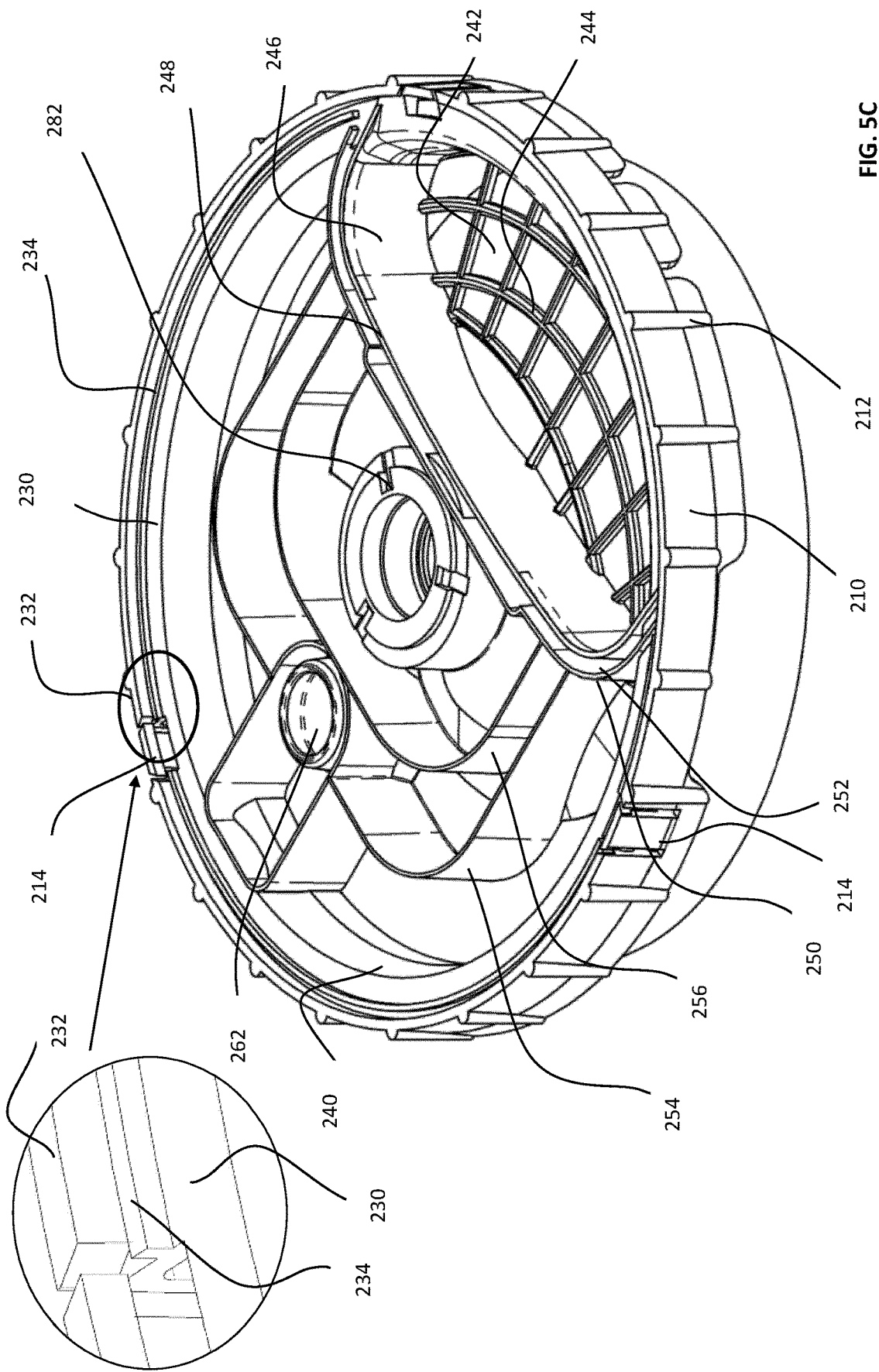
Figure 5D:
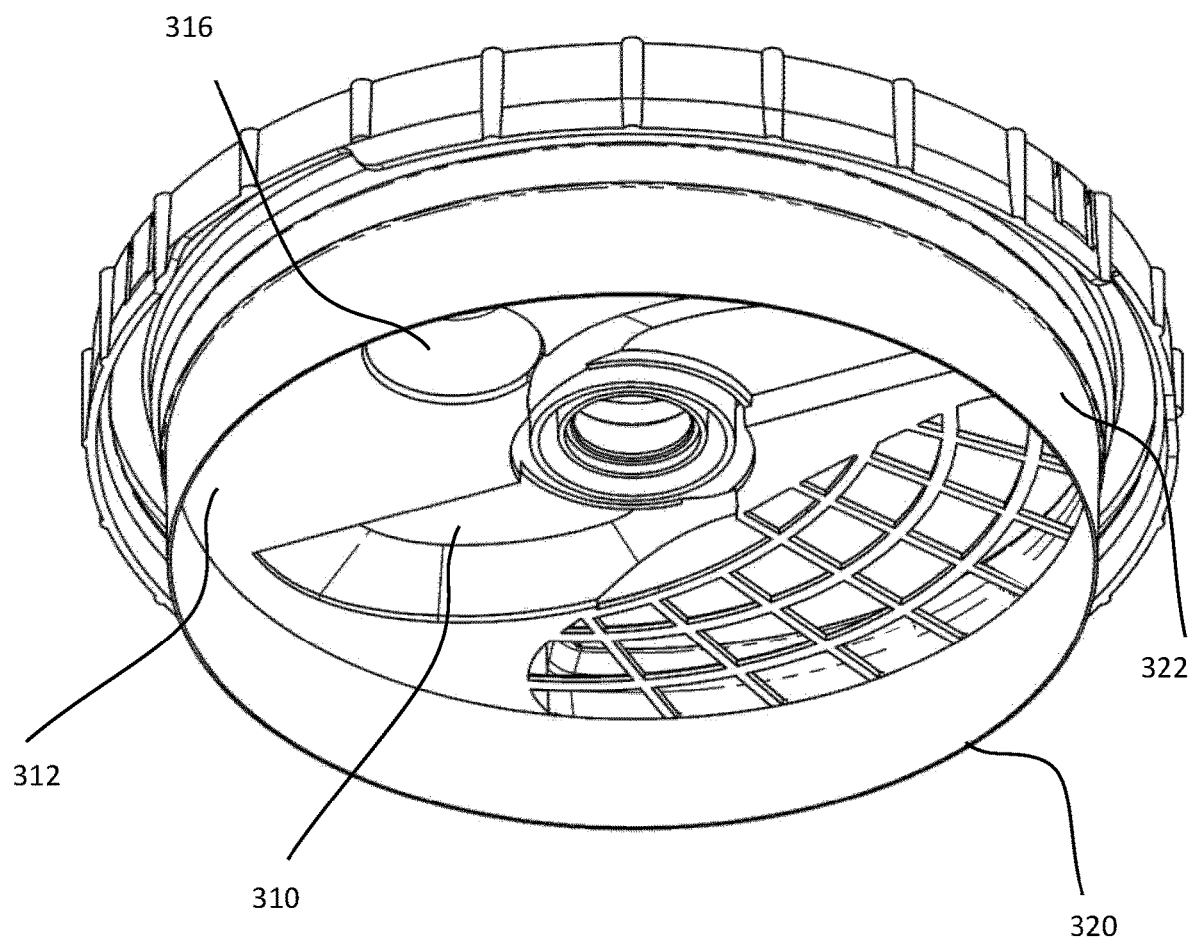
Figure 5E:
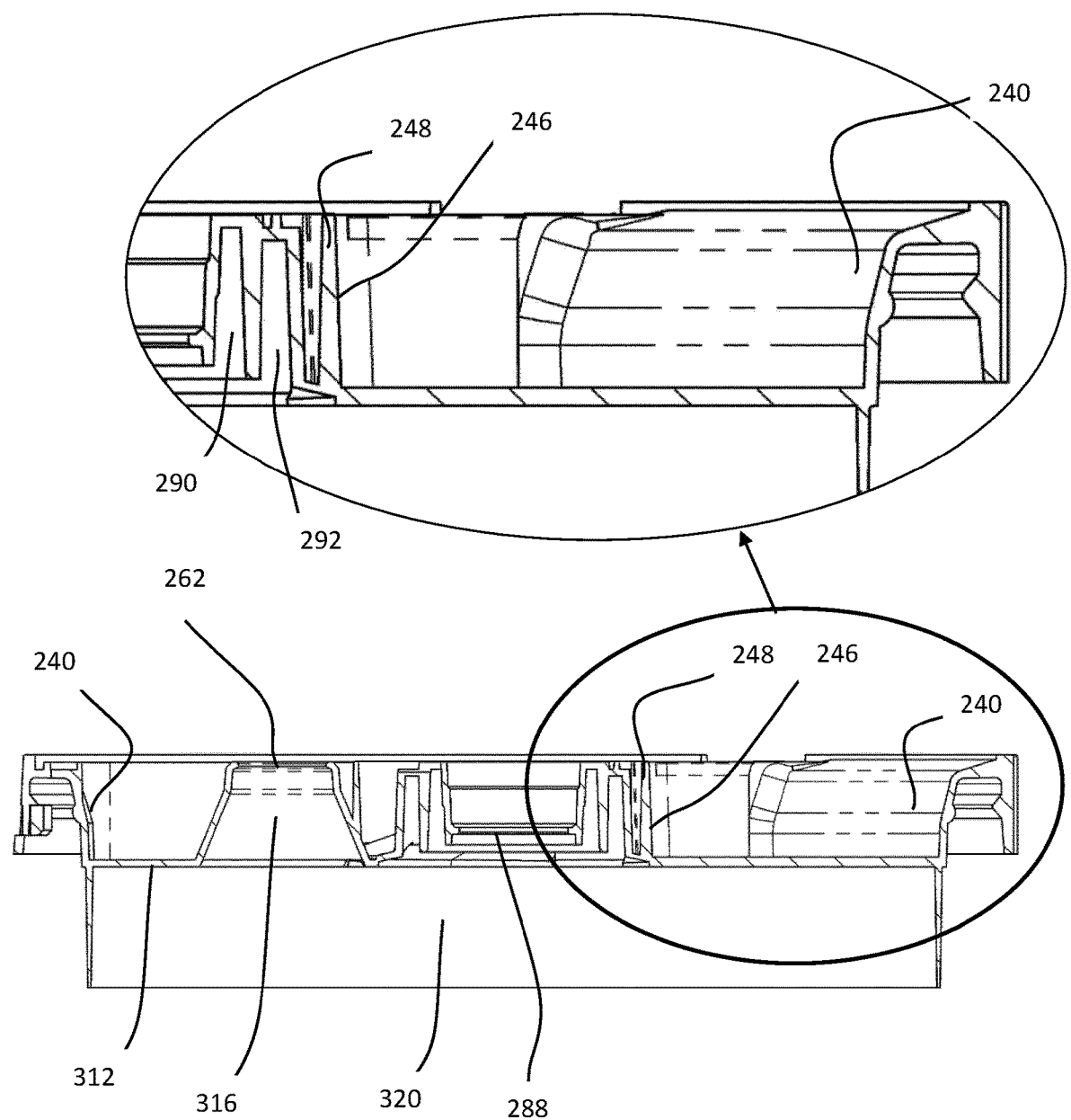

Prior to tamper and use, as seen in enlargement A of FIG. 5A, tapered mutually circumferentially spaced edge surfaces 216 of each of tabs 214 are arranged in mutually spaced parallel arrangement with corresponding tapered mutually circumferentially spaced edge surfaces 220 of circumferential edge surface 210, such that tabs 214 can, principally due to flexibility thereof, be forced radially outwardly through openings 215.

The arrangement of tabs 214 and openings 215 is such that following use or tampering, as seen in enlargement B of FIG. 5A, tabs 214 are displaced radially outwardly through openings 215 such that edge surfaces 216 lie radially outwardly of edge surfaces 220 and are prevented from returning to their original position by engagement of a relatively wide radially inwardly-facing surface 222 of tabs 214 with radially outwardly-facing edges 223 of circumferential edge surface 210 alongside opening 215. This is seen more clearly with reference to FIGS. 5J-5M.

It is a particular feature of this embodiment of the present invention that generally circumferential edge surface 210 is preferably formed with a plurality of cut outs 224, best seen in FIG. 5I, which are provided to enable clamping of the SUPCA 100 to a multiple motion intelligent driving device (MMIDD) (FIGS. 10A-10C) during operation thereof, as will be described hereinbelow in detail.

Figure 5F:
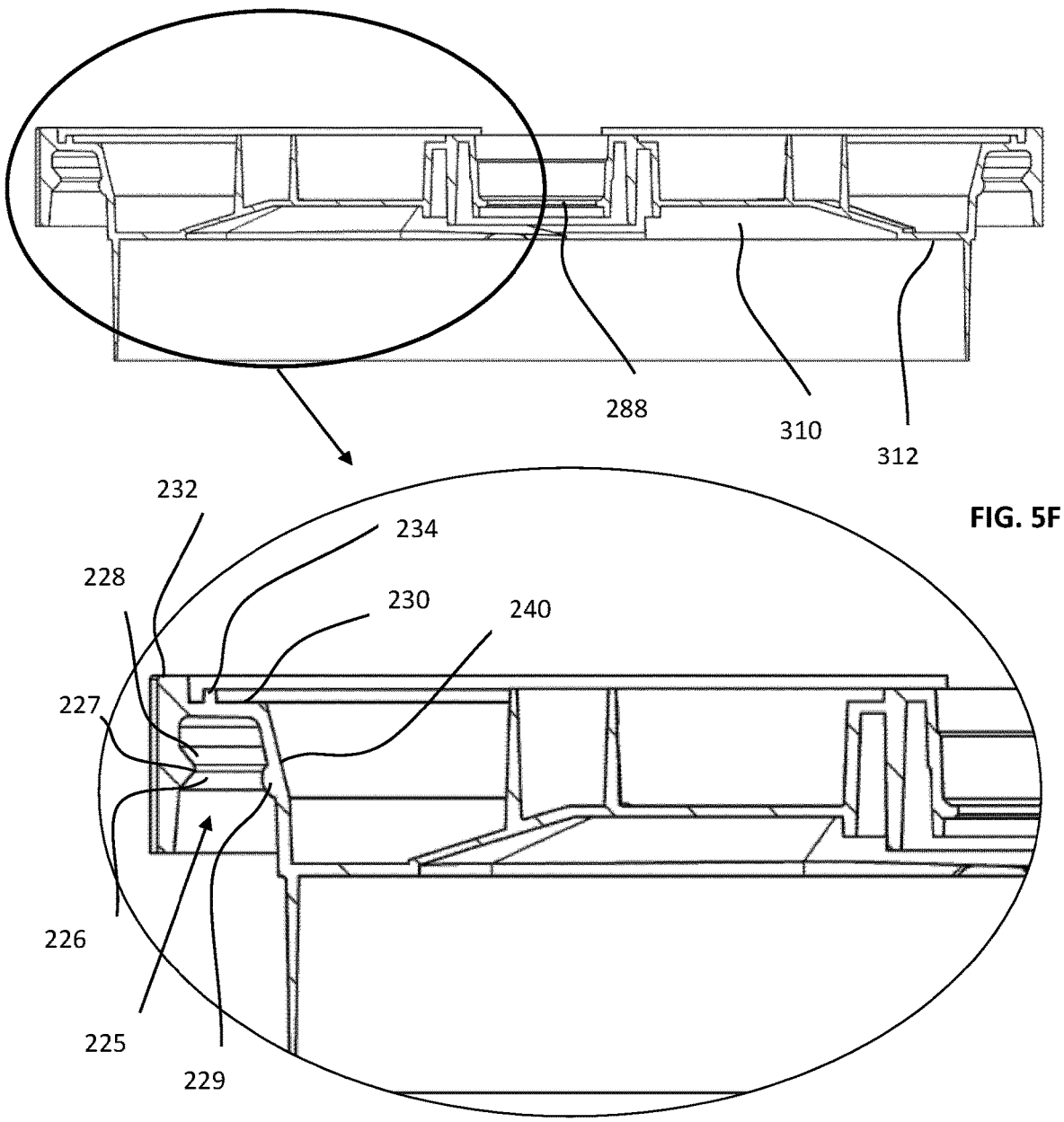
Figure 5G:
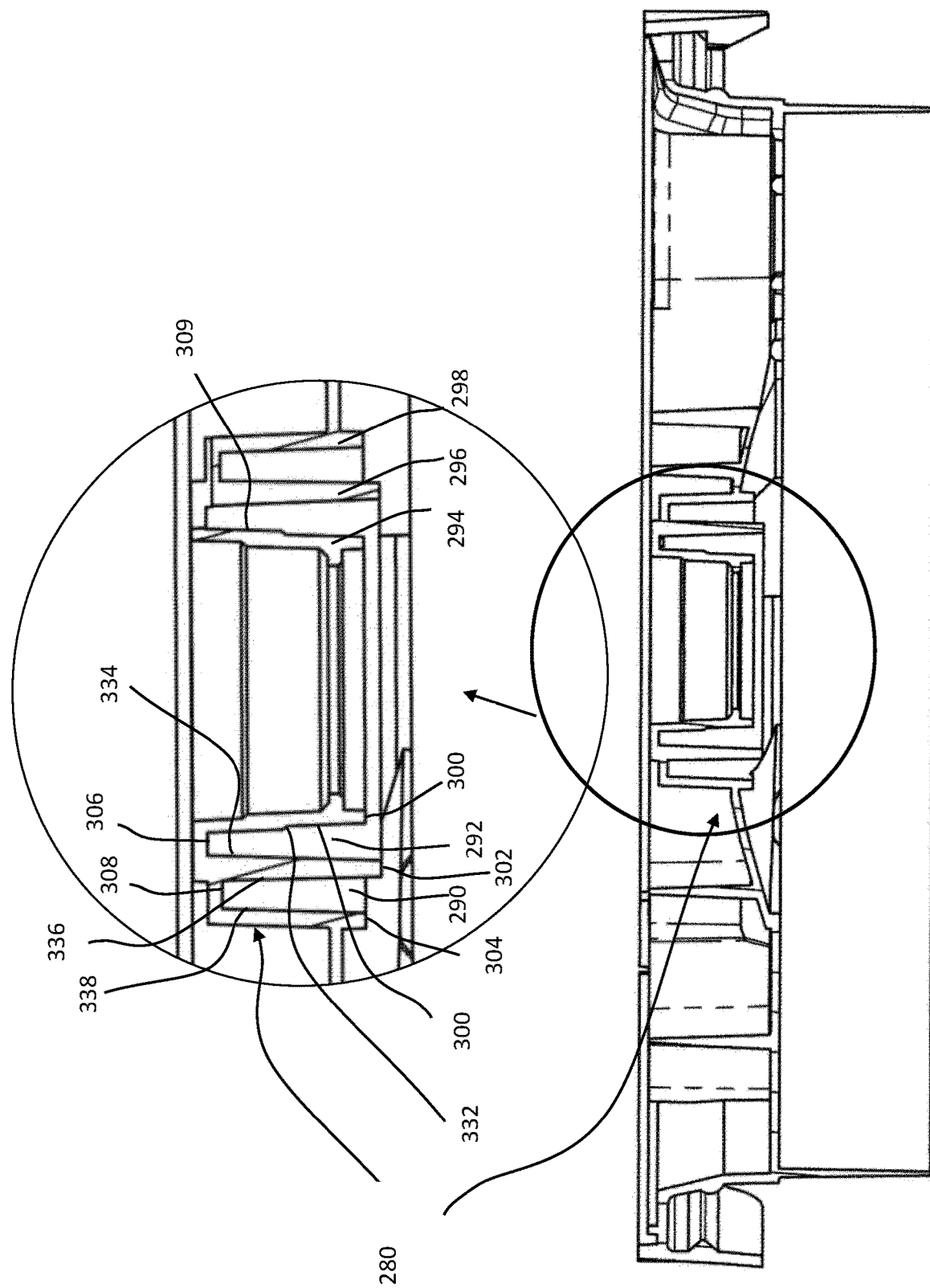
Figure 5H:
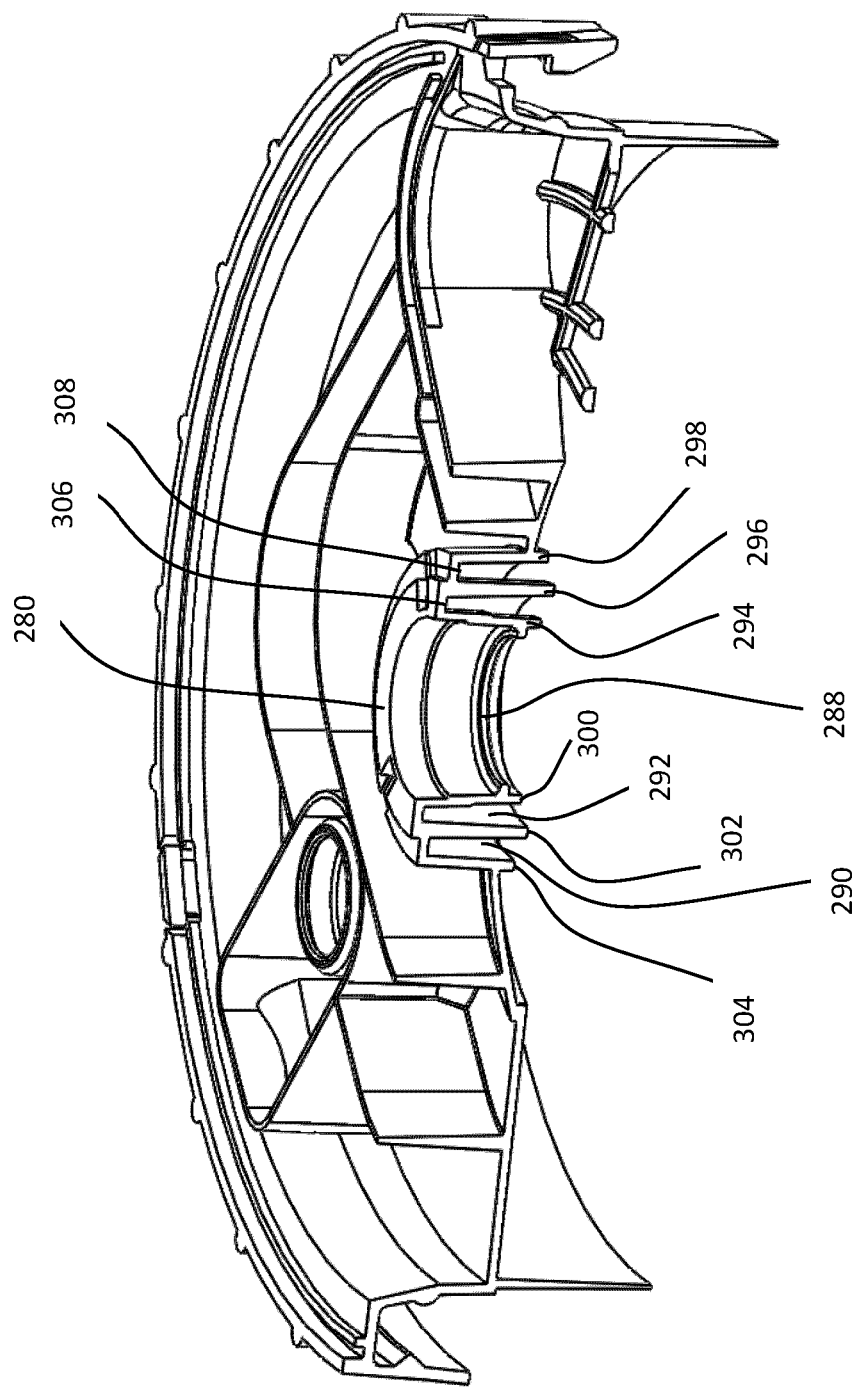
Figure 5I:
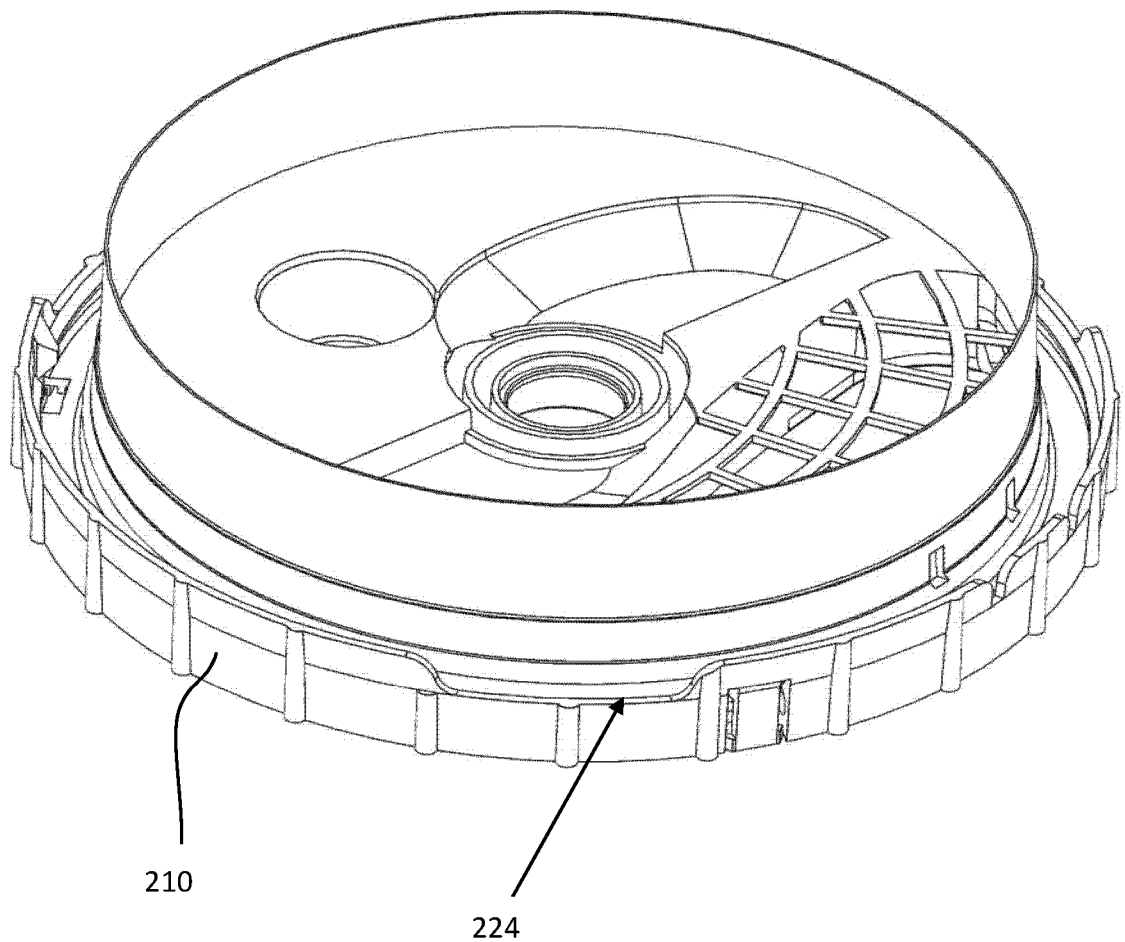
Figure 5J:
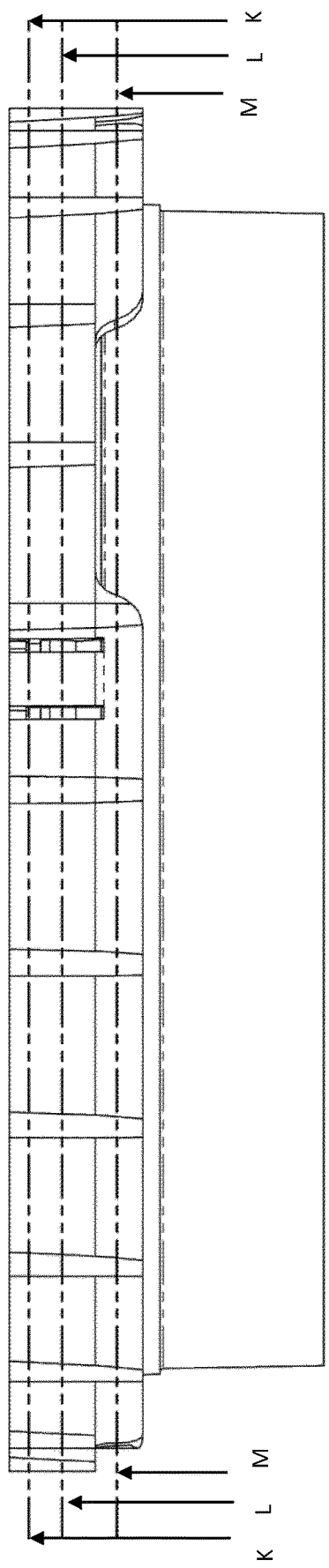
FIG. 5J is a simplified side view illustration of the lid of FIGS. 5A-5I.
Figure 5K:
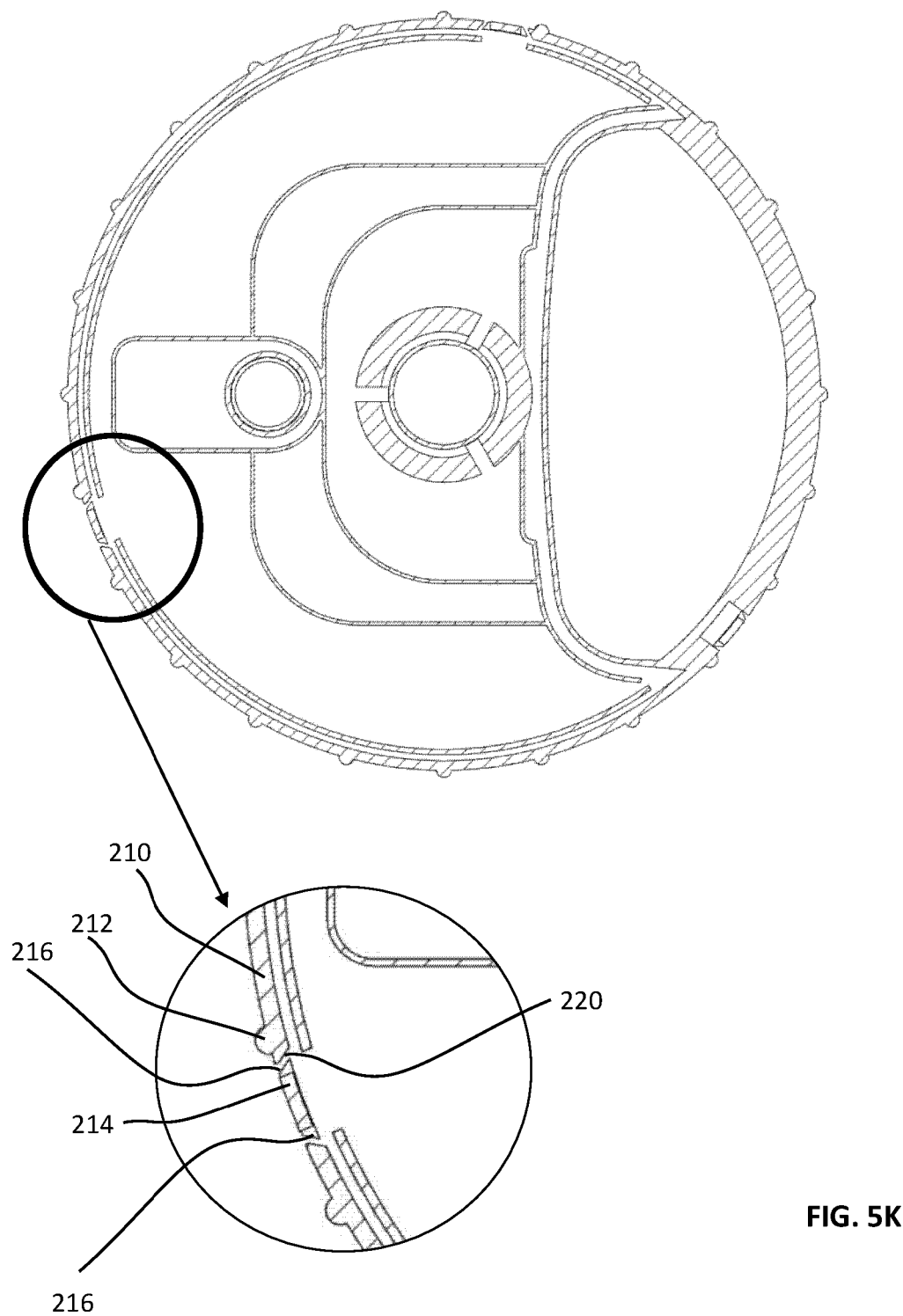
FIGS. 5K, 5L and 5M are simplified sectional illustrations taken along respective lines K-K, L-L and M-M in FIG. 5J.
Figure 5L:
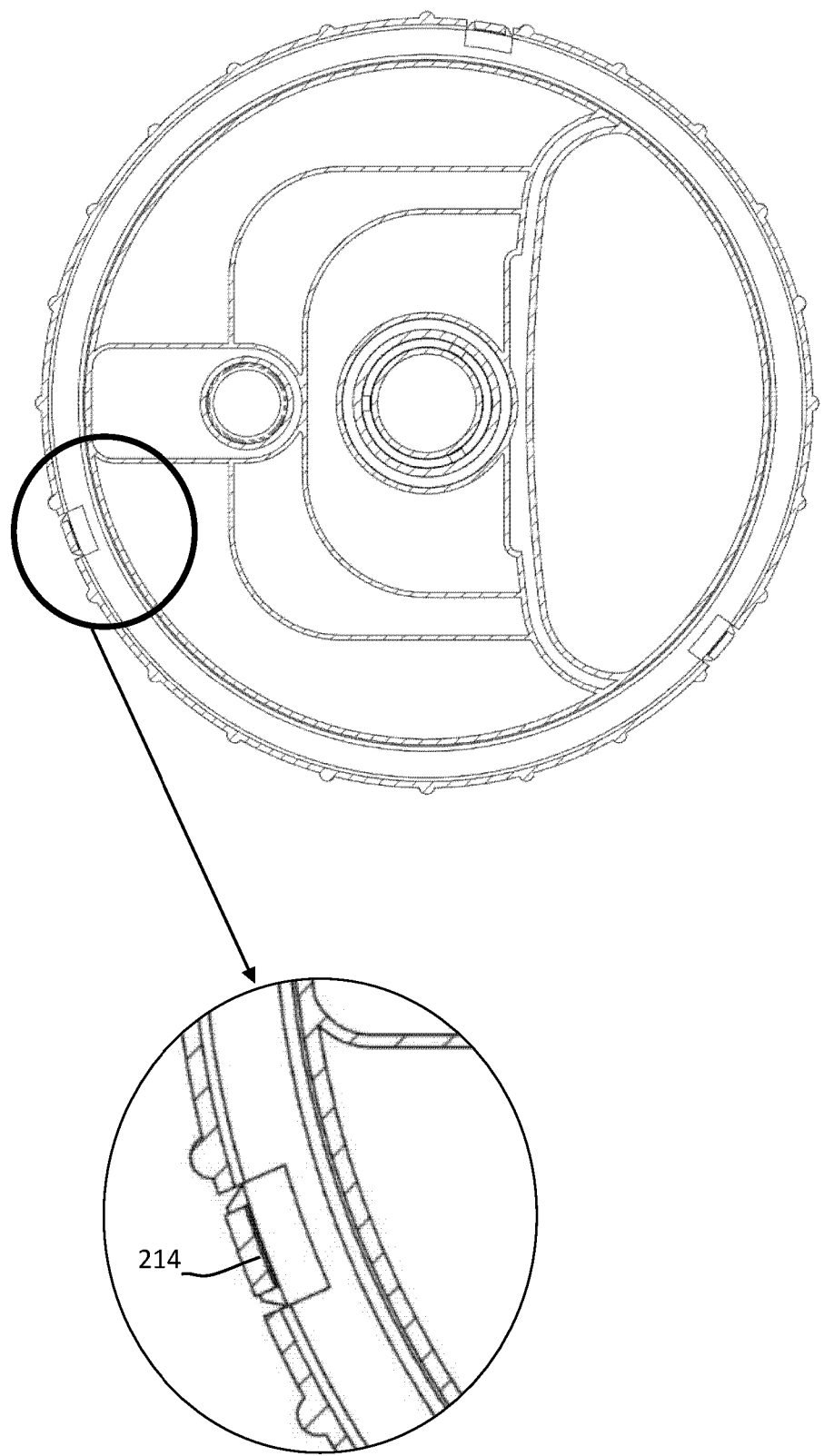
Figure 5M:
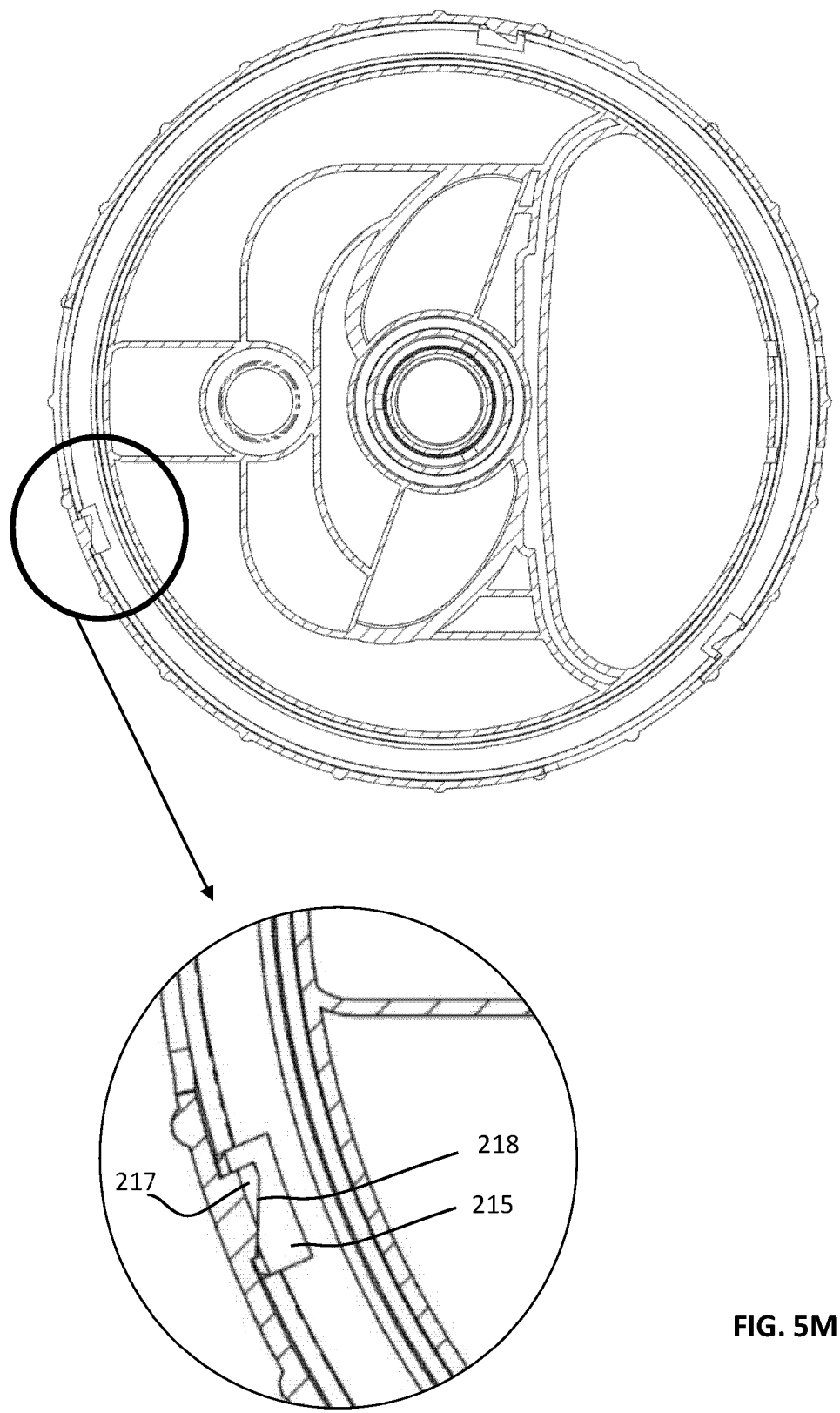
Figure 6A:
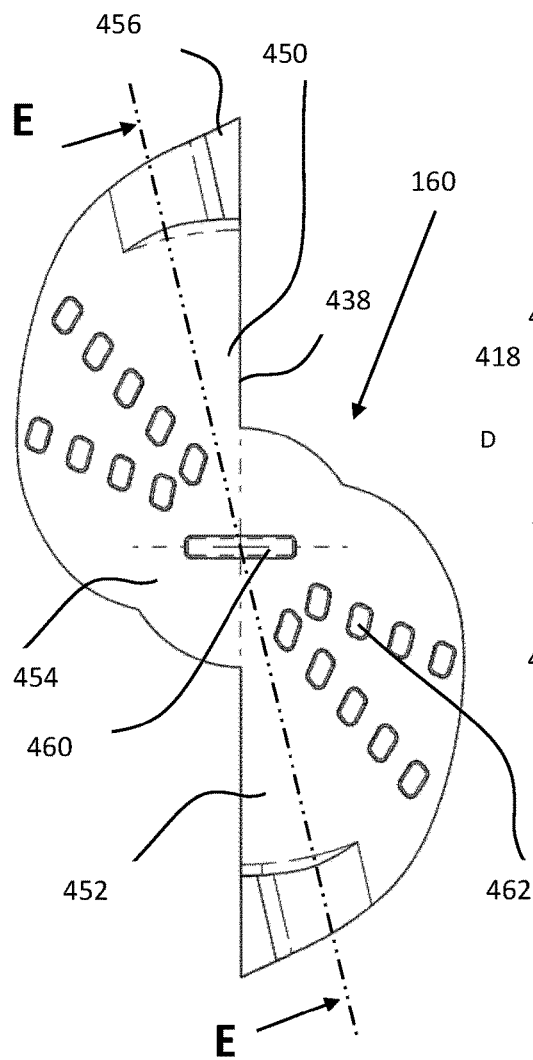
FIGS. 6A, 6B, 6C, 6D and 6E are simplified respective planar top, planar bottom, pictorial bottom, planar sectional and pictorial sectional illustrations of a preferred embodiment of a blade of the single-use cover seal of FIGS. 2A-3B, FIGS. 6D and 6E being taken along respective section lines D-D in FIG. 6B and E-E in FIG. 6A.
Figure 6B:
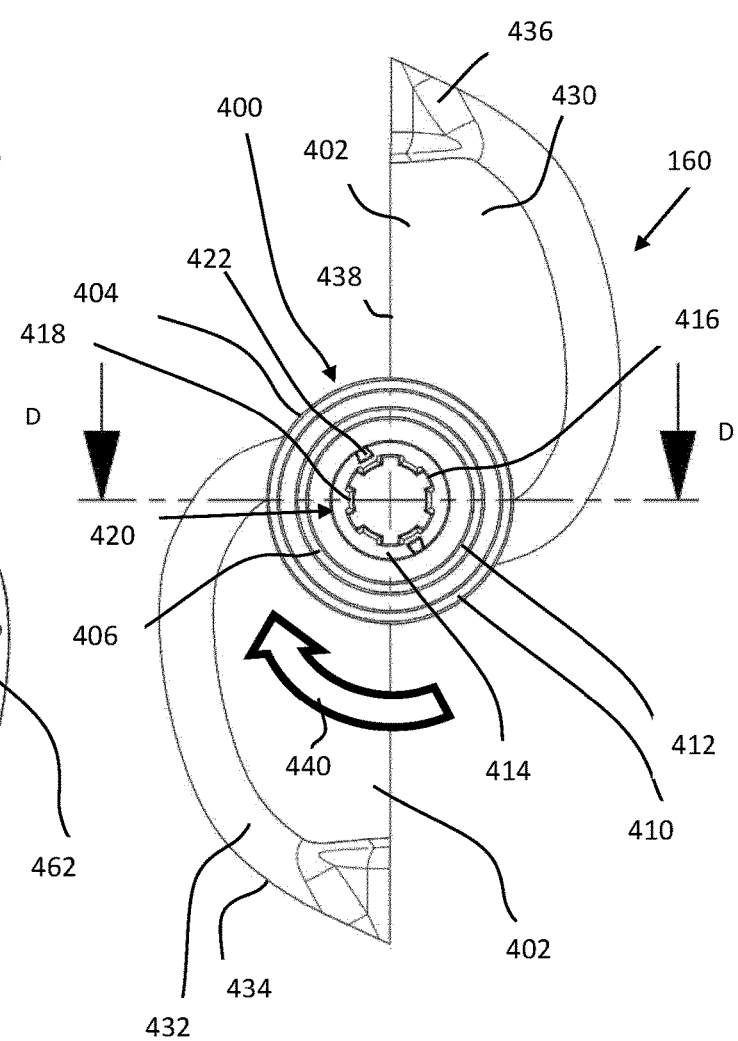
Figure 6C:
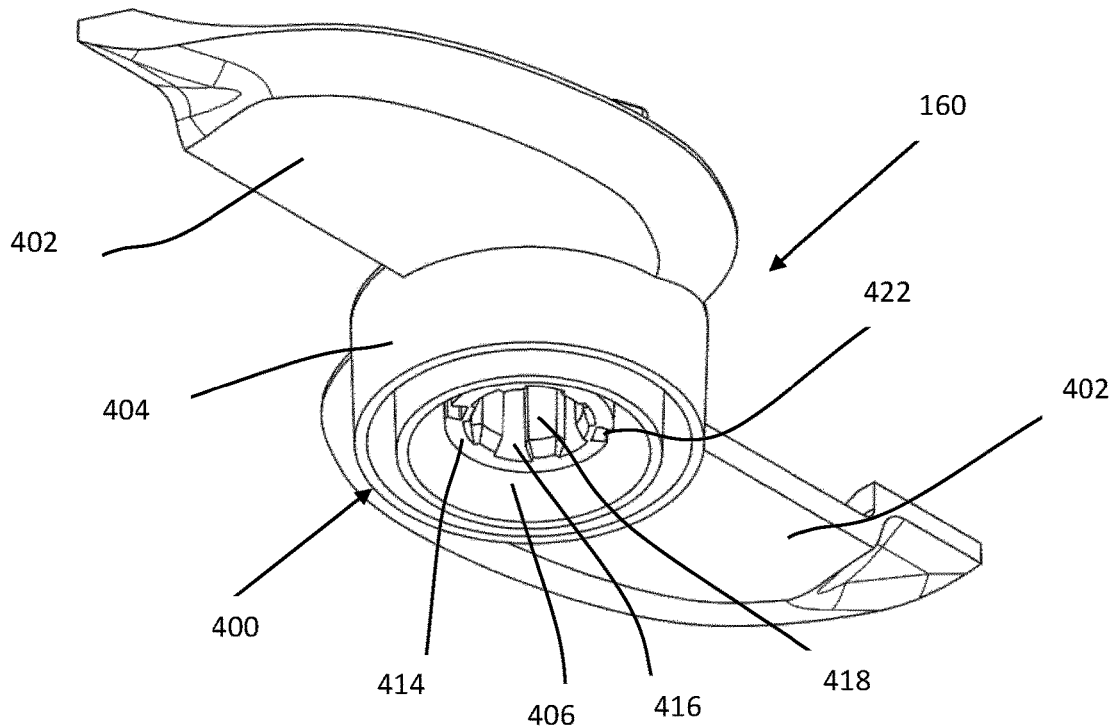
Figure 6D:
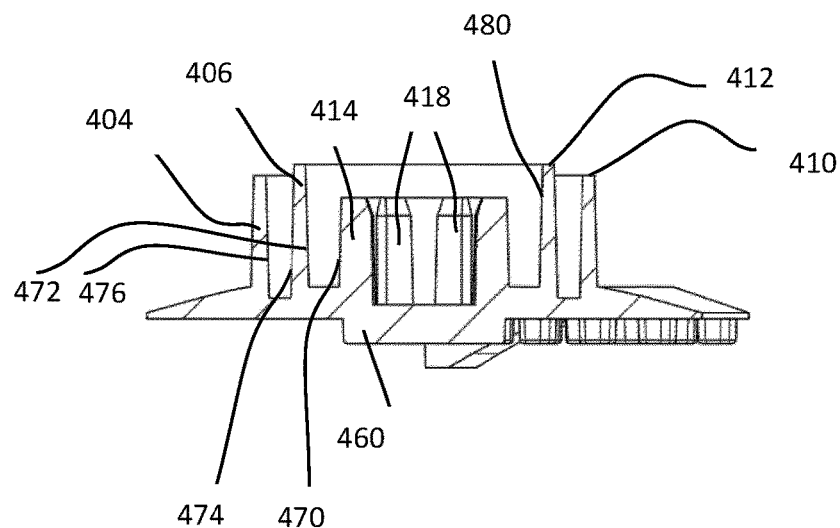
Figure 6E:
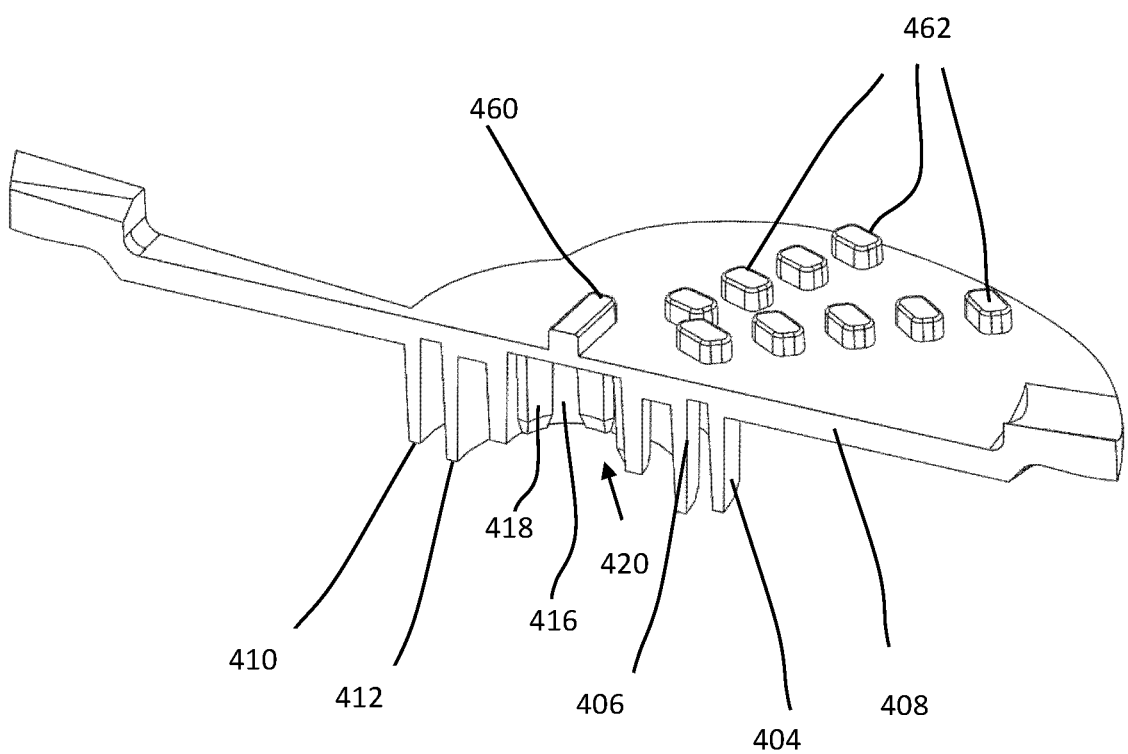
Figure 7A:
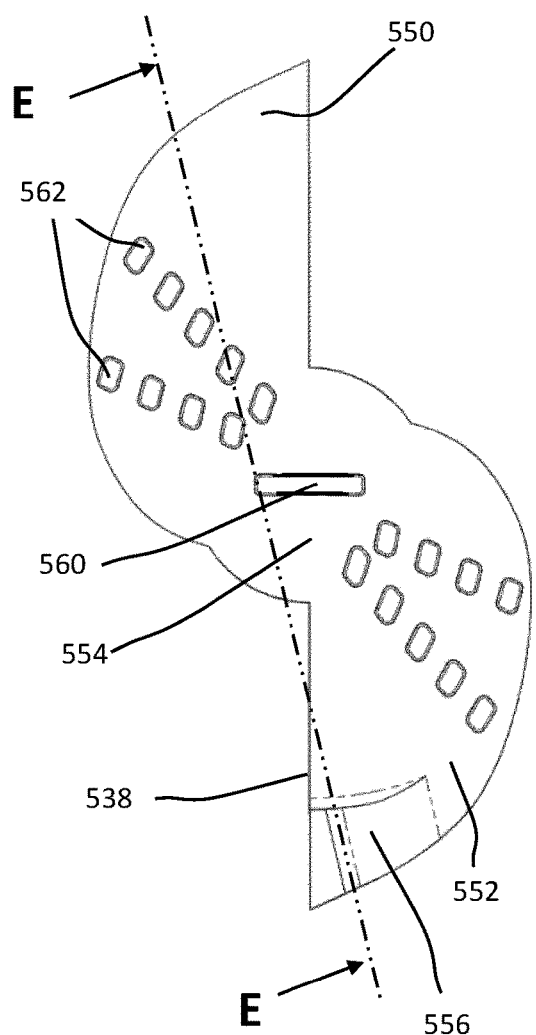
FIGS. 7A, 7B, 7C, 7D and 7E are simplified respective planar top, planar bottom, pictorial bottom, planar sectional and pictorial sectional illustrations of an alternative embodiment of a blade of the single-use cover seal of FIGS. 2A-3B, FIGS. 7D and 7E being taken along respective section lines D-D in FIG. 7B and E-E in FIG. 7A.
Figure 7B:
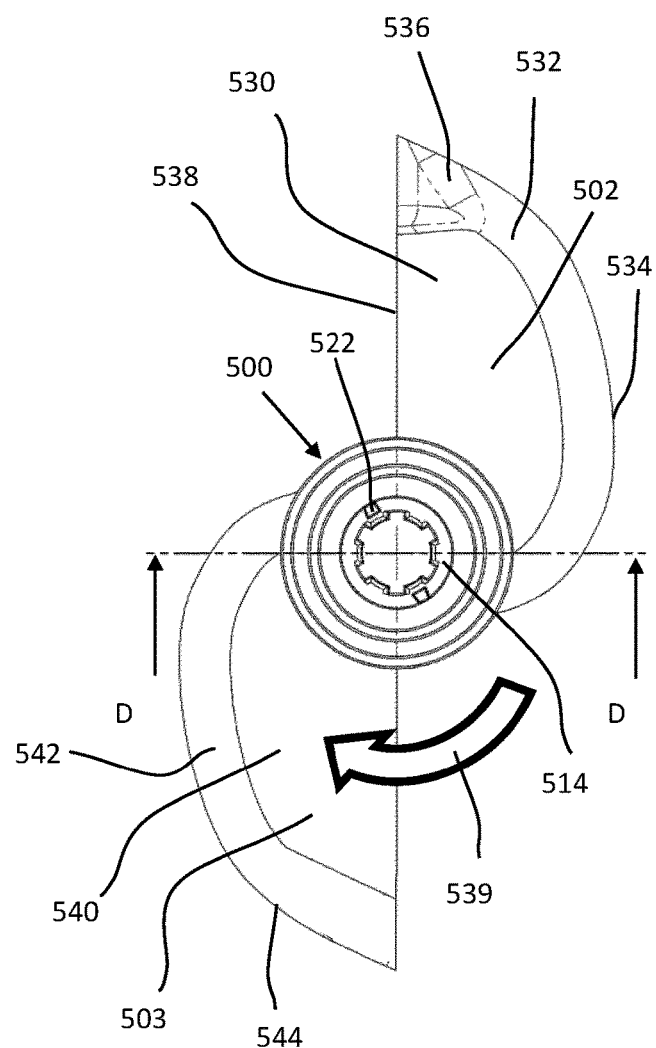
Figure 7C:
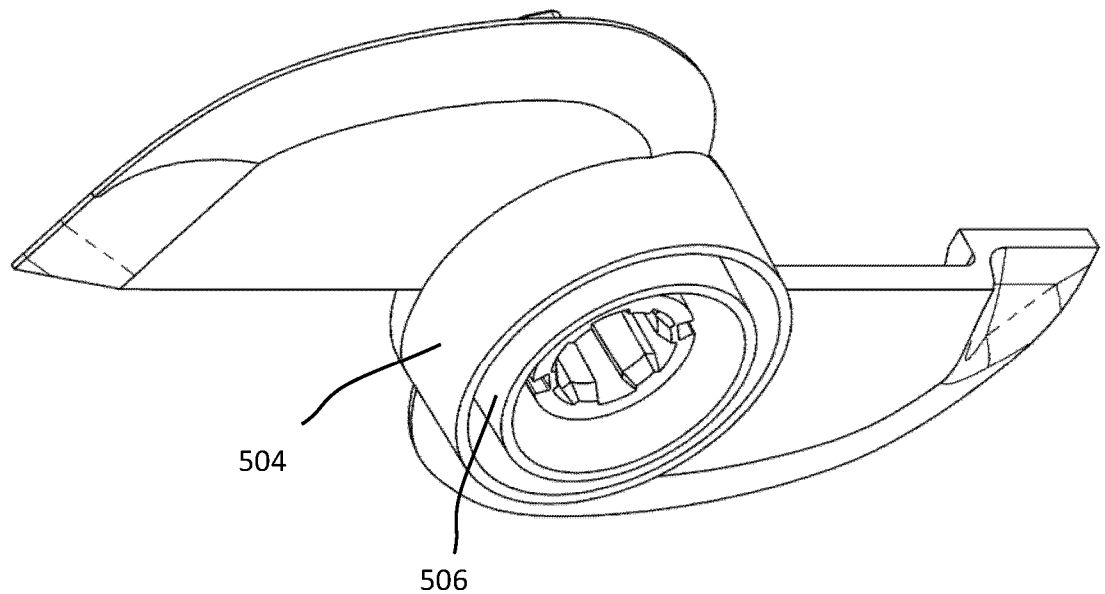
Figure 7D:
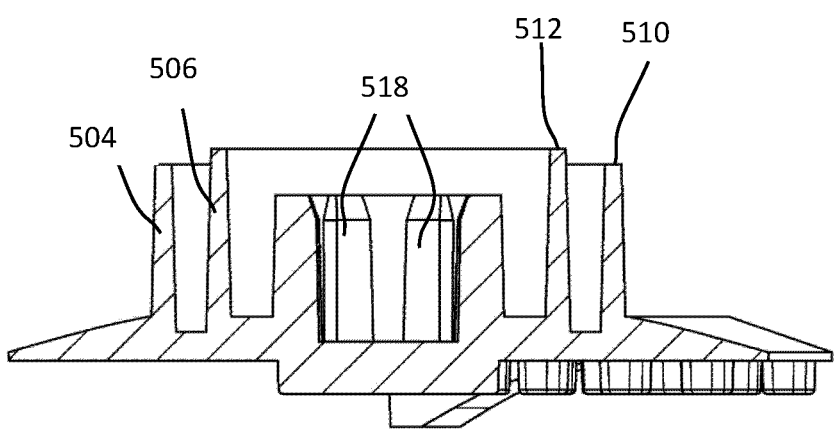
Figure 7E:
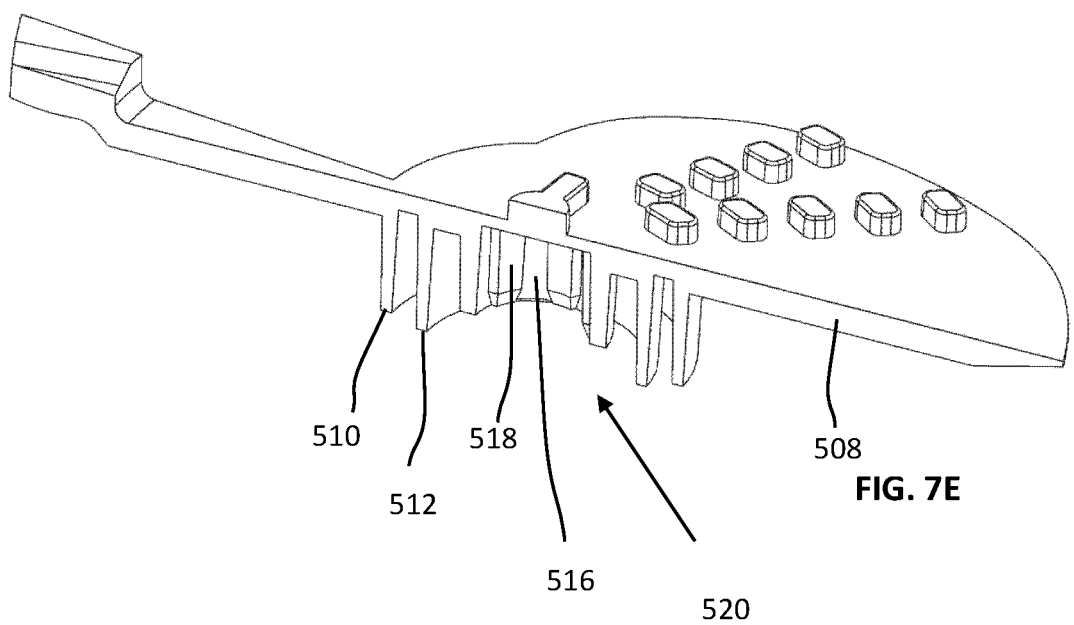
Figure 8C:
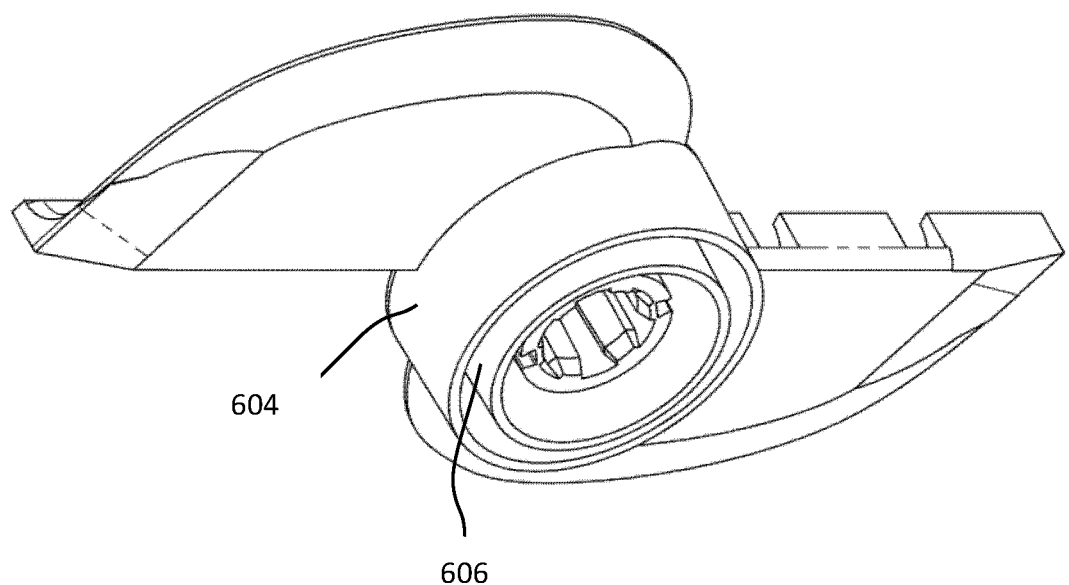
Figure 8D:
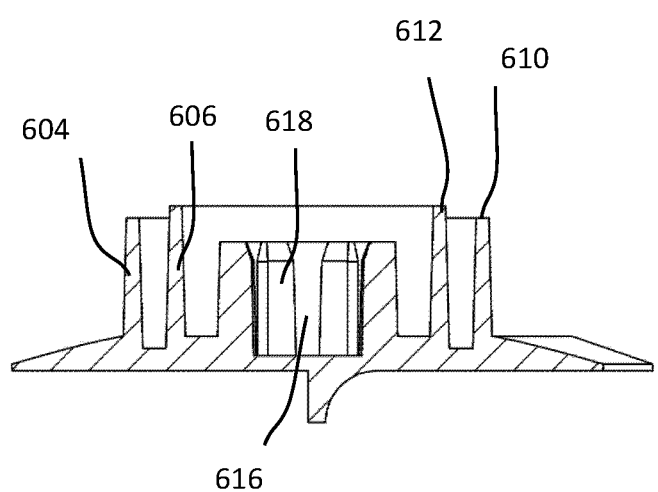
Figure 8E:
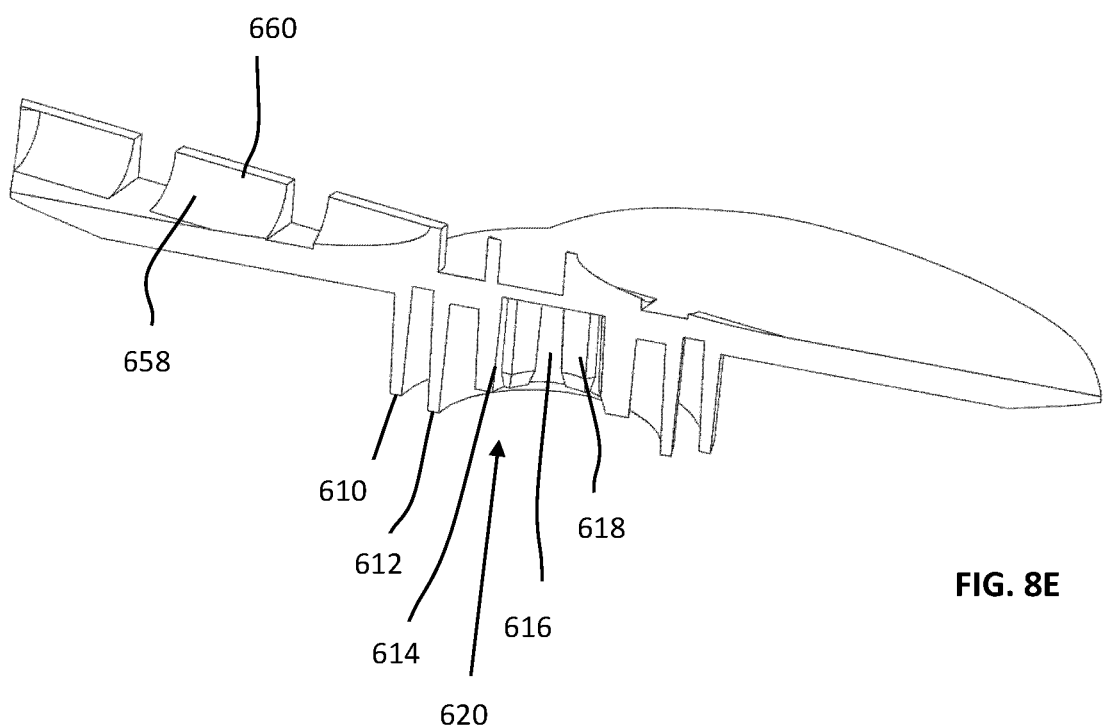

It is also a particular feature of this embodiment of the present invention that, as seen best in FIGS. 5F, 5G and 5H, interiorly of circumferential edge surface 210 there is defined an annular clamping recess 225 for removable engagement with container body 102. Annular clamping recess 225 preferably includes a downward-facing, in the sense of FIG. 5F, tapered annular surface 226, an inwardly facing edge surface 227, an upward-facing, in the sense of FIG. 5F, tapered annular surface 228 and a radially outwardly facing sealing surface 229.

Inwardly of generally circumferential edge surface 210 is a generally planar annular surface 230, which lies slightly below a top edge 232 of edge surface 210. A generally circular protrusion 234 extends upwardly, in the sense of FIG. 1A, from annular surface 230.

Extending downwardly, in the sense of FIG. 1A, from annular surface 230 is a radially inwardly slightly tapered circumferential surface 240. Extending inwardly of radially inwardly circumferential surface 240 along a portion of the extent thereof, typically about one-third of the circumference thereof, is a liquid ingress opening 242 formed with a protective grid 244, which is engaged by cover surface 198 of cover 130 when the liquid ingress opening cover 193 is in its closed and sealed operative orientation. The periphery of liquid ingress opening 242 is partially defined by surface 240 and partially by a surface 246 of a wall 248.

An additional wall 250 is spaced from wall 248 and defines therewith a volume 252 which partially accommodates integral hinge 194 of cover 130.

Extending from wall 250 in a direction opposite to liquid ingress opening 242 are a pair of curved mutually separated walls 254 and 256, which may provide structural support to cover 130, when welded to lid 140, and which may define one or more sealed leaked fluid reservoir volumes 260.

A straw communication aperture 262 is preferably provided adjacent leaked fluid reservoir volumes 260.

Located generally at the center of lid 140 is a rotary drive aperture 270, which is surrounded by a multiple walled sealing structure 280, preferably having a plurality of leaked fluid egress apertures 282, which communicate with one or more sealed leaked fluid reservoir volumes 260. Apertures 282 are distributed along a generally annular planar inner surface 284 which surrounds aperture 270. Surrounding surface 284 and generally downwardly stepped with respected thereto is a generally annular planar surface 286.

Cover 130 is preferably welded to lid 140 at the intersections respectively of an inner edge of annular surface 284, annular surface 230, and protrusion 234 with corresponding surfaces of downwardly-facing protrusions 177, 178, and 180 of cover 130.

An upwardly-facing partially tapered and partially flat annular surface 288 is defined interiorly of aperture 270.

Turning now particularly to FIGS. 5A, 5B and 5E-5H, it is seen that multiple walled sealing structure 280 preferably comprises at least two mutually concentric downwardly-facing recesses 290 and 292, in the sense of FIG. 5H, which are sealingly engaged by corresponding protrusions of the blade element 160, as described in detail hereinbelow. Recesses 290 and 292 are defined by three mutually concentric walls 294, 296 and 298, having respective downwardly facing annular edges 300, 302 and 304 and by base surfaces 306 and 308 extending respectively between walls 294 & 296 and 296 & 298. Base surfaces 306 and 308 generally underlie respective annular surfaces 284 and 286. Wall 294 preferably defines a radially outwardly facing internal circumferential static sealing surface 309, which intersections with base surface 306.

A downwardly-facing blade receiving recess 310 is defined in a downwardly facing, generally planar surface 312 of lid 140.

A truncated conical recess 316 is preferably defined with respect to surface 312 about straw communication aperture 262.

Generally coextensive with radially inwardly circumferential surface 240 and extending downwardly from generally planar surface 312 is a circumferential wall 320 having an outer surface 322 which preferably sealingly engages an interior surface of wall 106 of container body 102 when SUCSERDREA 120 is fully engaged with the single-use container body 102.

It is appreciated that walls 294, 296 and 298 also define dynamic sealing surfaces as described hereinbelow:

Wall 294 defines a dynamic radially outwardly facing circumferential sealing surface 330 which is joined by a circumferential tapered junction surface 332 to static sealing surface 309.

Wall 296 defines a dynamic radially inwardly facing circumferential sealing surface 334 which faces surfaces 309, 330 and 332.

Wall 296 also defines a dynamic radially outwardly facing circumferential sealing surface 336.

Wall 298 defines a dynamic radially inwardly facing circumferential sealing surface 338.

Reference is now made to FIGS. 6A-6E, which illustrate a preferred embodiment of blade element 160 of SUCSERDREA 120.

As seen in FIGS. 6A-6E, blade element 160 comprises a unitary element, preferably injection molded from polypropylene and including a central driving and sealing portion 400 and a pair of blades 402 extending radially outwardly therefrom in opposite directions. Central driving and sealing portion 400 comprises a pair of mutually radially spaced, concentric sealing walls 404 and 406 extending upwardly in the sense of FIGS. 1A & 1B from a wall 408 and defining respective upwardly facing annular surfaces 410 and 412. Interiorly of wall 406 and radially spaced therefrom and concentric therewith is a drive shaft engaging wall 414 having, on a radially inwardly-facing surface 416 thereof, an arrangement of splines 418, which engage corresponding splines on a drive shaft of a multiple motion intelligent driving device (MMIDD) (FIGS. 10A-10C) and together with a portion of surface 412 define a drive shaft seating recess 420. Drive shaft engaging wall 414 is also provided with a pair of recesses 422 for positioning of the hub 150 with respect thereto.

Blades 402 each define a top facing surface in the sense of FIGS. 1A & 1B, which includes a planar portion 430 and a tapered portion 432 which terminates at a curved cutting edge 434. The tapered portion 432 includes a further downwardly and circumferentially tapered portion 436 alongside a trailing edge 438 of the blade, defined with respect to a blade rotation direction indicated by an arrow 440.

A bottom-facing surface 450 of blade element 160 preferably includes a generally planar surface 452, which extends over central driving and sealing portion 400 and most of blades 402. Generally planar surface 452 may have a slightly downwardly-extending central dome 454. Also formed on bottom-facing surface 450 are one or two downwardly and circumferentially tapered portions 456 alongside trailing edge 438 of the blade, which underlie tapered portions 436. Formed on planar surface 452 are preferably a central protrusion 460 and a plurality of mutually spaced radially distributed protrusions 462.

It is appreciated that walls 414, 406 and 404 define dynamic sealing surfaces as described hereinbelow:

Wall 414 defines a dynamic radially outwardly facing circumferential sealing surface 470.

Wall 406 defines a dynamic radially inwardly facing circumferential sealing surface 472 which faces surface 470.

Wall 406 also defines a dynamic radially outwardly facing circumferential sealing surface 474.

Wall 404 defines a dynamic radially inwardly facing circumferential sealing surface 476.

It is appreciated that an inner disposed portion 480 of surface 472 also defines a static sealing surface.

Reference is now made to FIGS. 7A-7E, which illustrate an alternative embodiment of a blade for SUCSERDREA 120.

As seen in FIGS. 7A-7E, the blade comprises a unitary element, preferably injection molded from polypropylene and including a central driving and sealing portion 500 and a pair of blades 502 and 503 extending radially outwardly therefrom in opposite directions. Central driving and sealing portion 500 comprises a pair of mutually radially spaced, concentric sealing walls 504 and 506 extending upwardly, in the sense of FIGS. 1A & 1B, from a wall 508 and defining respective upwardly facing annular surfaces 510 and 512. Interiorly of wall 506 and radially spaced therefrom and concentric therewith is a drive shaft engaging wall 514 having, on a radially inwardly-facing surface 516 thereof, an arrangement of splines 518, which engage corresponding splines on a drive shaft of a multiple motion intelligent driving device (MMIDD) (FIGS. 10A-10C) and, together with a portion of surface 512, define a drive shaft seating recess 520. Drive shaft engaging wall 514 is also provided with a pair of recesses 522 for positioning of hub 150 with respect thereto.

Blade 502 defines a top facing surface, in the sense of FIGS. 1A & 1B, which includes a planar portion 530 and a tapered portion 532 which terminates at a curved cutting edge 534. The tapered portion 532 includes a further downwardly and circumferentially tapered portion 536 alongside a trailing edge 538 of the blade, defined with respect to a blade rotation direction indicated by an arrow 539.

Blade 503 defines a top facing surface in the sense of FIGS. 1A & 1B, which includes a planar portion 540 and a tapered portion 542 which terminates at a curved cutting edge 544.

A bottom-facing surface 550 preferably includes a generally planar surface 552, which extends over central driving and sealing portion 500 and most of blades 502 and 503. Generally planar surface 552 may have a slightly downwardly-extending central dome 554. Also formed on bottom-facing surface 550 is one downwardly and circumferentially tapered portion 556 alongside trailing edge 538 of blade 502, which underlies tapered portion 536 thereof. Formed on planar surface 552 are preferably a central protrusion 560 and a plurality of mutually spaced radially distributed protrusions 562.

Reference is now made to FIGS. 8A-8E, which illustrate another alternative embodiment of a blade of SUCSERDREA 120.

As seen in FIGS. 8A-8E, the blade comprises a unitary element, preferably injection molded from polypropylene and including a central driving and sealing portion 600 and a pair of blades 602 extending radially outwardly therefrom in opposite directions. Central driving and sealing portion 600 comprises a pair of mutually radially spaced, concentric sealing walls 604 and 606 extending upwardly, in the sense of FIGS. 1A & 1B, from an upwardly facing surface 608 and defining respective upwardly facing annular surfaces 610 and 612. Interiorly of wall 606 and radially spaced therefrom and concentric therewith is a drive shaft engaging wall 614 having, on a radially inwardly-facing surface 616 thereof, an arrangement of splines 618, which engage corresponding splines on a drive shaft of a multiple motion intelligent driving device (MMIDD) (FIGS. 10A-10C) and, together with a portion of surface 612, define a drive shaft seating recess 620. Drive shaft engaging wall 614 is also provided with a pair of recesses 622 for positioning of hub 150 with respect thereto.

Blades 602 each define a top facing surface in the sense of FIGS. 1A & 1B, which includes a planar portion 630 and a tapered portion 632 which terminates at a curved cutting edge 634.

A bottom-facing surface 650 preferably includes a generally planar surface 652, which extends over central driving and sealing portion 600 and most of blades 602. Generally planar surface 652 may have a slightly downwardly-extending central dome 654. Also formed on bottom-facing surface 650 are a row of mutually spaced downwardly-facing protrusions 656, each of which preferably has a downwardly curved tapered leading edge 658 and a downwardly extending trailing edge 660.

Figure 9A:
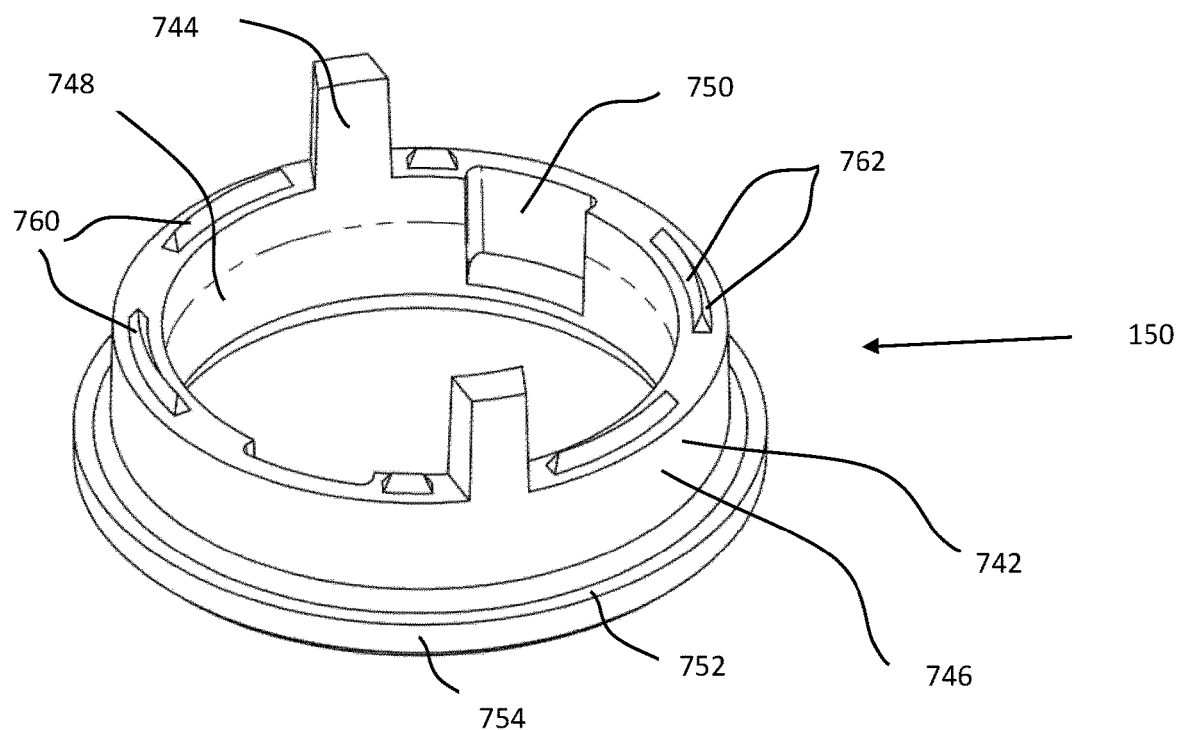
FIGS. 9A and 9B are respective simplified top and bottom pictorial illustrations of a hub of the single-use cover seal of FIGS. 2A-3B.
Figure 9B:
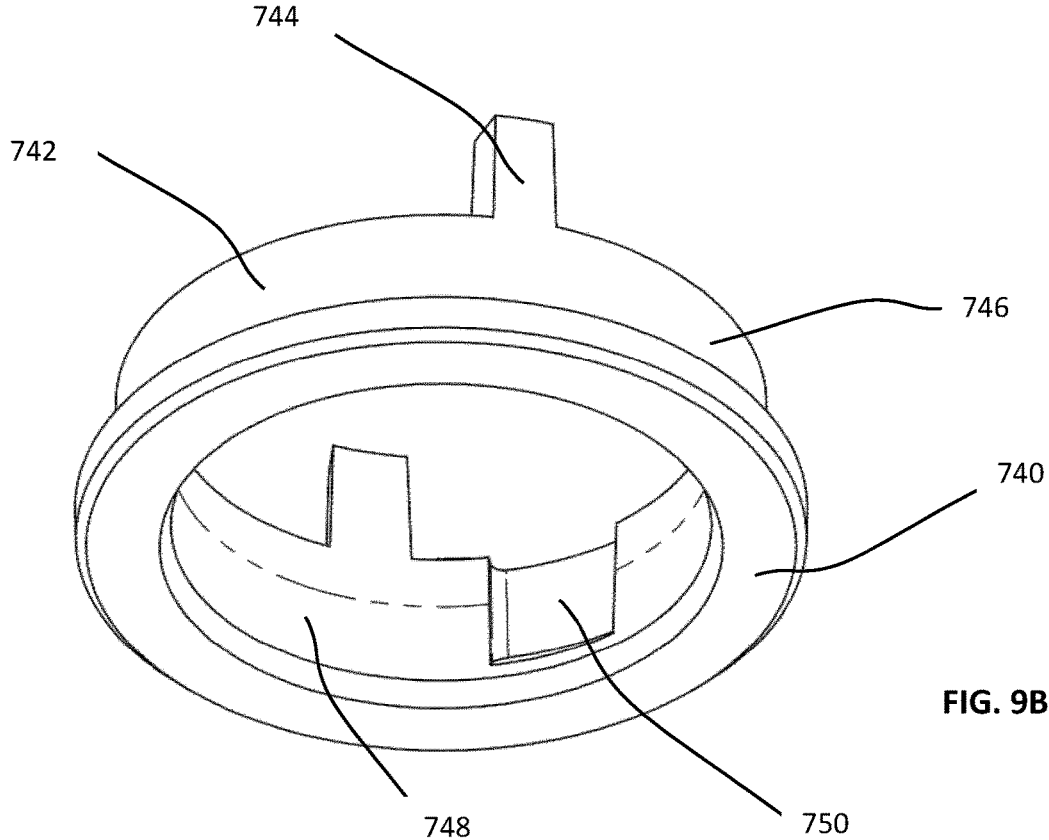

Reference is now made to FIGS. 9A and 9B, which illustrate hub 150. It is appreciated that alternatively hub 150 may be integrally formed with the blade as a single piece. Hub 150 is preferably a generally annular element and defines an upwardly-facing, in the sense of FIGS. 1A & 1B, planar ring surface 740 and a circumferential wall 742 extending downwardly therefrom, in the sense of FIGS. 1A & 1B. Circumferential wall 742 preferably includes a pair of downwardly extending protrusions 744 which preferably engage recesses 422 of blade element 160 or corresponding recesses of alternative embodiments of blades.

Figure 10B:
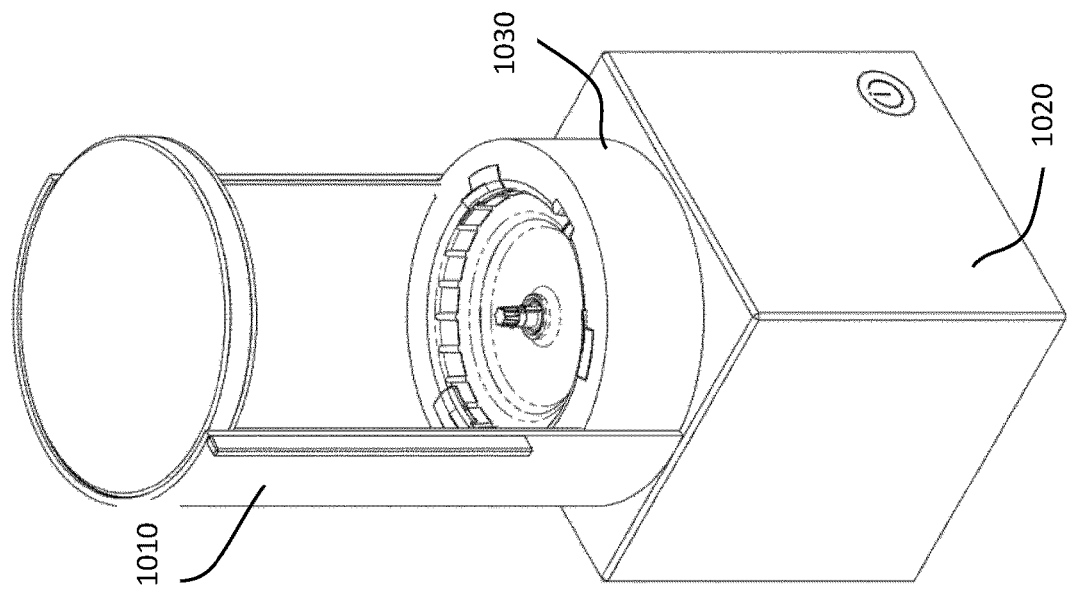
FIGS. 10A and 10B are simplified pictorial illustrations of a preferred embodiment of a multiple motion intelligent driving device (MMIDD) constructed and operative in accordance with a preferred embodiment of the present invention and useful with the SUPCA of FIGS. 1A-9B, in respective door open and door closed states.
Figure 10A:
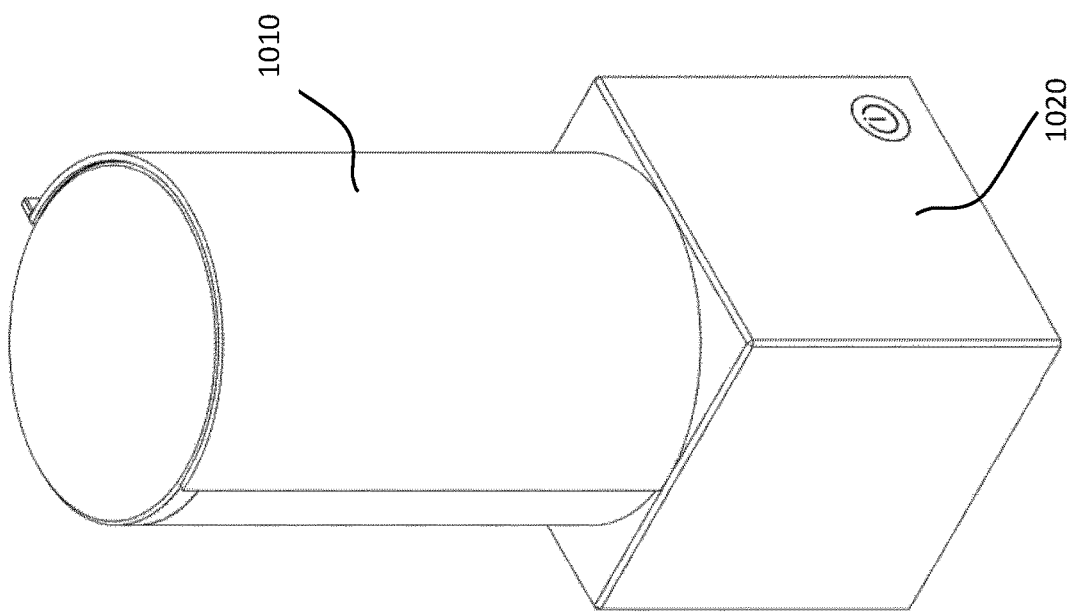
Figure 10C:
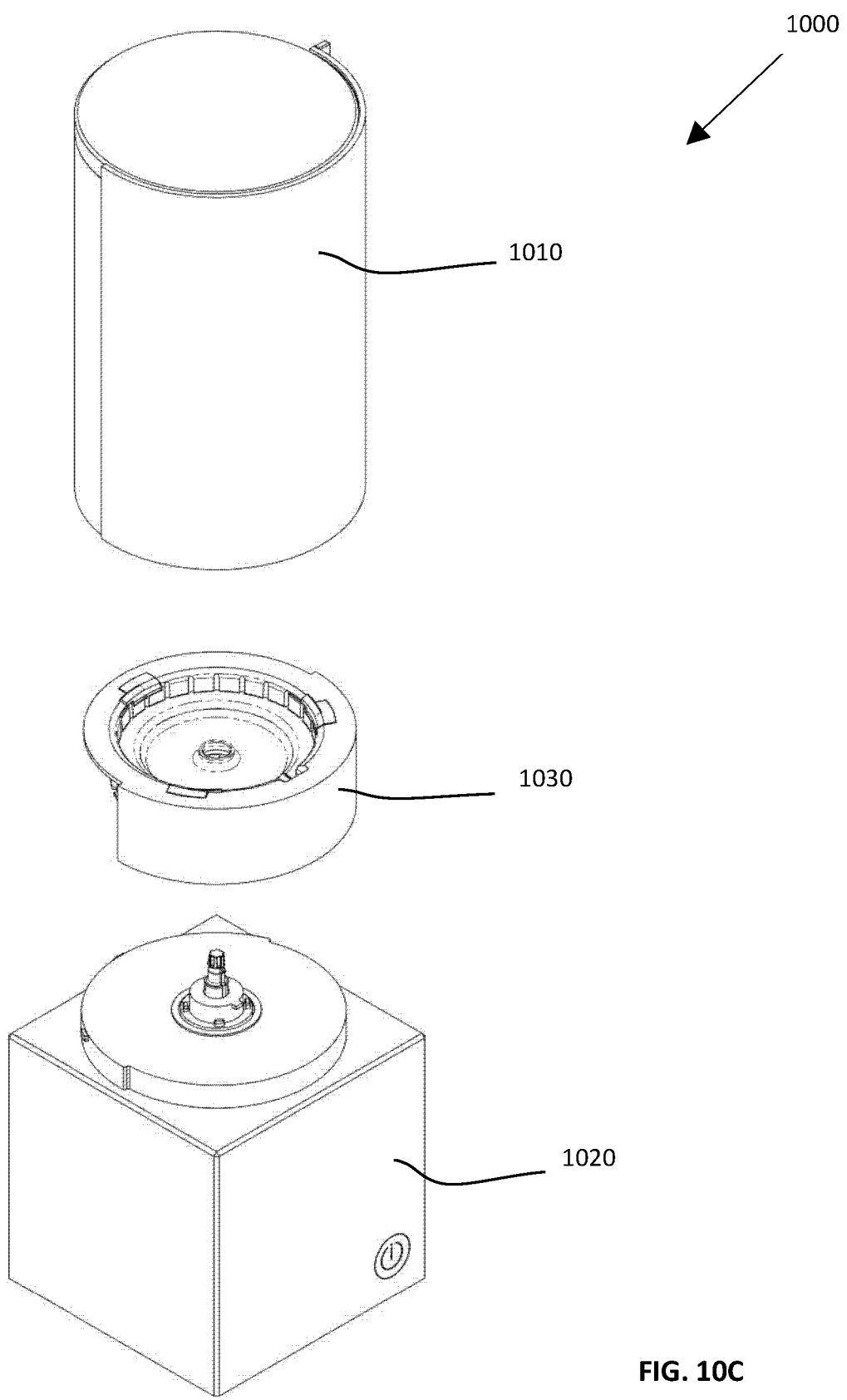
FIG. 10C is a simplified exploded view illustration of the MMIDD of FIGS. 10A & 10B.

Circumferential wall 742 defines a circumferential radially outwardly-facing wall surface 746 and a circumferential radially inwardly-facing wall surface 748, preferably having a pair of mutually facing undercut recesses 750 for removable engagement with a drive shaft of a multiple motion intelligent driving device (MMIDD) (FIGS. 10A-10C). A tapered annular radially outwardly-facing surface 752 preferably joins surfaces 746 and a radially outwardly-facing edge surface 754. Tapered annular radially outwardly-facing surface 752 preferably is rotatably snap fit engaged with flat annular surface 288 of lid 140.

A plurality of downwardly extending, in the sense of FIGS. 1A and 1B, protrusions 760 extend from circumferential wall 742 and define end surfaces 762, which are preferably welded to a top surface, in the sense of FIG. 3A, of wall 414 of blade element 160.

Reference is now made to FIGS. 10A-10C, which illustrate a multiple motion intelligent driving device (MMIDD) 1000 constructed and operative in accordance with a preferred embodiment of the present invention and useful with SUPCA 100 of FIGS. 1A-9B.

As seen in FIGS. 10A-10C, MMIDD 1000 includes a top housing assembly 1010, which is shown in FIGS. 10A and 10B in respective door closed and door open operative orientations. The top housing assembly 1010 is supported on a base assembly 1020, which also supports a SUPCA support and clamping assembly (SUPCASCA) 1030, which is surrounded by the top housing assembly 1010, when it is in a door closed operative orientation.

Reference is now made to FIGS. 11A-11D, which are simplified assembled and general exploded view illustrations of top housing assembly 1010 of the MMIDD of FIGS. 10A-10C.

As seen in FIGS. 11A-11D, top housing assembly 1010 comprises a static housing assembly 1040 and a rotatable door assembly 1050. Static housing assembly 1040 preferably comprises a static housing element 1060 including a semi-cylindrical upstanding wall portion 1062, integrally formed with a semi-cylindrical base ring 1064. Semi-cylindrical upstanding wall portion 1062 is preferably formed with a plurality of radially inward-facing bayonet receiving recesses 1066, each of which has an opening at the base of semi-cylindrical upstanding wall portion 1062.

Semi-cylindrical upstanding wall portion 1062 preferably terminates, at an upward end thereof, at a generally circular top portion 1068, which is formed with an upwardly-facing circumferential recess 1070 for receiving a low friction bearing ring 1072, which in turn rotatably supports the rotatable door assembly 1050. A top cover 1074 is mounted onto generally circular top element 1068.

The rotatable door assembly 1050 includes a semi-cylindrical upstanding wall portion 1080 which is integrally formed with a cylindrical top ring 1082. A generally vertical user hand engageable door grip 1084 is mounted onto semi-cylindrical upstanding wall portion 1080.

Figure 11A:
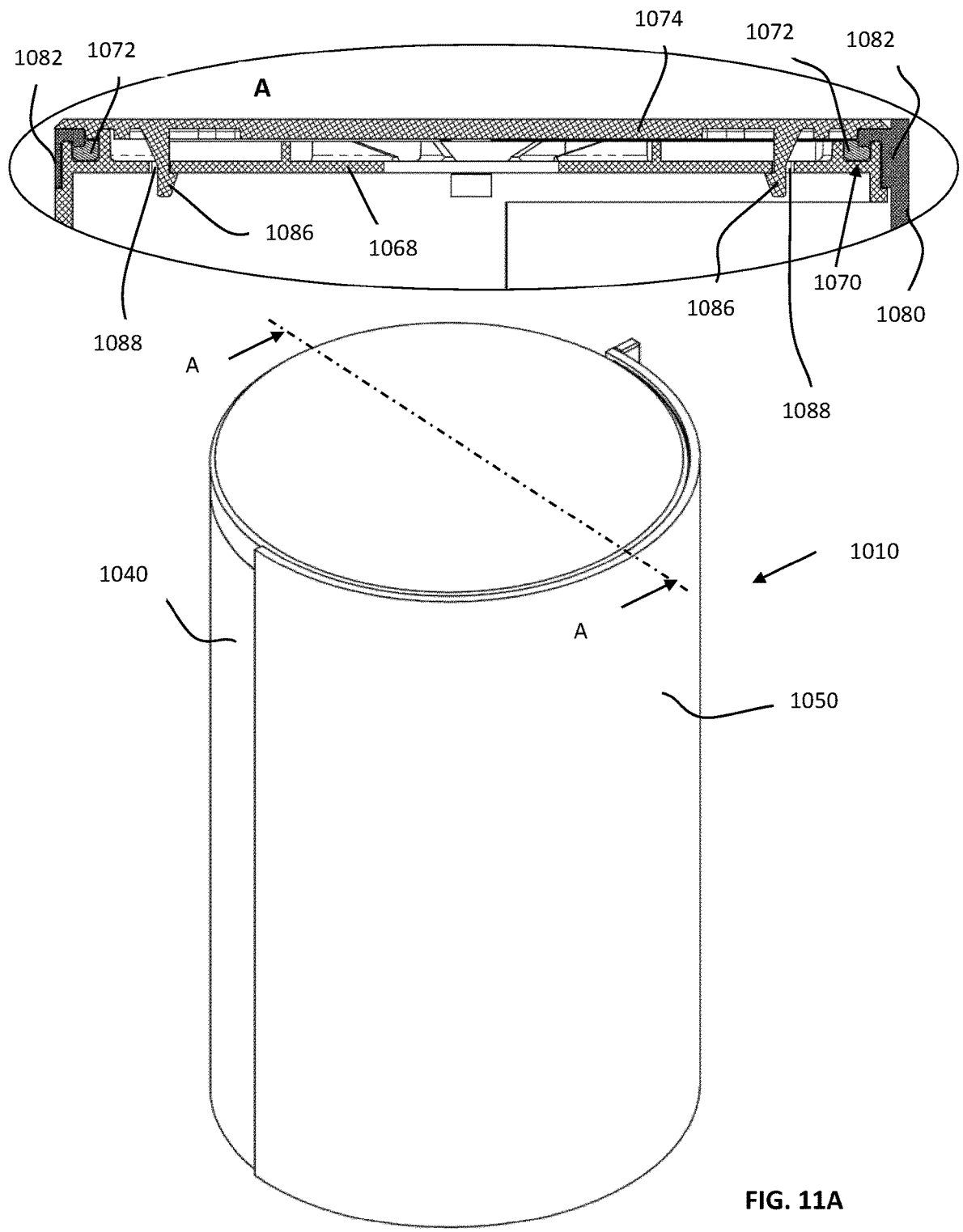
FIGS. 11A and 11B are simplified assembled and general exploded view illustrations of a top housing assembly of the MMIDD of FIGS. 10A-10C.
Figure 11B:
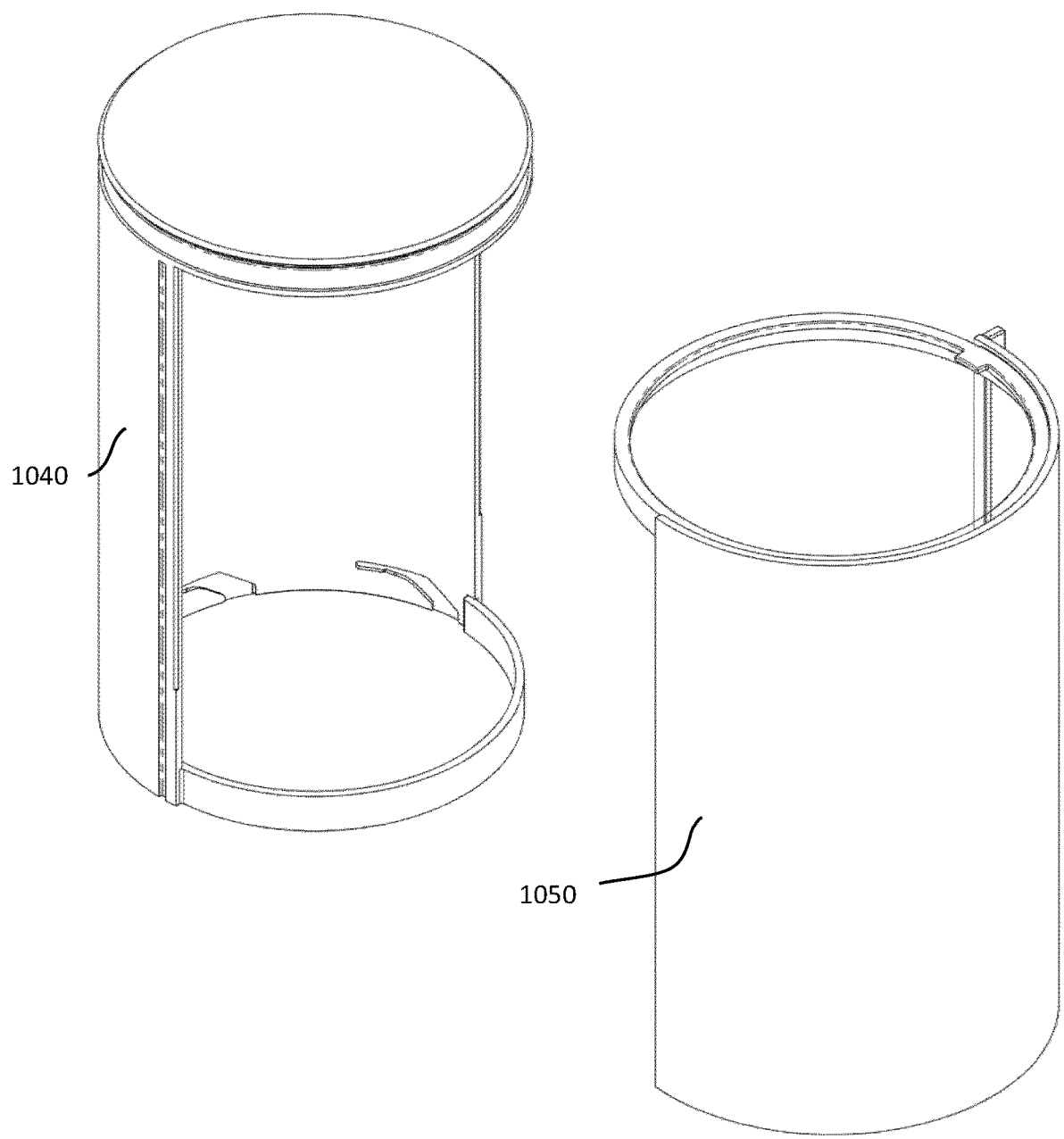
Figure 11C:
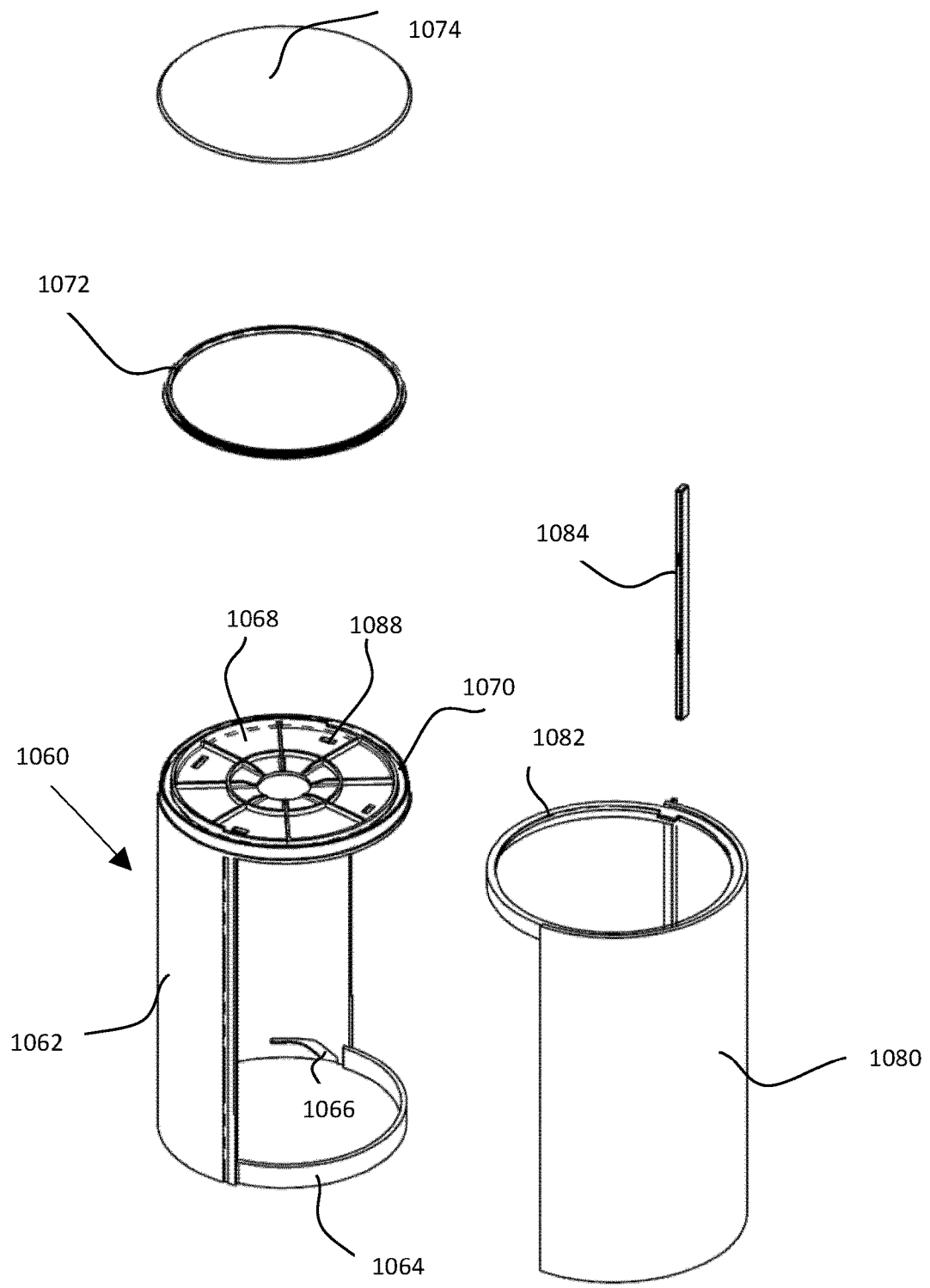
FIGS. 11C and 11D are simplified respective top facing and bottom facing more detailed exploded view illustrations of a top housing assembly of the MMIDD of FIGS. 10A-10C.
Figure 11D:
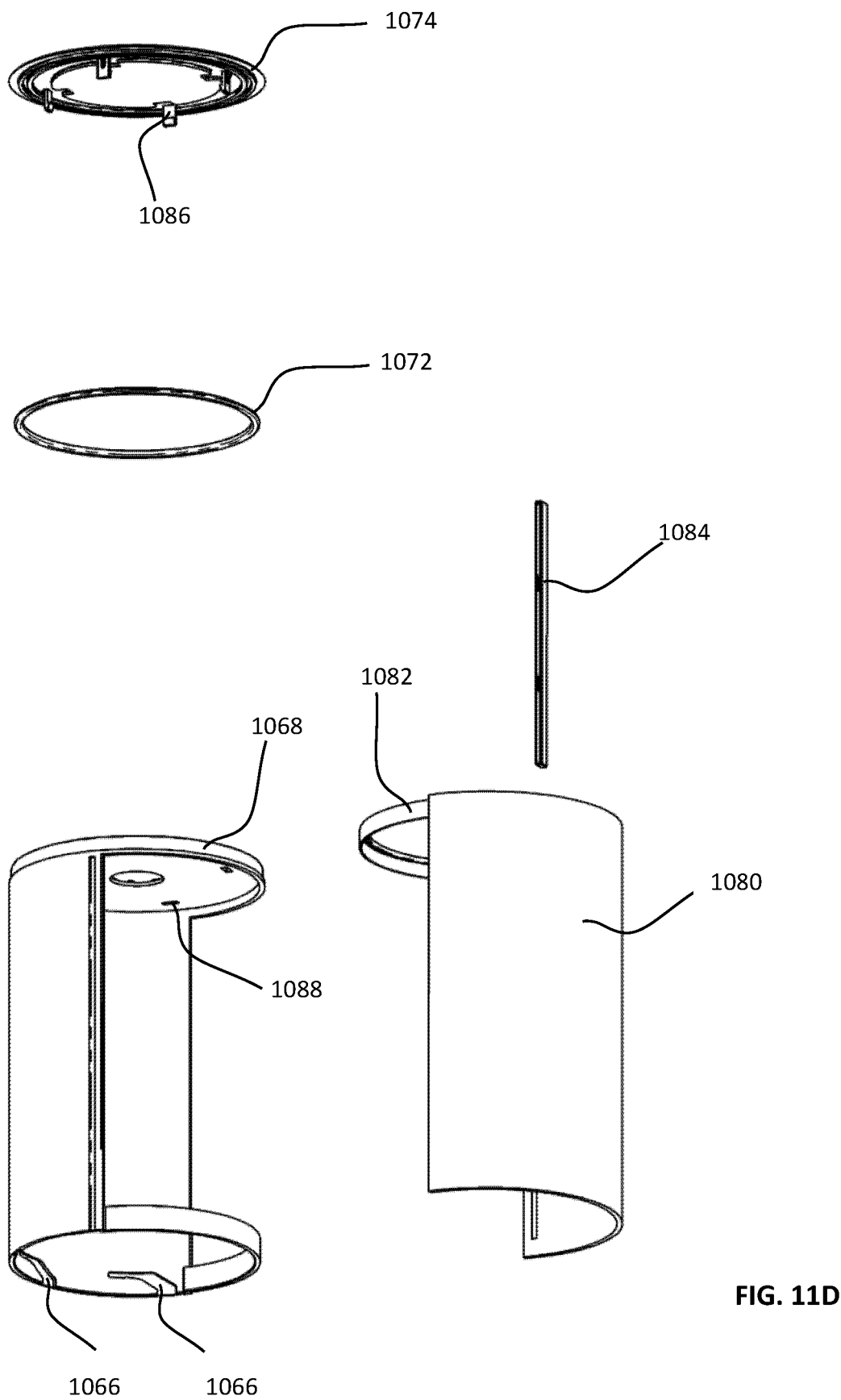
Figure 12A:
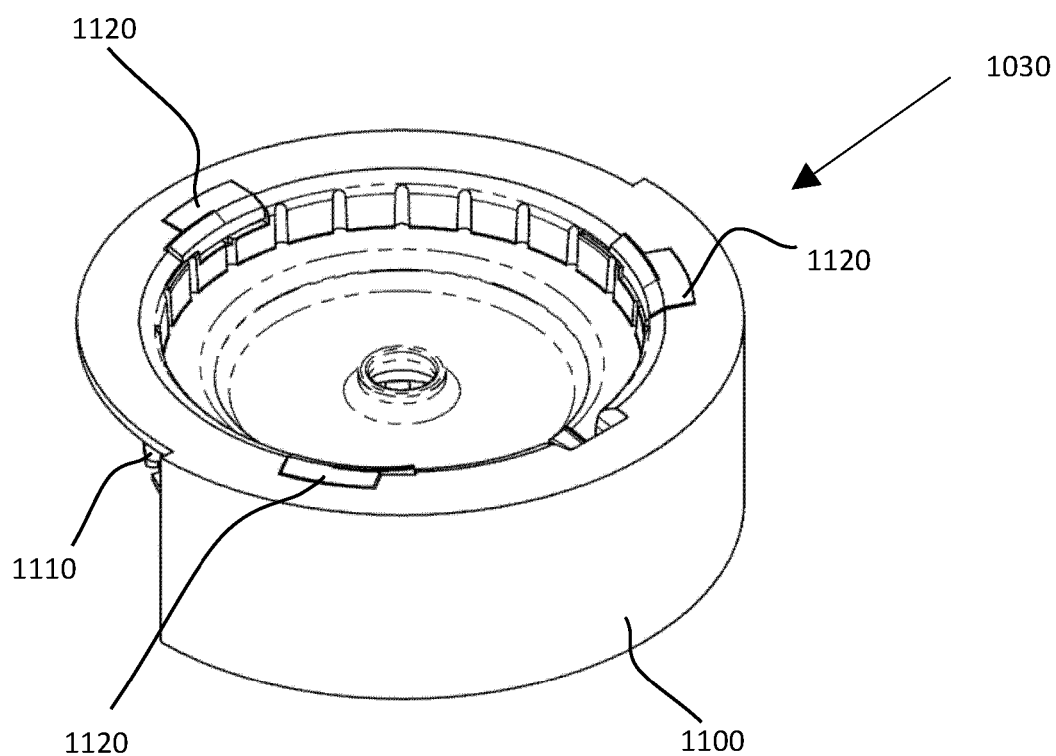
FIGS. 12A, 12B, 12C and 12D are simplified respective pictorial top view, planar top view, planar side view and planar bottom view illustrations of a SUPCA support and clamping assembly (SUPCASCA) forming part of MMIDD of FIGS. 10A-10C.
Figure 12B:
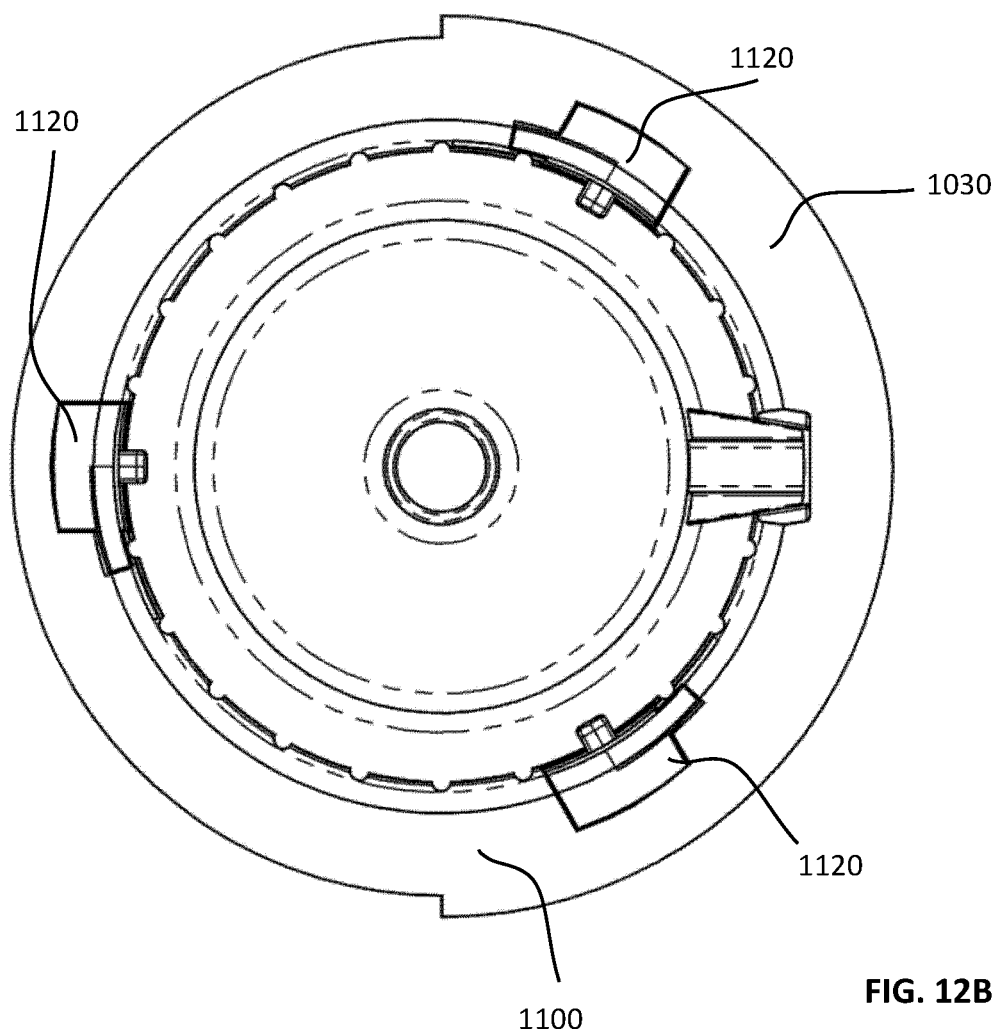
Figure 12C:
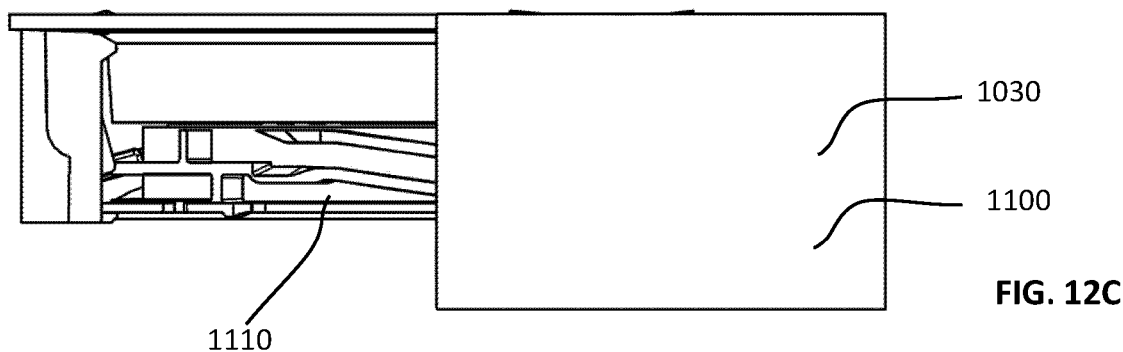
Figure 12D:
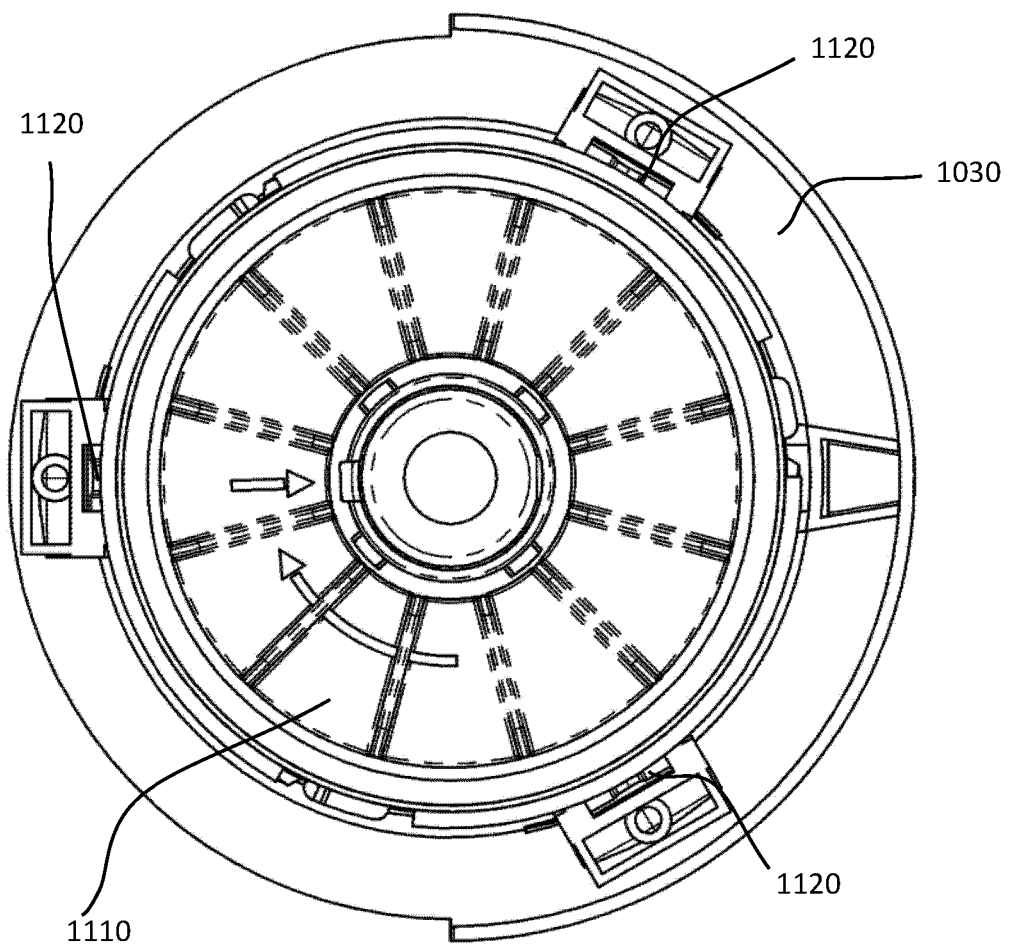
Figure 12E:
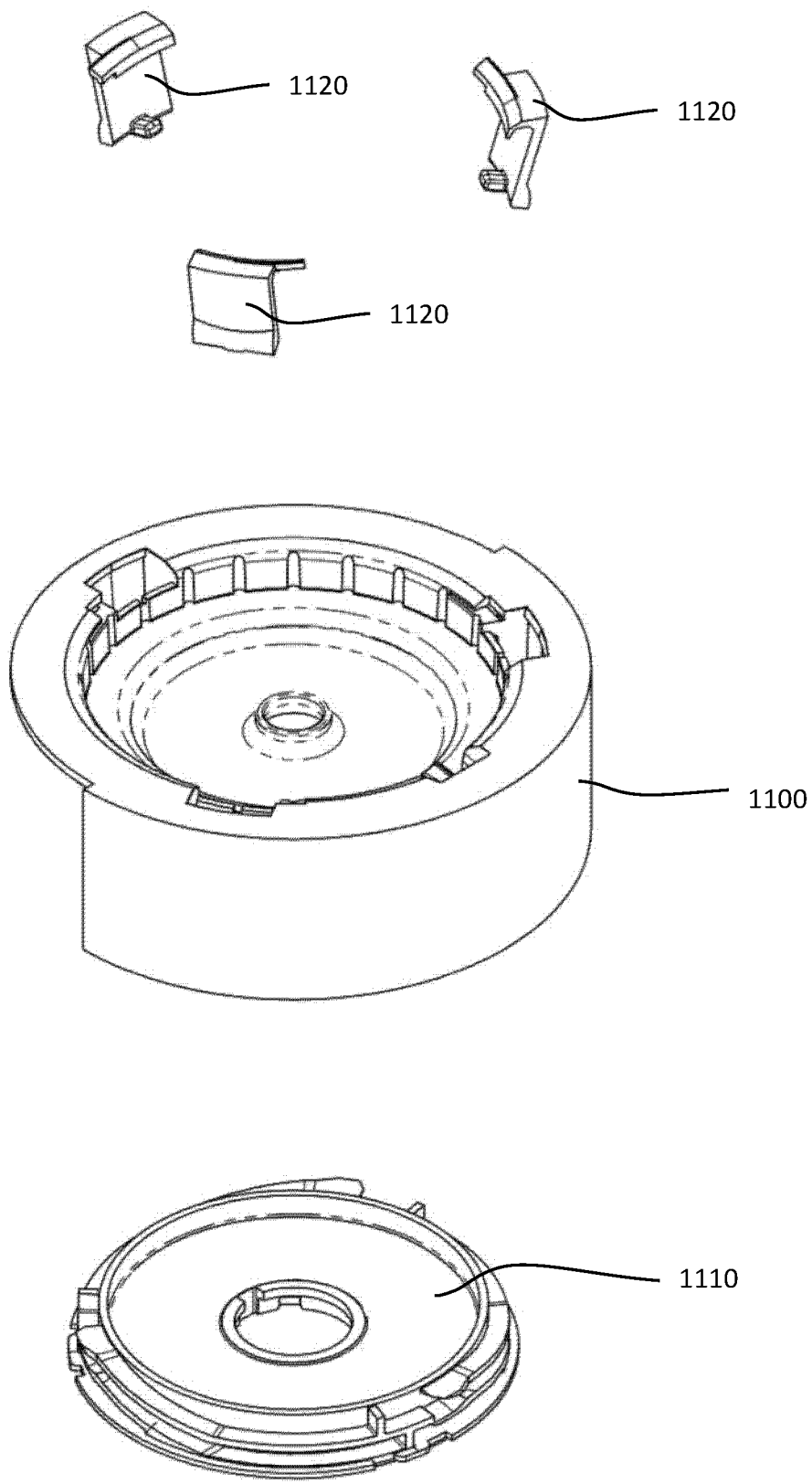
FIG. 12E is a simplified exploded view illustration of the SUPCASCA of FIGS. 12A-12D.
Figure 13A:
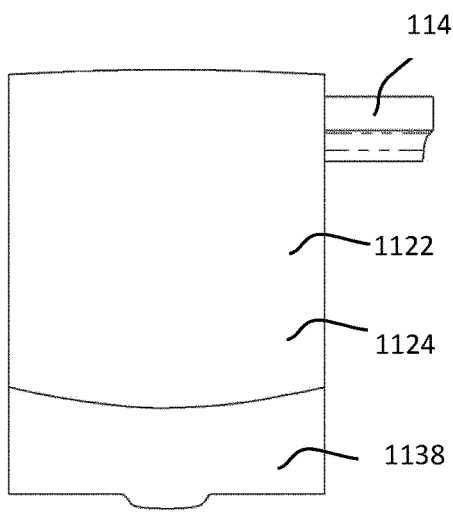
FIGS. 13A, 13B, 13C, 13D, 13E, 13F, 13G and 13H are simplified respective planar front view, planar rear view, planar side view, planar top view, planar sectional view, top-facing pictorial front view, bottom-facing pictorial rear view and bottom-facing pictorial front view illustrations of a clamp element forming part of the SUPCASCA of FIGS. 12A-12E, FIG. 13E being taken along lines E-E in FIG. 13D.
Figure 13B:
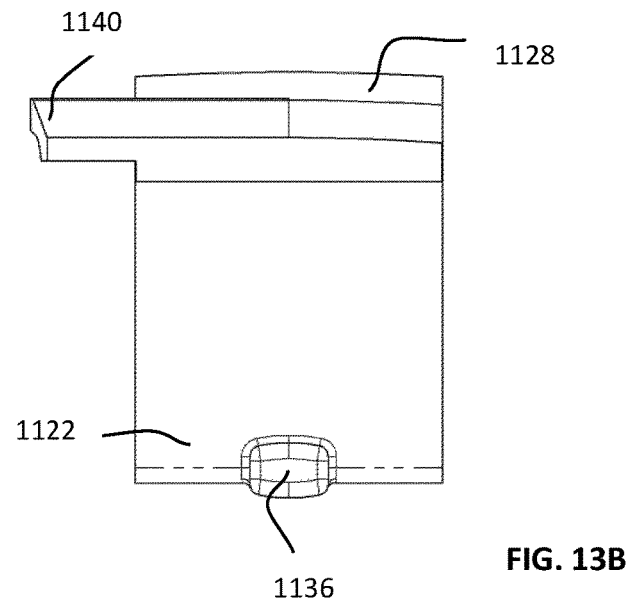
Figure 13C:
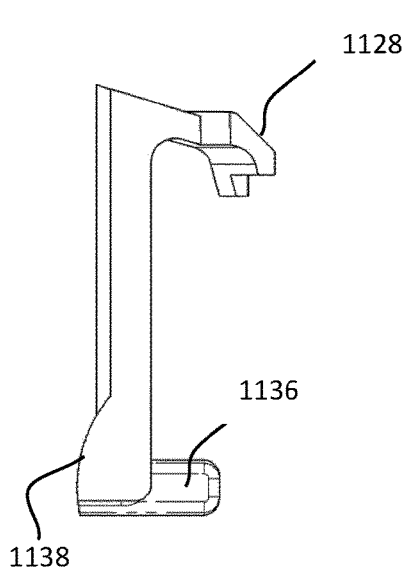
Figure 13D:
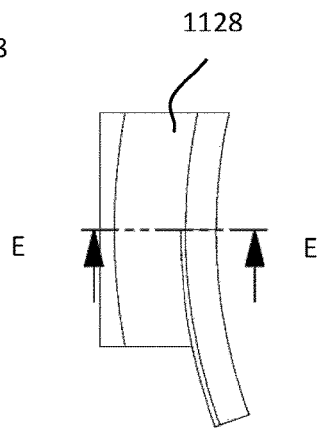
Figure 13E:
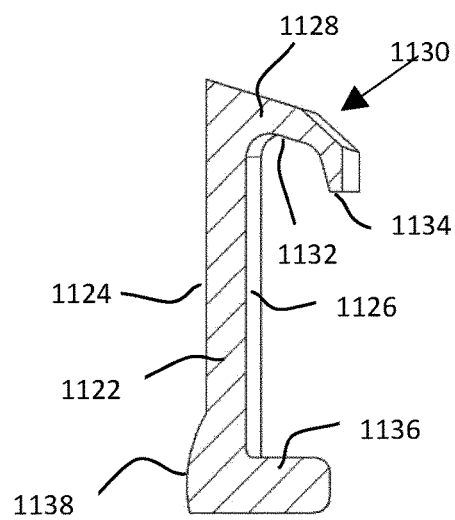
Figure 13F:
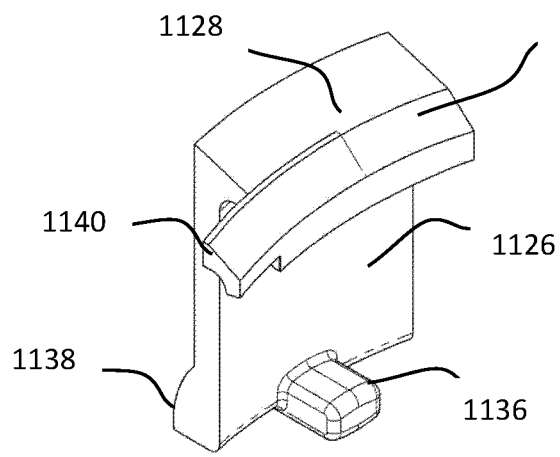
Figure 13G:
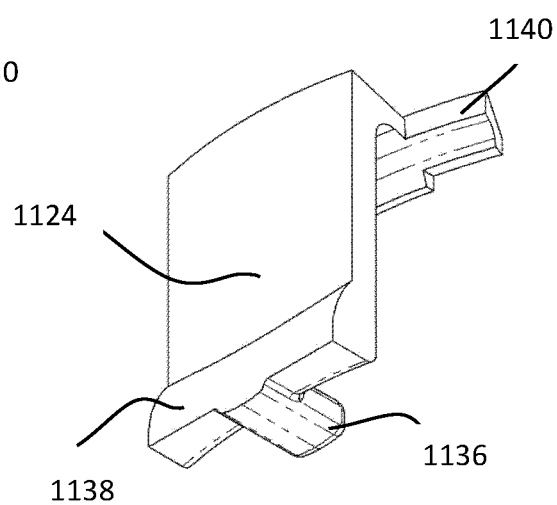
Figure 13H:
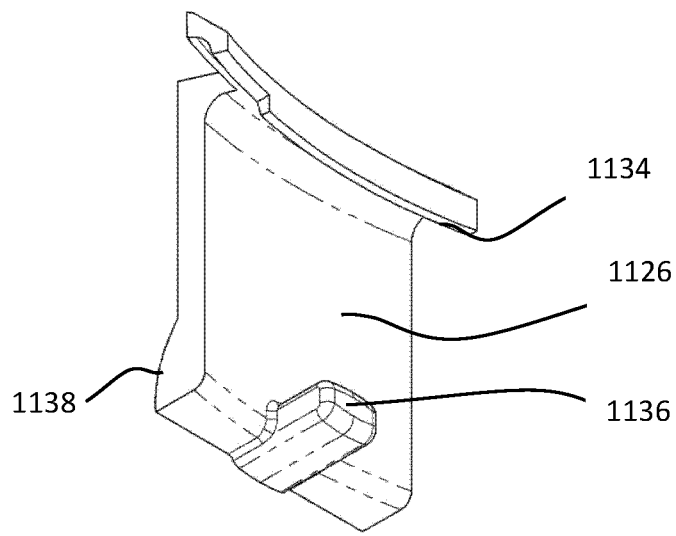
Figure 14A:
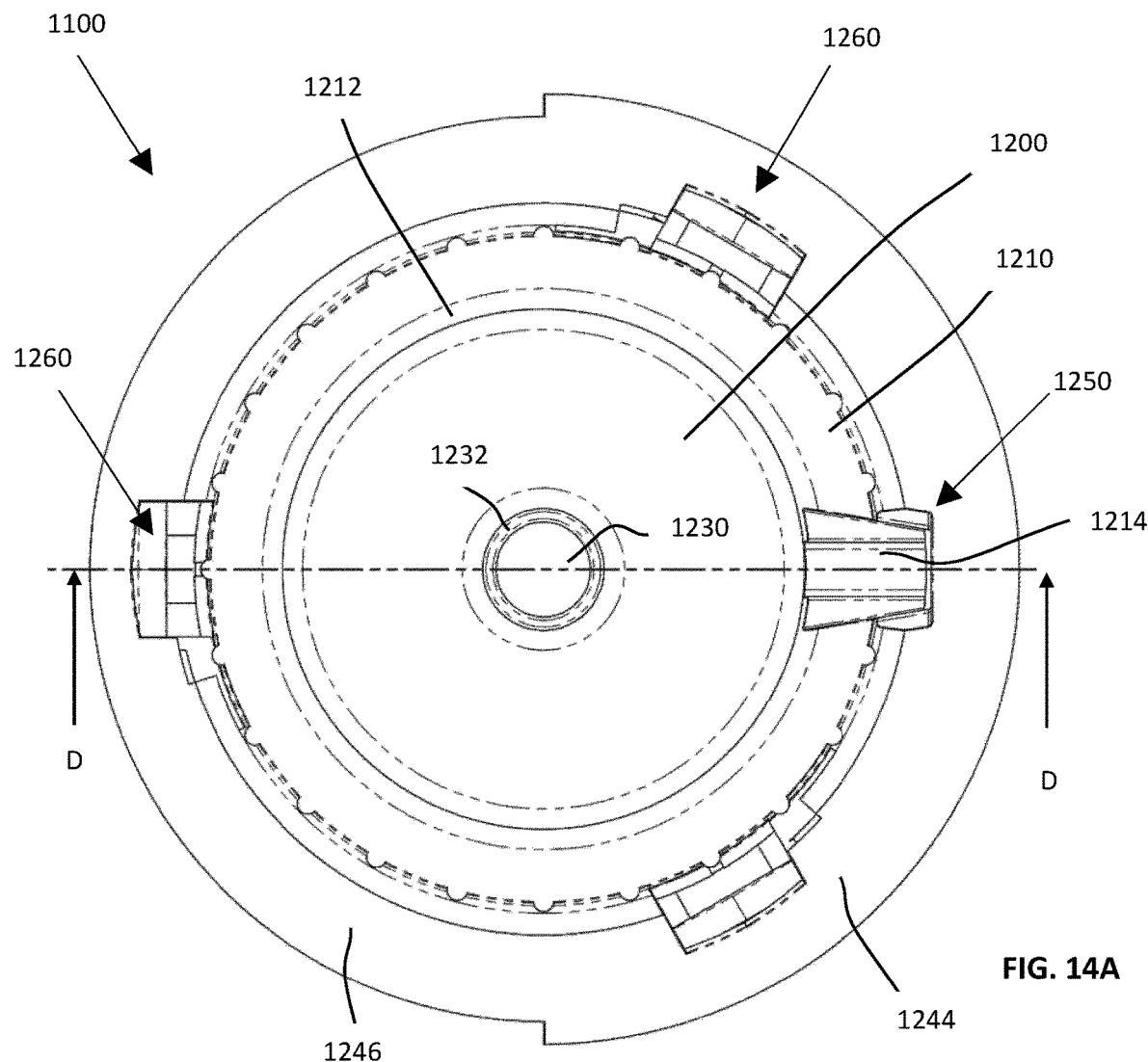
FIGS. 14A, 14B, 14C, 14D, 14E and 14F are simplified respective planar top view, planar side view, planar bottom view, sectional view, pictorial top view and pictorial bottom view illustrations of a support element forming part of the SUPCASCA of FIGS. 12A-12E, FIG. 14D being taken along lines D-D in FIG. 14A.
Figure 14B:
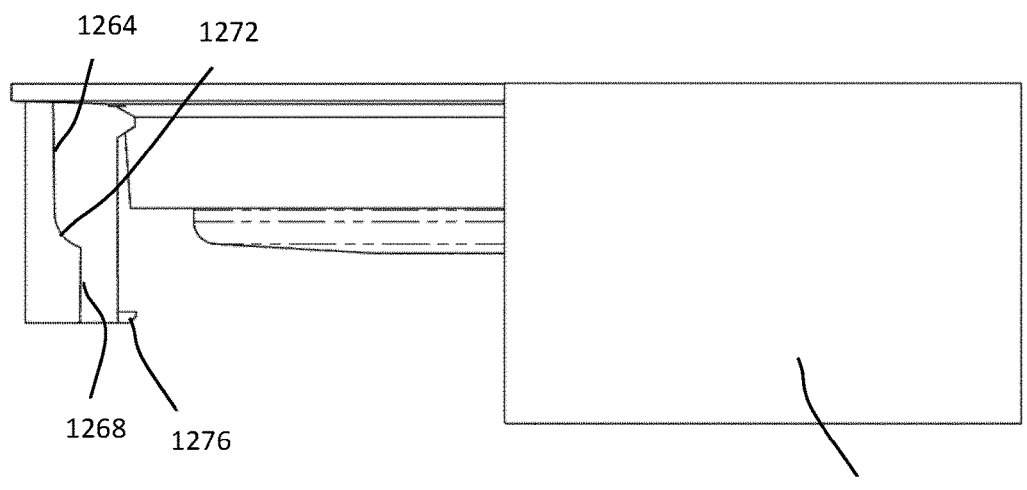
Figure 14C:
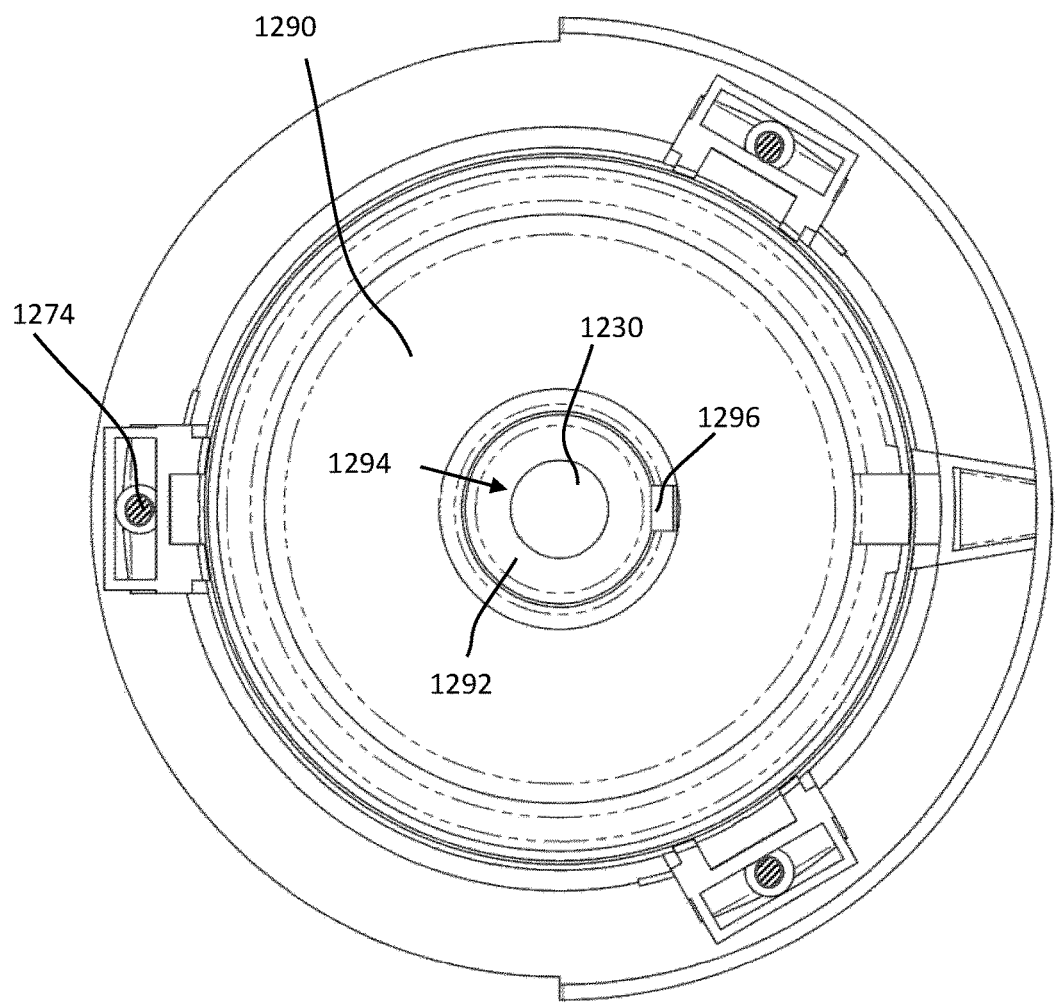
Figure 14D:
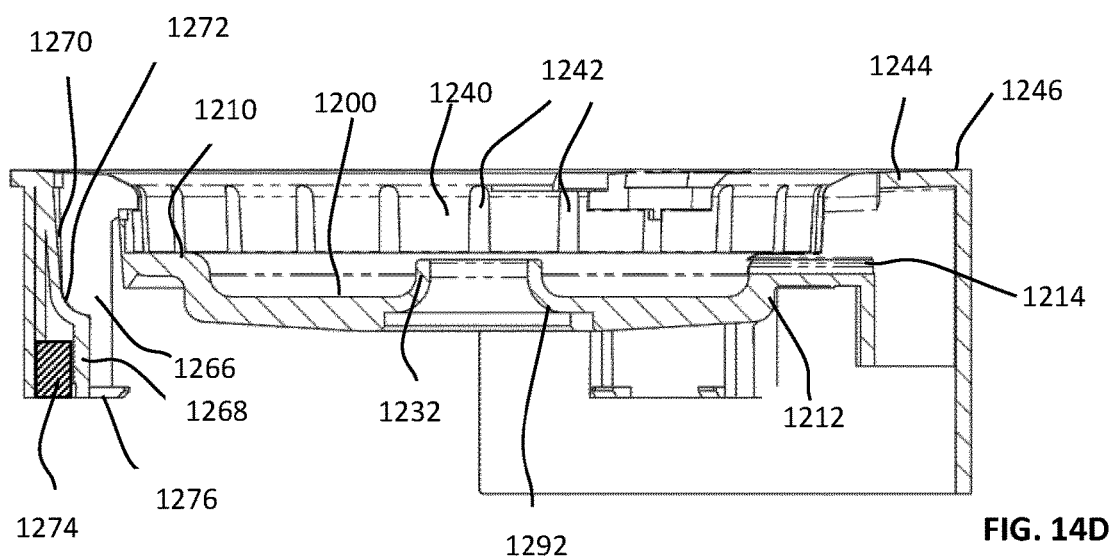
Figure 14E:
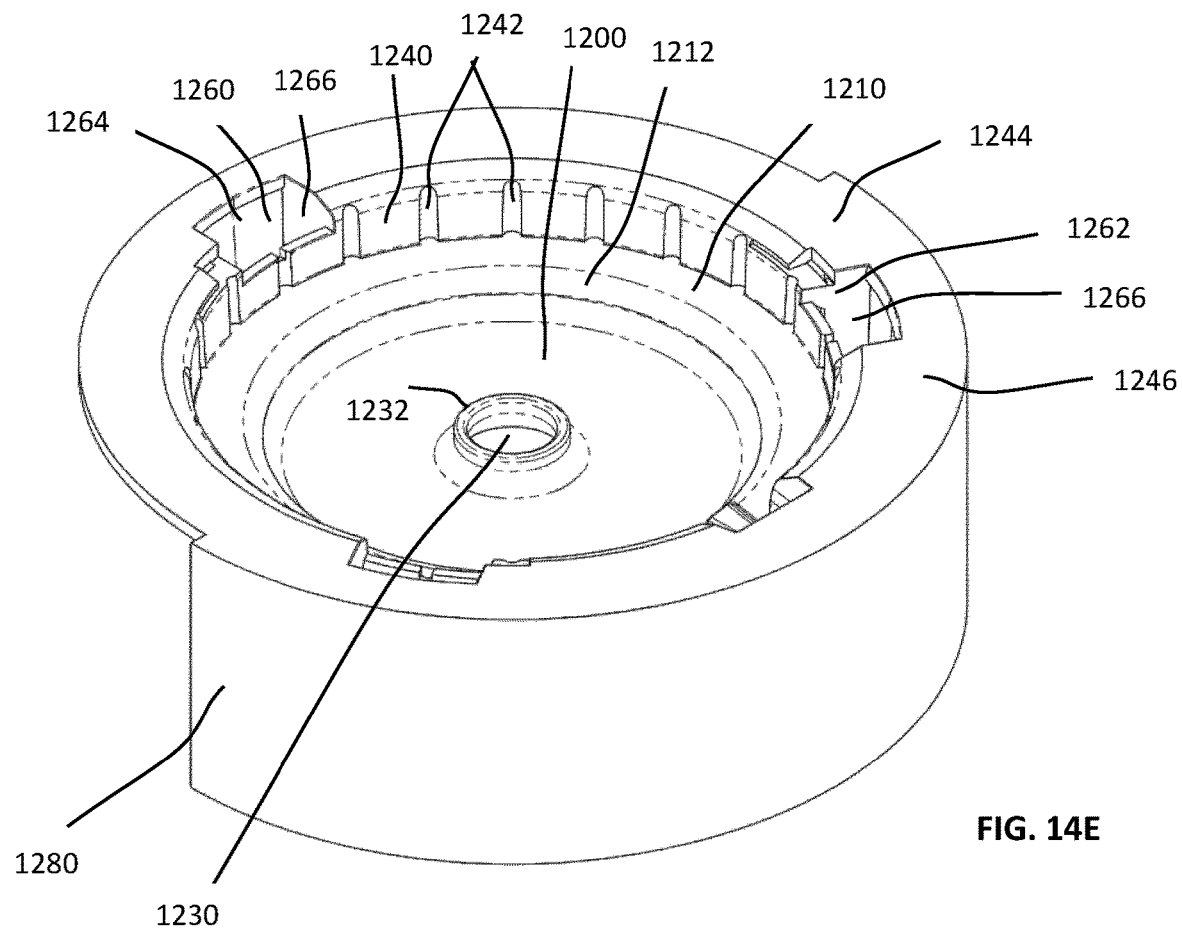
Figure 14F:
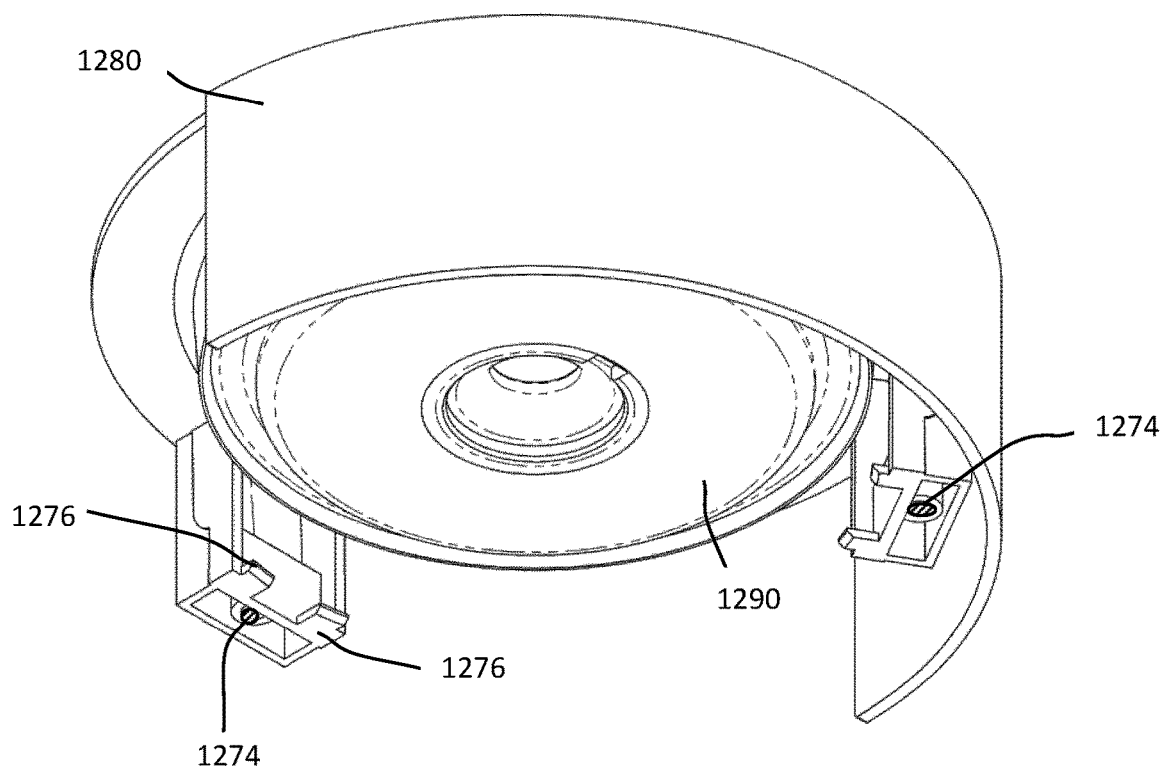
Figure 15A:
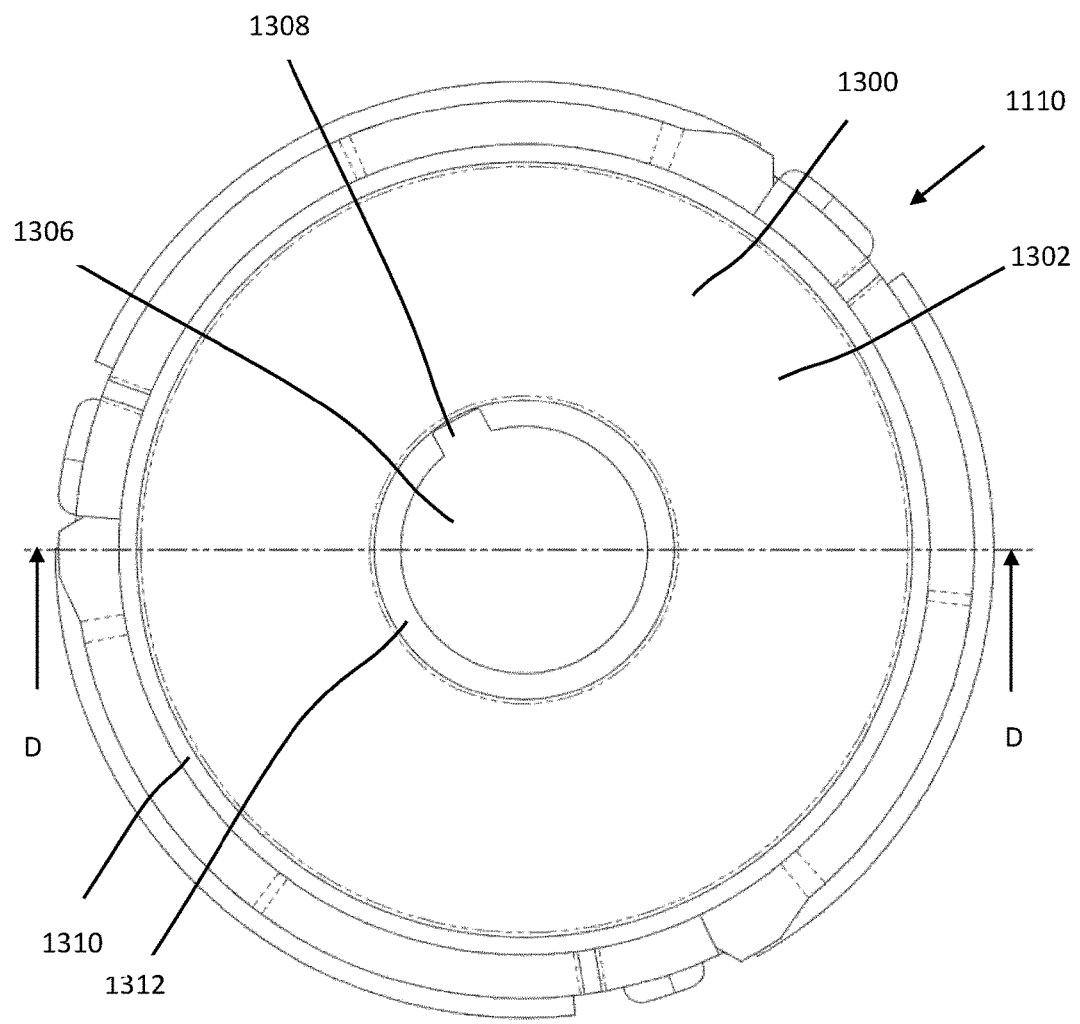
FIGS. 15A, 15B, 15C, 15D, 15E and 15F are simplified respective planar top view, planar side view, planar bottom view, sectional view, pictorial top view and pictorial bottom view illustrations of a cam element forming part of the SUPCASCA of FIGS. 12A-12E, FIG. 15D being taken along lines D-D in FIG. 15A.
Figure 15B:
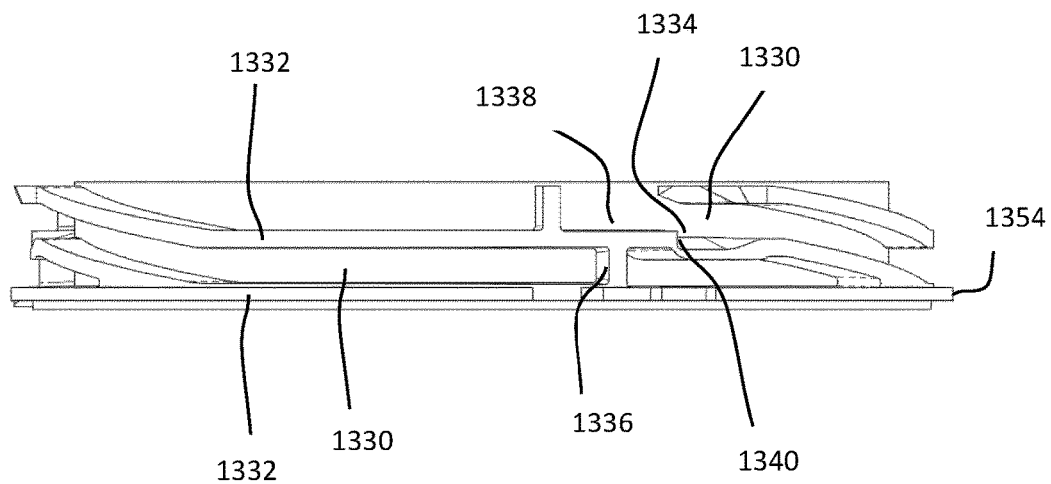
Figure 15C:
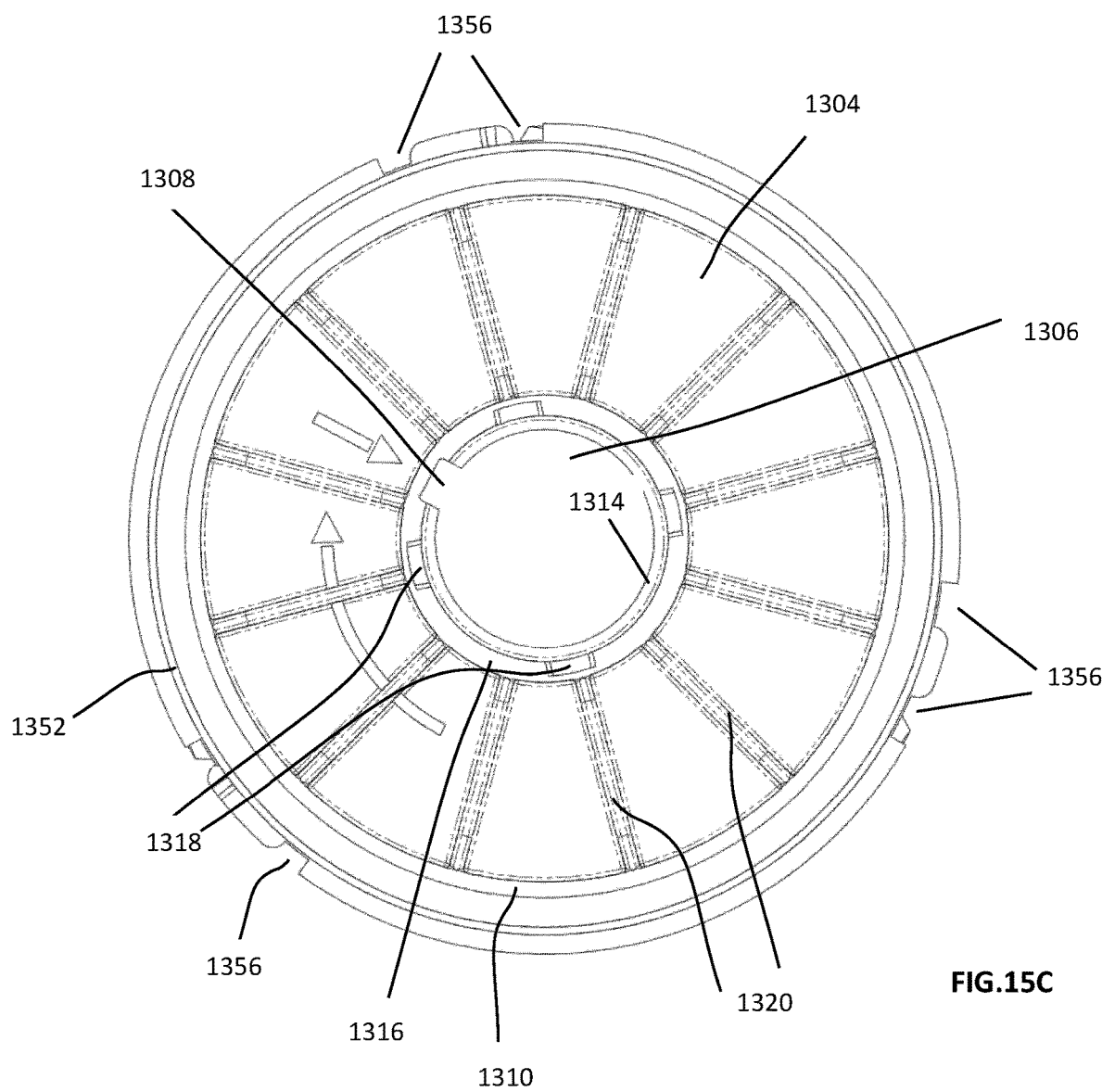
Figure 15D:
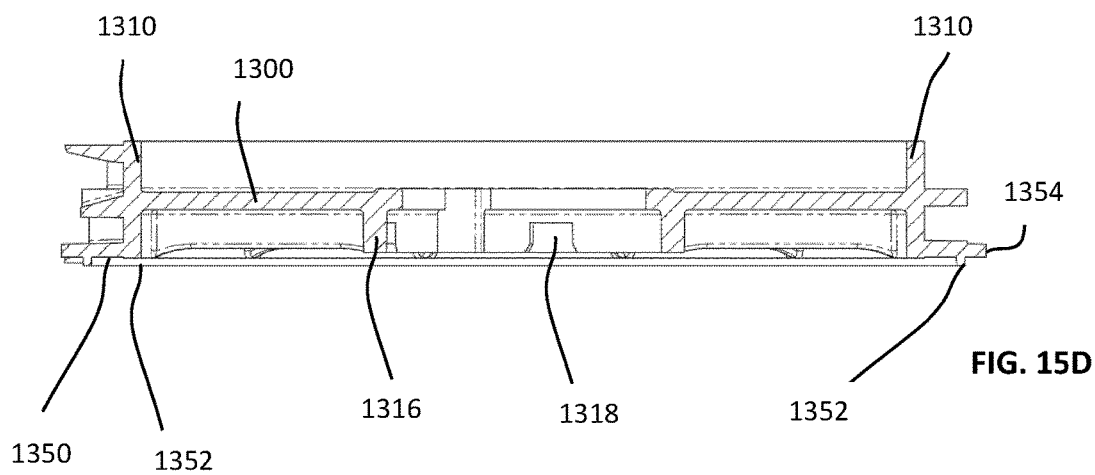
Figure 15E:
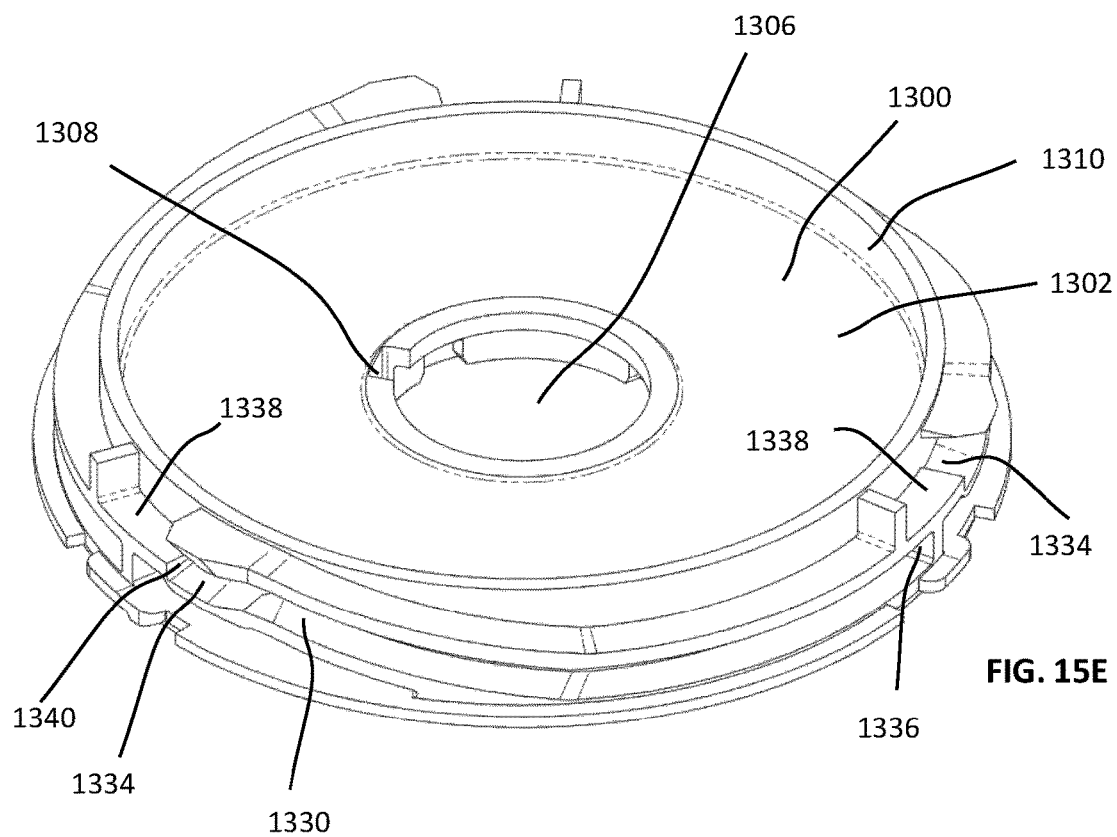
Figure 15F:
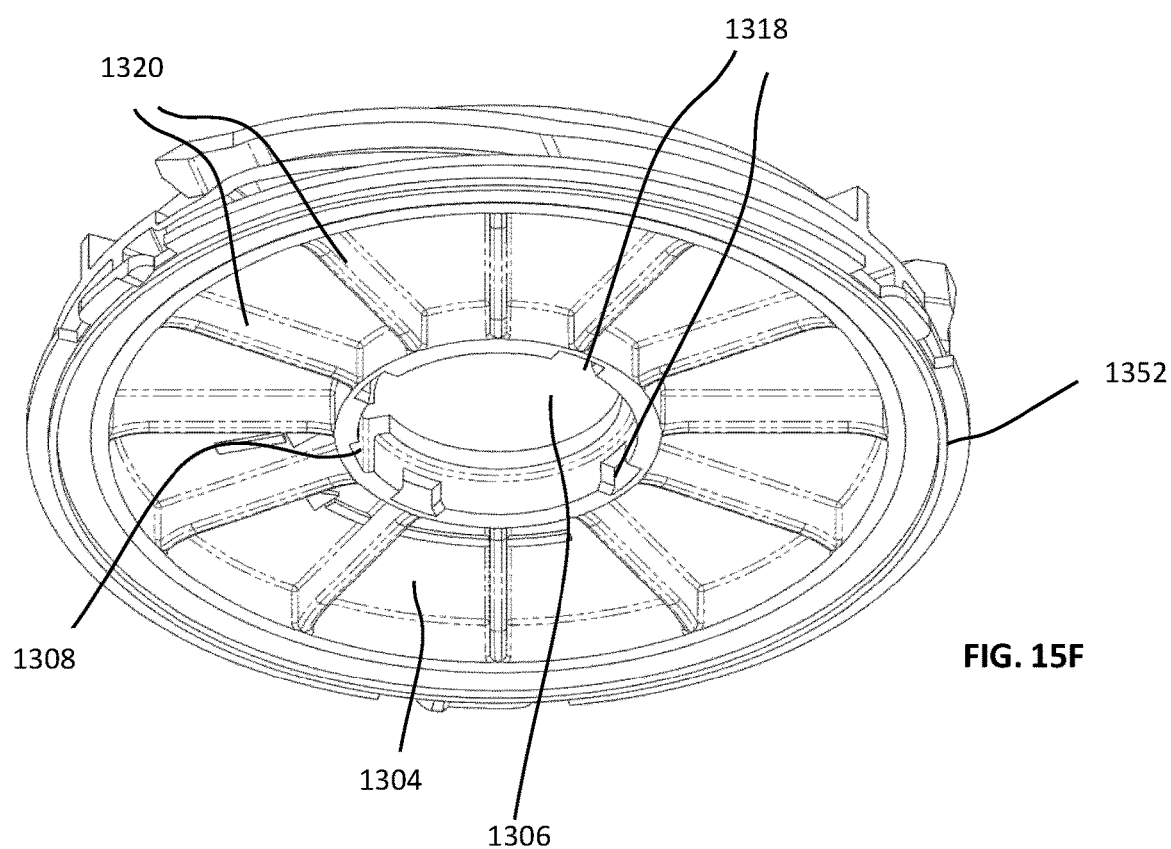
Figure 16A:
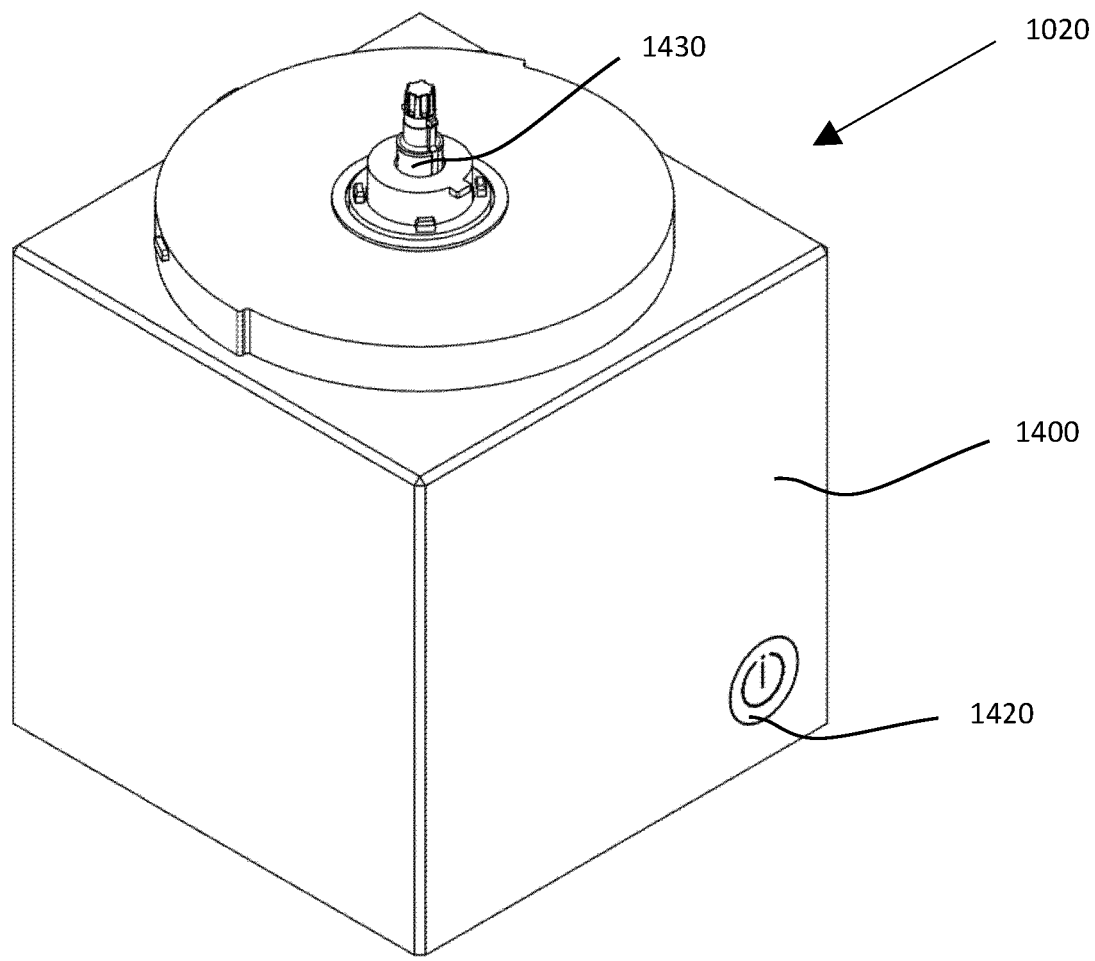
FIGS. 16A, 16B, 16C, 16D and 16E are simplified respective pictorial, planar front, planar top, planar bottom and exploded view illustrations of a base assembly forming part of the MMIDD of FIGS. 10A-10C.
Figure 16B:
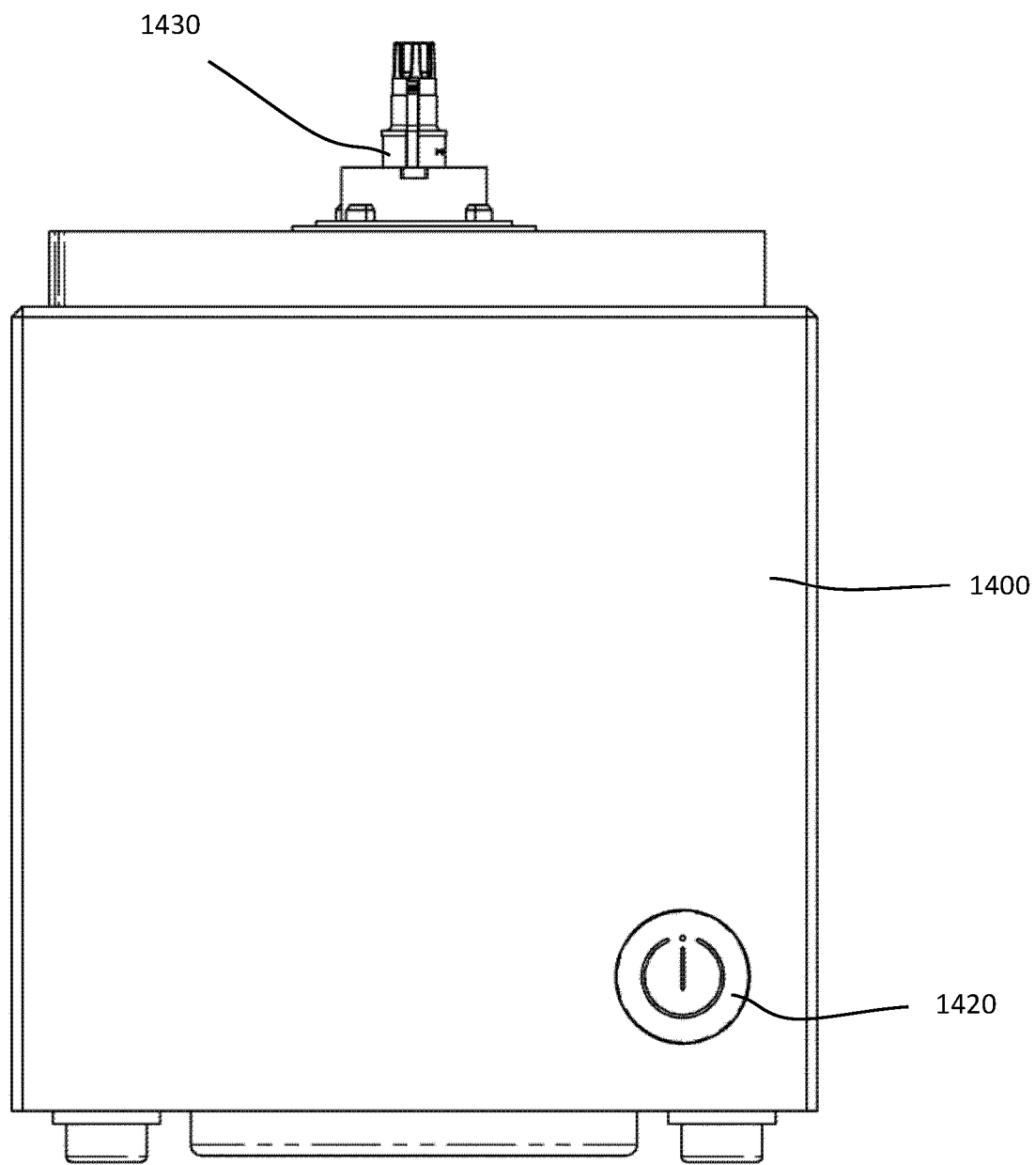
Figure 16C:
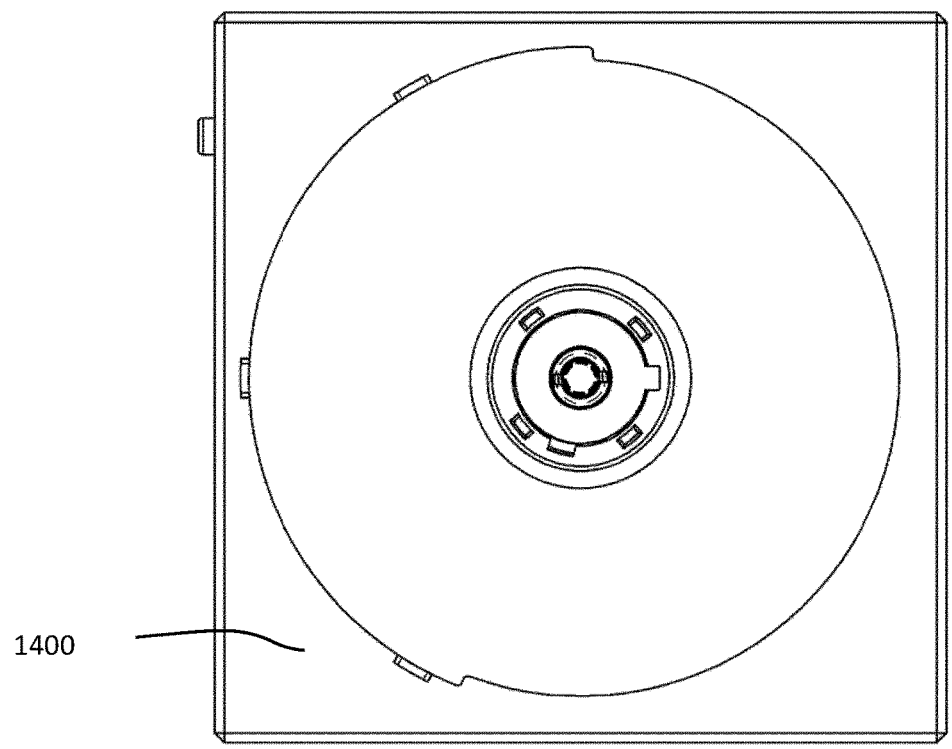
Figure 16D:
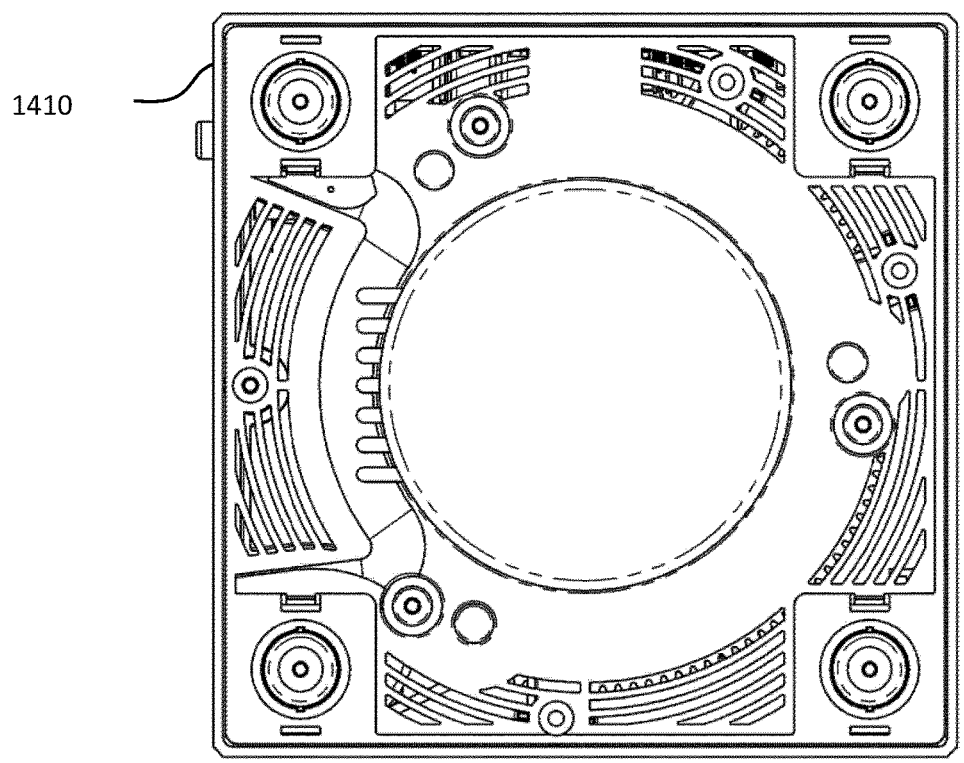
Figure 16E:
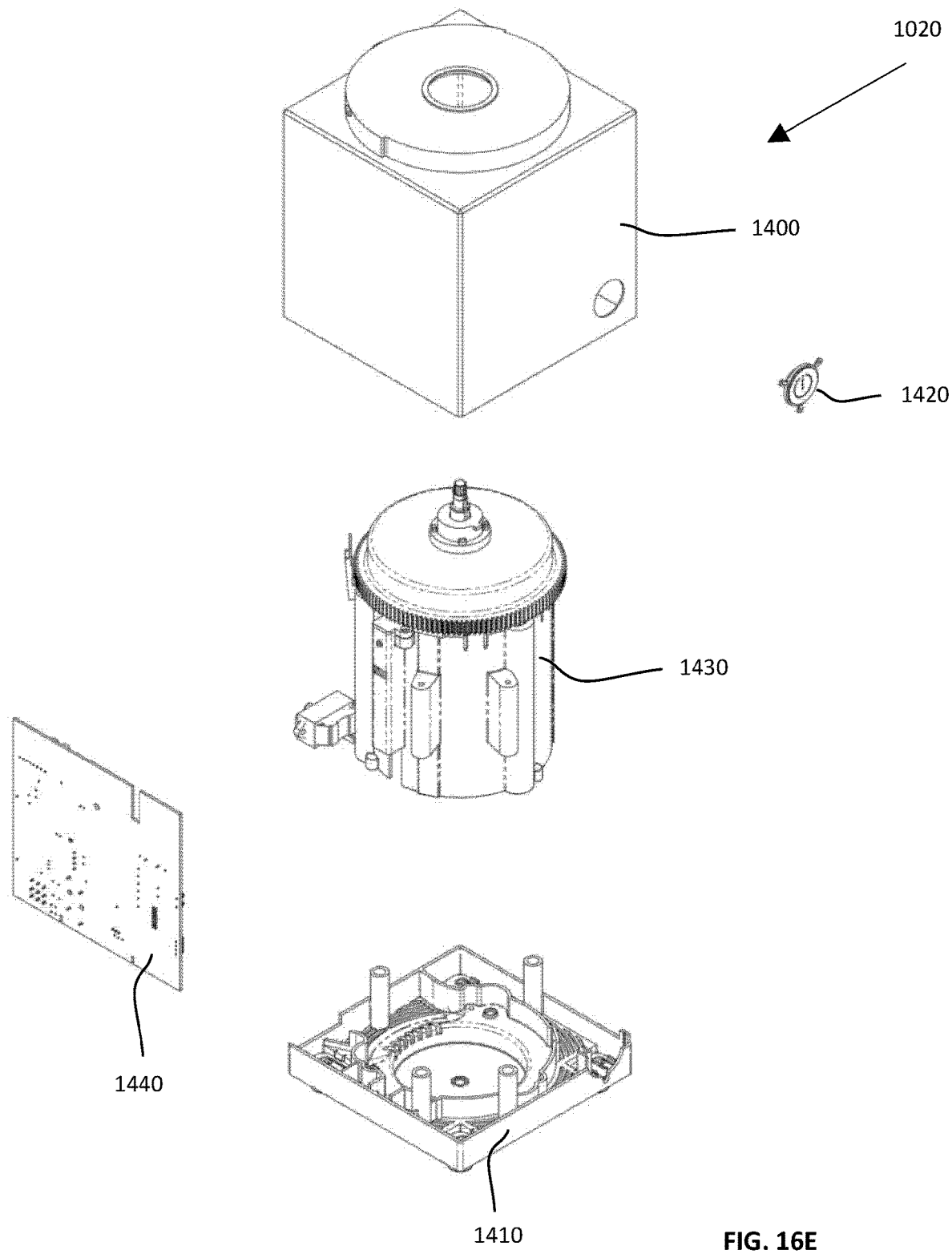
Figure 17A:
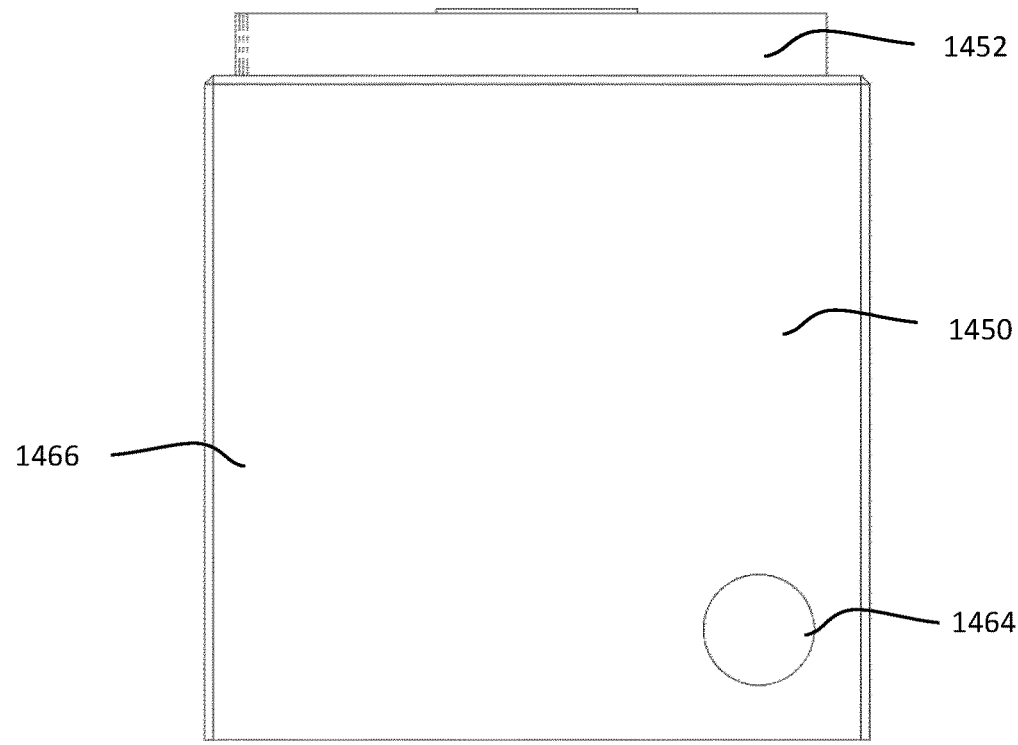
FIGS. 17A, 17B, 17C, 17D and 17E are simplified respective planar front, planar top, planar bottom, upward-facing pictorial and downward-facing pictorial view illustrations of a base housing forming part of the base assembly of FIGS. 16A-16E.
Figure 17B:
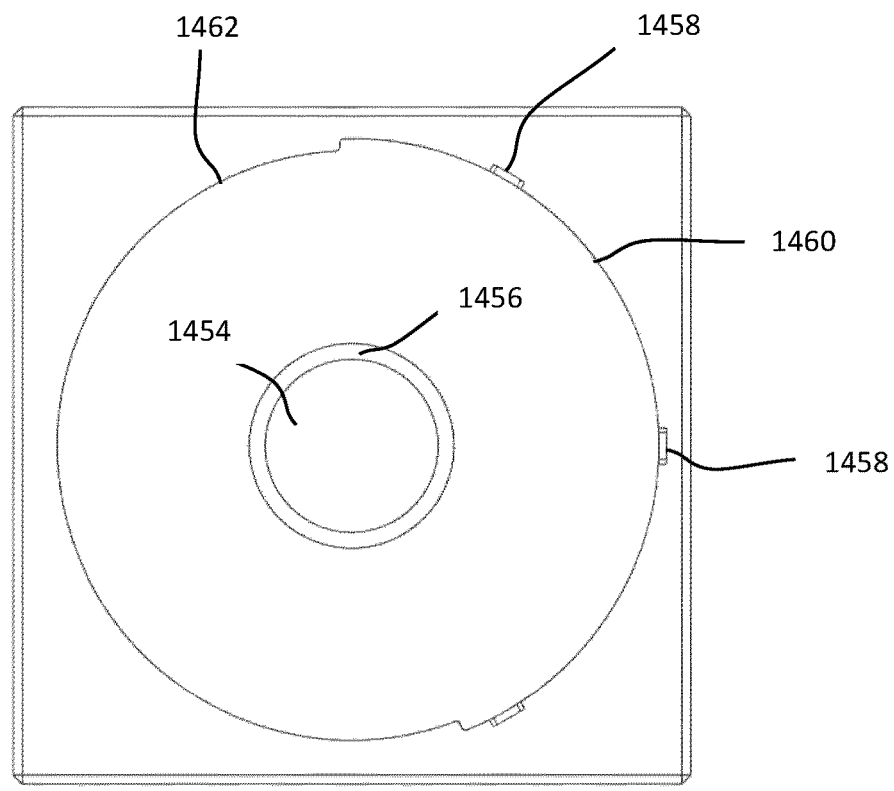
Figure 17C:
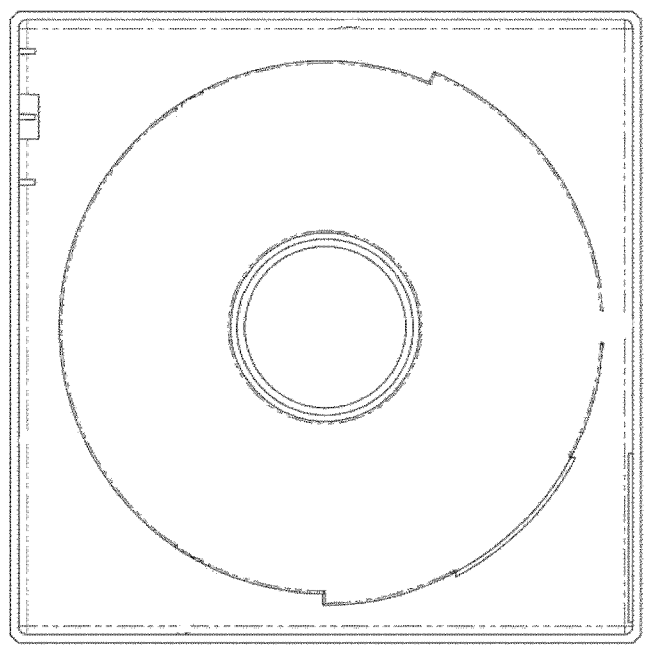
Figure 17D:
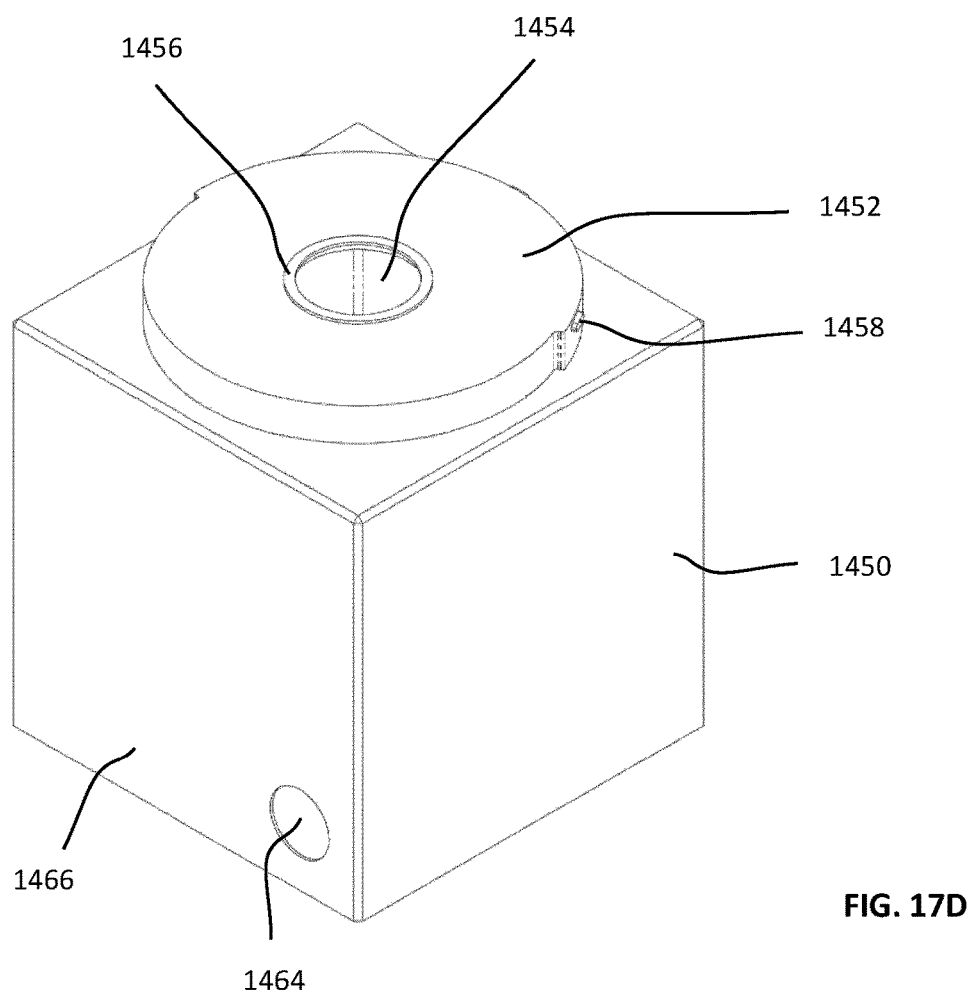
Figure 17E:
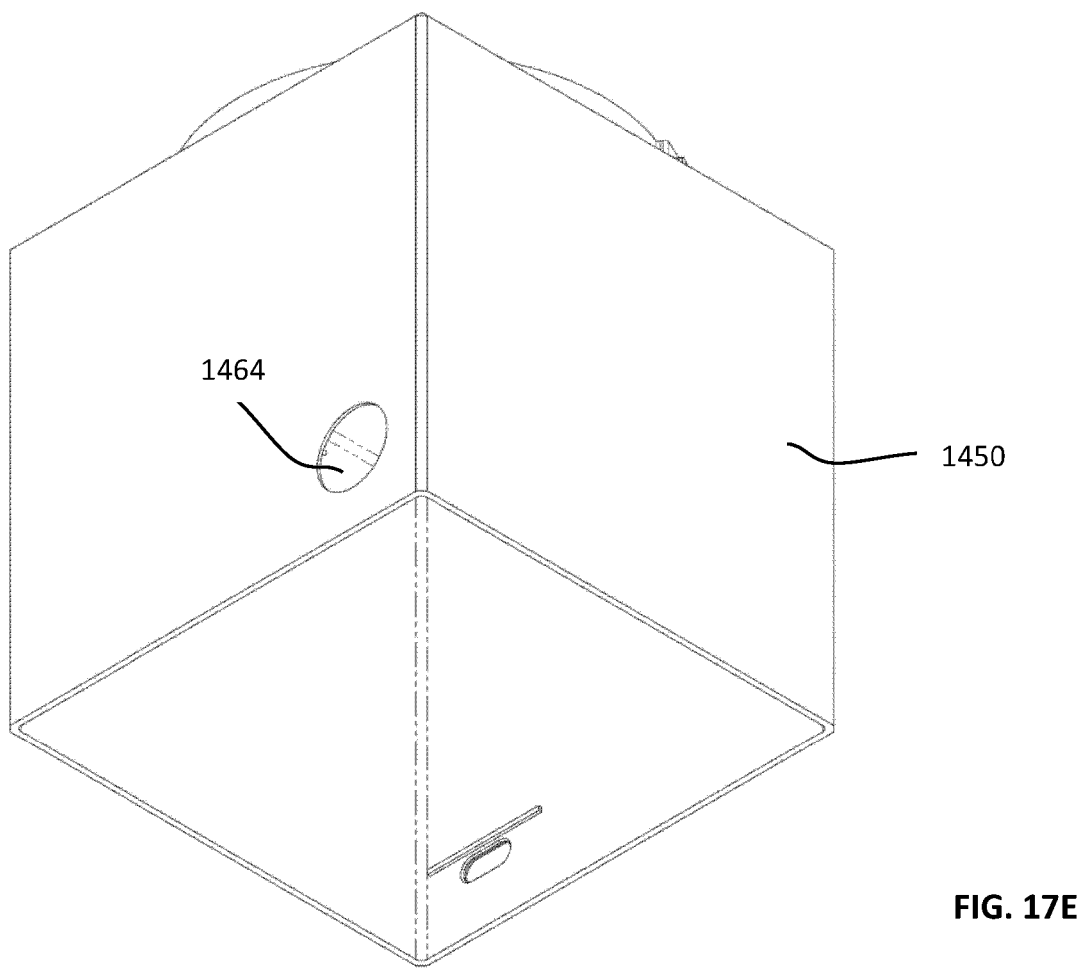

As seen with particular clarity in sectional enlargement A in FIG. 11A, low friction bearing ring 1072 is seated in circumferential recess 1070 and cylindrical top ring 1082 is rotatably supported thereon. Top cover 1074, which is fixed to static housing element 1060 by means of clips 1086 which engage apertures 1088 formed in top portion 1068, overlies recess 1070, low friction ring 1072 and cylindrical top ring 1082.

Reference is now made to FIGS. 12A-12E, which illustrate SUPCA support and clamping assembly (SUPCASCA)

1030 forming part of MMIDD 1000. As seen in FIGS. 12A-12E, SUPCASCA 1030 preferably includes a support element 1100, which rotatably supports a cam element 1110 and pivotably and slidably supports a plurality of, typically three, clamp elements 1120.

Reference is now made to FIGS. 13A-13H, which are simplified illustrations of clamp element 1120 forming part of the SUPCASCA 1030 of FIGS. 12A-12E. As seen in FIGS. 13A-13H, clamp element 1120 comprises a planar generally rectangular portion 1122 having a radially outward-facing surface 1124 and a radially inward-facing surface 1126. Radially outward-facing surface 1124 terminates at a radially inward tapered top surface 1128 of a clamping portion 1130 defining a radially inwardly and downwardly directed clamping groove 1132 which extends to radially inward-facing surface 1126. Top surface 1128 and clamping groove 1132 together define a clamping engagement edge 1134.

A cam engagement protrusion 1136 extends radially inwardly at a bottom portion of front surface 1126. A support element pivotable and slidable engagement protrusion 1138 is formed on radially outward-facing surface 1124 at a location generally opposite protrusion 1136.

Extending circumferentially to one side of clamping portion 1130 is a tab engagement protrusion 1140, which operatively engages tab 214 of lid 140 in response to clamping operation of clamp element 1120 and causes irreversible radially outward displacement of tab 214, thereby providing single-use functionality for SUPCA 100.

Reference is now made to FIGS. 14A-14F, which are simplified illustrations of support element 1100, forming part of SUPCASCA 1030 of FIGS. 12A-12E. As seen in FIGS. 14A-14F, support element 1100 preferably comprises a generally circular planar surface 1200 which is surrounded by a raised, generally annular planar container support surface 1210, preferably joined to surface 1200 by a tapered circular wall 1212. A spillage channel 1214 extends radially outwardly through tapered circular wall 1212 at a height between the planes of surface 1200 and annular planar container support surface 1210.

Disposed centrally of generally circular planar surface 1200 is a drive shaft accommodating aperture 1230, which is surrounded by an upstanding circumferential rim 1232, thereby to help prevent leaking of spillage located on generally circular planar surface 1200 into the remainder of the MMIDD 1000 lying below support element 1100.

Annular planar container support surface 1210 is preferably surrounded by a tapered wall 1240 which is preferably formed with a multiplicity of circumferentially distributed indents 1242, arranged to accommodate a plurality of generally vertical radially outwardly extending elongate protrusions 212 distributed along circumferential edge surface 210 of lid 140 of SUPCA 100. Wall 1240 terminates in a circumferential planar annular top and radially outwardly extending wall 1244 having a top-facing surface 1246.

Extending circumferentially to both sides of channel 1214 is a SUPCA azimuthal locating channel 1250, which extends radially outwardly of wall 1240 and communicates with channel 1214. SUPCA azimuthal locating channel 1250 accommodates finger engagement portion 196 of SUPCA 100.

Walls 1240 and 1244 are formed with a plurality of clamp accommodating pockets 1260, typically three in number. Each of pockets 1260 preferably includes an opening 1262, which extends from wall 1240 at a height just below that of wall 1244 radially outwardly along wall 1244. Each of pockets 1260 includes a radially outwardly extending wall 1264 and side walls 1266. Radially outwardly extending wall 1264 includes a radially inward lower portion 1268 and a radially outward upper portion 1270 joined by a concave curved surface 1272. Preferably, a magnet 1274 is seated behind radially inward lower portion 1268. Extending radially inwardly from radially inward outer portion 1268 adjacent each of side walls 1266 and underlying opening 1262 are a pair of protrusions 1276.

Preferably, a depending circumferential wall 1280 extends along nearly one half of the circumference of wall 1244 at an outer edge thereof.

Underlying surface 1200 is a corresponding circular planar surface 1290 which is formed with a convex curved circumferential wall 1292 surrounding aperture 1230. Surrounding wall 1292 there is formed a generally circular recess 1294, which is preferably configured to have a radially outwardly extending rectangular notch 1296.

Reference is now made to FIGS. 15A-15F, which are simplified illustrations of cam element 1110 forming part of the SUPCASCA 1030 of FIGS. 12A-12E.

As seen in FIGS. 15A-15F, cam element 1110 preferably is a generally circular planar element, preferably formed of polyoxymethylene (POM) or fiberglass-reinforced polyamide.

Cam element 1110 preferably includes a generally circular disk 1300 having a generally planar top surface 1302 and a generally planar bottom surface 1304 and is formed with a central aperture 1306 having a radially outwardly extending generally rectangular notch 1308. A circumferential wall 1310 surrounds disk 1300.

Aperture 1306 is surrounded on generally planar top surface 1302 by a generally circular rotational engagement surface 1312 and is surrounded on generally planar bottom surface 1304 by a generally circular ledge surface 1314. Generally circular ledge surface 1314 is surrounded adjacent generally planar bottom surface 1304 by a generally circular wall 1316 that is formed with a plurality of radially outwardly extending notches 1318. A plurality of mutually equally spaced ribs 1320 preferably extend from circular wall 1316 to circumferential wall 1310 and are joined to planar bottom surface 1304.

Formed on a radially outer surface of circumferential wall 1310 are a plurality of cam channels 1330, preferably three in number, each arranged to operate and selectably position a clamp element 1120, located in a pocket 1260 of support element 1100 as will be described hereinbelow with reference to FIGS. 48A and 49A. The clamp element 1120 is retained in a cam channel 1330 by engagement of engagement surface 1138 of the radially outwardly facing surface 1124 of the clamp element 1120 with lower surface 1268 of pocket 1260. As seen particularly well in FIGS. 15B and 15E, cam channels 1330 are distributed about the outer circumference of cam element 1110 and are partially overlapping. Each cam channel 1330 is defined by a pair of radially outwardly extending mutually spaced circumferential walls 1332, each of which extends from a first location 1334 therealong to a second location 1336 therealong. Upstream of the first location 1334 is an entry location 1338 wherein, during assembly of the SUPCASCA 1030, each clamp element 1120 is inserted into cam channel 1330. Generally, each cam channel 1330 extends circumferentially and downwardly through approximately 105 degrees of azimuth. The width of each cam channel 1330, as defined by the separation between adjacent circumferential walls 1332 is at a maximum at the first location 1334.

It is a particular feature of this embodiment of the present invention that the operation of the cam element 1110 in causing clamp elements 1120 to assume a clamping operative orientation is produced both by the downward orientation of the cam channel 1330 from the first location 1334 to the second location 1336 and by varying the radial extent of a circumferential wall 1332 relative to circumferential wall 1310 along the cam channels 1330. Thus it will be seen that at first location 1334, the radial extent of the upper circumferential wall 1332 defining the cam channel 1330 is at a maximum, forcing the clamp element 1120 located in the cam channel 1330 at the first location 1334 radially outwardly and as the cam channel 1330 rotates relative to the clamp element 1120 in pocket 1260, the radial extent of the upper circumferential wall 1332 decreases, allowing the clamp element 1120 to be biased radially inwardly by engagement of engagement surface 1138 of the radially outwardly facing surface 1124 of the clamp element 1120 with lower surface 1268 of pocket 1260.

This operation is enhanced by construction of the cam channels 1330 to have a maximum width between adjacent circumferential walls 1332 at the first location 1334 along each cam channel 1330 so as to accommodate radial outward biasing of the clamp element 1120 within the cam channel 1330 thereat.

It is appreciated that the cam channels 1330 are each constructed to have a somewhat flexible stopper portion 1340 downstream of entry location 1338 and upstream of the first location 1334 thereof to permit assembly of the device with each clamp element 1120 located within a cam channel 1330 and to prevent inadvertent disengagement of the clamp element 1120 from the cam channel 1330. Each cam channel 1330 is blocked at the second location 1336, thus preventing disengagement of the clamp element 1120 from the cam channel 1330 at the second location 1336.

It is a particular feature of this embodiment of the present invention that a generally planar annular wall surface 1350 extends radially outwardly of circumferential wall 1310 below generally planar bottom surface 1304 and is formed with a downwardly facing circumferential leakage directing protrusion 1352, which is operative to direct liquids away from the interior of MMIDD 1000.

It is also a particular feature of this embodiment of the present invention that a radially outwardly directed edge 1354 of generally planar annular wall surface 1350 is formed with a plurality of locating notches 1356, which are configured to engage protrusions 1276 associated with each pocket 1260, thereby ensuring proper azimuthal alignment between the cam element 1110 and the support element 1100.

Reference is now made to FIGS. 16A-16E, which are simplified illustrations of base assembly 1020 forming part of MMIDD 1000 of FIGS. 10A-10C. As seen in FIGS. 16A-16E, the base assembly includes a base housing 1400, which is preferably generally cubic in configuration and is supported on a bottom assembly 1410. Mounted on base housing 1400 is an ON/OFF push button element 1420.

Disposed within base housing 1400 are a vertically displacing rotary drive motor assembly 1430 and a printed circuit board 1440, which preferably contains control electronics which manage operation of the MMIDD 1000.

Reference is now made to FIGS. 17A-17E, which are illustrations of base housing 1400, forming part of the base assembly 1020 of FIGS. 16A-16E. As seen in FIGS. 17A-17E, base housing 1400 includes a cubic main portion 1450 and a generally cylindrical top portion 1452 integrally formed therewith and having a central aperture 1454, surrounded by a raised rim 1456.

Generally cylindrical top portion 1452 is preferably formed with a plurality of, typically three, radially outwardly extending protrusions 1458 distributed along an outer periphery of a first generally semicircular wall portion 1460 thereof. Protrusions 1458 are inserted into radially inward-facing bayonet receiving recesses 1066 to provide locking of semi-cylindrical upstanding wall portion 1062 of static housing assembly 1060 to base housing 1400. Generally cylindrical top portion 1452 also includes a second generally semicircular wall portion 1462 which is concentric with first generally semicircular wall portion 1460 but has a smaller outer radius. An aperture 1464 is provided on a front wall 1466 of cubic main portion 1450.

Figure 18A:
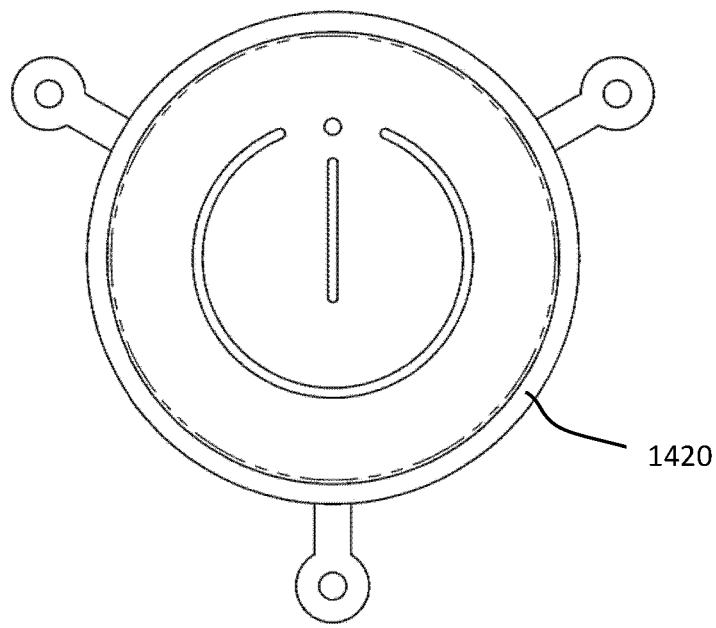
FIGS. 18A, 18B and 18C are simplified respective planar front view, pictorial front view and pictorial rear view illustrations of an ON/OFF push button element forming part of the base assembly of FIGS. 16A-16E.
Figure 18B:
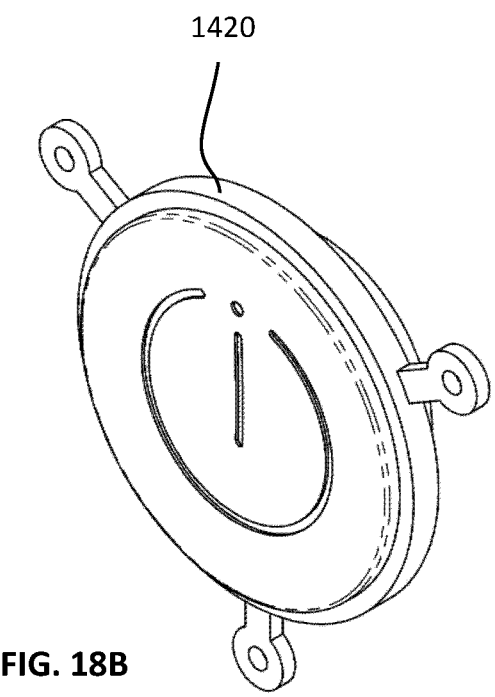
Figure 18C:
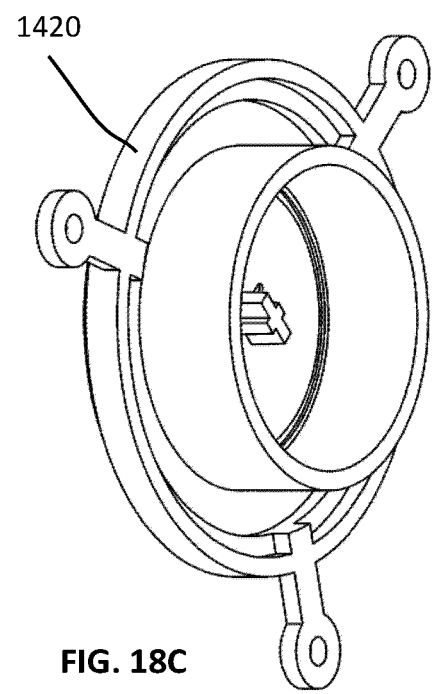

Reference is now made to FIGS. 18A-18C, which are simplified illustrations of ON/OFF push button element 1420, forming part of the base assembly of FIGS. 16A-16E. ON/OFF push button element 1420 is preferably a somewhat flexible plastic element which engages a switch and is preferably mounted on a printed circuit board (not shown) located within base housing 1400. ON/OFF push button element 1420 is preferably mounted in aperture 1464 of cubic main portion 1450.

Reference is now made to FIGS. 19A-19F, which are simplified illustrations of vertically displacing rotary drive motor assembly 1430, forming part of the base assembly 1020 of FIGS. 16A-16E. As seen in FIGS. 19A-19F, the vertically displacing rotary drive motor assembly 1430 preferably comprises a rotary drive gear 1500 which is rotatably mounted on a motor housing and support assembly 1510. Motor housing and support assembly 1510 in turn supports an auxiliary rotary drive motor 1520 and encloses an axially displaceable rotary drive assembly 1530.

Figure 20:
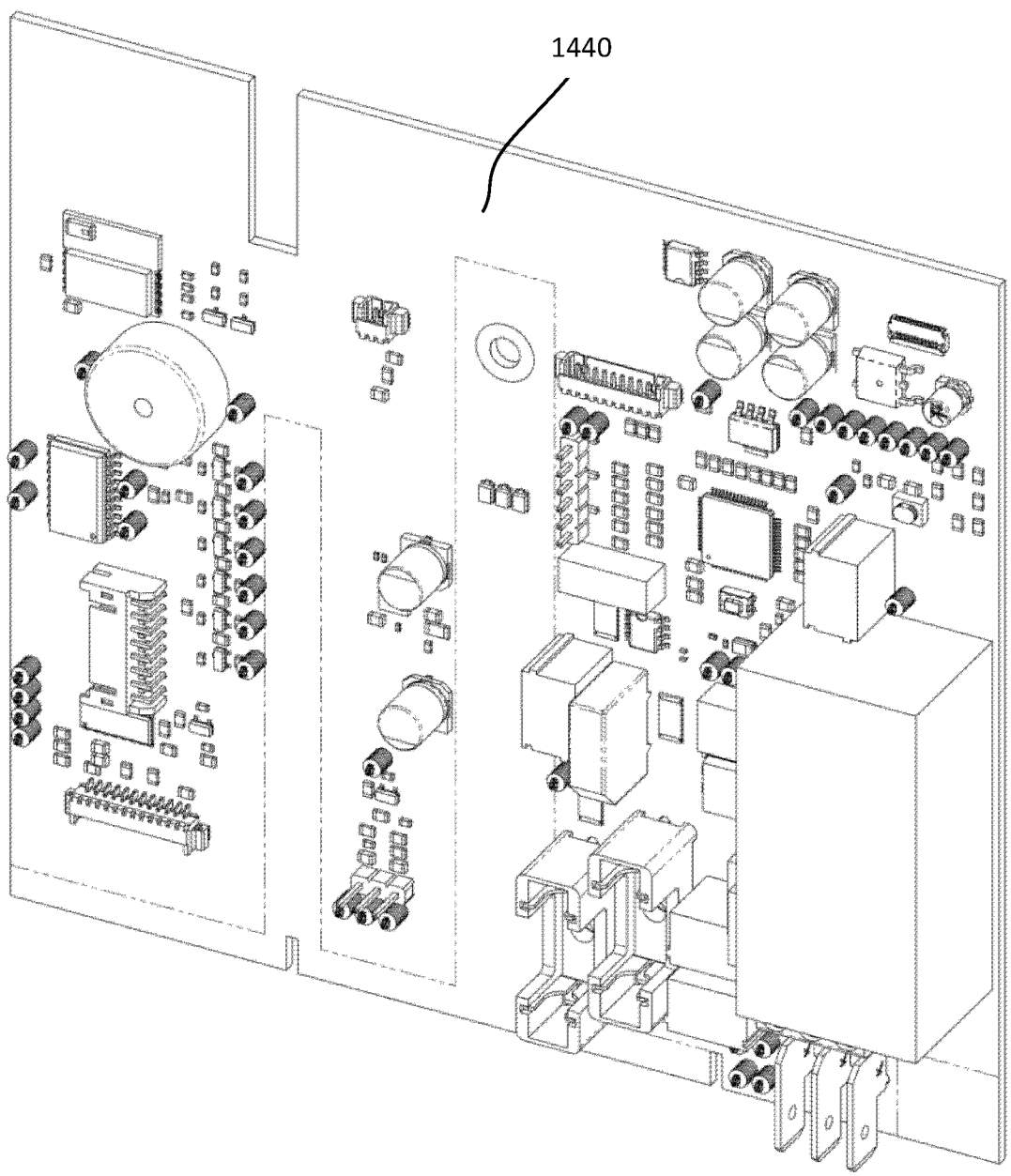
FIG. 20 is a simplified pictorial illustration of a control circuit board forming part of the base assembly of FIGS. 16A-16E.

Reference is now made to FIG. 20, which is a simplified pictorial illustration of printed circuit board 1440, forming part of the base assembly of FIGS. 16A-16E. It is appreciated that there may be additionally provided multiple various printed circuit boards (not shown) within base housing 1400.

Figure 21A:
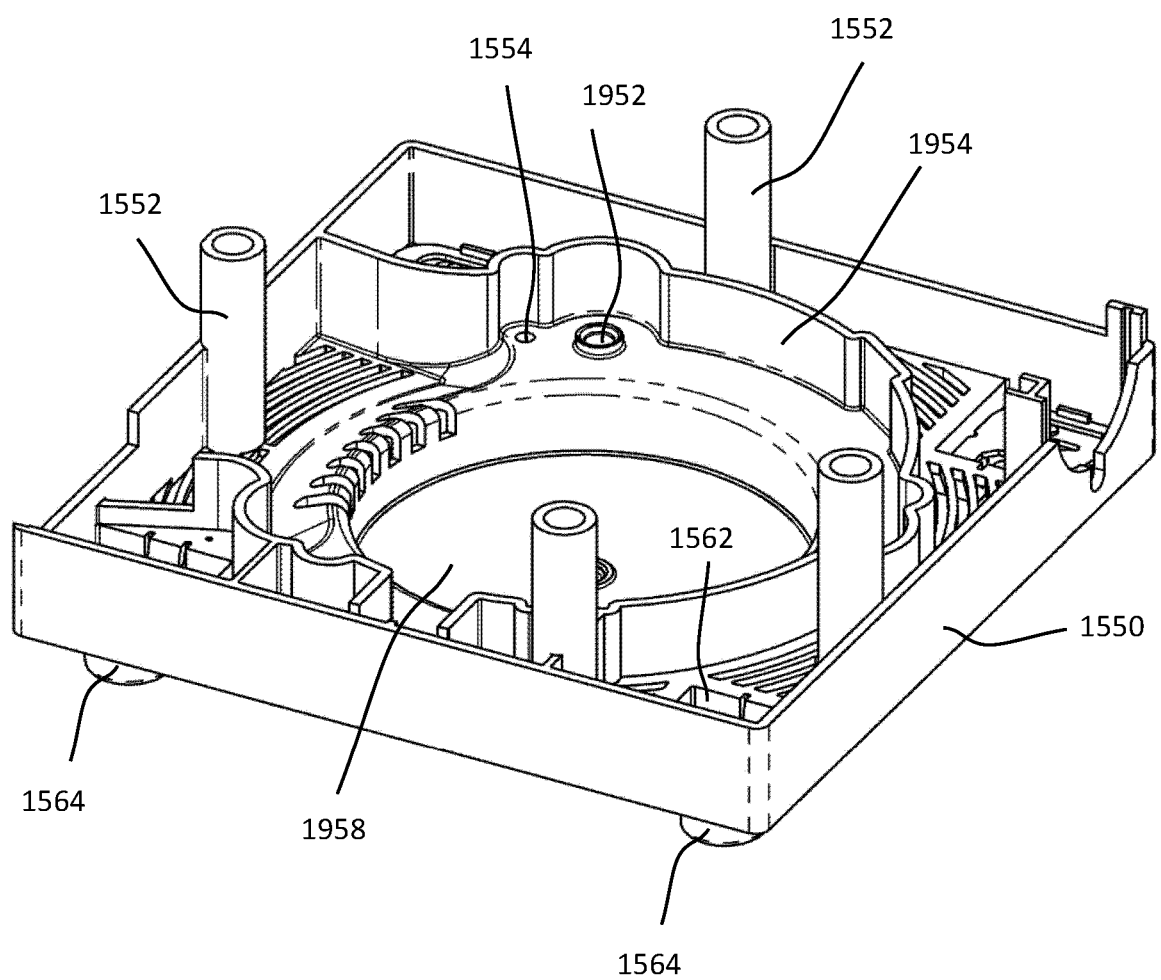
FIGS. 21A and 21B are simplified pictorial respective assembled and exploded view illustrations of a bottom assembly forming part of the base assembly of FIGS. 16A-16E.
Figure 21B:
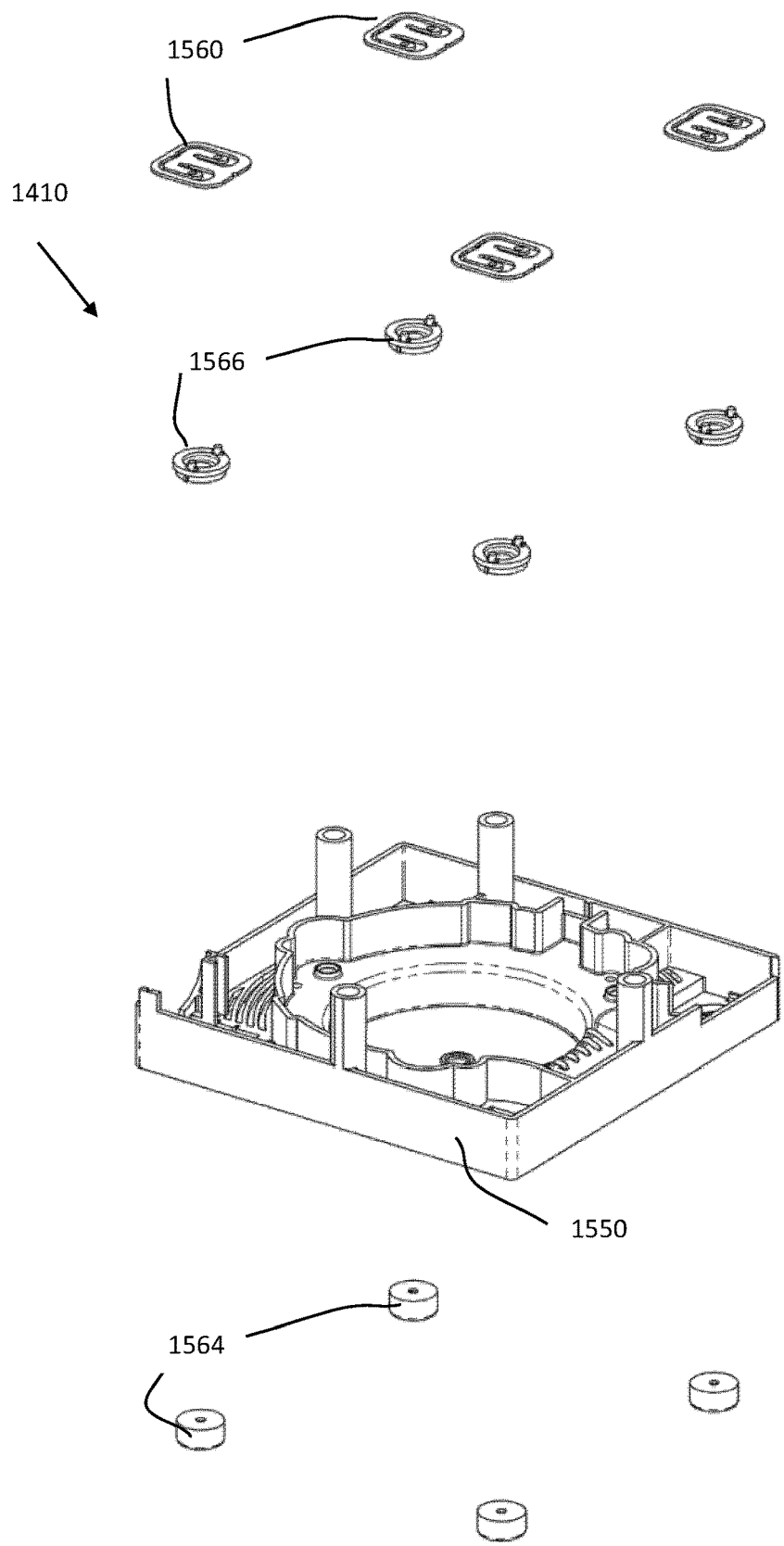
Figure 22A:
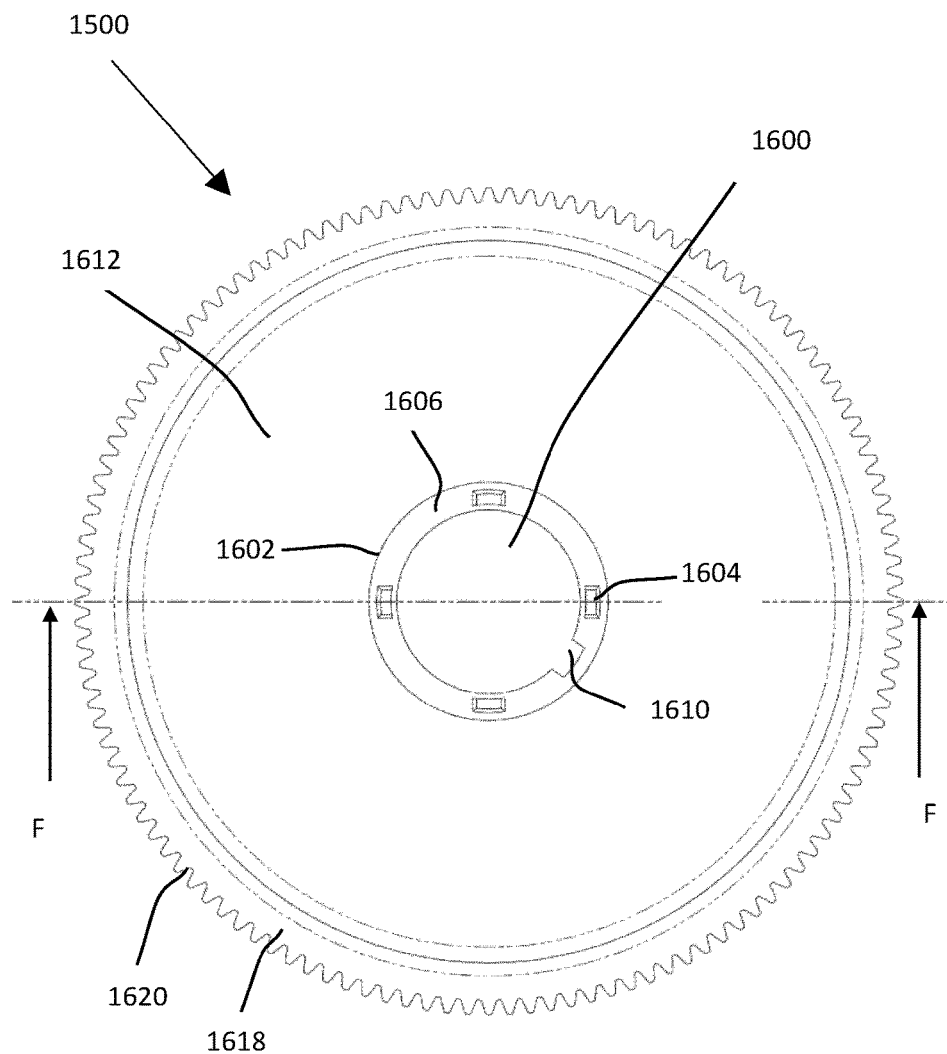
FIGS. 22A, 22B, 22C, 22D, 22E, 22F and 22G simplified respective planar top, planar side, planar bottom, pictorial top, pictorial bottom, first planar sectional and second planar sectional view illustrations of a rotary drive gear forming part of the vertically displacing rotary drive motor assembly of FIGS. 19A-19F, FIGS. 22F and 22G being taken along lines F-F in FIG. 22A and G-G in FIG. 22B respectively.
Figure 22B:
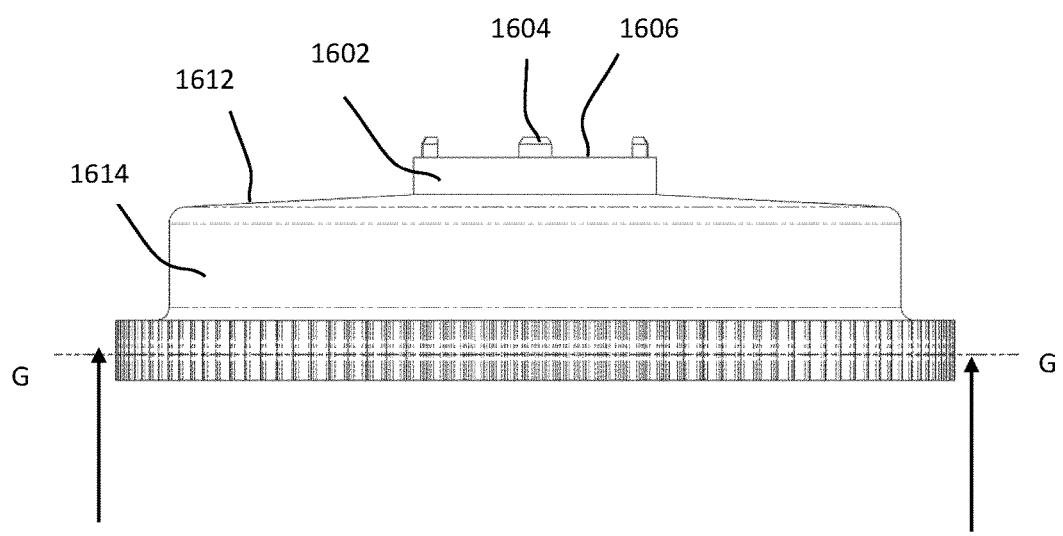
Figure 22C:
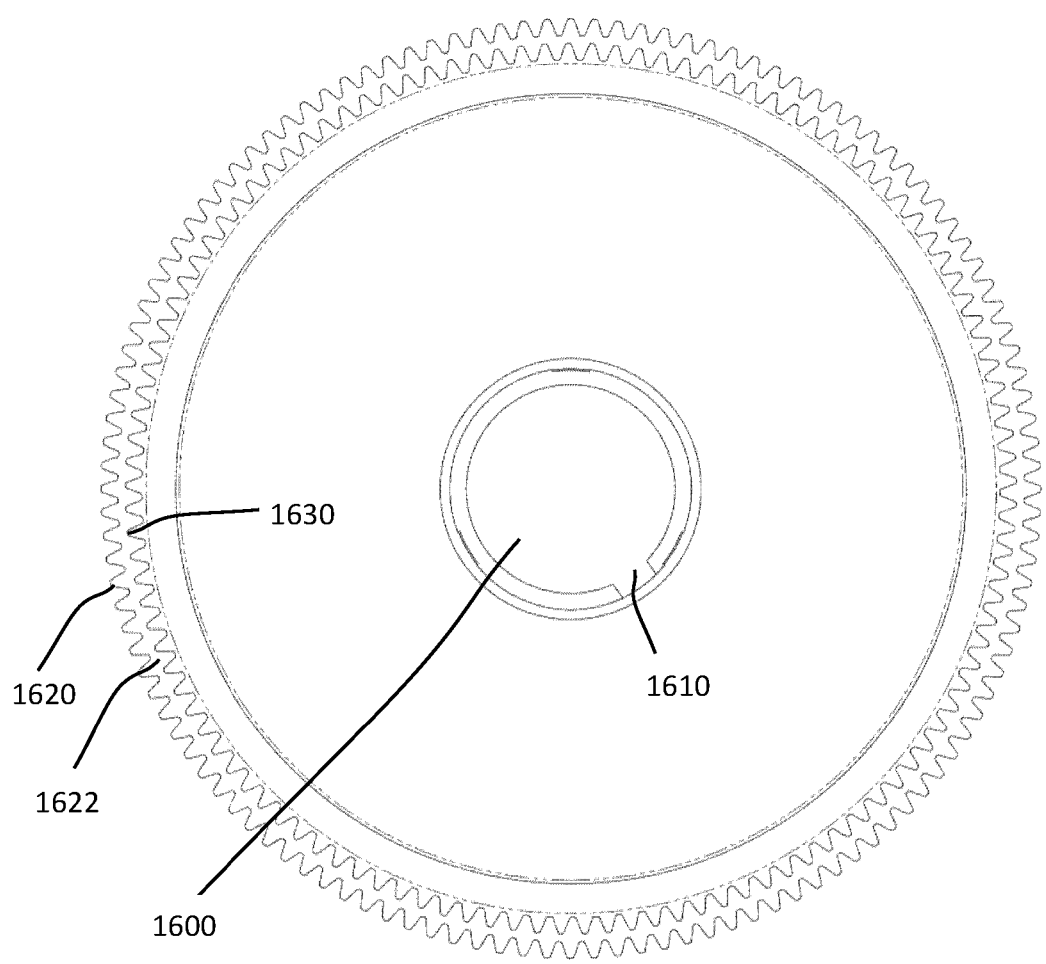
Figure 22D:
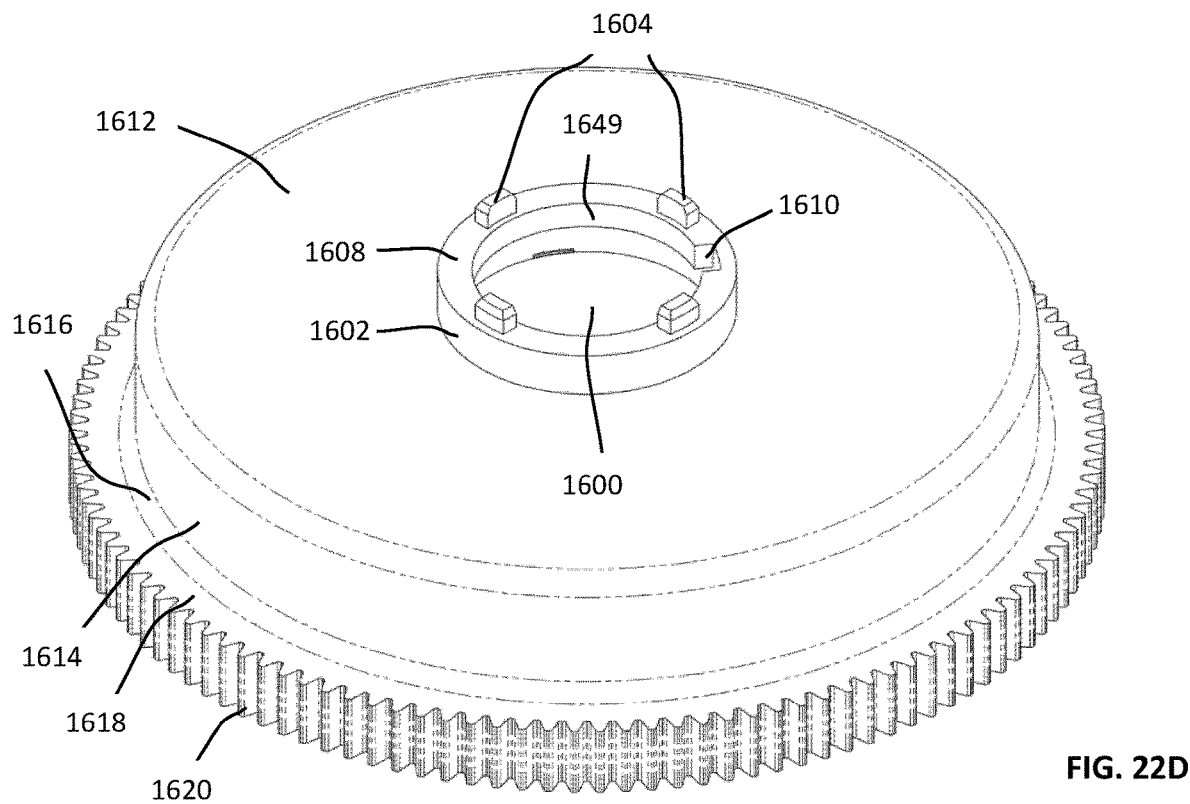
Figure 22E:
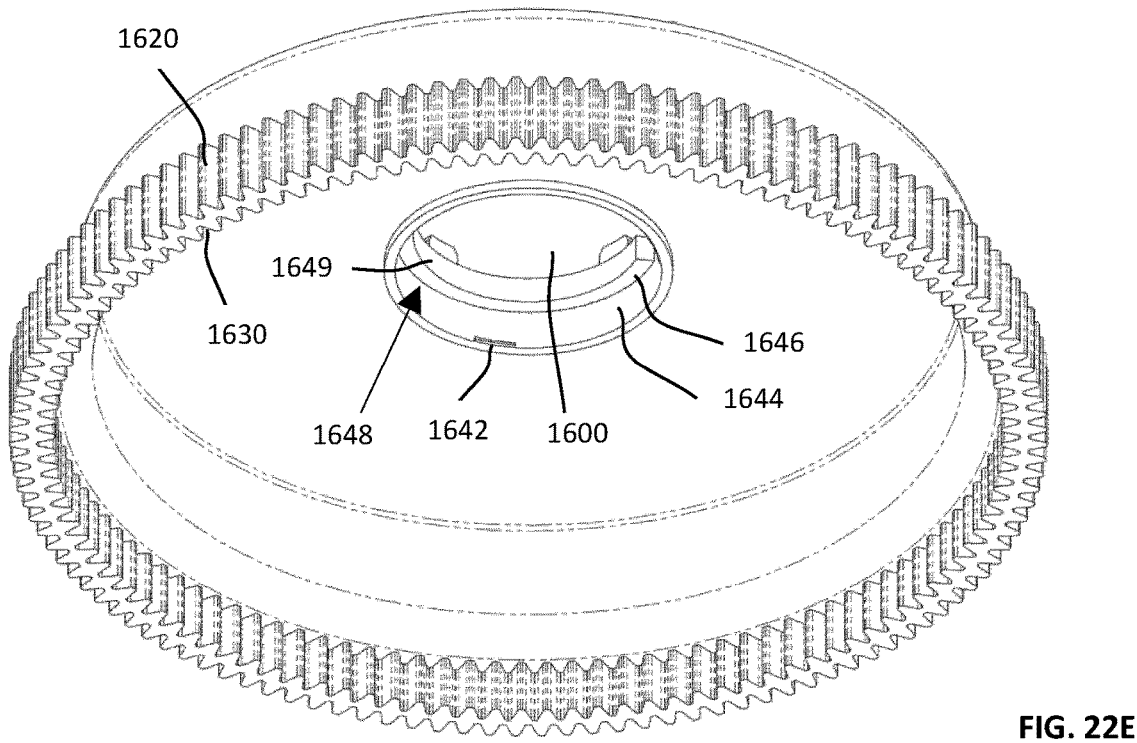
Figure 22F:
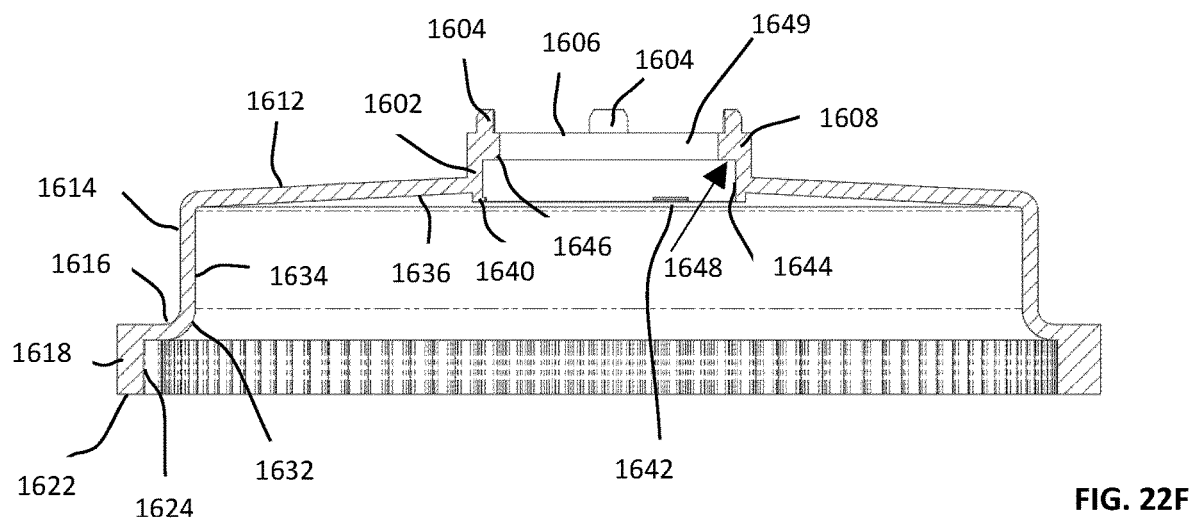
Figure 22G:
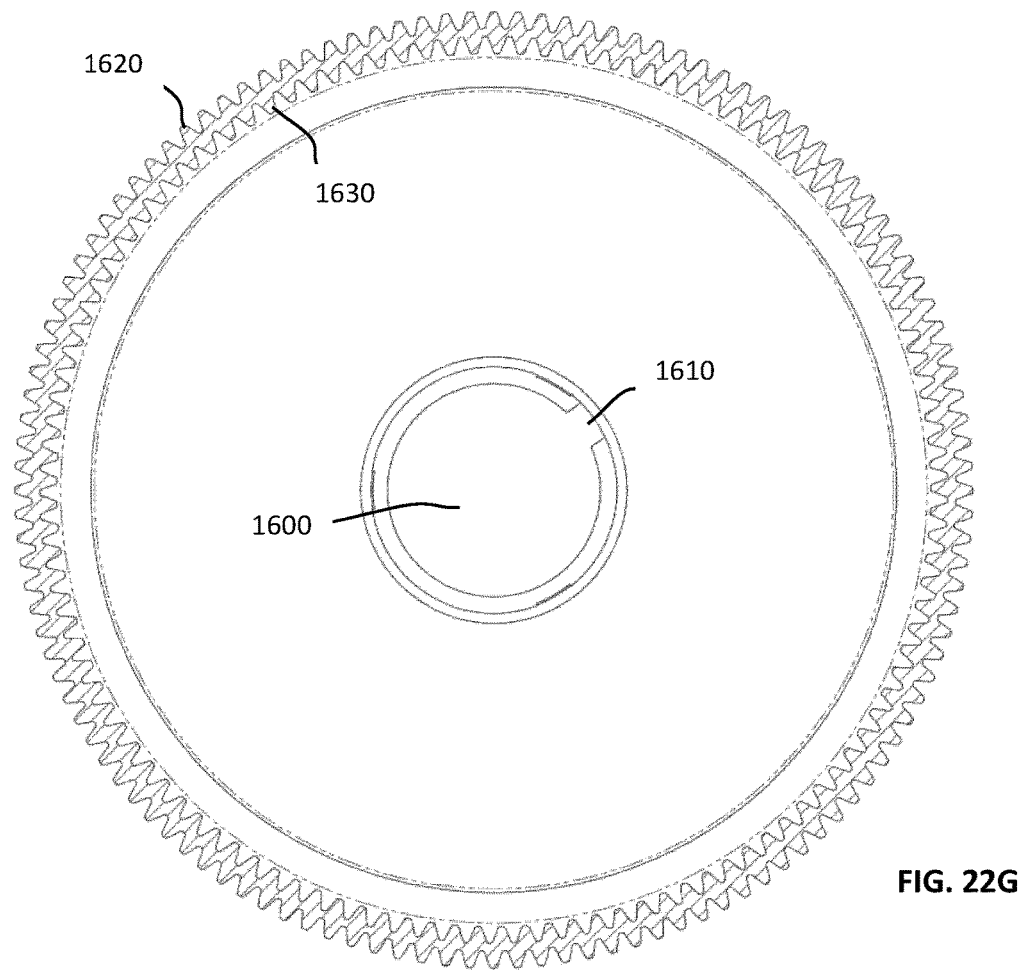
Figure 23A:
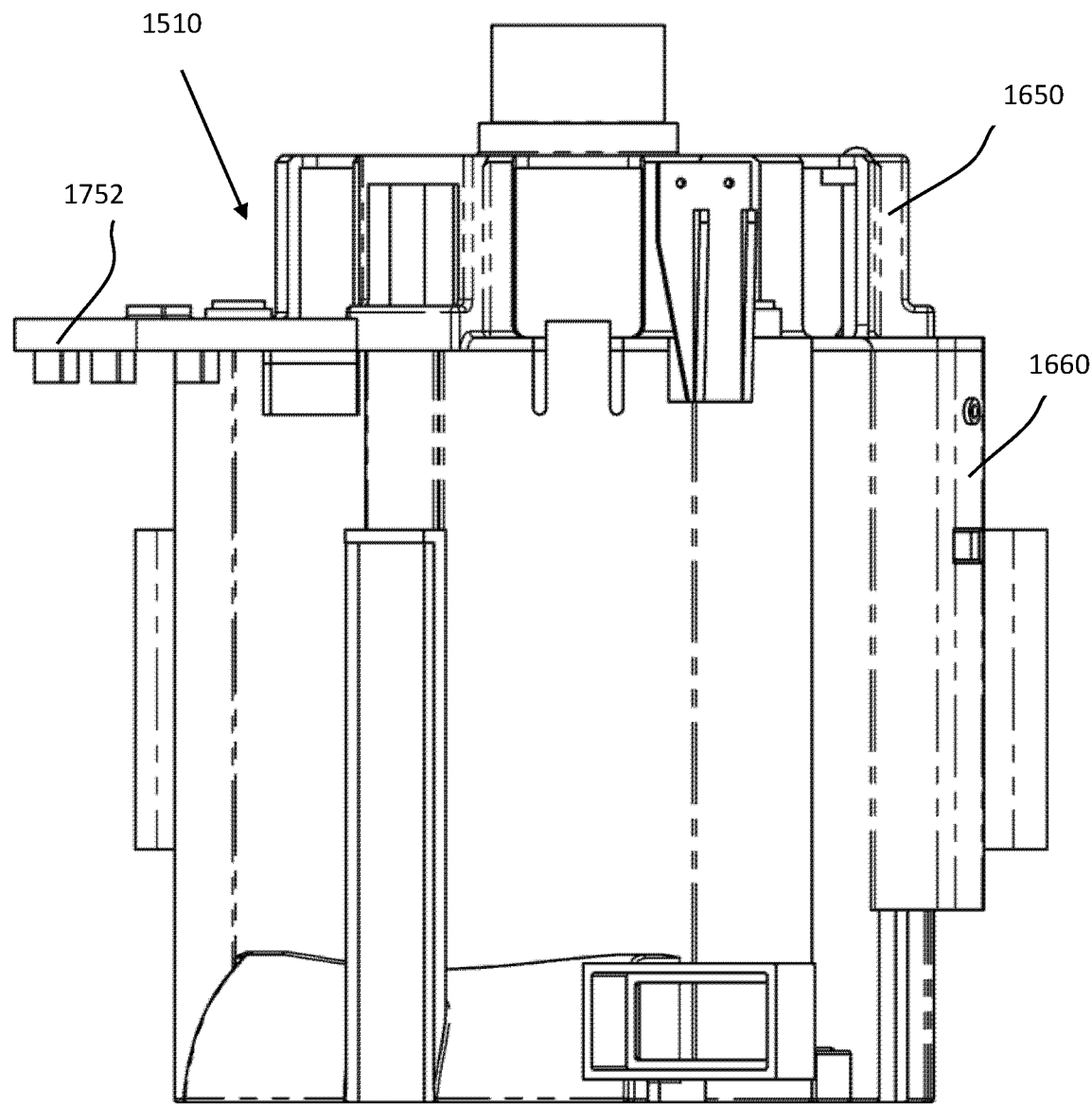
FIGS. 23A, 23B, 23C and 23D are simplified respective planar side, planar top, planar bottom and exploded view illustrations of a motor housing and support assembly, forming part of the vertically displacing rotary drive motor assembly of FIGS. 19A-19F.
Figure 23B:
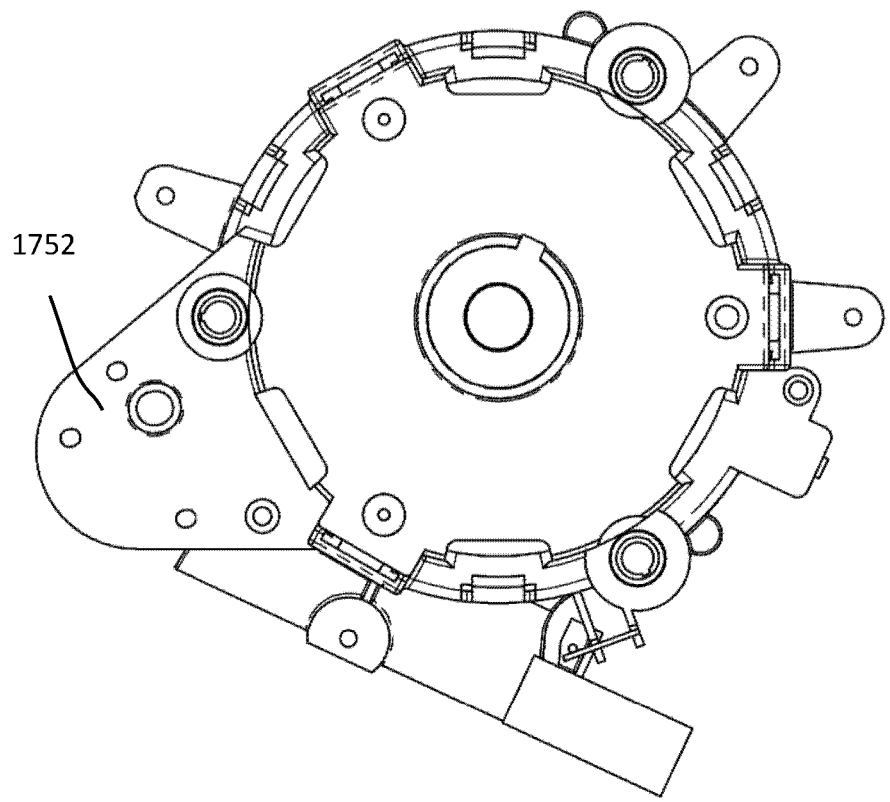
Figure 23C:
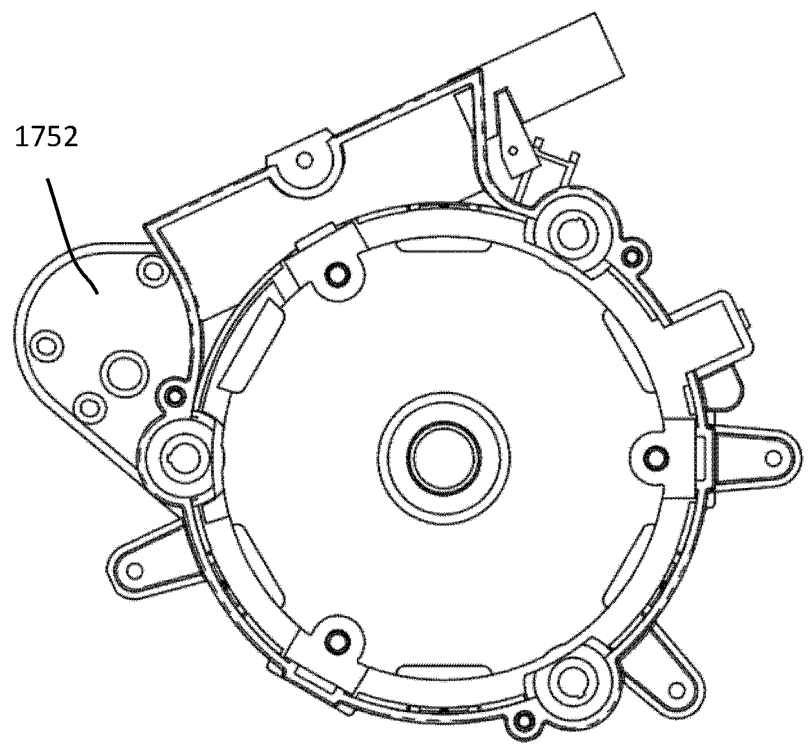
Figure 23D:
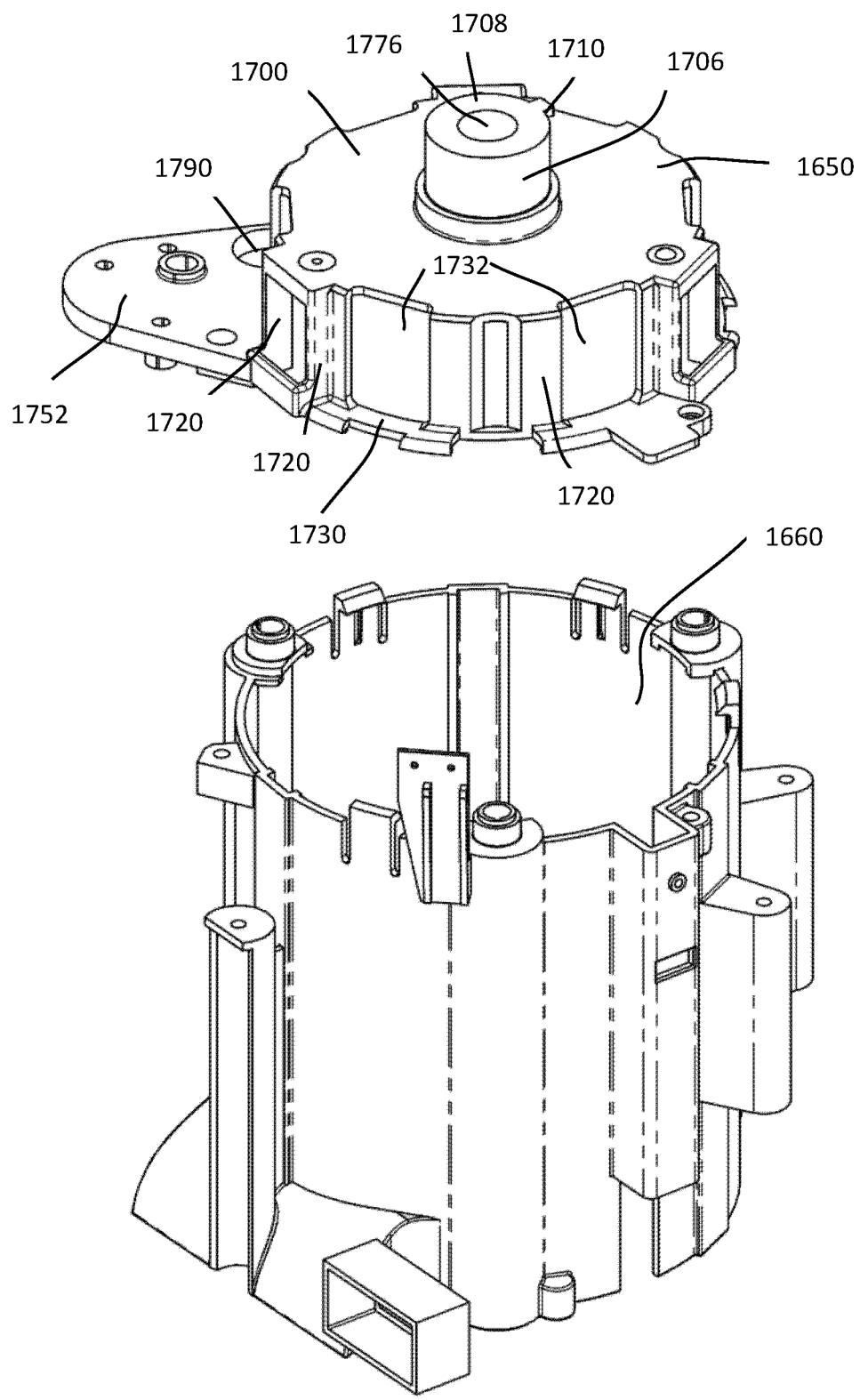

Reference is now made to FIGS. 21A and 21B, which are simplified pictorial respective assembled and exploded view illustrations of bottom assembly 1410, forming part of the base assembly 1020 of FIGS. 16A-16E. As seen in FIGS. 21A and 21B, bottom assembly 1410 preferably includes a generally square bottom element 1550 which defines a plurality of upstanding mounting screw guiding bosses 1552, which enable insertion of screws (not shown) which are employed for static mounting of base housing 1400 onto motor housing and support assembly 1510. Bottom element 1550 also defines screw mounting apertures 1554, which accommodate screws (not shown), which are employed for static mounting of motor housing and support assembly 1510 onto bottom element 1550.

A plurality of, preferably four, load cells 1560 are preferably located in corner recesses 1562 in bottom element 1550 and are secured by screws (not shown) to corresponding support pads 1564 underlying bottom element 1550 via load cell supports 1566, which overlie bottom element 1550. Support pads 1564 extend through corresponding apertures 1568 (FIG. 27B), which extend through bottom element 1550 at corner recesses 1562. Load cells 1560 are preferably model GML624, commercially available from Xi'an Gavin Electronic Technology Co., Ltd Xi'an, Shaanxi, China.

Reference is now made to FIGS. 22A-22G, which are simplified illustrations of rotary drive gear 1500 forming part of vertically displacing rotary drive motor assembly 1430 of FIGS. 19A-19F. As seen in FIGS. 22A-22G, rotary drive gear 1500 preferably is a generally circularly symmetric cap having a central aperture 1600 surrounded by an upstanding circumferential wall 1602 having a plurality of upwardly extending protrusions 1604 at an upper edge 1606 thereof. Protrusions 1604 are configured to seat in notches 1318 of cam element 1110. A circumferentially inwardly directed annular wall 1608 extends inwardly of circumferential wall 1602 at upper edge 1606 thereof and is formed with a notch 1610.

At its base, circumferential wall 1602 is surrounded by a nearly planar but slightly conical top surface 1612, which terminates in a depending circumferential wall 1614. Circumferential wall 1614 terminates in an annular circumferential surface 1616, which terminates in a further depending circumferential wall 1618 having formed on an outer circumferential surface thereof a radially outwardly directed circumferentially extending gear train 1620.

Wall 1618 has a bottom edge 1622 and an inner circumferential surface 1624. A radially inwardly directed circumferentially extending gear train 1630 is formed on inner circumferential surface 1624. Preferably gear trains 1620 and 1630 have an identical pitch and are slightly out of phase. Bottom edge 1622 exhibits edges of both gear trains 1620 and 1630.

Interiorly and upwardly of inner circumferential surface 1624 there is provided a curved circumferential surface 1632, which underlies annular circumferential surface 1616 and extends to an inner circumferential surface 1634 which lies inwardly of circumferential wall 1614. An inner nearly planar but slightly conical surface 1636 underlies nearly planar but slightly conical top surface 1612.

Surrounding aperture 1600 at the interior of rotary drive gear 1500 is a downwardly extending annular protrusion 1640 having a plurality of slightly radially inwardly protrusions 1642 formed thereon. Extending upwardly from annular protrusion 1640 is an inner circumferential surface 1644, which terminates in an annular surface 1646 and defines therewith a shoulder 1648. An upper inner circumferential surface 1649 extends upwardly from annular surface 1646.

Reference is now made to FIGS. 23A-23D, which are simplified illustrations of motor housing and support assembly 1510, forming part of the vertically displacing rotary drive motor assembly 1430 of FIGS. 19A-19F. As seen in FIGS. 23A-23D, the motor housing and support assembly 1510 includes a top element 1650, which is described hereinbelow in detail with reference to FIGS. 24A-24F and a bottom element 1660, which is described hereinbelow in detail with reference to FIGS. 25A-25E.

Reference is now made to FIGS. 24A-24F, which are simplified illustrations of top element 1650 forming part of the motor housing and support assembly 1510 of FIGS. 23A-23D.

As seen in FIGS. 24A-24F, top element 1650 preferably includes a planar wall portion 1700 from which extends upwardly a central upstanding circumferential wall surface 1702, which terminates at an annular generally planar wall surface 1704, which rotatably supports annular surface 1646 of rotary drive gear 1500.

Annular generally planar wall surface 1704 terminates radially inwardly in an upstanding circumferential wall surface 1706 having a top planar annular edge surface 1708, which is formed with a radially outwardly extending protrusion 1710, which corresponds to notch 1610 of rotary drive gear 1500 and which corresponds to notch 1308 of cam element 1110.

Peripherally of planar wall portion 1700 are a plurality of mutually spaced depending wall portions 1720, all of which terminate in a generally planar, generally annular wall 1730, which lies parallel to planar wall portion 1700. Wall portions 1720, together with wall portion 1700 and wall 1730, define an array of ventilation apertures 1732. An extension 1752 of wall 1730 supports auxiliary rotary drive motor 1520.

Figure 24A:
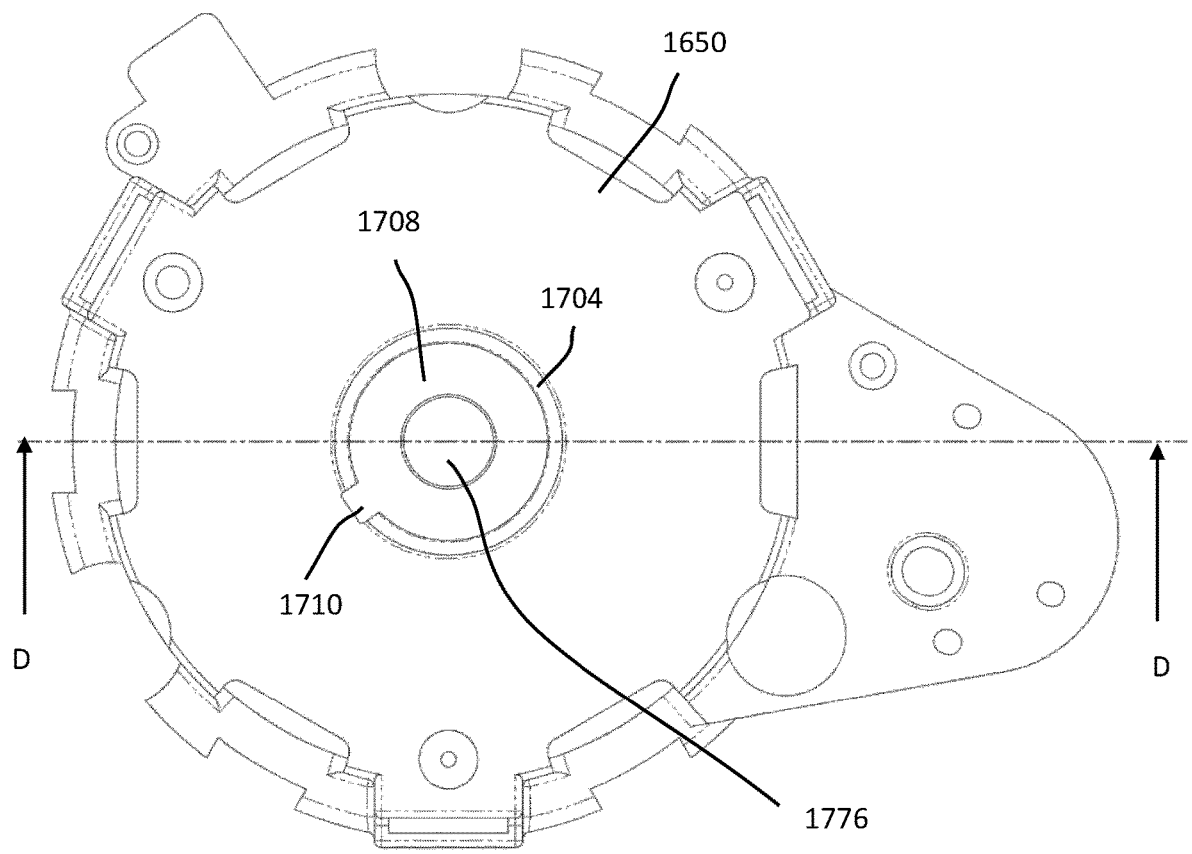
Figure 24B:
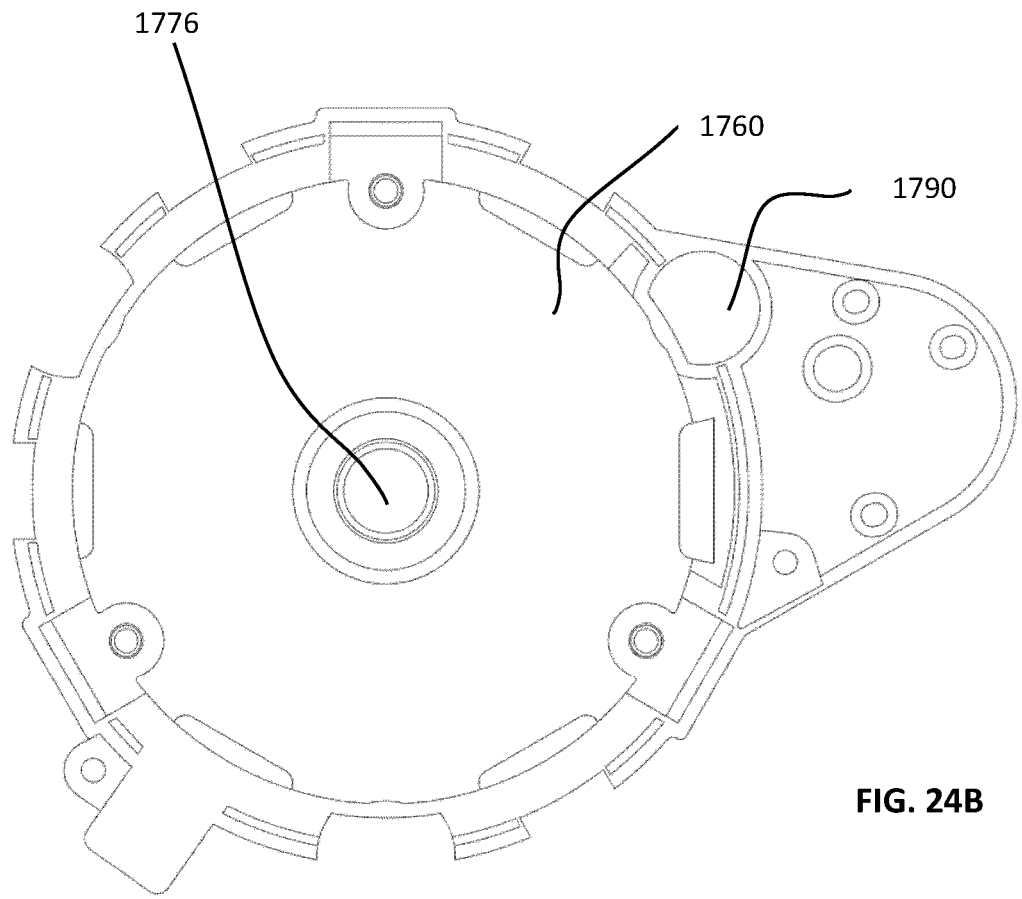
Figure 24C:
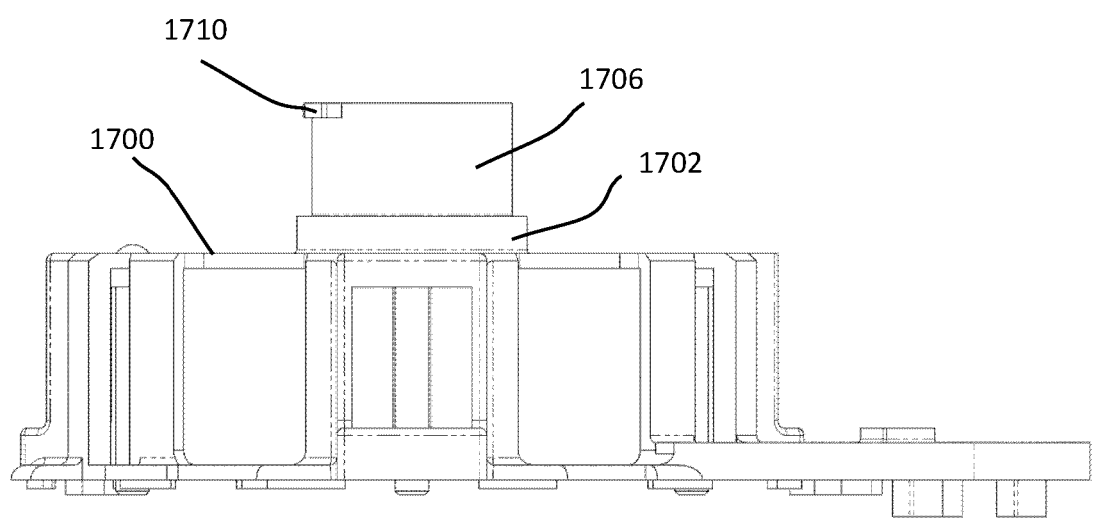
Figure 24D:
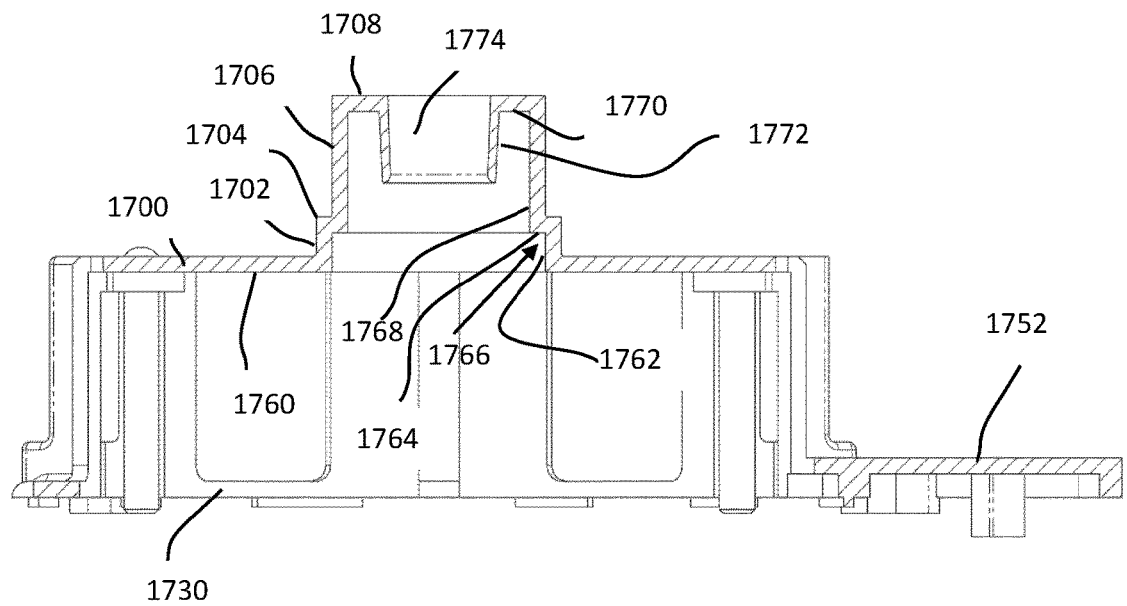
Figure 24E:
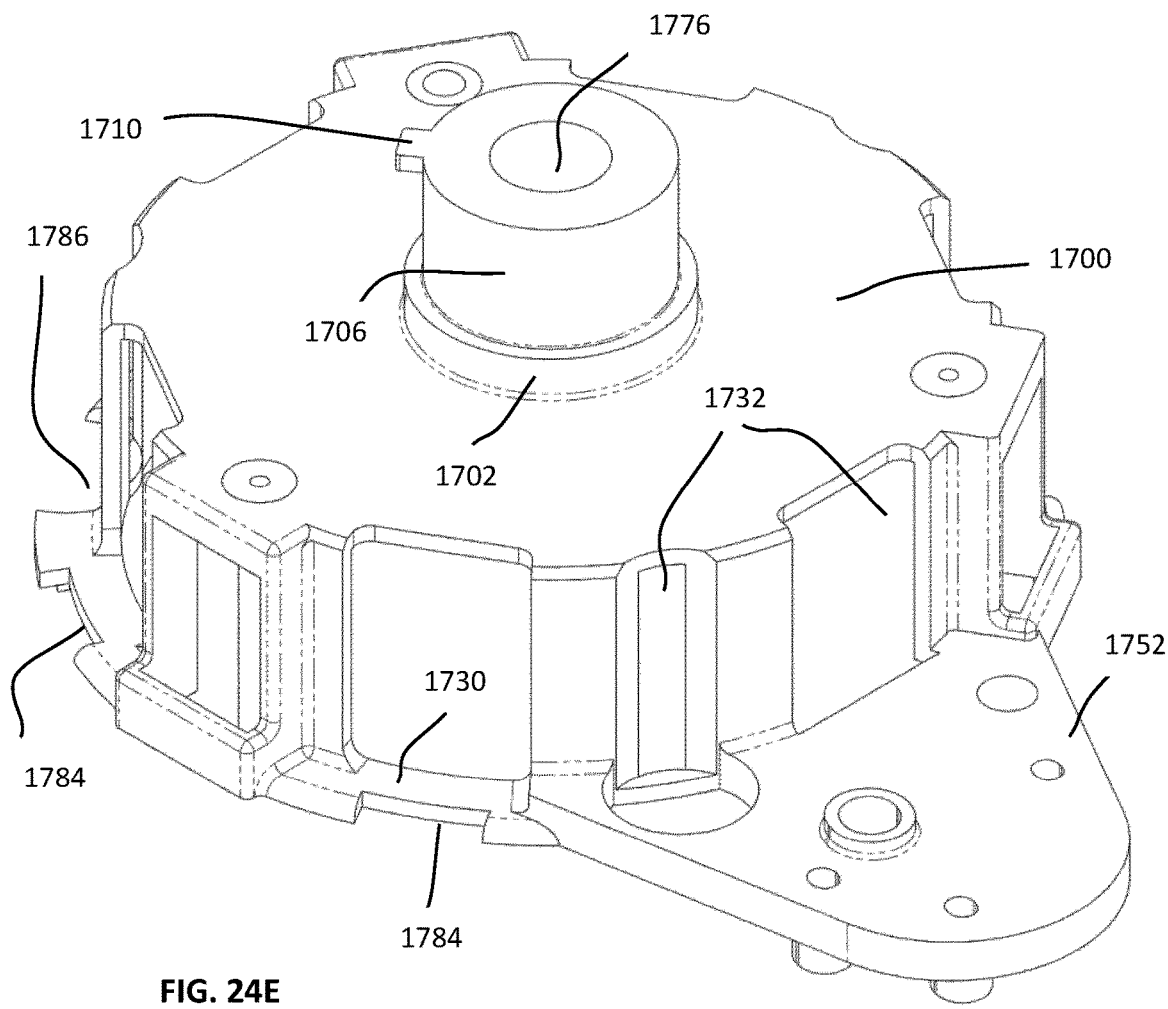
Figure 25A:
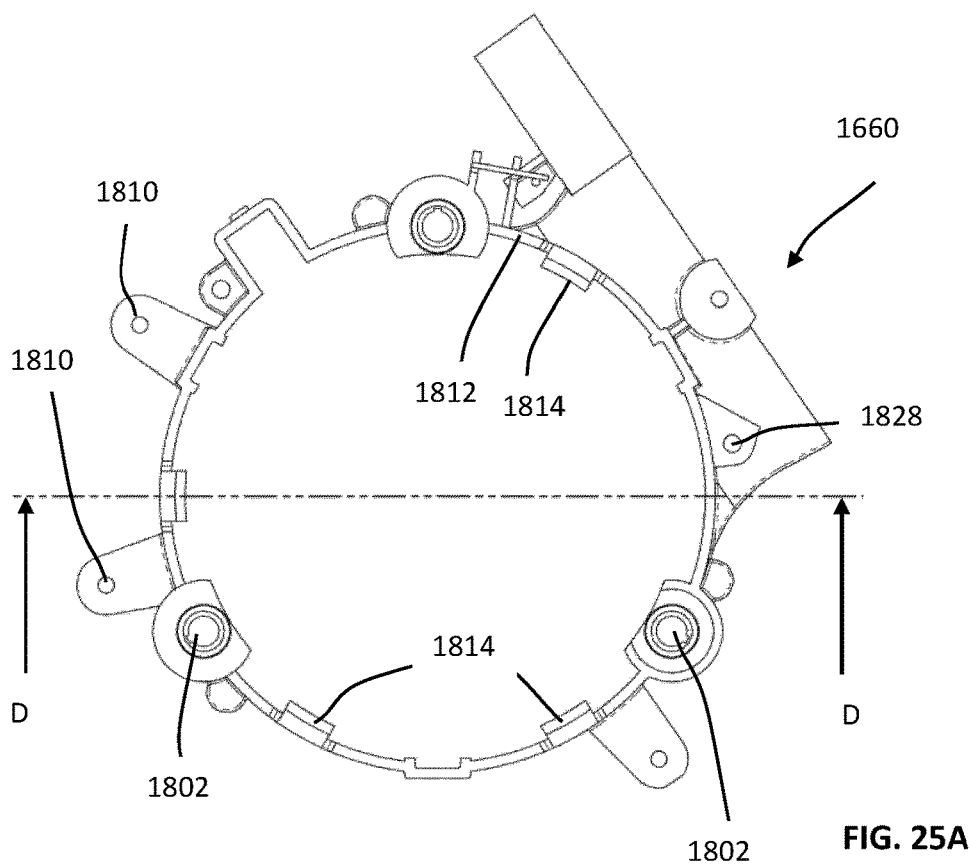
FIGS. 25A, 25B, 25C, 25D and 25E are simplified respective planar top, planar bottom, planar side, sectional and pictorial view illustrations of a bottom element forming part of the motor housing and support assembly of FIGS. 23A-23D, FIG. 25D being taken along lines D-D in FIG. 25A.
Figure 25B:
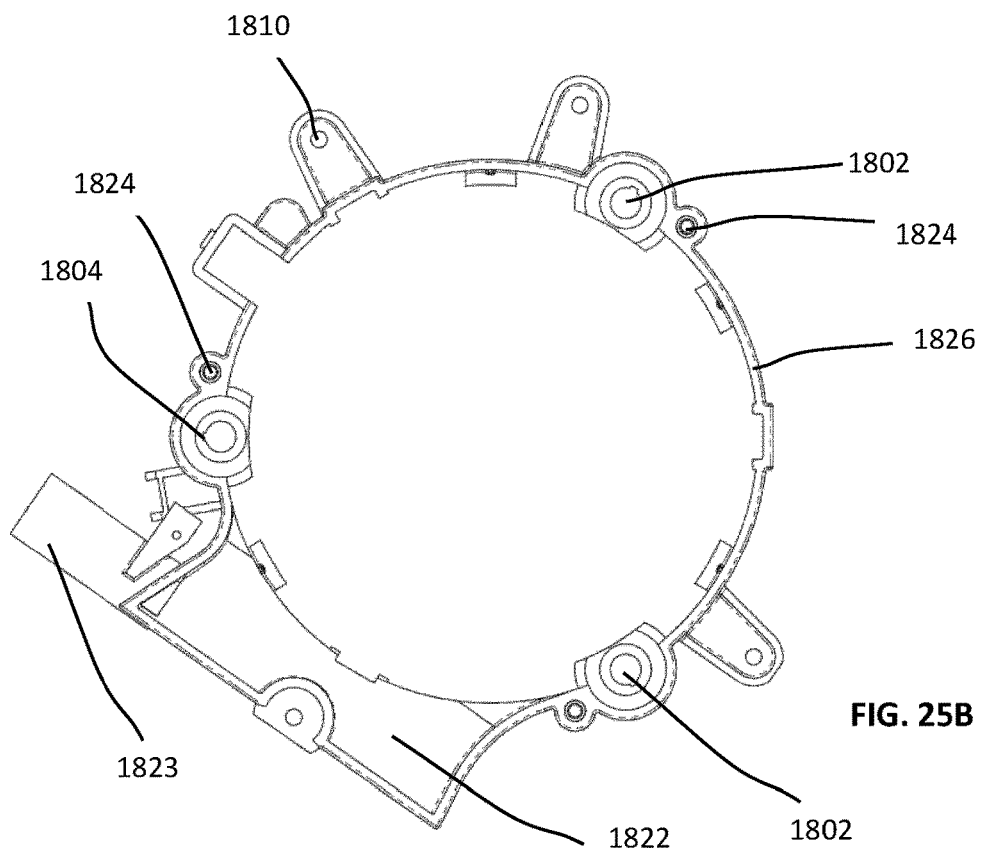
Figure 25C:
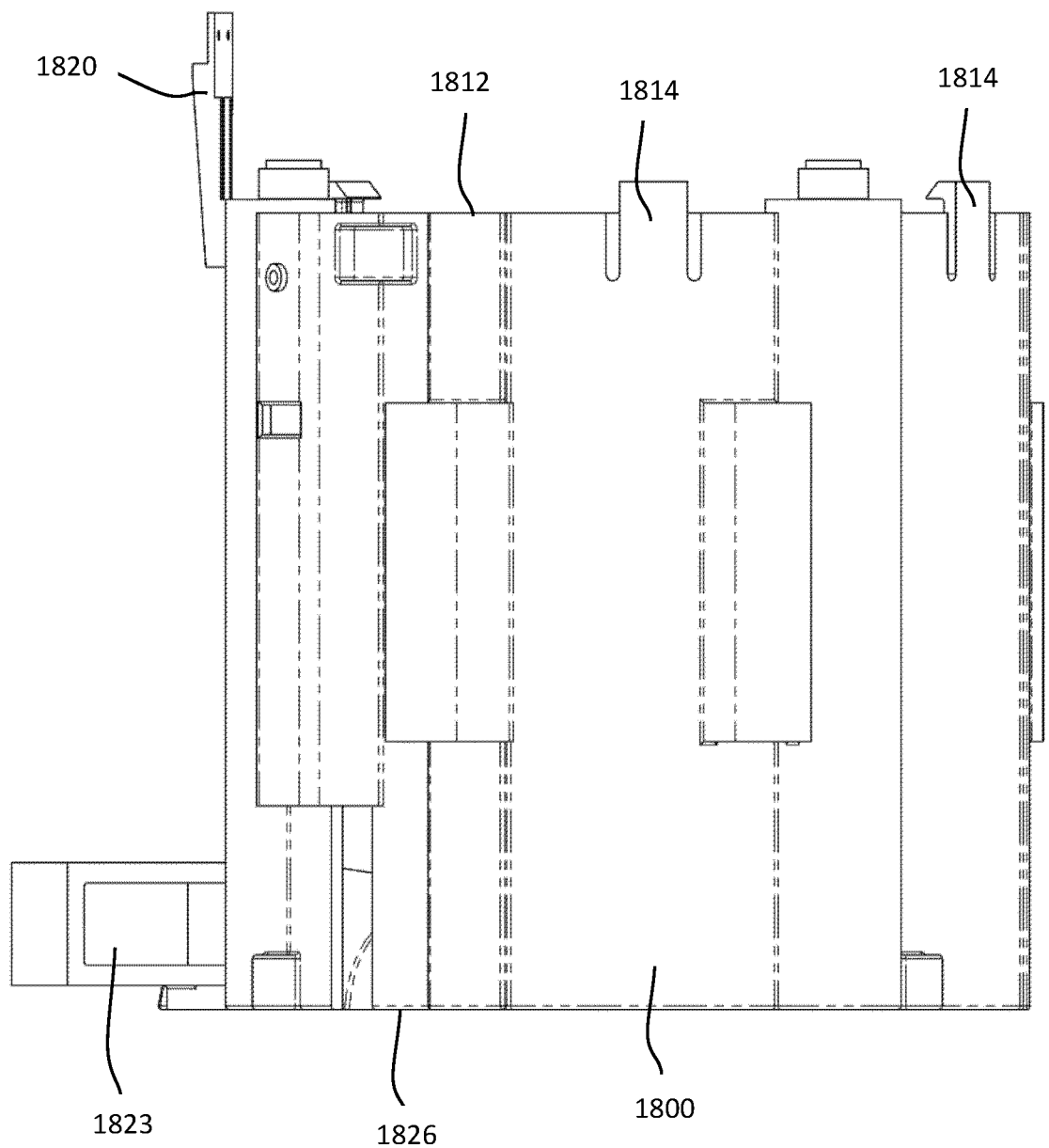
Figure 25D:
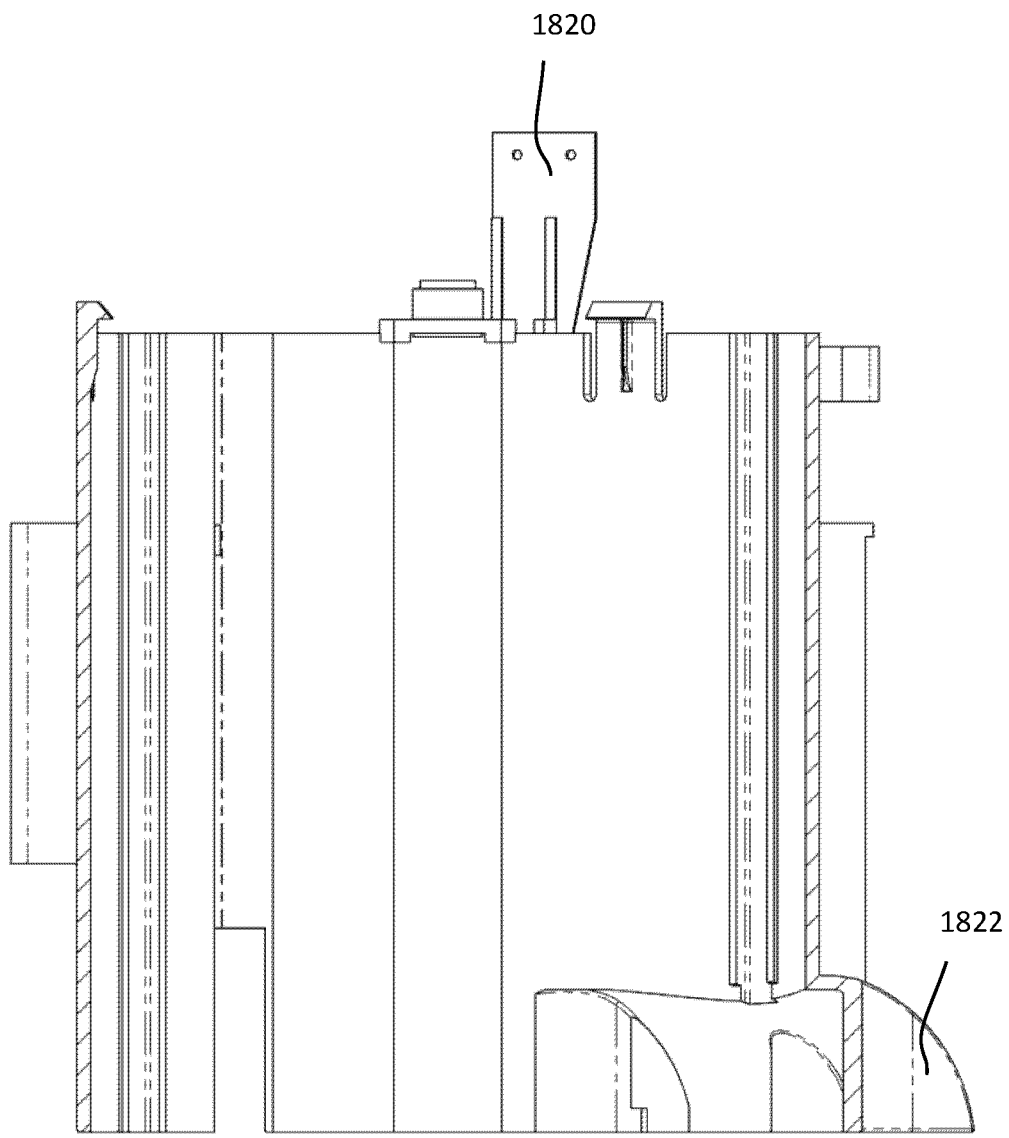
Figure 25E:
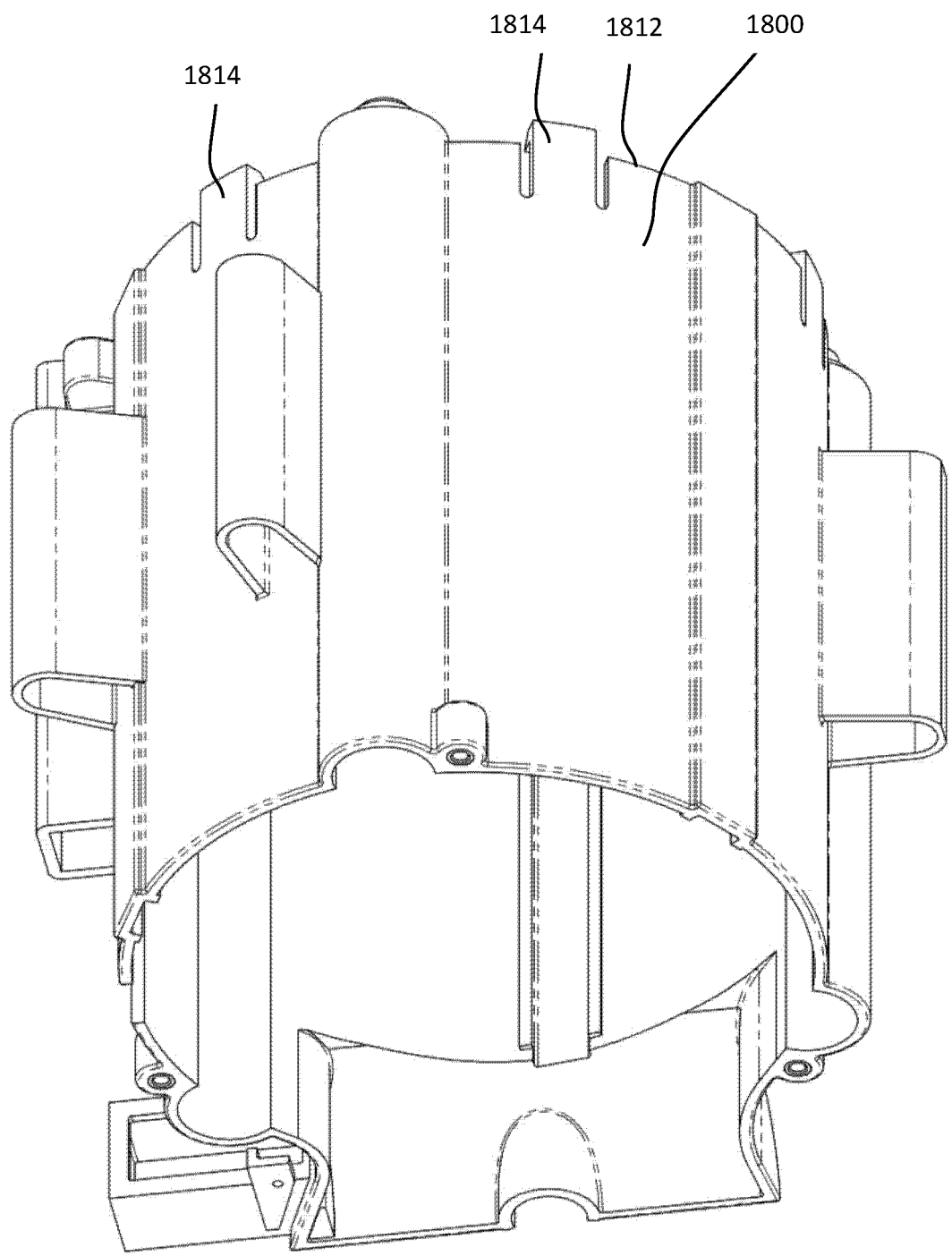
Figure 26A:
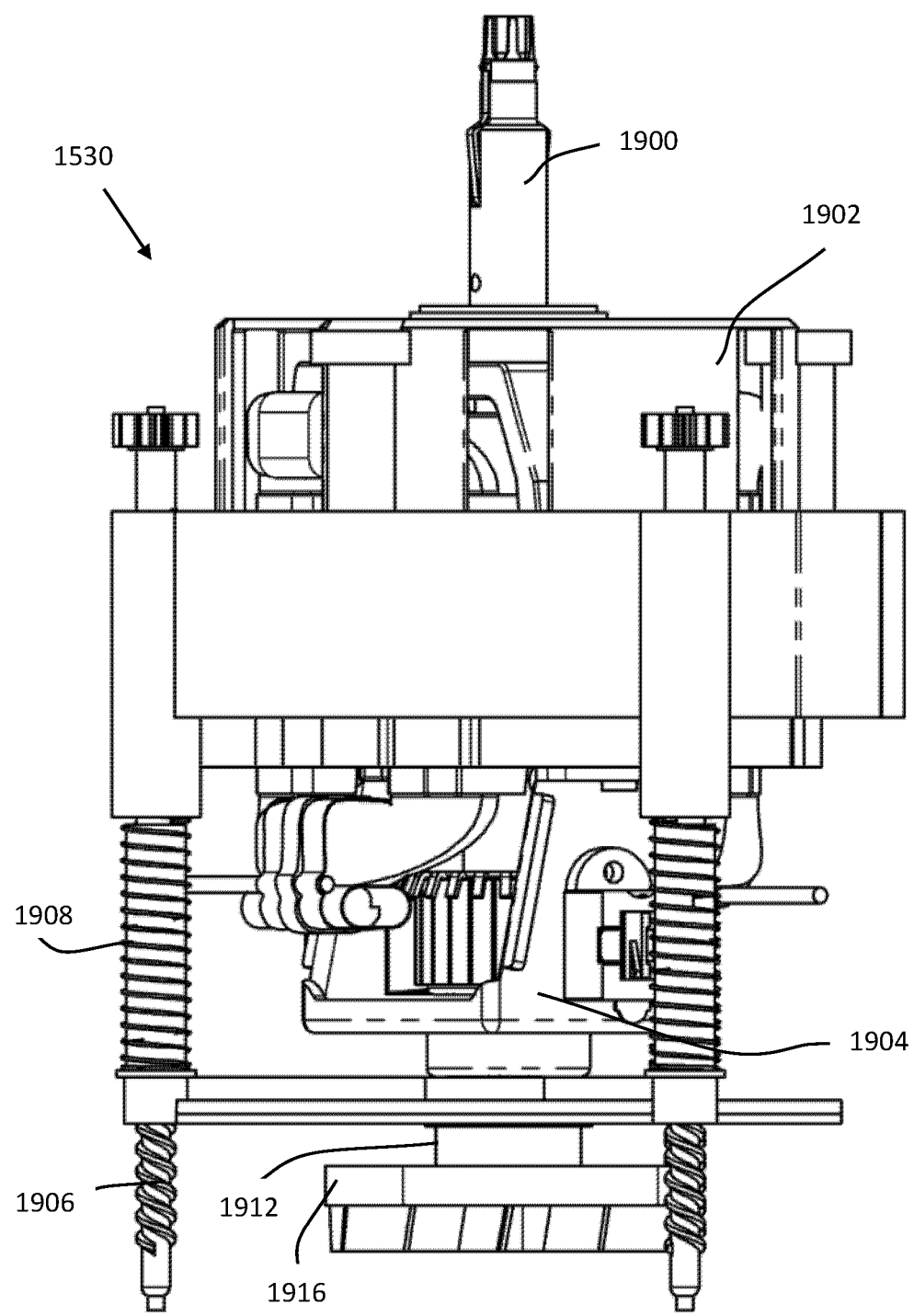
FIGS. 26A, 26B, 26C, 26D and 26E are simplified respective planar side, planar top, planar bottom, pictorial and exploded view illustrations of an axially displaceable rotary drive assembly forming part of the vertically displacing rotary drive motor assembly of FIGS. 19A-19F.
Figure 26B:
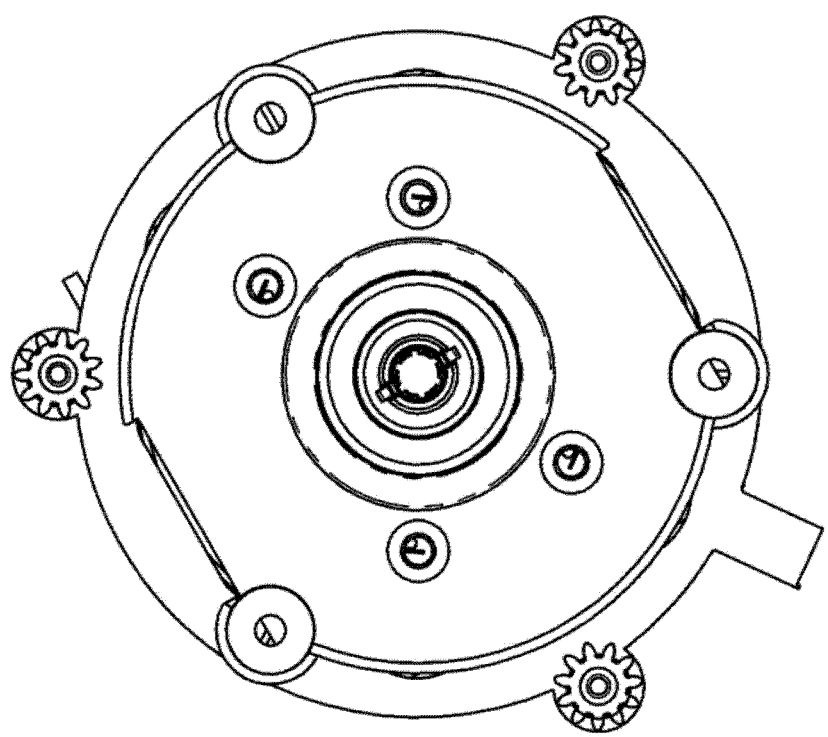
Figure 26C:
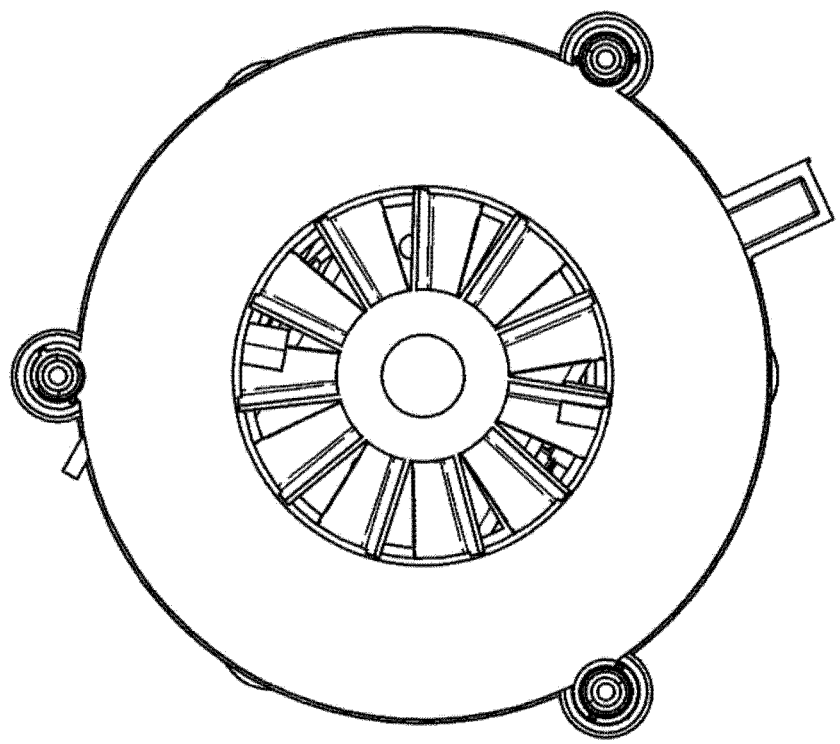
Figure 26D:
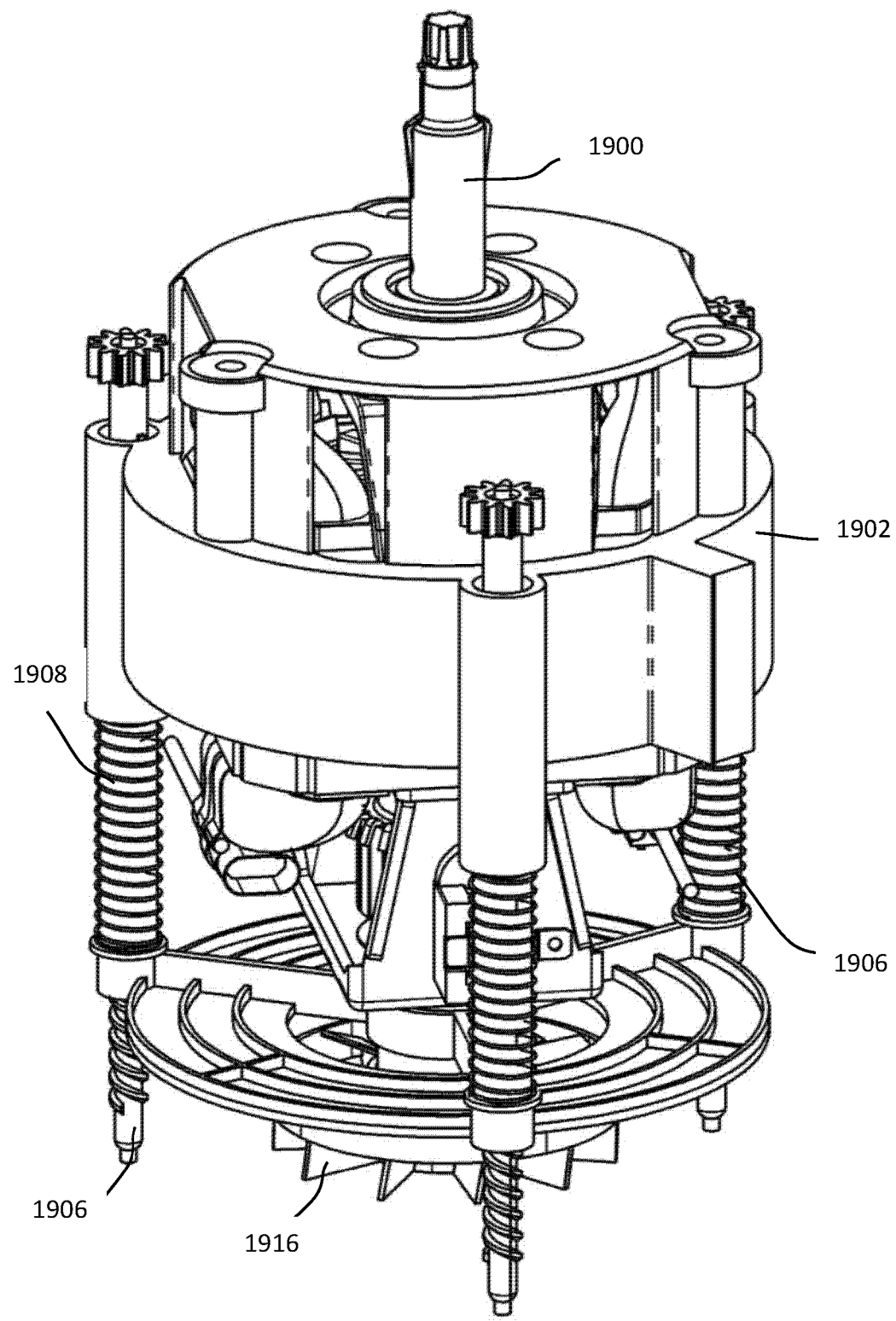
Figure 26E:
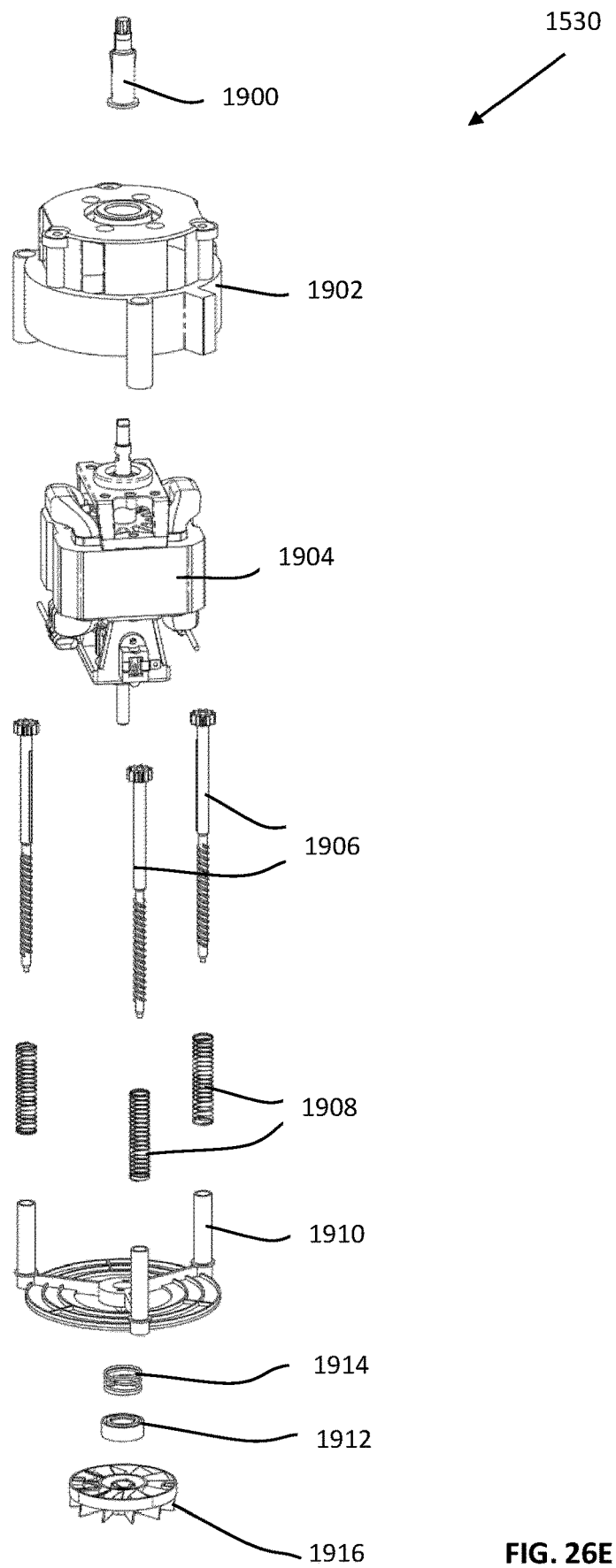

As seen particularly in FIG. 24D, at an underside surface 1760 of planar wall portion 1700 there is defined a central interior circumferential surface 1762, which terminates at an annular wall surface 1764 and defines therewith a shoulder 1766. Annular wall surface 1764 terminates radially inwardly at an inner interior circumferential wall surface 1768, which, in turn, terminates at an underside annular surface 1770, which underlies top planar annular edge surface 1708. A depending circumferential wall 1772 extends downwardly from underside annular surface 1770 and defines a radially inwardly directed cylindrical surface 1774 which extends to top planar annular edge surface 1708 and defines therewith an aperture 1776.

A plurality of guiding pins 1780, preferably three in number, extend downwardly from underside surface 1760 for guiding axially displaceable rotary drive assembly 1530 in its vertical displacement relative to motor housing and support assembly 1510. A plurality of mutually circumferentially arranged downwardly extending protrusions 1782 are formed on wall 1730. A plurality of, preferably four, snap-engagement cut outs 1784 are formed at edges of wall 1730. A pair of recesses 1786 and 1788 and an aperture 1790 are provided in wall 1730 and its extension 1752 for accommodating linear displacement spindles (not shown).

Reference is now made to FIGS. 25A-25E, which are simplified illustrations of bottom element 1660 forming part of the motor housing and support assembly 1510 of FIGS. 23A-23D.

As seen in FIGS. 25A-25E, the bottom element 1660 is a generally cylindrical element having a cylindrical wall 1800 which generally, but not entirely, has a uniform cross section. Cylindrical wall 1800 preferably defines a plurality of, preferably three, spindle accommodating channels 1802, each of which is formed with a spindle locking socket 1804 for rotatably locking a spindle against vertical displacement relative to the bottom element 1660.

Cylindrical wall 1800 also defines a plurality of mounting screw accommodating channels 1810 which receive mounting screws (not shown) which serve to fixedly attach the bottom element 1660 to the base housing 1400. Formed along a top edge 1812 of cylindrical wall 1800 are a plurality of, preferably four, snap engagement portions 1814 which are configured for snap engagement with top element 1650 at snap-engagement cut outs 1784 of top element 1650.

Preferably extending upwardly from top edge 1812 is a sensor mounting protrusion 1820 for mounting of an optional sensor (not shown) for sensing a rotational position of rotary drive gear 1500.

The bottom of cylindrical wall 1800 is preferably formed with a first widened region 1822 for facilitating air flow therefrom and a second widened region 1823 for accommodating electronic circuitry (not shown).

A plurality of threaded screw bosses 1824 are preferably provided at a bottom edge 1826 of cylindrical wall 1800 for accommodating screws (not shown) which attach bottom element 1660 to bottom assembly 1410 at screw mounting apertures 1554.

A plurality of threaded screw bosses 1828 are preferably provided at top edge 1812 of cylindrical wall 1800 for accommodating screws (not shown) which attach bottom element 1660 to top element 1650.

Reference is now made to FIGS. 26A-26E, which are simplified illustrations of axially displaceable rotary drive assembly 1530 forming part of the vertically displacing rotary drive motor assembly 1430 of FIGS. 19A-19F. As seen in FIGS. 26A-26E, the axially displaceable rotary drive assembly 1530 preferably comprises a outer drive shaft assembly 1900, a motor support bracket assembly 1902, an AC motor 1904, a plurality of, preferably three, spindles 1906, a corresponding plurality of coil springs 1908, a motor lifting element 1910, a linear to rotary converting adaptor 1912, a spring 1914 and a linearly driven rotating ventilating element 1916.

Figure 27A:
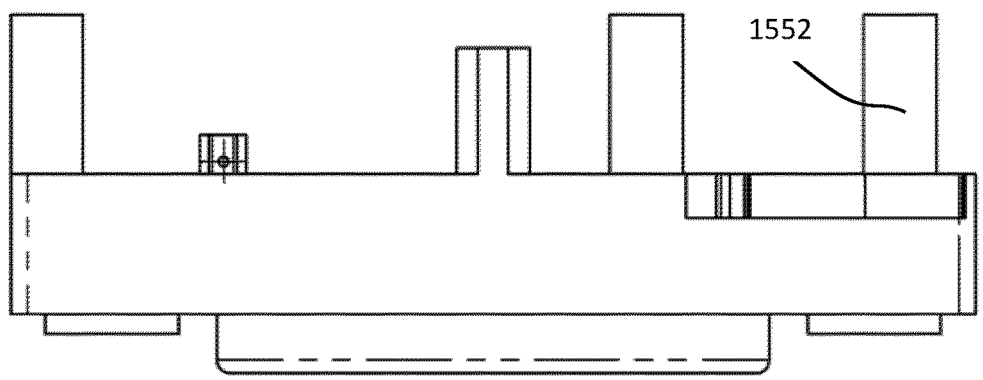
FIGS. 27A, 27B and 27C are simplified respective planar side, planar top and pictorial view illustrations of a bottom element forming part of the bottom assembly of FIGS. 21A & 21B.
Figure 27B:
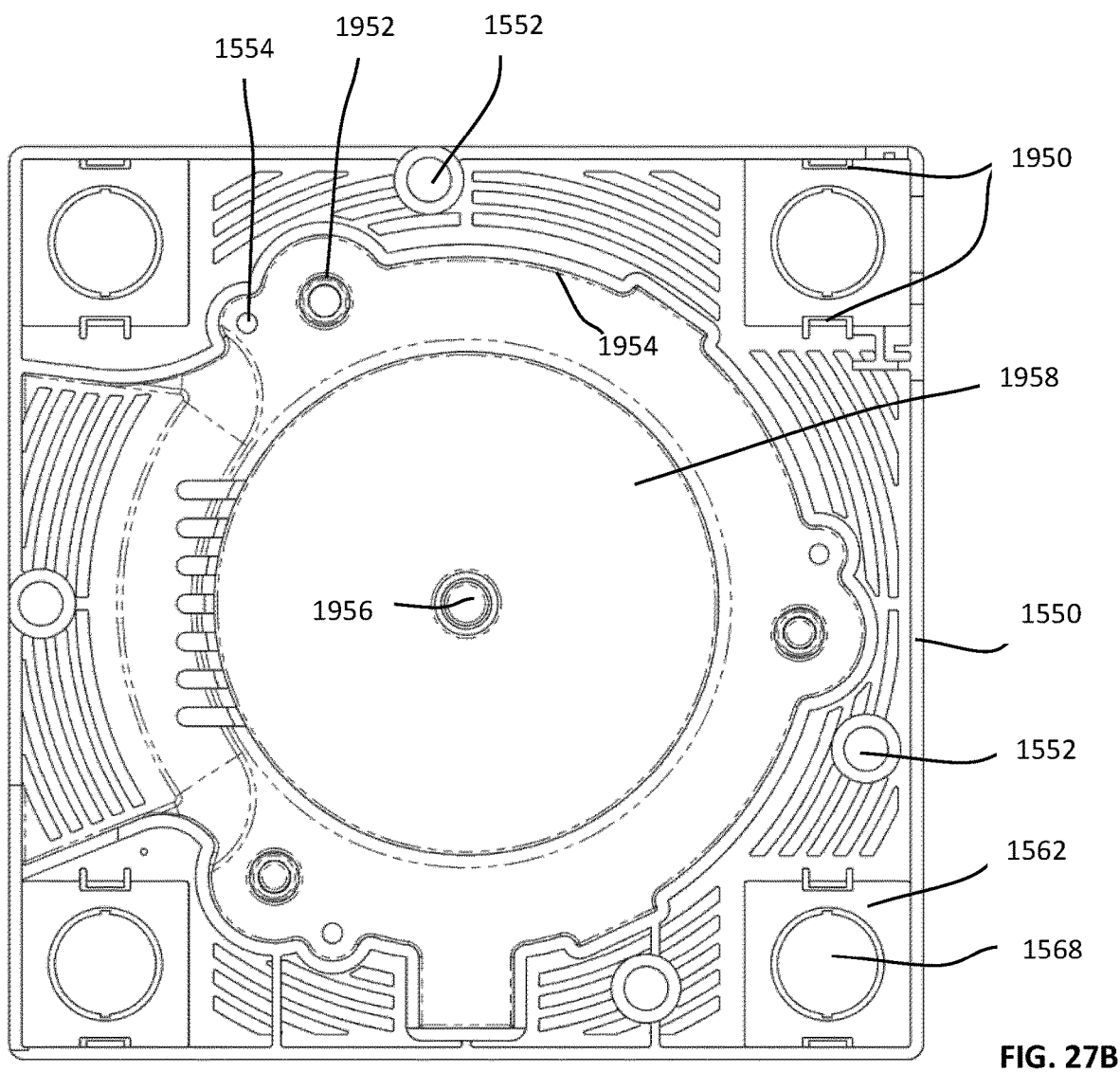
Figure 27C:
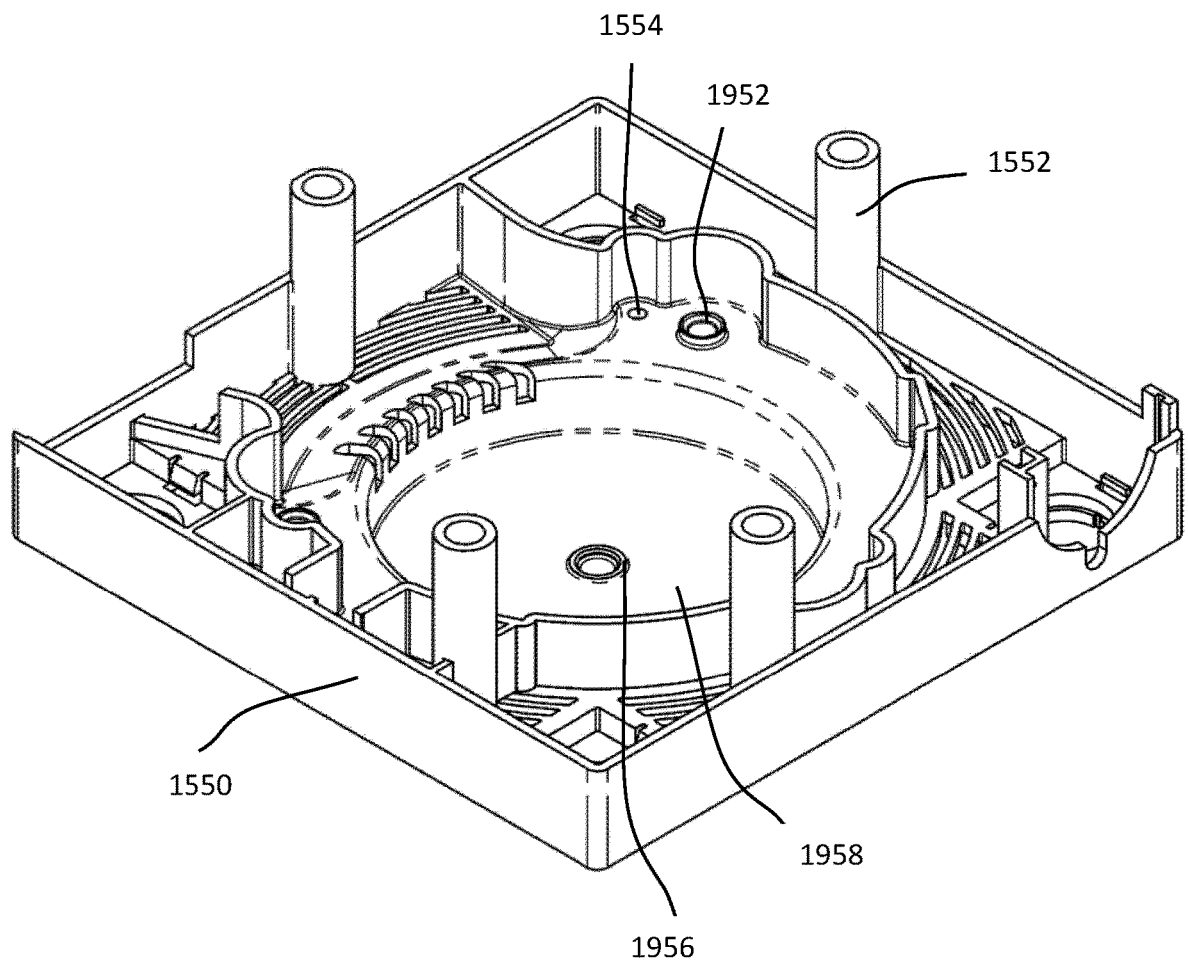

Reference is now made to FIGS. 27A-27C, which are simplified respective planar side, planar top and pictorial view illustrations of bottom element 1550, forming part of the bottom assembly 1410 of FIGS. 21A & 21B.

In addition to the elements described hereinabove with reference to FIGS. 21A & 21B, namely the plurality of upstanding mounting screw guiding bosses 1552, and the plurality of screw mounting apertures 1554, the corner recesses 1562 and the apertures 1568, it is seen that each corner recess 1562 of the bottom element 1550 includes a plurality of, preferably two, snaps 1950, for securing load cells 1560 to bottom element 1550.

Bottom element 1550 also preferably includes a plurality of, preferably three, apertures 1952 for accommodating spindles 1906.

Bottom element 1550 preferably defines a partially interrupted circumferential wall 1954 for locating bottom element 1660 of motor housing and support assembly 1510 thereon and for separating warm and ambient air flows through the bottom element 1660.

Bottom element 1550 preferably also defines a drive shaft engageable socket 1956 on a top-facing planar surface 1958 thereof.

Figure 28A:
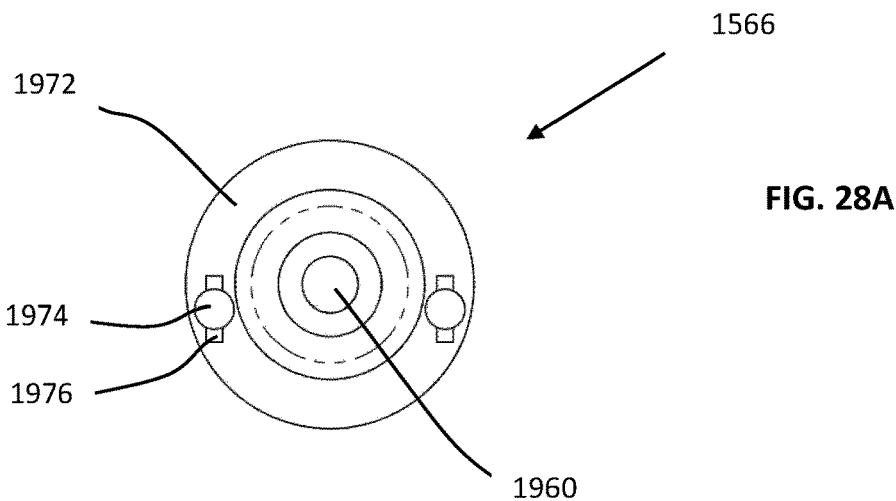
FIGS. 28A, 28B and 28C are simplified respective planar top, planar side and pictorial view illustrations of a load cell support forming part of the bottom assembly of FIGS. 21A &21B.
Figure 28B:
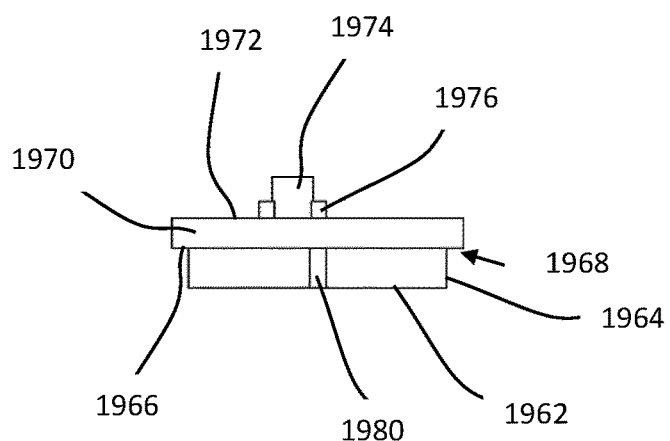
Figure 28C:
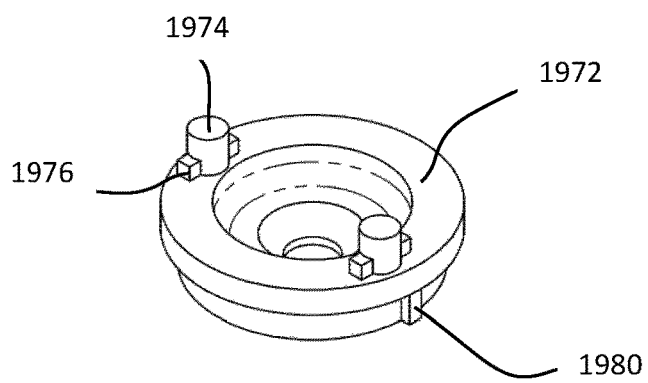

Reference is now made to FIGS. 28A-28C, which are simplified illustrations of load cell support 1566, forming part of the bottom assembly 1410 of FIGS. 21A &21B.

As seen in FIGS. 28A-28C, load cell support 1566 is a generally circular integrally formed element having a central aperture 1960 for accommodating a screw. Outer surfaces of the load cell support 1566 include an aperture bottom surface 1962, a circumferential surface 1964 extending upwardly from bottom surface 1962 and terminating in a downward-facing annular surface 1966, thereby defining a circumferential locating shoulder 1968 which seats in a correspondingly configured portion of corner recess 1562. Extending upwardly from annular surface 1966 is a circumferential surface 1970 which extends to a top annular surface 1972. A pair of upstanding load cell locating protrusions 1974 extend upwardly from top annular surface 1972. A pair of side protrusions 1976 extend laterally from each of protrusions 1974. A pair of rotational locating protrusions 1980 extend radially outwardly in opposite directions from circumferential surface 1964.

Figure 29D:
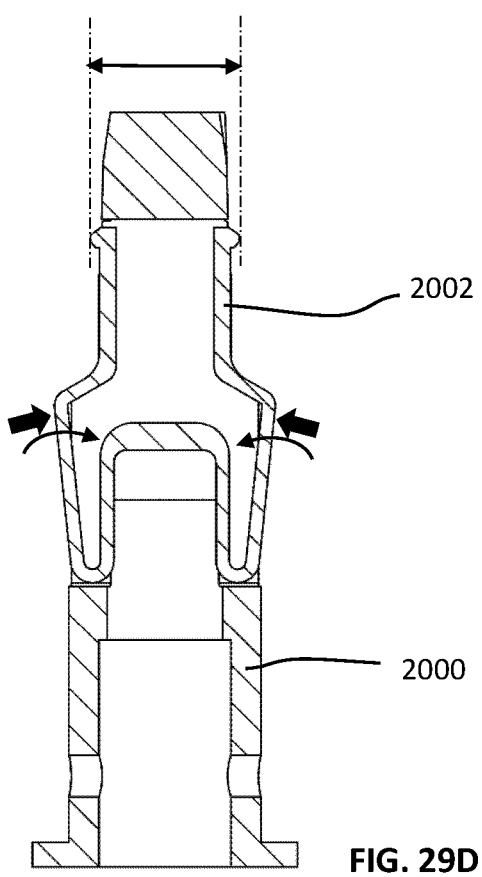
Figure 29E:
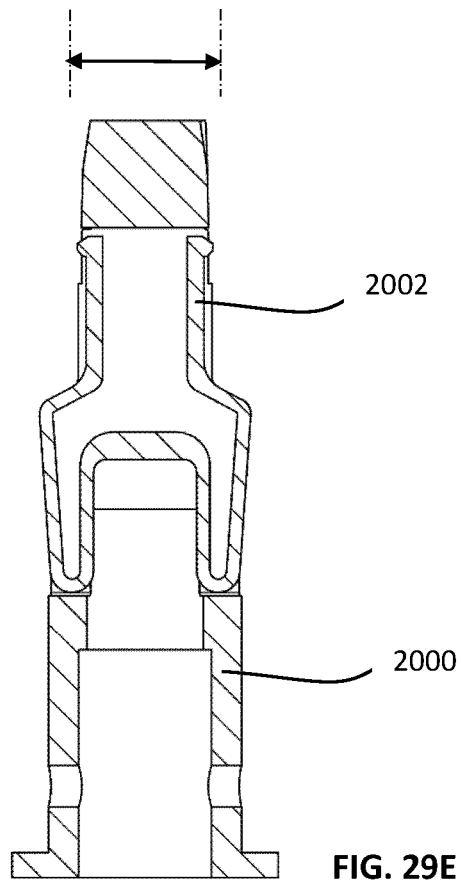
Figure 30A:
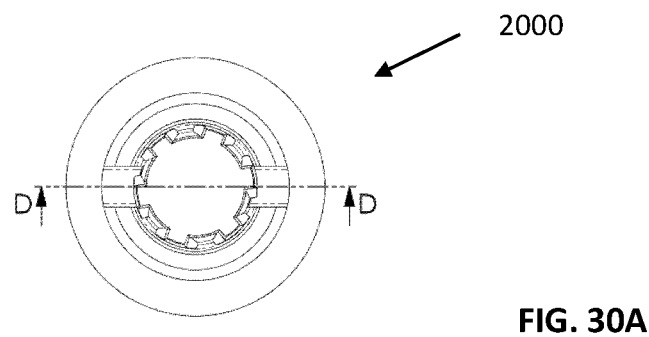
FIGS. 30A, 30B, 30C and 30D are simplified planar top, planar side, pictorial and sectional view illustrations of an outer drive shaft housing element forming part of the outer drive shaft assembly of FIGS. 29A-29E, FIG. 30D being taken along lines D-D in FIG. 30A.
Figure 30B:
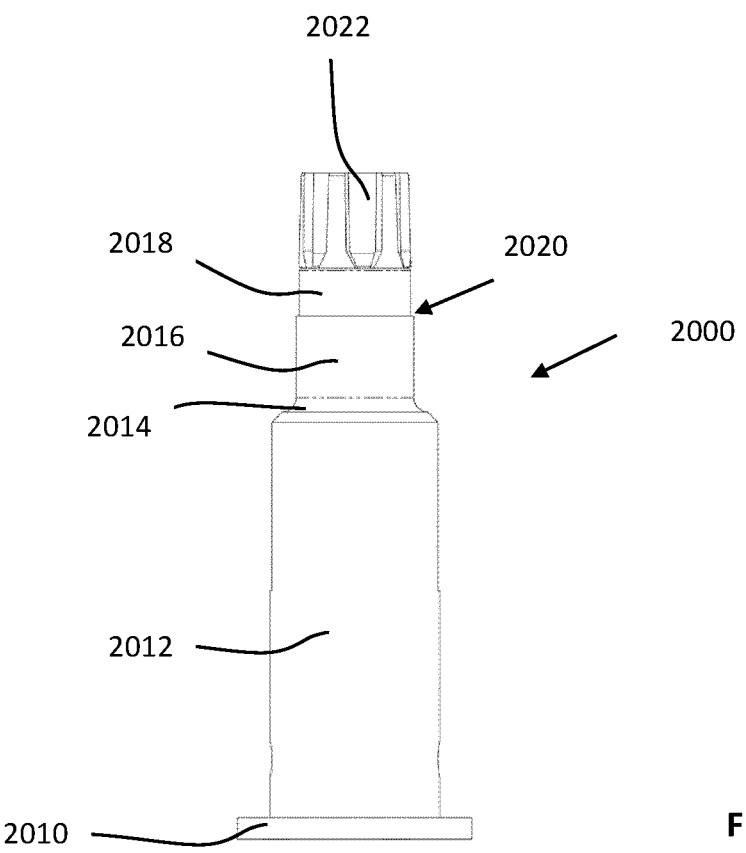
Figure 30C:
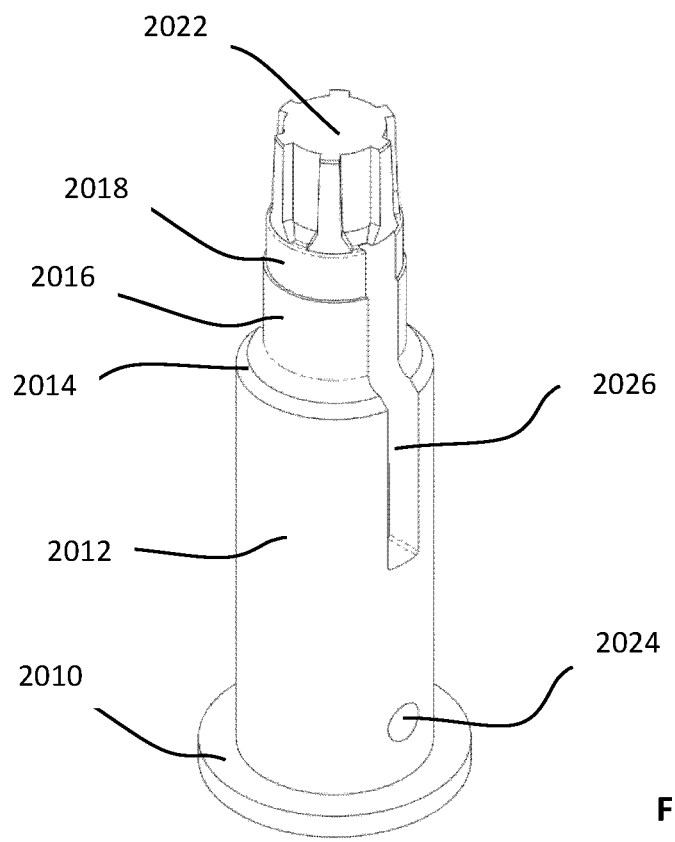
Figure 30D:
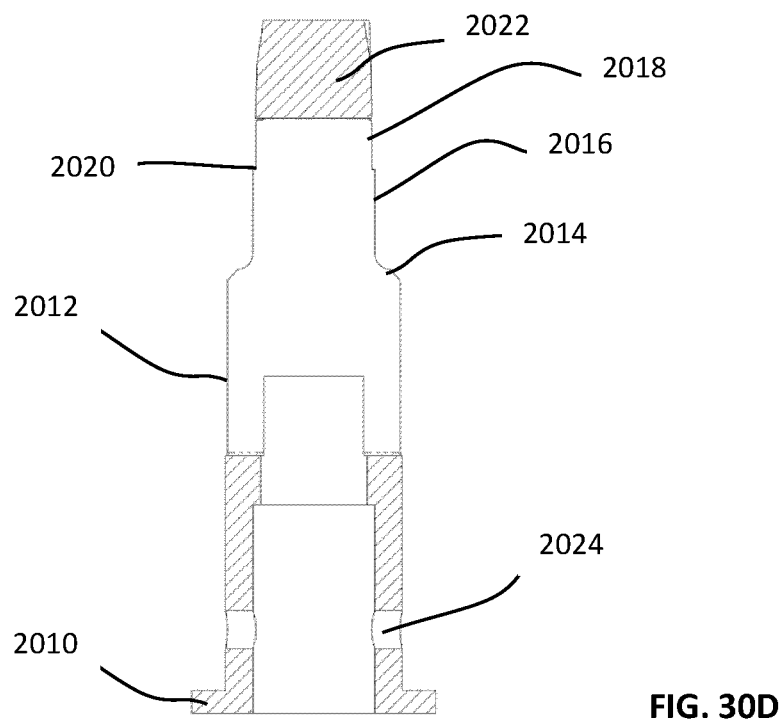
Figure 32A:
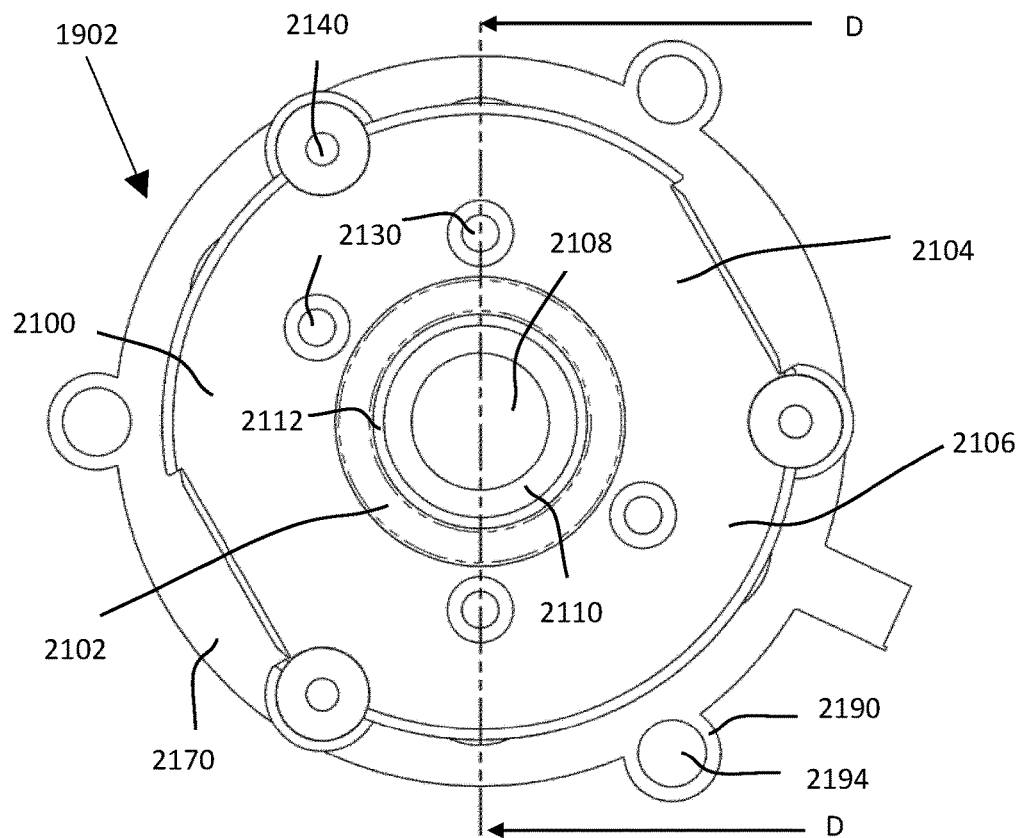
FIGS. 32A, 32B, 32C and 32D are simplified planar top, planar bottom, planar side and sectional illustrations of a motor support bracket assembly forming part of the axially displaceable rotary drive assembly of FIGS. 26A-26E, FIG. 32D being taken along lines D-D in FIG. 32A.
Figure 32B:
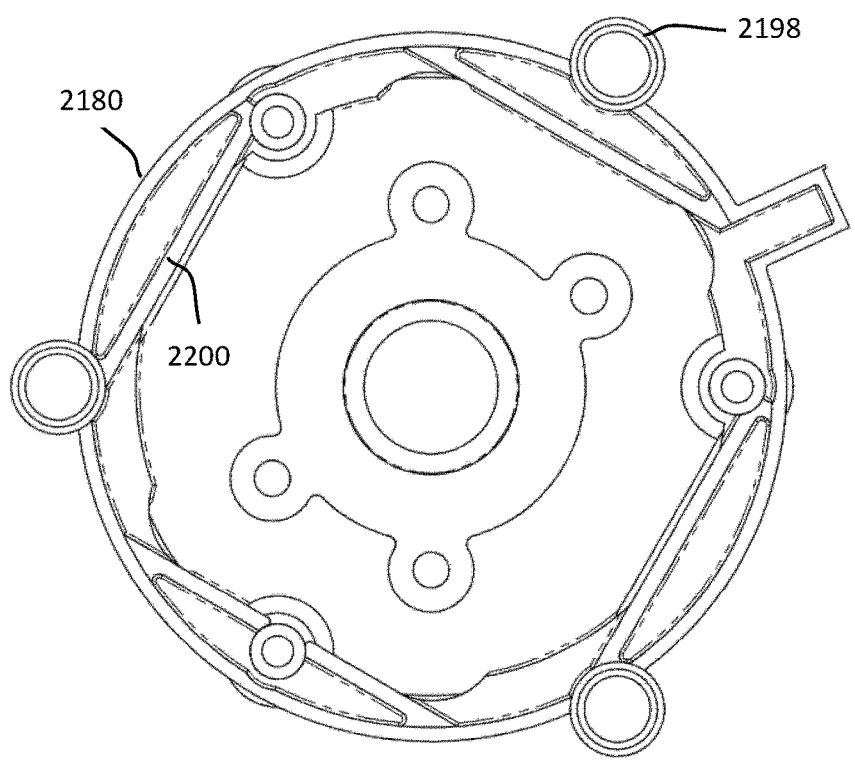
Figure 32C:
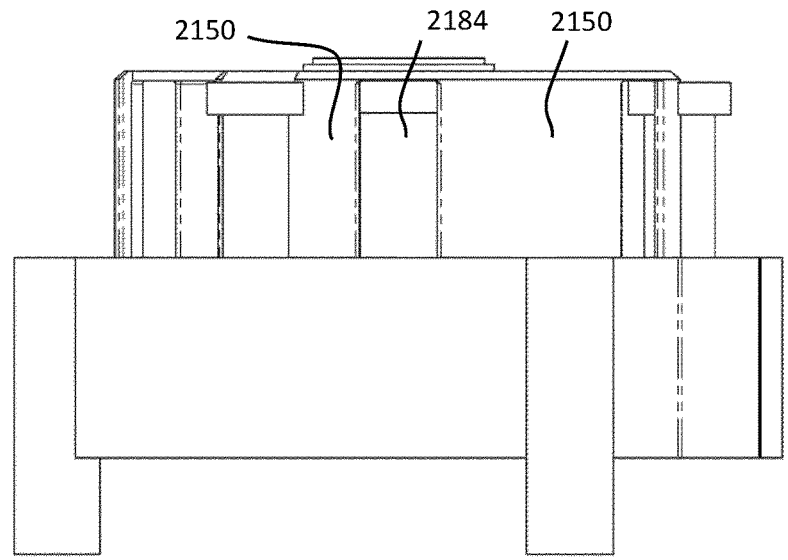
Figure 32D:
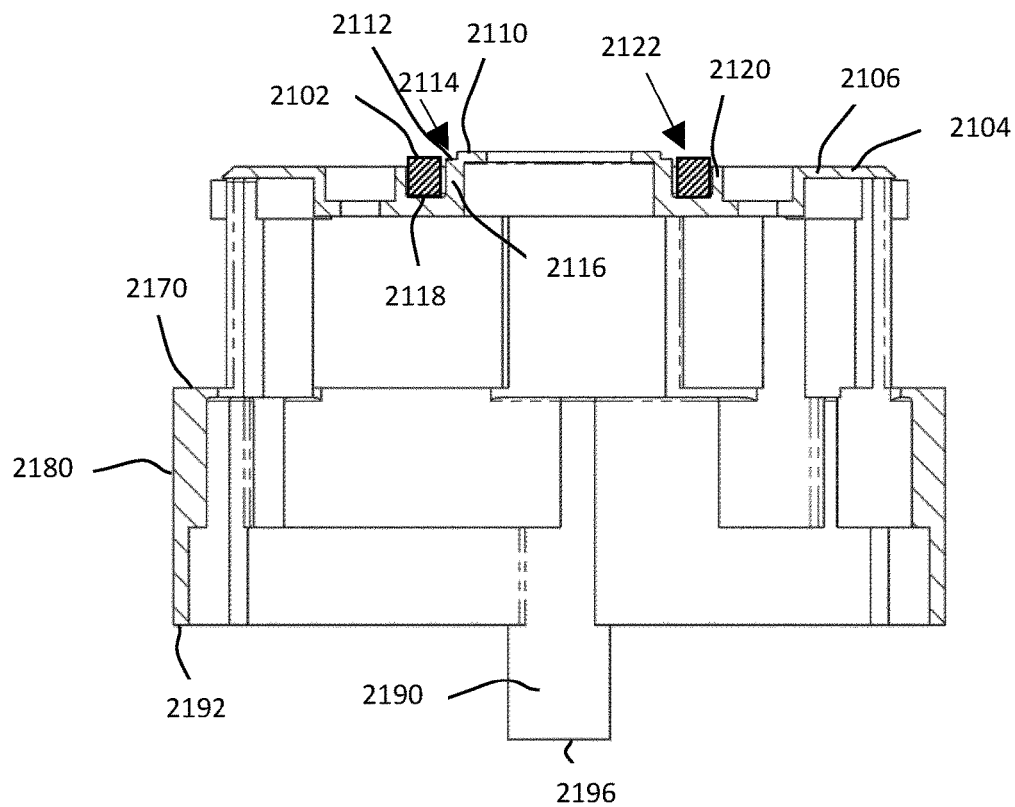

Reference is now made to FIGS. 29A-29E, which are simplified illustrations of outer drive shaft assembly 1900 forming part of the axially displaceable rotary drive assembly 1530 of FIGS. 26A-26E. As seen in FIGS. 29A-29E, the outer drive shaft assembly 1900 includes an outer drive shaft housing element 2000 and an outer drive shaft locking engagement element 2002, which is partially seated within outer drive shaft housing element 2000. FIG. 29D illustrates outer drive shaft assembly 1900 in an extended operative orientation which occurs when MMIDD 1000 is at rest or when AC motor 1904 is solely engaged in rotary motion. FIG. 29E illustrates the outer drive shaft assembly 1900 in a retracted operative orientation during axial displacement of the axially displaceable rotary drive assembly 1530.

Reference is now made to FIGS. 30A-30D, which are simplified illustrations of outer drive shaft housing element 2000, forming part of the outer drive shaft assembly 1900 of FIGS. 29A-29E. As seen in FIGS. 30A-30D, the outer drive shaft housing element 2000 is a generally elongate upstanding element having a base 2010, a generally cylindrical lower portion 2012, extending upwardly from base 2010, a tapered portion 2014 extending upwardly from generally cylindrical lower portion 2012 and terminating in an intermediate cylindrical portion 2016, which extends to a slightly narrower upper cylindrical portion 2018 and defines therewith a shoulder 2020.

A vertically splined top generally cylindrical portion 2022 extends upwardly from cylindrical portion 2018 and is configured for engagement with a correspondingly configured drive shaft engaging wall 414 of blade element 160.

A throughgoing transverse bore 2024 is formed in cylindrical lower portion 2012 above base 2010 and a throughgoing slot 2026 is formed in an upper portion of cylindrical lower portion 2012, tapered portion 2014, intermediate cylindrical portion 2016 and upper cylindrical portion 2018. Slot 2026 is configured to accommodate outer drive shaft locking engagement element 2002.

Reference is now made to FIGS. 31A-31C, which are simplified illustrations of outer drive shaft locking engagement element 2002, forming part of the outer drive shaft assembly 1900 of FIGS. 29A-29E. As seen in FIGS. 31A-31C, outer drive shaft locking engagement element 2002 preferably comprises a unitary side to side symmetric element formed of spring steel.

Element 2002 preferably includes a central bridge portion 2030 including a cross beam portion 2032 and a pair of upstanding side portions 2034. The bottoms of upstanding side portions 2034 each extend through a curved bent portion 2036 to a slightly outwardly tapered upwardly extending portion 2038. Portions 2038 each extend via an inwardly tapered section 2040 to an upstanding top portion 2042 having, at a top edge 2044 thereof, an outwardly extending protrusion portion 2046.

Reference is now made to FIGS. 32A-32D, which are simplified illustrations of motor support bracket assembly 1902 forming part of the axially displaceable rotary drive assembly 1530 of FIGS. 26A-26E.

As seen in FIGS. 32A-32D, motor support bracket assembly 1902 is a generally cylindrical assembly, which includes a support bracket element 2100 onto which is mounted an annular sealing ring 2102. Support bracket element 2100 includes a top planar generally circular wall 2104 having a top surface 2106 and a central aperture 2108.

A raised annular wall surface 2110 surrounds central aperture 2108. Surrounding raised annular wall surface 2110 is a slightly lower raised annular wall surface 2112, which defines a circumferential shoulder 2114 therewith. Wall surface 2112 terminates at a radially outward edge thereof in a depending circumferential wall 2116, which in turn extends to a recessed annular surface 2118, which lies in a plane below that of top surface 2106.

Recessed annular surface 2118 is delimited at its radial outward extent by a circumferential wall 2120, which extends to top surface 2106 and is concentric with circumferential wall 2116 and defines therewith an annular recess 2122. Annular sealing ring 2102 is seated in annular recess 2122 and is preferably positioned in touching engagement with circumferential wall 2120 and is spaced from circumferential wall 2116. Annular sealing ring 2102 preferably extends slightly above top surface 2106 but lies below raised annular wall surface 2110.

A plurality of bolt mounting holes 2130 are preferably formed in wall 2104 for accommodating motor mounting bolts (not shown), which bolt AC motor 1904 to motor support bracket assembly 1902.

A plurality, preferably three, of pin receiving shaft portions 2140 are preferably arranged about top wall 2104 and are arranged for slidably receiving pins 1780 of top element 1650.

Extending downwardly from top planar generally circular wall 2104 in a generally circular cylindrical arrangement are a plurality of depending wall sections 2150, some of which preferably surround pin receiving shafts 2140.

Depending wall sections 2150 preferably all terminate at a generally circumferential planar wall surface 2170, from which depends in turn, a generally cylindrical wall portion 2180. Wall sections 2150, together with top planar circular wall 2104 and generally circumferential planar wall surface 2170, define an array of ventilation apertures 2184. The array of ventilation apertures 2184 is generally mutually aligned with the array of ventilation apertures 1732 formed in top element 1650 of motor housing and support assembly 1510.

Protruding from generally cylindrical wall portion 2180 are a plurality of spindle guiding shaft portions 2190, which extend below a bottom edge 2192 of cylindrical wall portion 2180. Each of spindle guiding shaft portions 2190 preferably defines a vertical bore 2194, each of which terminates adjacent a lower edge 2196 of the spindle guiding shaft portion 2190 in a widened spring seat 2198 for accommodating a coil spring 1908.

Interiorly of cylindrical wall portion 2180 there are provided two pairs of mutually perpendicular planar upstanding wall surfaces 2200, which are configured to receive corresponding side surfaces of AC motor 1904.

Figure 33A:
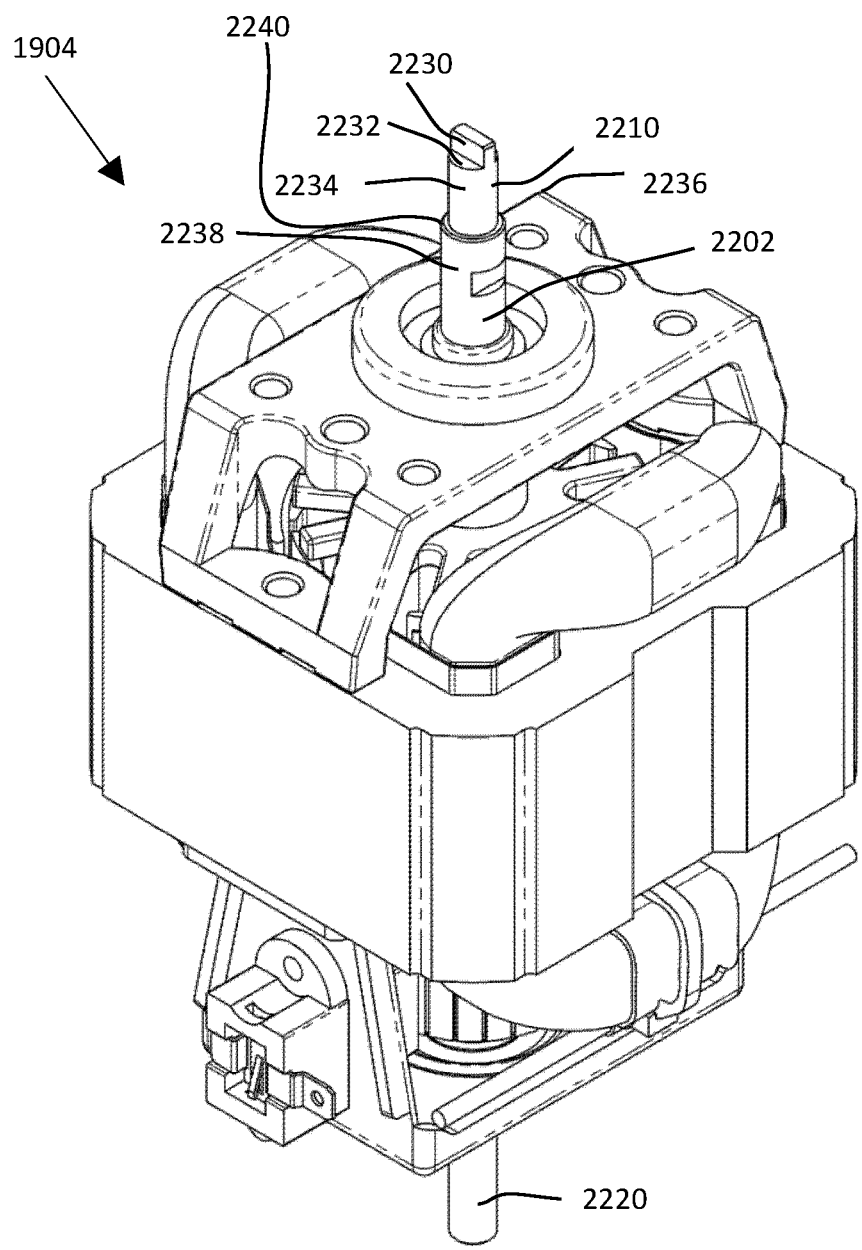
FIGS. 33A and 33B are simplified respective upward facing and downward facing pictorial view illustrations of a modified standard AC motor forming part of the axially displaceable rotary drive assembly of FIGS. 26A-26E.
Figure 33B:
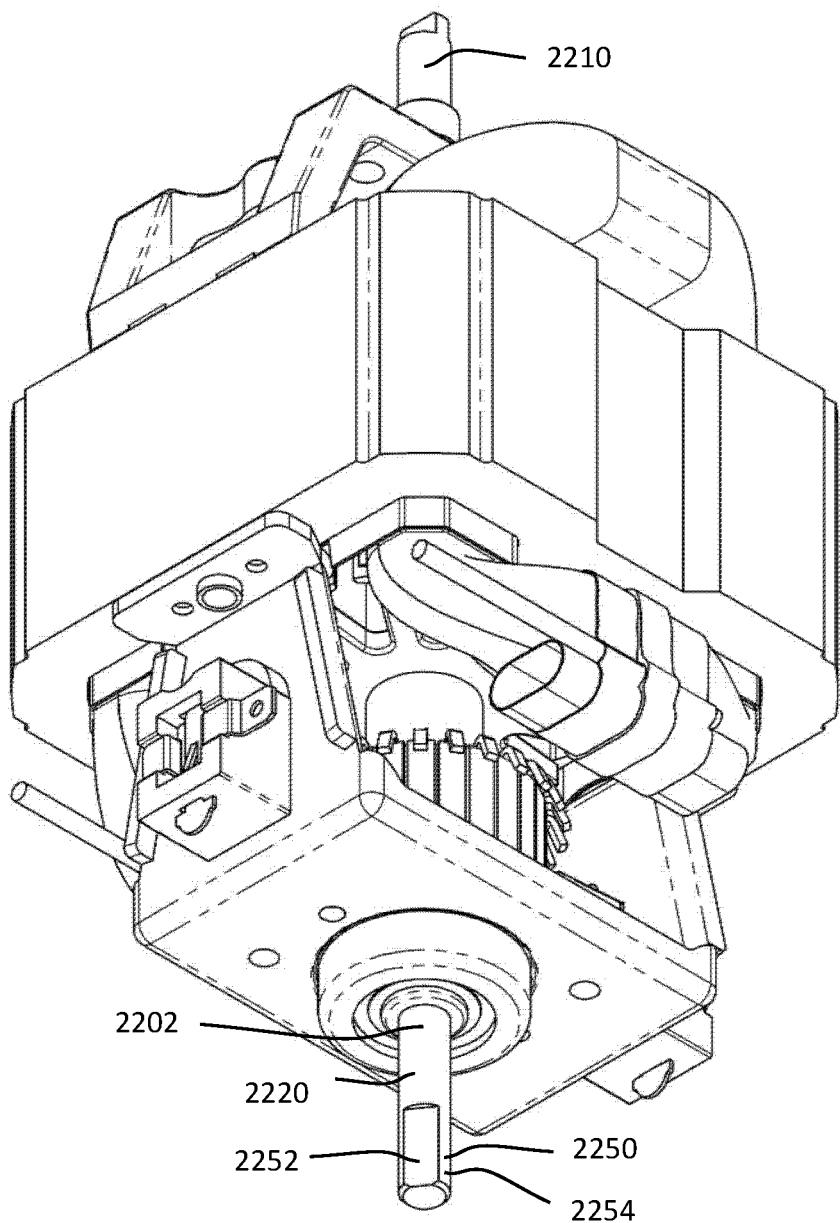

Reference is now made to FIGS. 33A and 33B, which are simplified respective upward facing and downward facing pictorial view illustrations of modified standard AC motor 1904, forming part of the axially displaceable rotary drive assembly 1530 of FIGS. 26A-26E. As seen in FIGS. 33A and 33B, the AC motor 1904 is generally a model EU9537-1201, manufactured by Euroka Electrical of Dongguan, China, and has a drive shaft 2202 having specially configured drive shaft top and bottom ends 2210 and 2220.

As seen in FIG. 33A, drive shaft top end 2210 is configured to have an uppermost portion 2230 having a generally elongate rectangular cross section, which terminates in a pair of coplanar side surfaces 2232. Underlying the uppermost portion 2230 and side surfaces 2232, the drive shaft top end 2210 includes an intermediate cylindrical portion 2234, which terminates in an annular planar surface 2236. Underlying intermediate cylindrical portion 2234 is the remainder 2238 of the drive shaft top end 2210 which has a slightly larger cross section than that of intermediate cylindrical portion 2234 and defines therewith a shoulder 2240.

As seen in FIG. 33B, drive shaft bottom end 2220 is configured to have a bottommost portion 2250 having a generally uniform cross section characterized in that it includes a flat side surface 2252 and a circular cylindrical surface 2254.

Figure 34A:
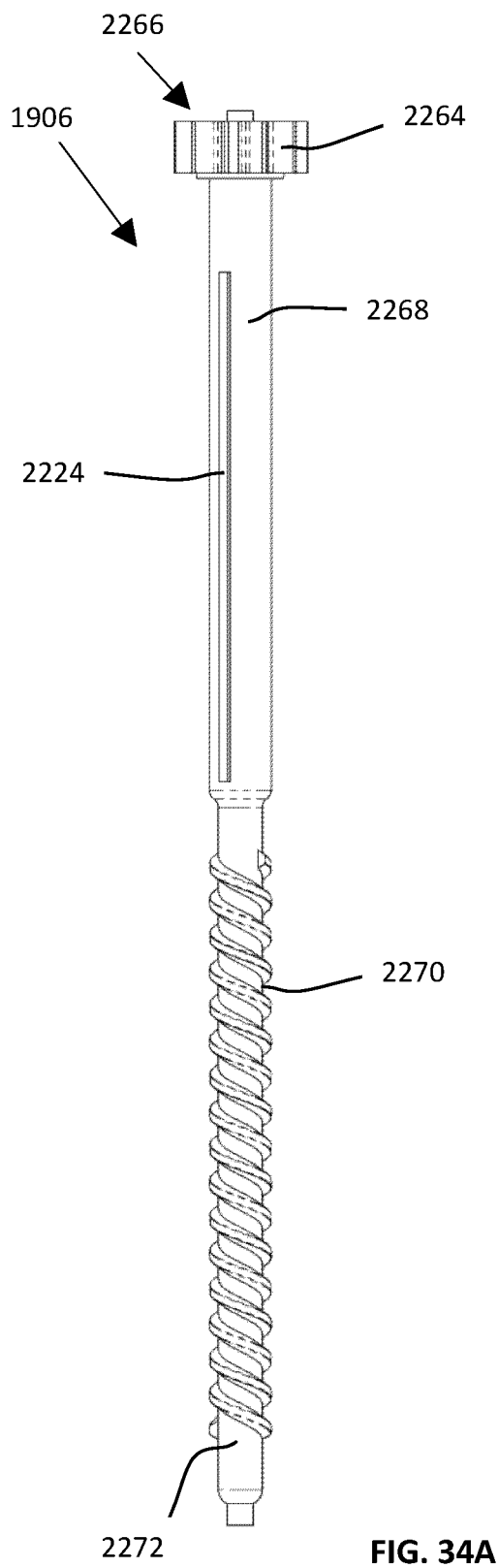
FIGS. 34A and 34B are simplified respective planar side and pictorial view illustrations of a spindle forming part of the axially displaceable rotary drive assembly of FIGS. 26A-26E.
Figure 34B:
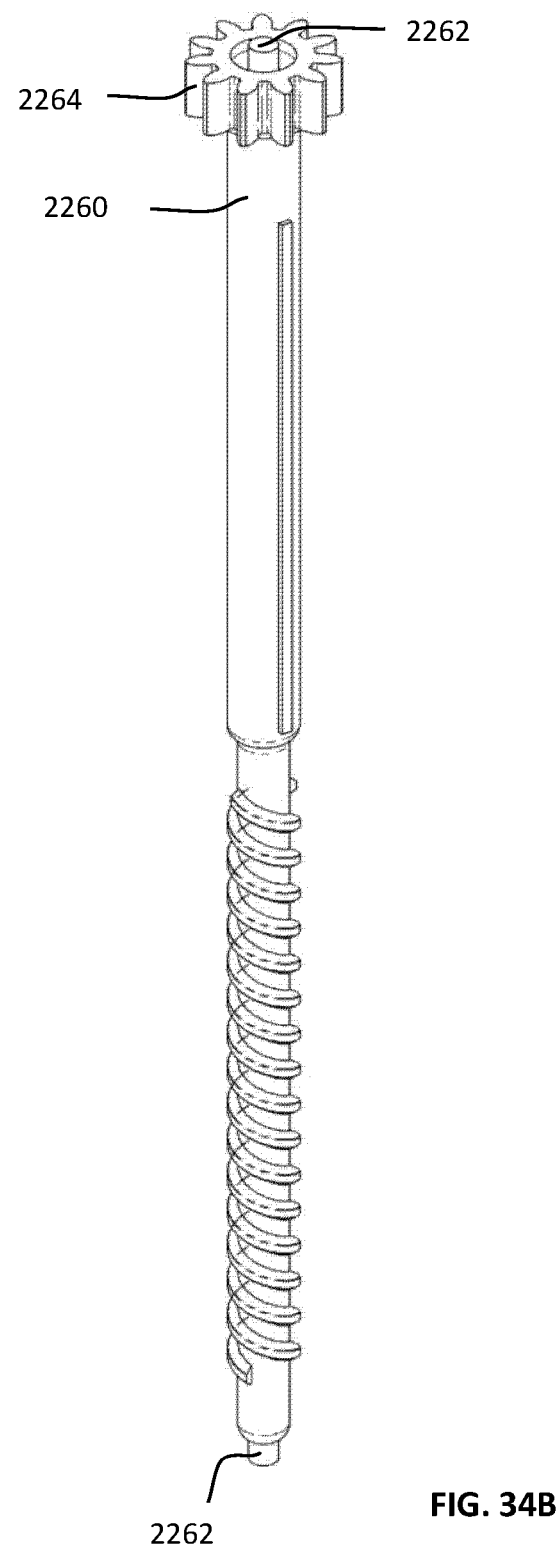
Figure 35A:
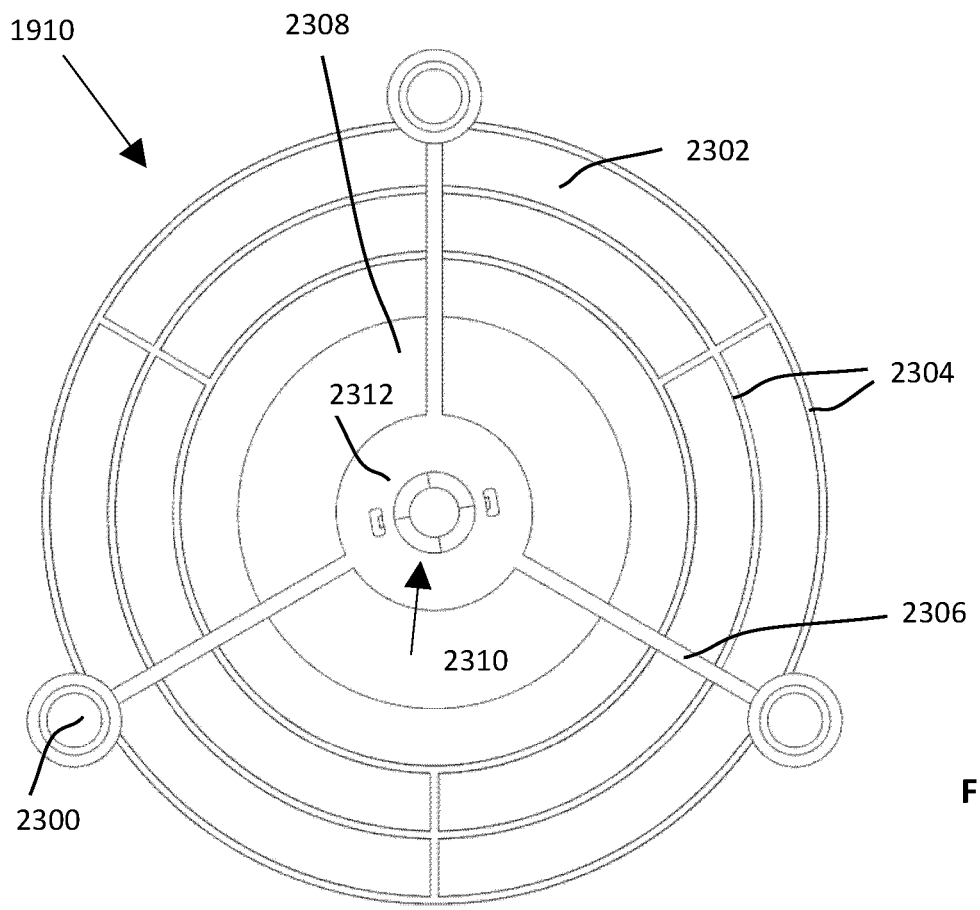
Figure 35B:
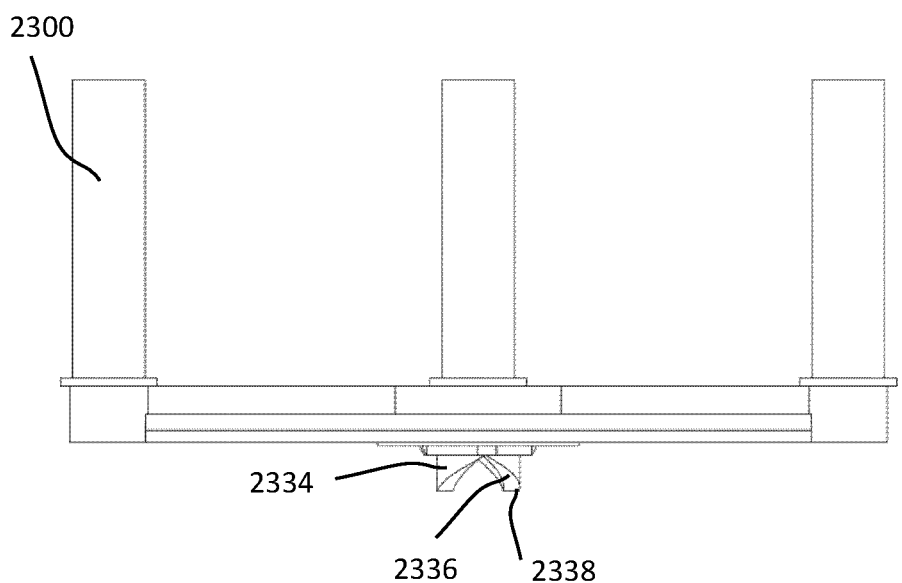
Figure 35C:
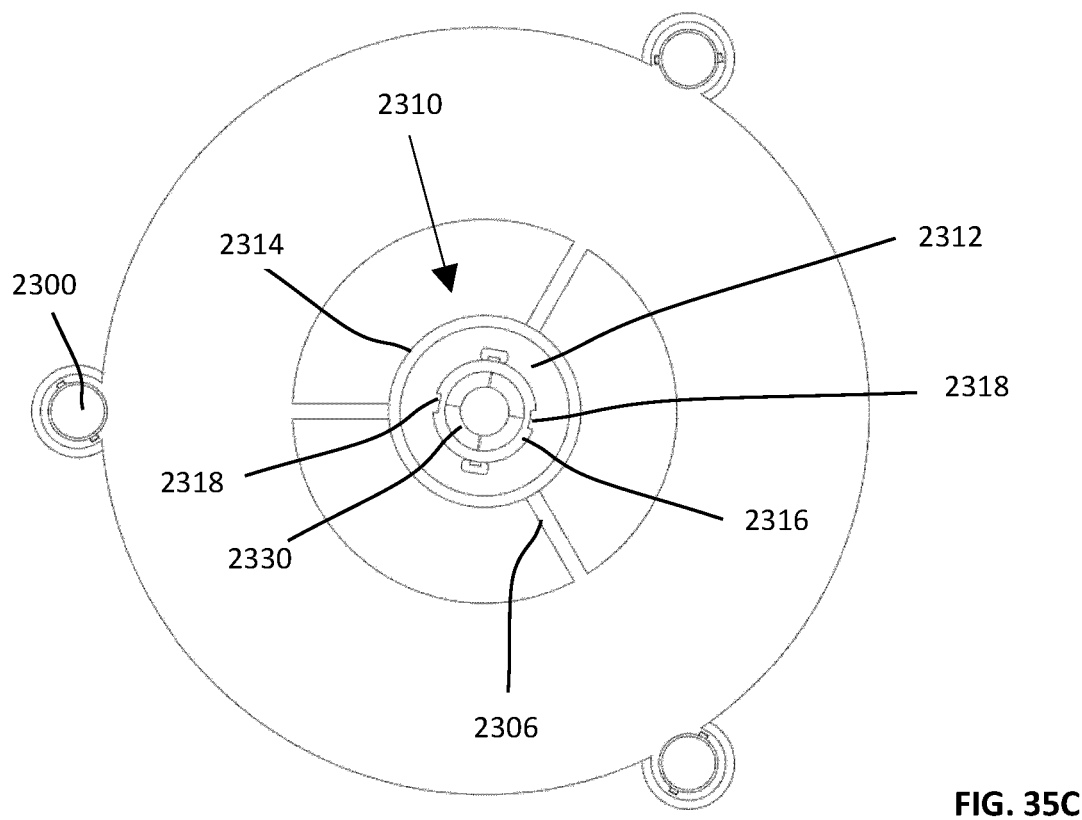
Figure 35D:
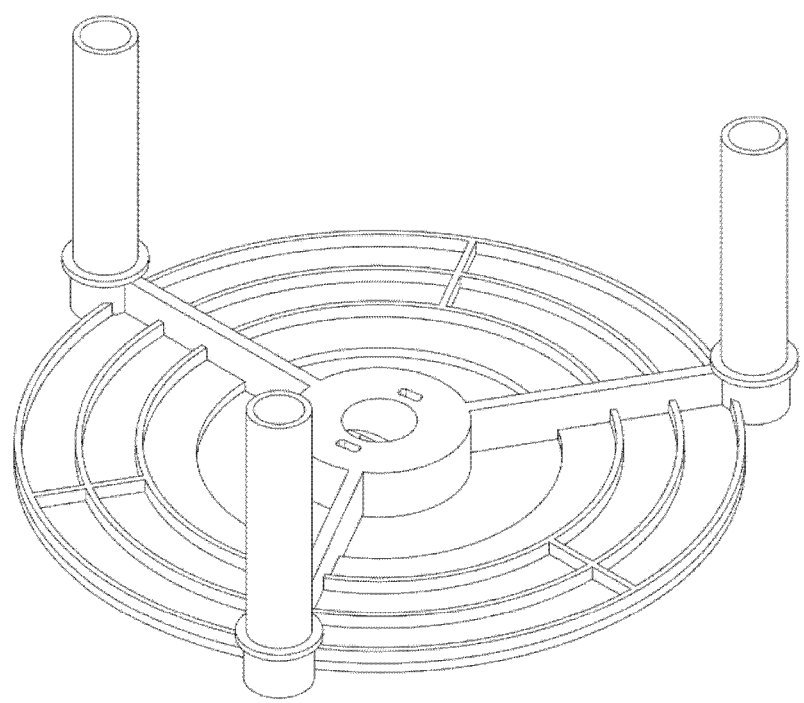
Figure 36A:
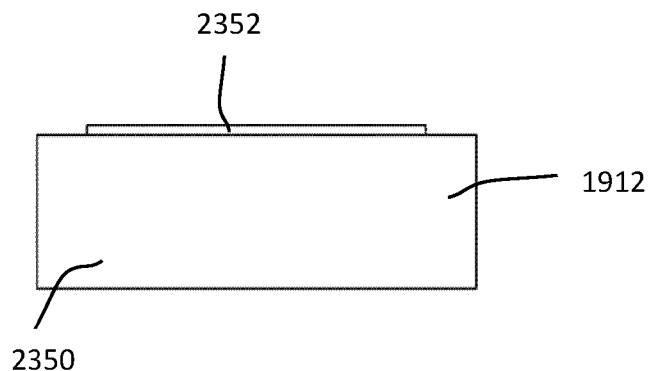
FIGS. 36A, 36B, 36C, 36D and 36E are simplified respective planar side, planar top, planar bottom, bottom-facing pictorial and sectional view illustrations of a linear to rotary converting adaptor, forming part of the axially displaceable rotary drive assembly of FIGS. 26A-26E, FIG. 36E being taken along lines E-E in FIG. 36C.
Figure 36B:
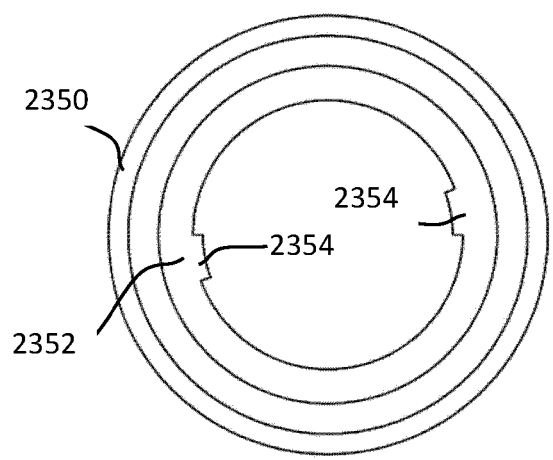
Figure 36C:
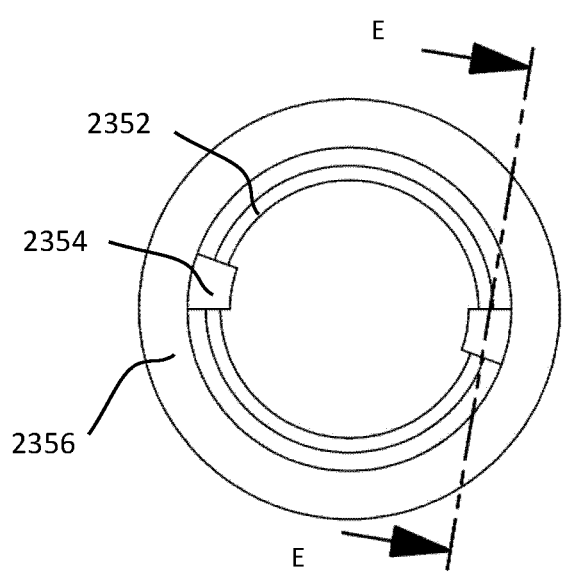
Figure 36D:
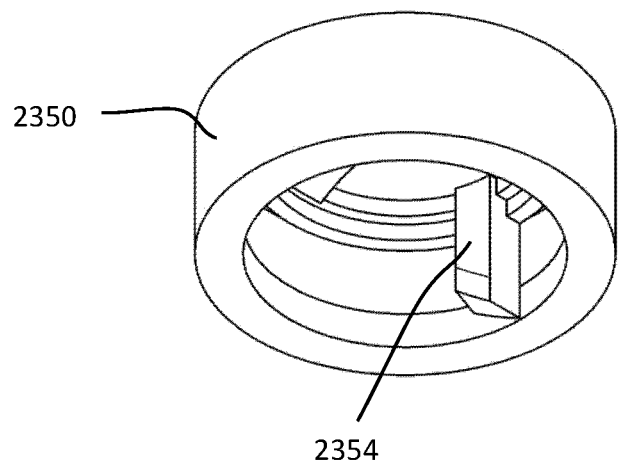
Figure 36E:
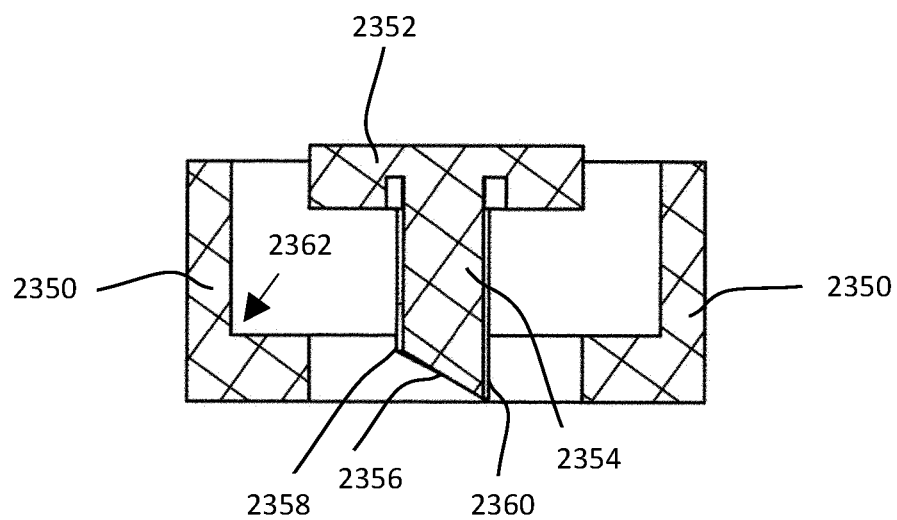
Figure 37A:
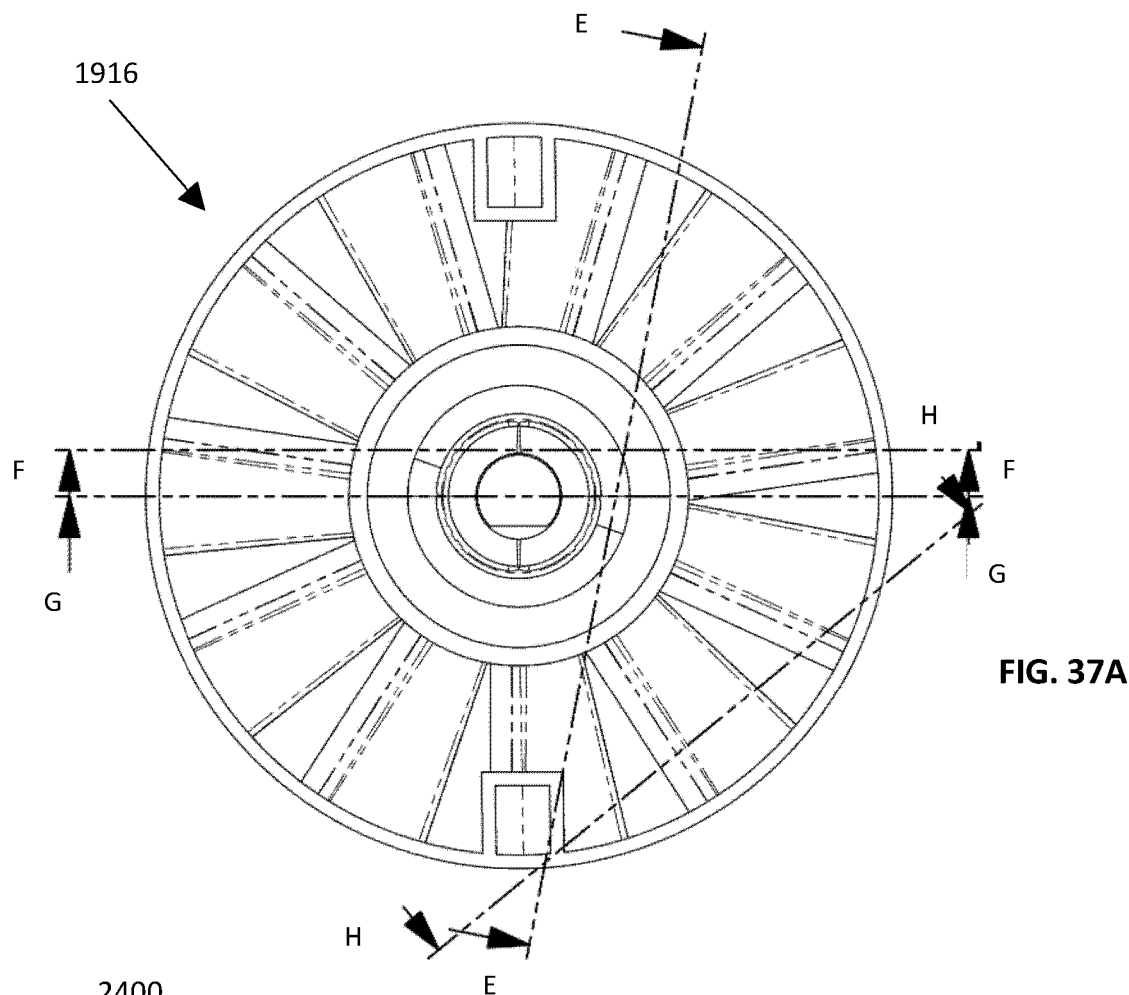
FIGS. 37A, 37B, 37C, 37D, 37E, 37F, 37G and 37H are simplified respective planar top, planar side, top-facing pictorial, bottom-facing pictorial, first sectional, second sectional, third sectional and fourth sectional view illustrations of a linearly driven rotating ventilating element forming part of the axially displaceable rotary drive assembly of FIGS. 26A-26E, FIGS. 37E, 37F, 37G and 37H being taken along respective lines E-E, F-F, G-G and H-H in FIG. 37A.
Figure 37B:
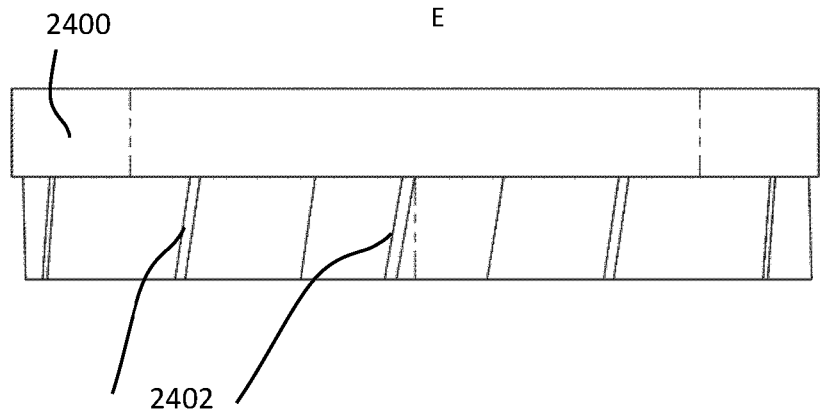
Figure 37C:
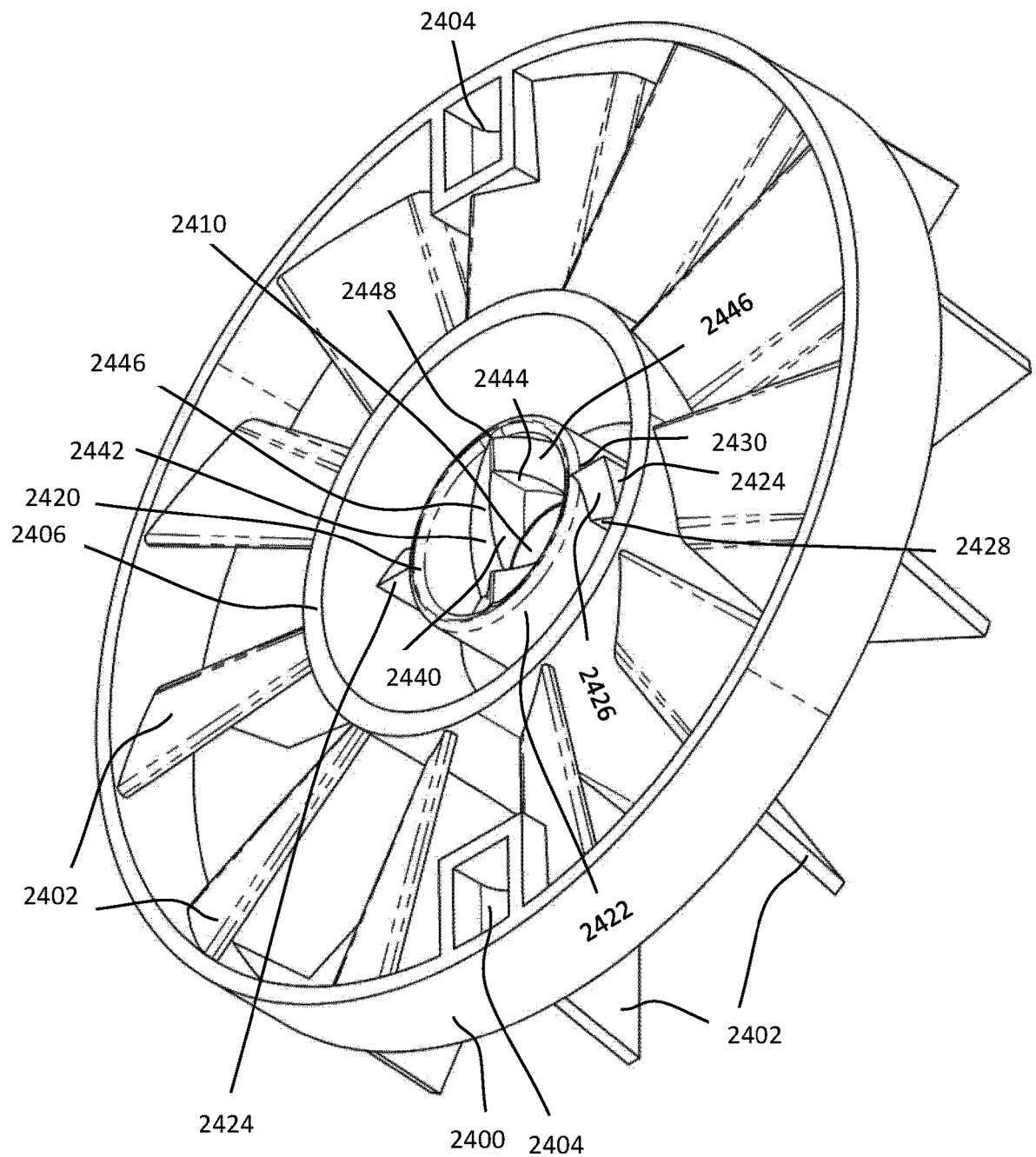
Figure 37D:
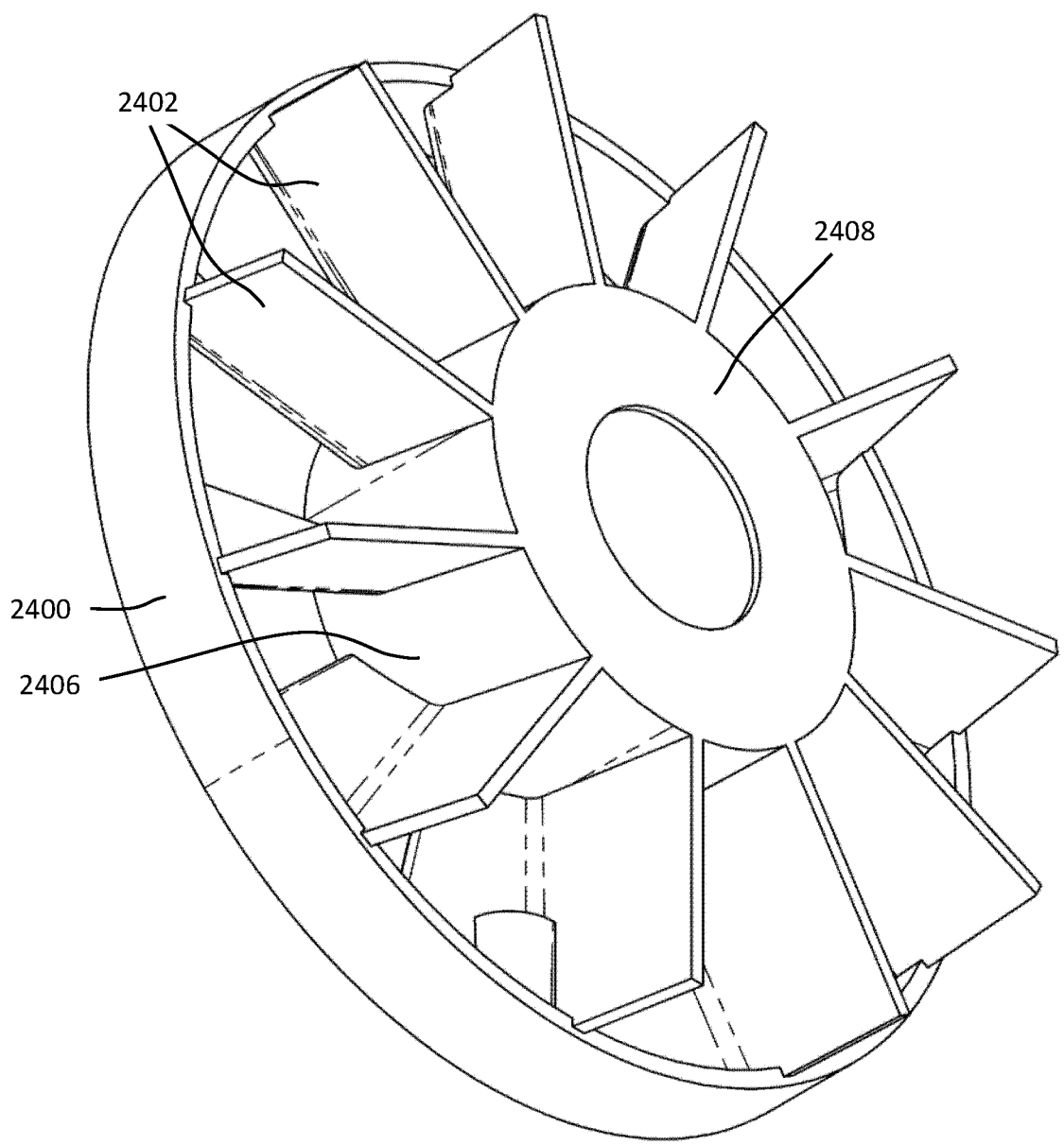
Figure 37E:
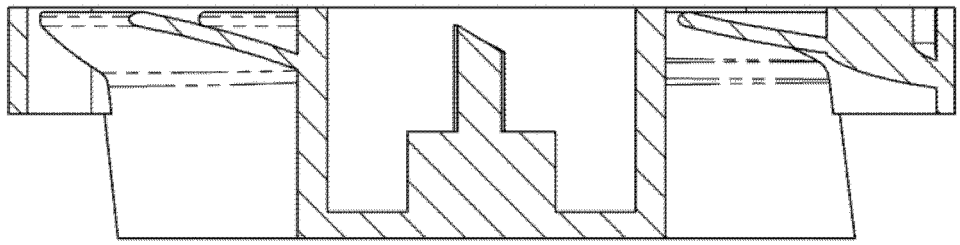
Figure 37F:
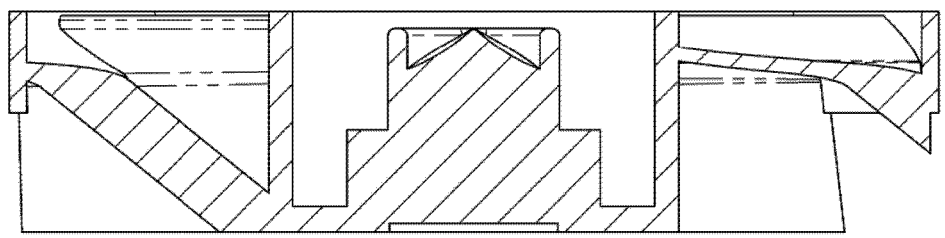
Figure 37G:
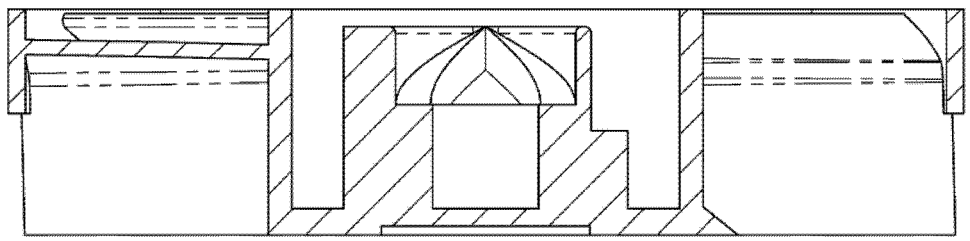
Figure 37H:
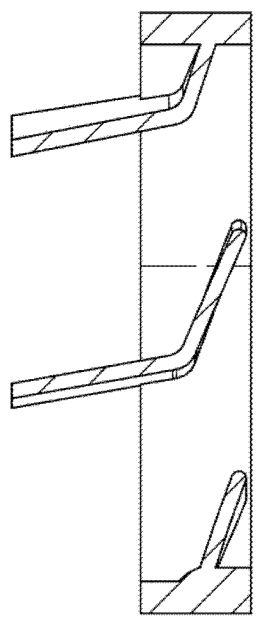

Reference is now made to FIGS. 34A and 34B, which are simplified respective planar side and pictorial view illustrations of spindle 1906, forming part of the axially displaceable rotary drive assembly 1530 of FIGS. 26A-26E.

As seen in FIGS. 34A & 34B, spindle 1906 preferably is an elongate element formed by injection molding of a plastic sheath 2260 over an elongate steel rod 2262. Spindle 1906 preferably includes a gear portion 2264 at a top end 2266 thereof. Below gear portion 2264 is a generally cylindrical portion 2268 which terminates in a helically threaded portion 2270, which terminates in a cylindrical bottom portion 2272. Preferably, generally cylindrical portion 2268 is formed along part of the extent thereof with an elongate side protrusion 2274.

Reference is now made to FIGS. 35A-35E, which are simplified illustrations of motor lifting element 1910 forming part of the axially displaceable rotary drive assembly 1530.

As seen in FIGS. 35A-35E, motor lifting element 1910 includes a plurality of upstanding internally threaded spindle receiving sockets 2300 which are disposed about a generally planar annular wall 2302, preferably having circumferential and radial reinforcement ribs 2304 and 2306, respectively, and defining a central ventilation aperture 2308. Disposed centrally of central ventilation aperture 2308 is a linearly displaceable ventilating element positioning hub 2310. The purpose of ventilating element positioning hub 2310 is to correctly azimuthally position blade element 160 upon lowering of axially displaceable rotary drive assembly 1530, such that the blade element 160 accurately seats in downwardly-facing blade receiving recess 310 of lid 140. This is achieved by correctly azimuthally positioning ventilating element 1916, which is rotationally fixed to drive shaft 2202, which in turn is rotationally fixed to blade element 160.

Ventilating element positioning hub 2310 is preferably configured to have a planar wall 2312, which is integrally formed with inner portions of radial reinforcement ribs 2306. Extending downwardly from planar wall 2312 is an outer circumferential wall 2314, interiorly of which is an inner circumferential wall 2316 having a pair of outer facing vertical elongate side slots 2318 for receiving a corresponding pair of interior ribs of linear to rotary converting adaptor 1912 thereby to lock linear to rotary converting adaptor 1912 against rotation relative to motor lifting element 1910.

Inner circumferential wall 2316 terminates at a downward facing edge 2320 adjacent which is provided a pair of protrusions 2322. Inwardly of edge 2320 is a circumferential wall 2330 having a bottom edge 2332 defining a pair of symmetric downward facing teeth 2334, each of which has a pair of inclined tooth surfaces 2336 which meet at a point 2338. It is also noted that protrusions 2322 also serve to lock linear to rotary converting adaptor 1912 against linear disengagement from to motor lifting element 1910.

Reference is now made to FIGS. 36A-36E, which are simplified illustrations of linear to rotary converting adaptor 1912, forming part of the axially displaceable rotary drive assembly 1530 of FIGS. 26A-26E.

As seen in FIGS. 36A-36E, the linear to rotary converting adaptor 1912 comprises an outer cylindrical wall 2350 and an inner cylindrical ring 2352, arranged interiorly of the outer cylindrical wall 2350 adjacent the top thereof and attached thereto by integrally formed vertically extending interior ribs 2354. Interior ribs 2354 each have an inclined downward facing end surface 2356, presenting a progressively lower surface portion from a leading edge 2358 to a trailing edge 2360 thereof.

Outer cylindrical wall 2350 defines a shoulder 2362 adjacent a bottom edge thereof, which shoulder, together with inner cylindrical ring 2352 provides a spring seat for accommodating spring 1914.

Reference is now made to FIGS. 37A-37H, which are simplified illustrations of linearly driven rotating ventilating element 1916 forming part of the axially displaceable rotary drive assembly 1530 of FIGS. 26A-26E.

As seen in FIGS. 37A-37H, linearly driven rotating ventilating element 1916 preferably includes an outer cylindrical wall 2400 to which are connected integrally formed outer edges of a plurality of circumferentially distributed generally radially extending vanes 2402. Preferably, there are provided a pair of recesses 2404 interior of outer cylindrical wall 2400 for retaining magnets (not shown) which may serve for sensing the rotational velocity of the rotating ventilating element 1916.

Inner edges of vanes 2402 are joined to an inner cylindrical wall 2406, which terminates at a downward-facing edge thereof in a planar, generally circular wall 2408 having formed at a center thereof a socket 2410, which is configured to lockably receive bottom end 2220 of drive shaft 2202.

Surrounding socket is an inner circular cylindrical wall 2420 defining an outer cylindrical wall surface 2422. Extending outwardly from cylindrical wall surface 2422 are a pair of protrusions 2424, each of which has an inclined upward surface 2426, presenting a progressively higher surface portion from a leading edge 2428 to a trailing edge 2430 thereof. Protrusions 2424 interact with end surfaces 2356 of interior ribs 2354 of linear to rotary converting adaptor 1912.

Interiorly of cylindrical wall surface 2422 is a circumferential wall 2440 having a top edge 2442 defining a pair of symmetric upward facing teeth 2444, each of which has a pair of inclined tooth surfaces 2446 which meet at a point 2448. Teeth 2444 interact with teeth 2334 of motor lifting element 1910.

Figure 19A:
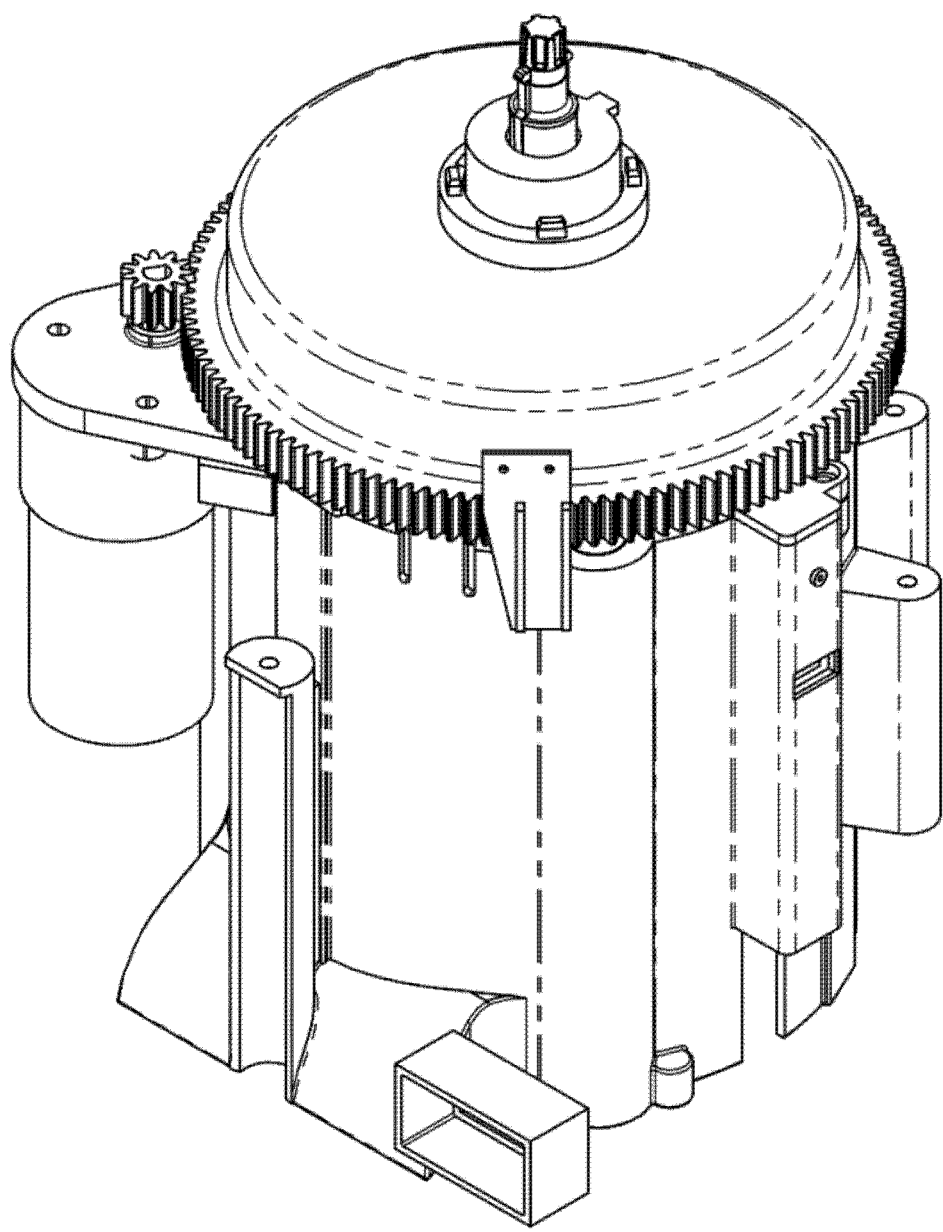
FIGS. 19A, 19B, 19C, 19D, 19E and 19F are simplified respective pictorial, planar side, first planar top, second planar top, planar bottom and exploded view illustrations of a vertically displacing rotary drive motor assembly forming part of the base assembly of FIGS. 16A-16E, FIGS. 19C and 19D showing different rotational orientations of the drive shaft.
Figure 19B:
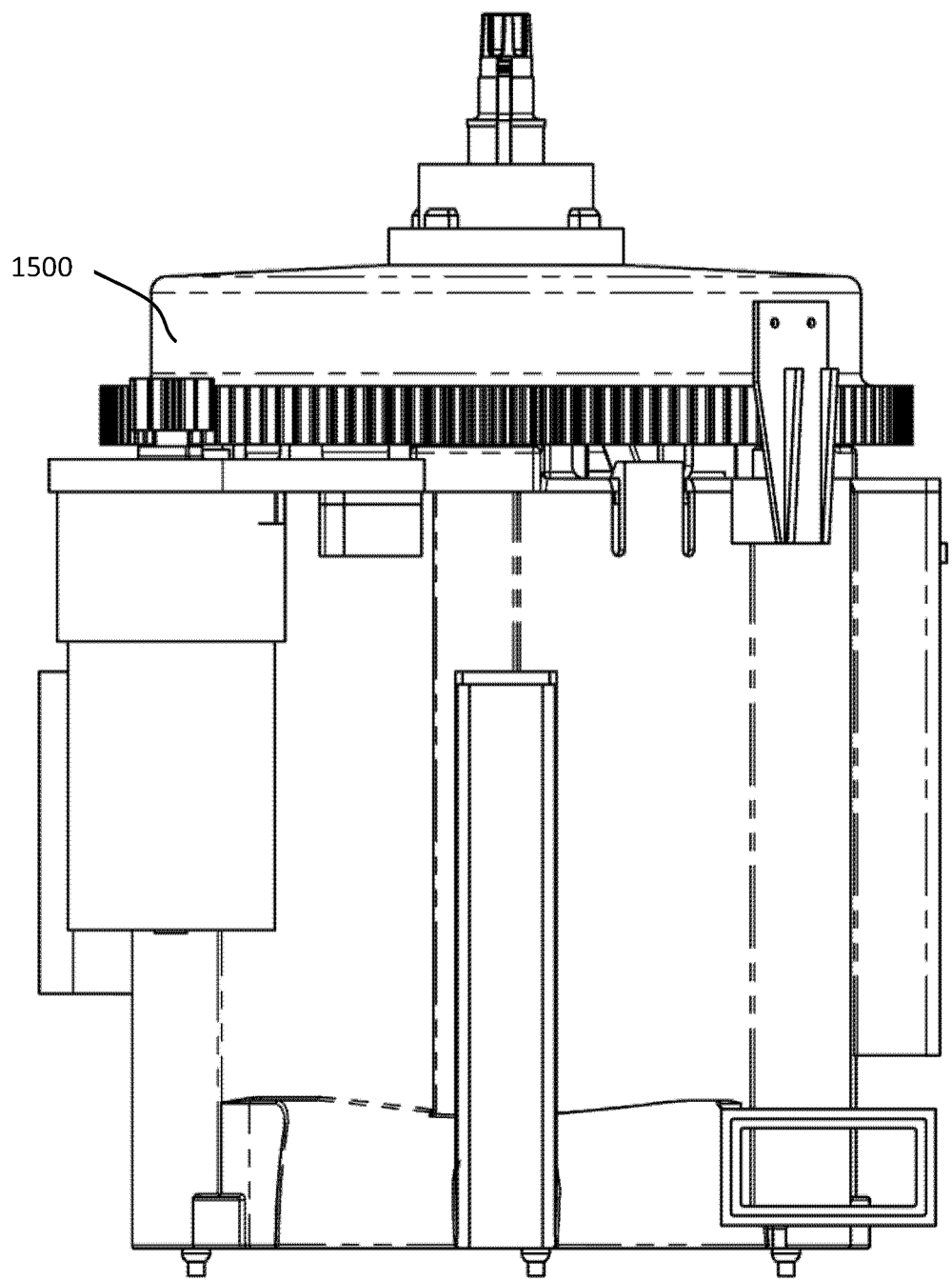
Figure 19C:
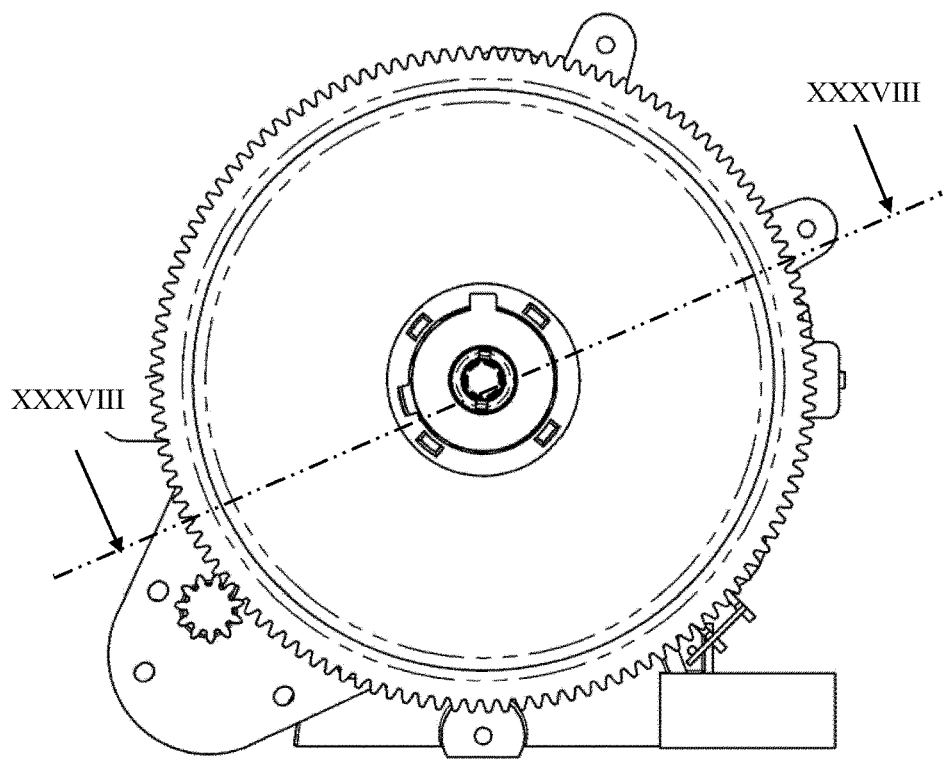
Figure 38:
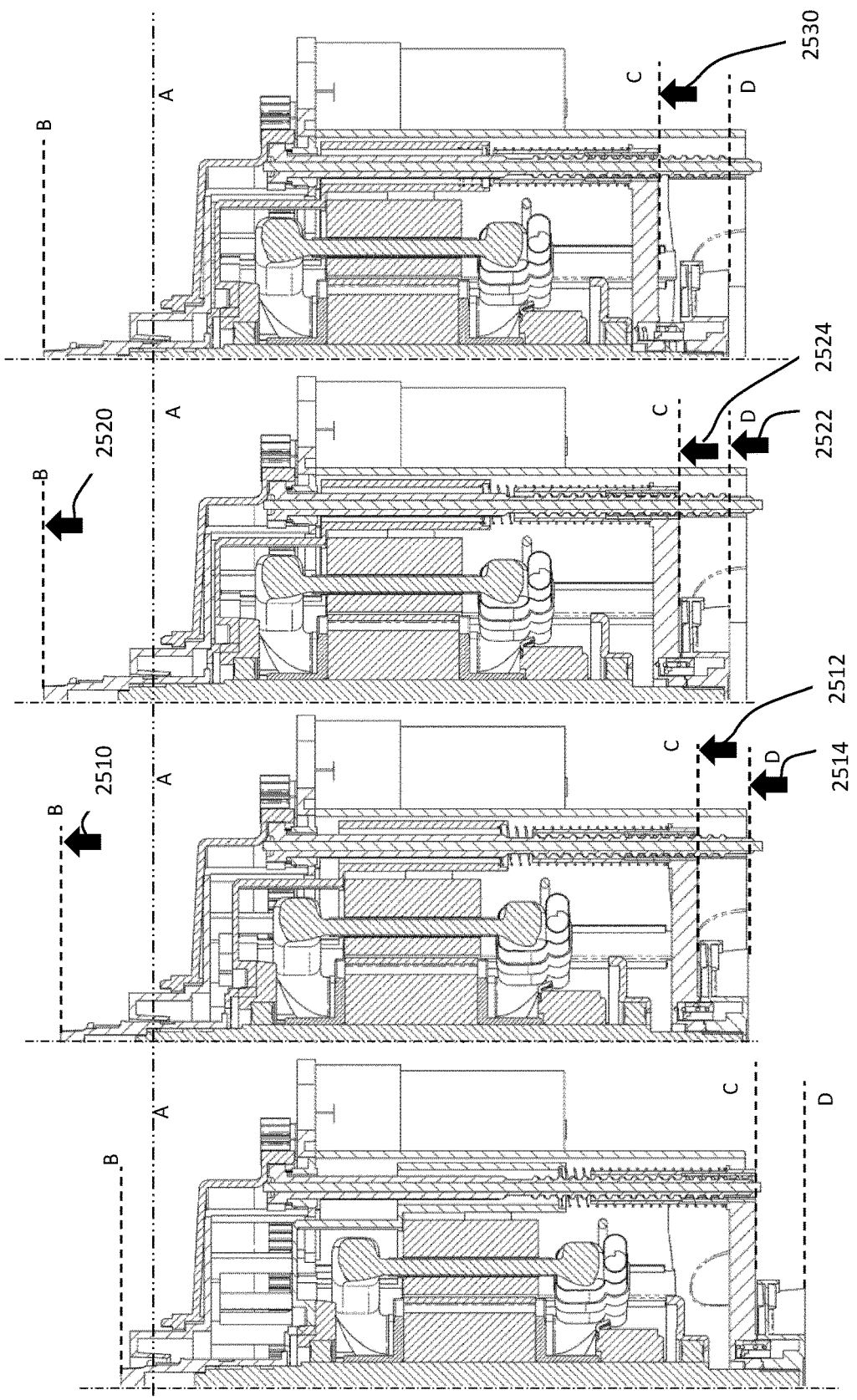
FIG. 38 is a simplified composite sectional illustration taken along a section line XXXVIII-XXXVIII in FIG. 19C illustrating various operative orientations in the operation of the vertically displacing rotary drive motor assembly of FIGS. 19A-19F.

Reference is now made to FIG. 38, which is a simplified composite sectional illustration taken along a section line XXXVIII-XXXVIII in FIG. 19C illustrating various operative orientations in the operation of the vertically displacing rotary drive motor assembly 1430 of FIGS. 19A-19F, and to FIGS. 39A, 39B, 39C and 39D, which are sectional illustrations taken along section line XXXVIII-XXXVIII in FIG. 19C, showing the vertically displacing rotary drive motor assembly in the four operative orientations represented in FIG. 38. It is appreciated that the various vertical displacements described hereinbelow are produced by the operation of spindles 1906 driven by auxiliary rotary drive motor 1520 via rotary drive gear 1500.

Figure 39A:
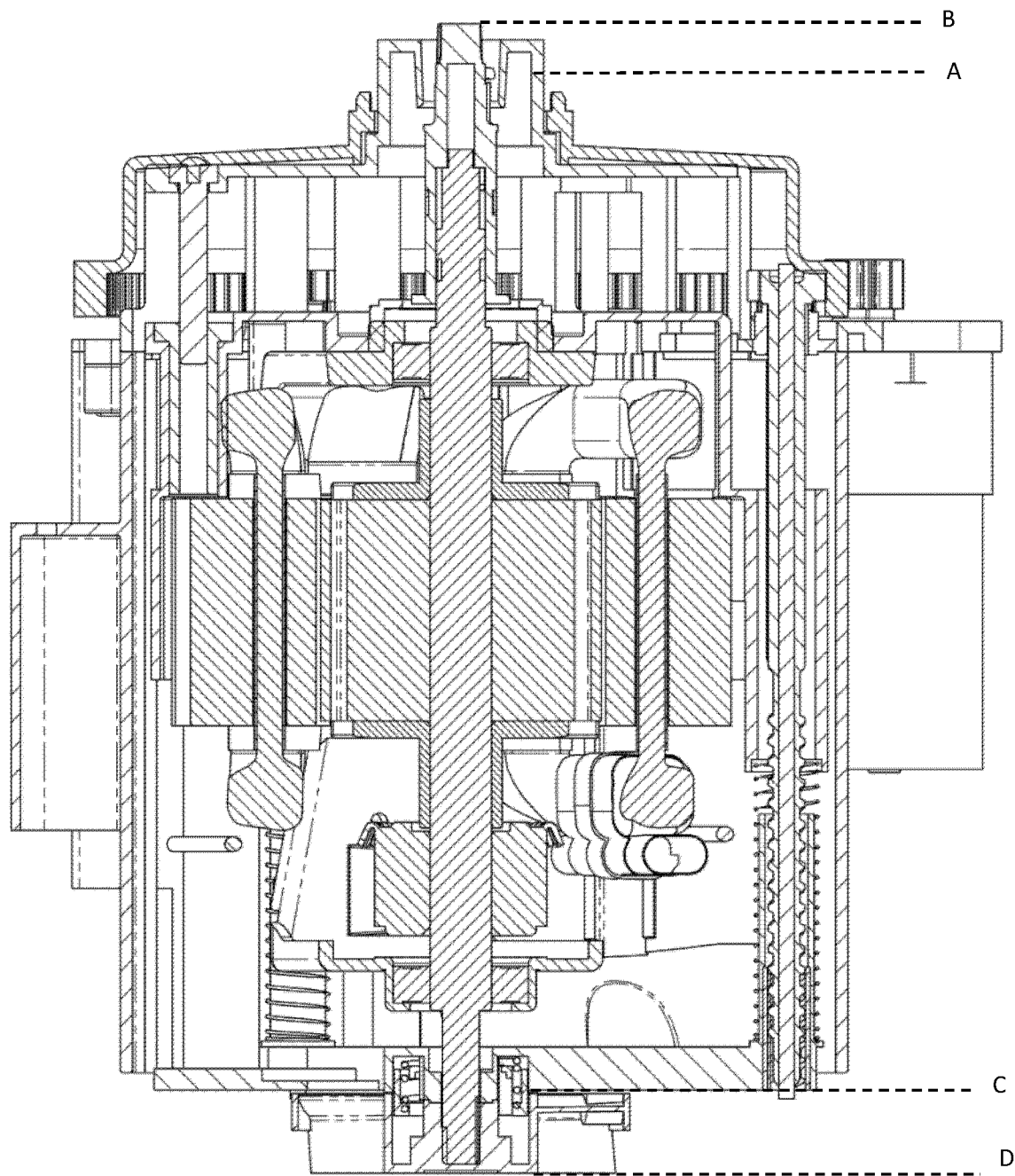
FIGS. 39A, 39B, 39C and 39D are sectional illustrations taken along section line XXXVIII-XXXVIII in FIG. 19C showing the vertically displacing rotary drive motor assembly in the four operative orientations represented in FIG. 38.

In the leftmost portion of FIG. 38, designated as I, and shown in detail in FIG. 39A, the vertically displacing rotary drive motor assembly 1430 of FIGS. 19A-19F is in its rest position. In the rest position, shown in portion I of FIG. 38, the axially displaceable rotary drive assembly 1530 is in its lowest vertical position, such that the motor lifting element 1910 is at its lowest vertical position, such that teeth 2334 of the motor lifting element 1910 operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 is in its highest vertical position, relative to motor lifting element 1910, against the urging of spring 1914.

For purposes of reference, the top surface of generally cylindrical top portion 1452 of base housing 1400 is indicated to lie in a plane designated A. The top surface of vertically splined top generally cylindrical portion 2022 of drive shaft assembly 1900 is indicated to lie in a plane designated B, parallel to plane A. The bottom surface of generally planar annular wall 2302 of motor lifting element 1910 is indicated to lie in a plane designated C, parallel to planes A and B. The bottom surface of planar, generally circular wall 2408 of linearly driven rotating ventilating element 1916 is indicated to lie in a plane designated D, parallel to planes A, B and C.

Figure 39B:
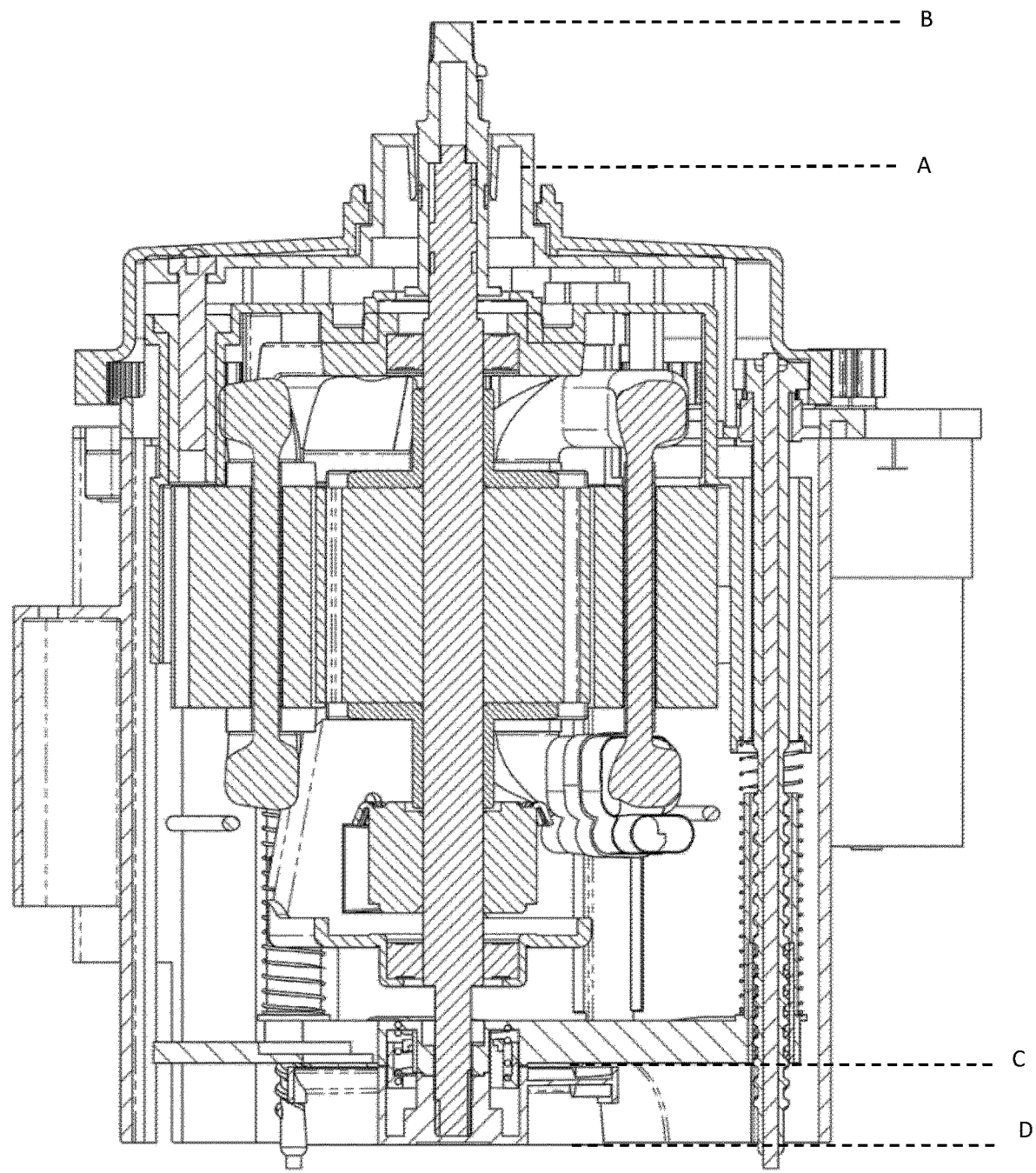

In the next to leftmost portion of FIG. 38, designated as II, and shown in detail in FIG. 39B, the vertically displacing rotary drive motor assembly 1430 of FIGS. 19A-19F is in a lower intermediate position. In the lower intermediate position, as shown in portion II of FIG. 38, the axially displaceable rotary drive assembly 1530 is in a relatively low but not lowest vertical position, such that the motor lifting element 1910 is raised from its lowest vertical position by operation of spindles 1906, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is seen that linear to rotary converting adaptor 1912 remains in its highest vertical position, relative to motor lifting element 1910, against the urging of spring 1914.

Raising of the motor lifting element 1910 provides corresponding raising of motor support bracket assembly 1902 under the urging of coil springs 1908. Inasmuch as AC motor 1904 is fixedly attached to motor support bracket assembly 1902, the AC motor 1904 is corresponding raised such that the top surface of vertically splined top generally cylindrical portion 2022 of drive shaft assembly 1900, plane B, is raised relative to plane A as indicated by an arrow 2510. It is appreciated that the bottom surface of generally planar annular wall 2302 of motor lifting element 1910 in plane C and the bottom surface of planar, generally circular wall 2408 of linearly driven rotating ventilating element 1916 in plane D are also raised relative to plane A as indicated by arrows 2512 and 2514, respectively, to a vertical extent generally identical to the raising of plane B relative to plane A.

Figure 39C:
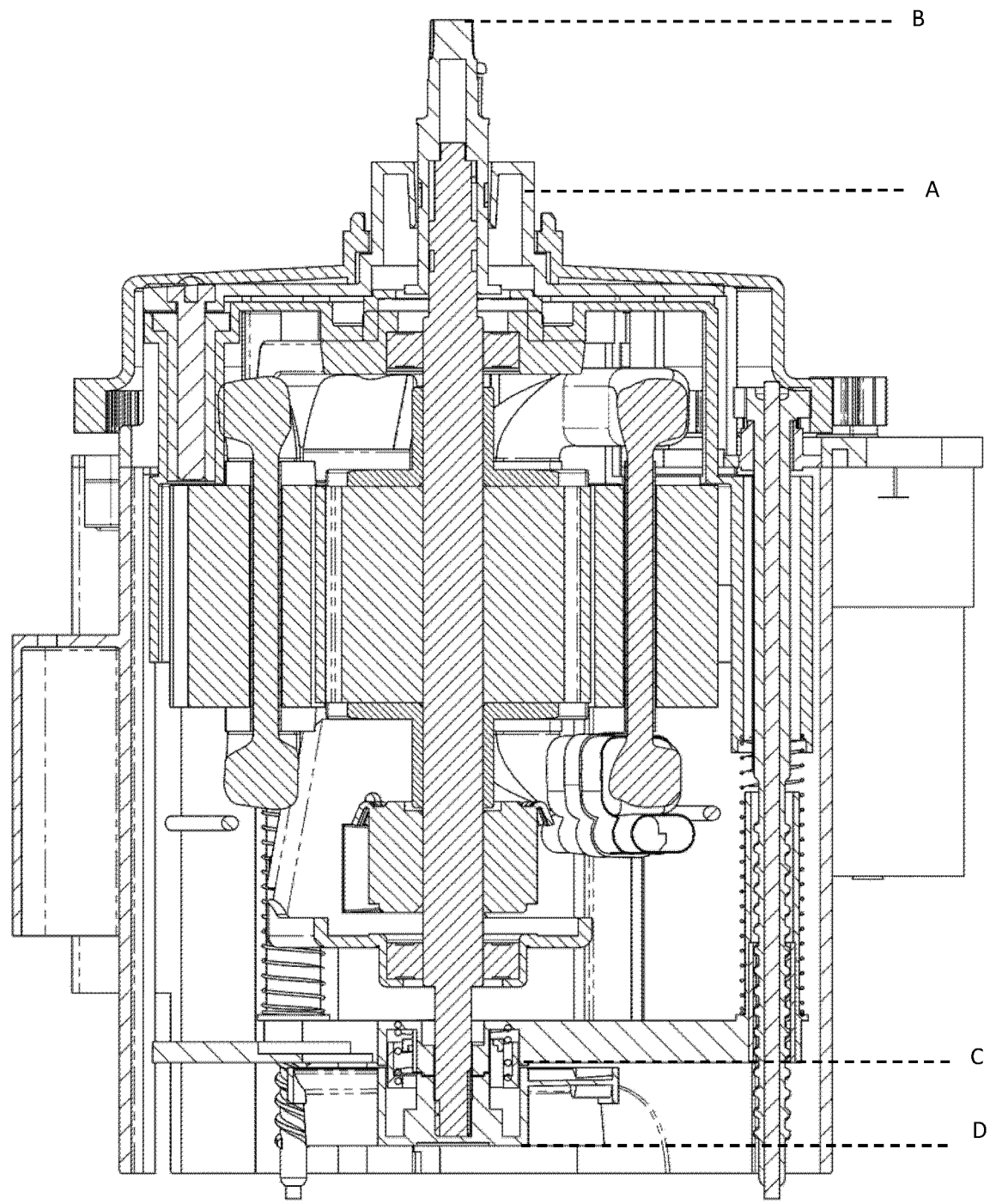

In the next to rightmost portion of FIG. 38, designated as III, and shown in detail in FIG. 39C, the vertically displacing rotary drive motor assembly 1430 of FIGS. 19A-19F is in an upper intermediate position. In the upper intermediate position, as shown in portion III of FIG. 38, the motor support bracket assembly 1902 is at its highest position. The motor lifting element 1910 of axially displaceable rotary drive assembly 1530 is in a relatively high but not highest vertical position.

It is seen that linear to rotary converting adaptor 1912 remains in its highest vertical position, relative to motor lifting element 1910, against the urging of spring 1914.

Inasmuch as AC motor 1904 is fixedly attached to motor support bracket assembly 1902, the AC motor 1904 is corresponding raised such that the top surface of vertically splined top generally cylindrical portion 2022 of drive shaft assembly 1900, plane B, is raised to its highest position relative to plane A as indicated by an arrow 2520. Accordingly the linearly driven rotating ventilating element 1916 is in its highest position, while teeth 2334 of the motor lifting element 1910 still operatively engage corresponding teeth 2444 of linearly driven rotating ventilating element 1916 such that inclined surfaces 2336 of teeth 2334 slidingly engage corresponding inclined surfaces 2446 of teeth 2444.

It is appreciated that in the operative orientation shown at III, planes B, C and D have been raised further upwardly relative to plane A and relative to their positions indicated at II. Specifically, the top surface of vertically splined top generally cylindrical portion 2022 of drive shaft assembly 1900, plane B, is shifted at its maximum vertical position relative to plane A and the bottom surface of planar, generally circular wall 2408 of linearly driven rotating ventilating element 1916 in plane D is also shifted to its maximum vertical position relative to plane A as indicated by an arrow 2522. Plane C is upwardly shifted relative to plane A as indicated by an arrow 2524 but is not at its maximum vertical position relative to plane A.

Figure 39D:
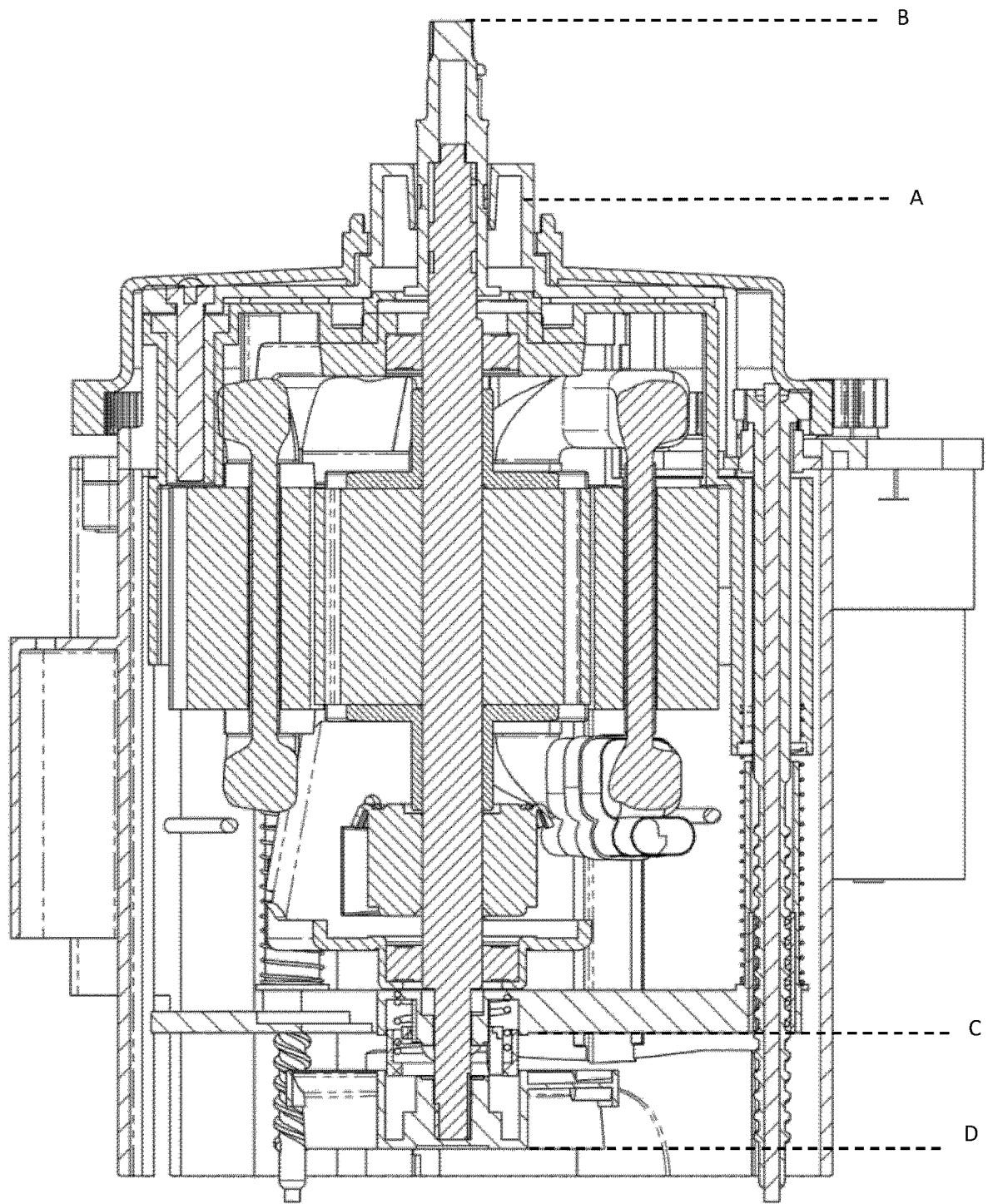

In the right most portion of FIG. 38, designated as IV, and shown in detail in FIG. 39D, the vertically displacing rotary drive motor assembly 1430 of FIGS. 19A-19F is in its highest vertical position. In this position, shown in portion IV of FIG. 38, the motor support bracket assembly 1902 remains at its highest position. The motor lifting element 1910 of axially displaceable rotary drive assembly 1530 is raised to its highest vertical position.

It is seen that linear to rotary converting adaptor 1912 is lowered relative to motor lifting element 1910, under the urging of spring 1914.

The top surface of vertically splined top generally cylindrical portion 2022 of drive shaft assembly 1900, plane B, remains at its highest position relative to plane A. The linearly driven rotating ventilating element 1916 remains in its highest position, however, the raising of the motor lifting element 1910 relative thereto causes disengagement of teeth 2334 of the motor lifting element 1910 from corresponding teeth 2444 of linearly driven rotating ventilating element 1916, allowing rotation of the linearly driven rotating ventilating element 1916 relative to the motor lifting element 1910.

It is appreciated that in the operative orientation shown at IV, plane C has been raised further upwardly relative to plane A as indicated by an arrow 2530 and relative to its position indicated at III. Specifically, the bottom surface of generally planar annular wall 2302 of motor lifting element 1910 in plane C is upwardly shifted relative to plane A as indicated by arrow 2530 to its maximum vertical position relative to plane A.

Figure 40A:
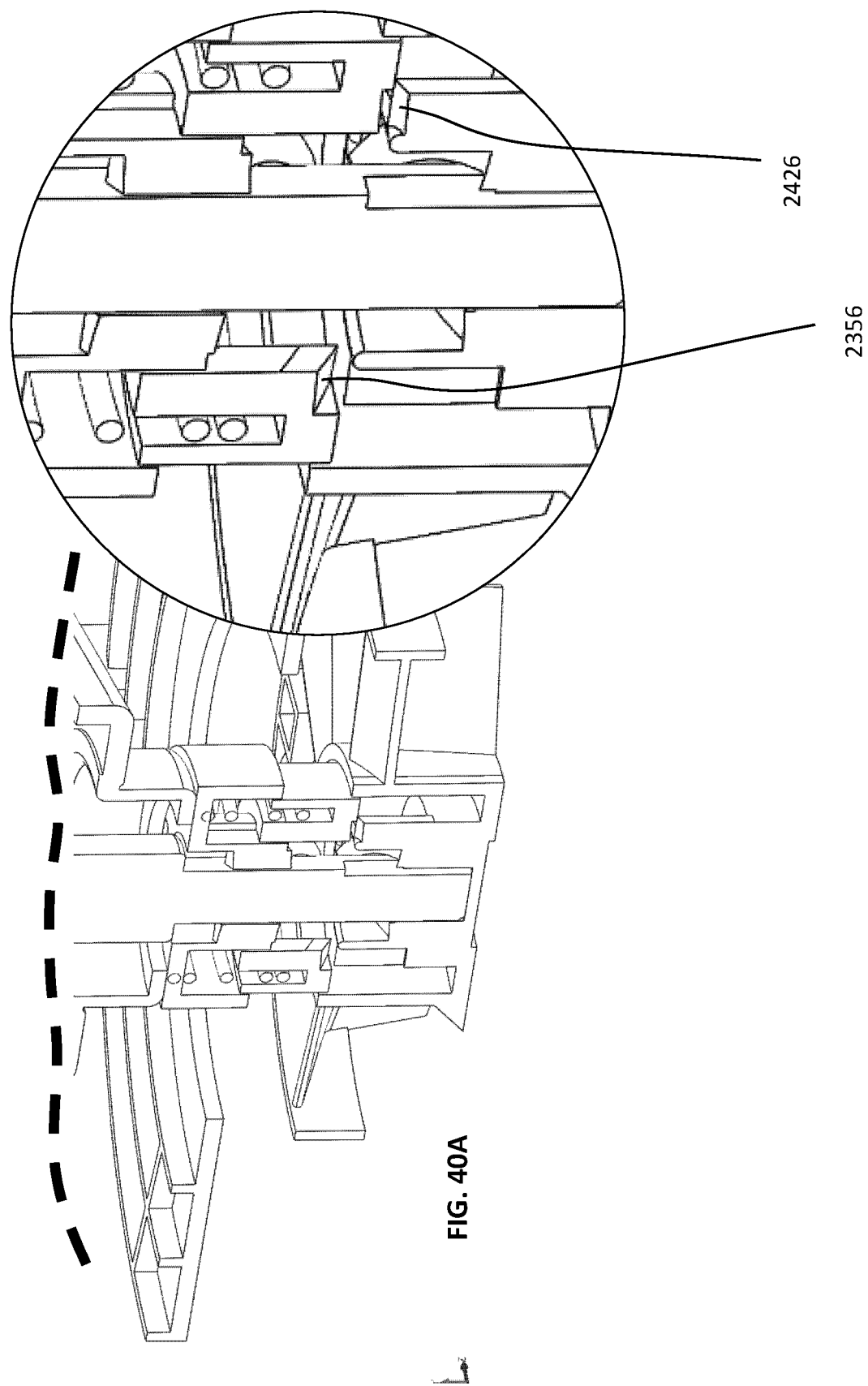
Figure 40B:
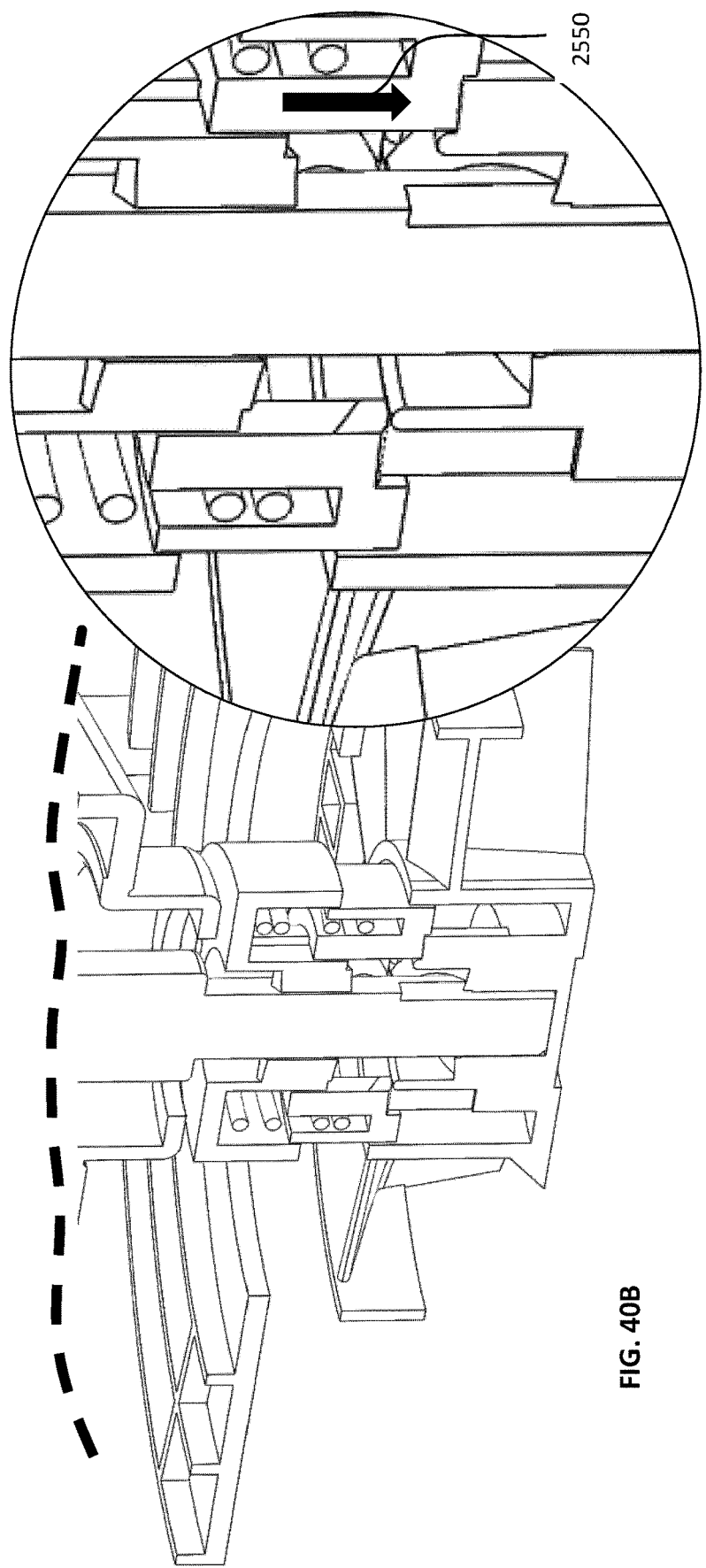
Figure 40C:
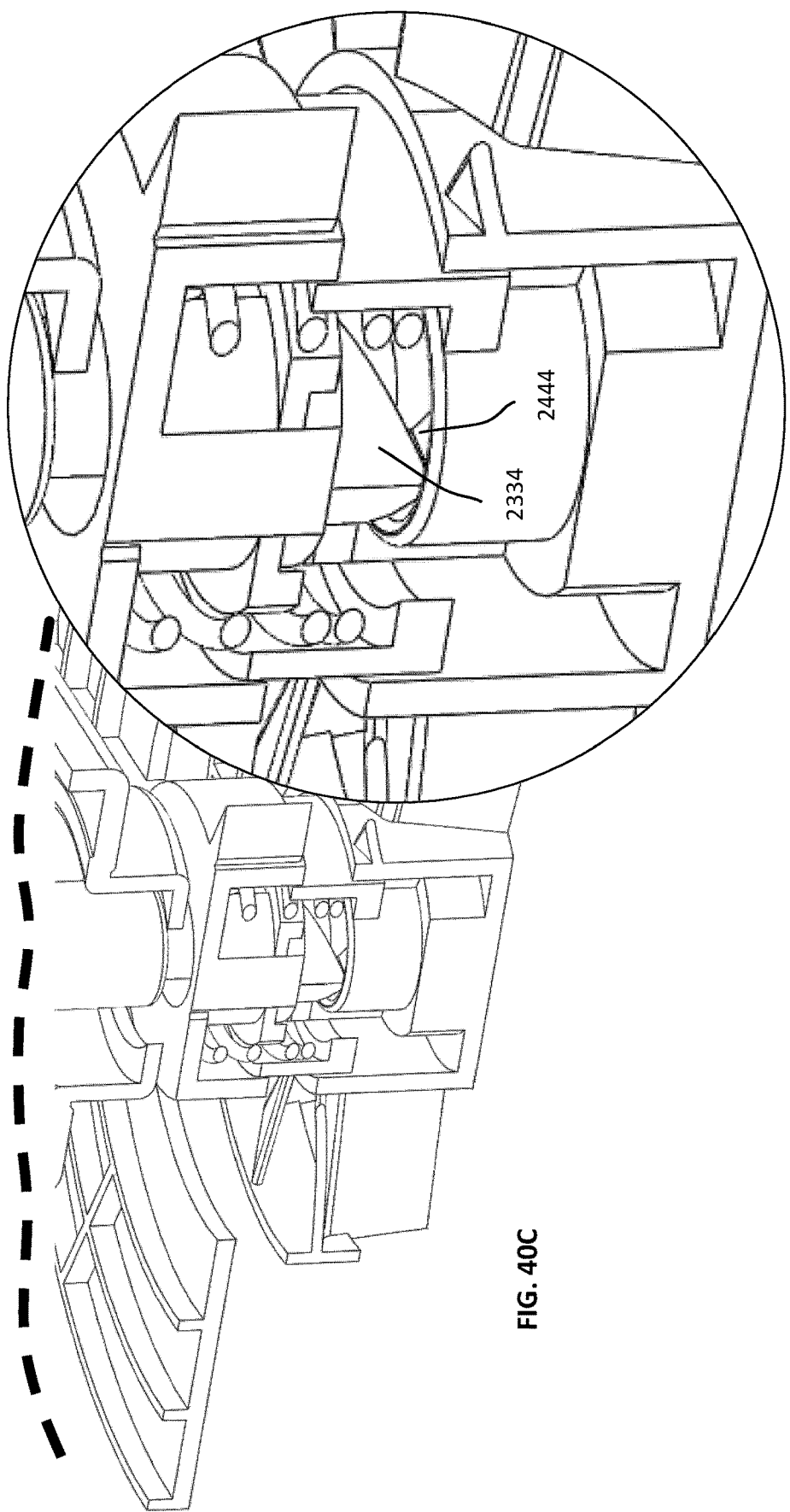
Figure 40D:
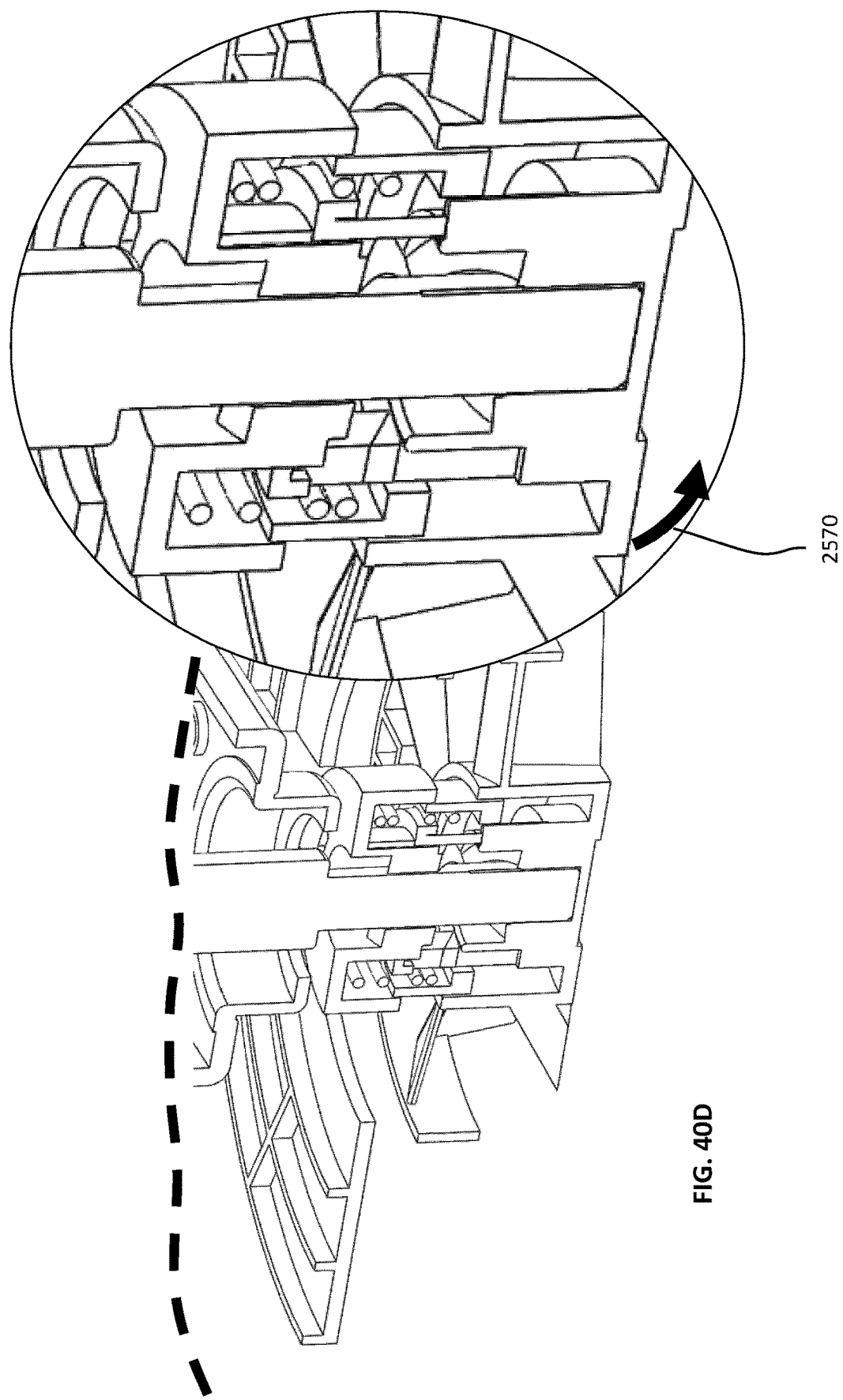

Reference is now made to FIGS. 40A-40G, which are sectional illustrations showing part of the vertically displacing rotary drive motor assembly 1430 seen in FIGS. 39A-39D in six operative orientations which occur following operation of blade element 160, as the vertically displacing rotary drive motor assembly 1430 shifts from operative orientation IV of FIGS. 38 and 39D back to operative orientation III of FIGS. 38 and 39C. FIGS. 40C and 40D show the same operative orientation from different points of view.

FIG. 40A shows an operative orientation of axially displaceable rotary drive assembly 1530 at a stage corresponding to operative orientation IV of FIGS. 38 and 39D in which the relative rotational orientations of linear to rotary converting adaptor 1912 and linearly driven rotating ventilating element 1916 are such that inclined downward facing end surfaces 2356 of linear to rotary converting adaptor 1912 nearly engage corresponding inclined upward surfaces 2426 of linearly driven rotating ventilating element 1916.

FIG. 40B shows an operative orientation of axially displaceable rotary drive assembly 1530 in which the motor lifting element 1910 and the linear to rotary converting adaptor 1912 is shifted downward, as indicated by an arrow 2550, and in which the relative rotational orientations of linear to rotary converting adaptor 1912 and linearly driven rotating ventilating element 1916 are such that inclined downward facing end surfaces 2356 of linear to rotary converting adaptor 1912 engage corresponding inclined upward surfaces 2426 of linearly driven rotating ventilating element 1916.

Figure 40E:
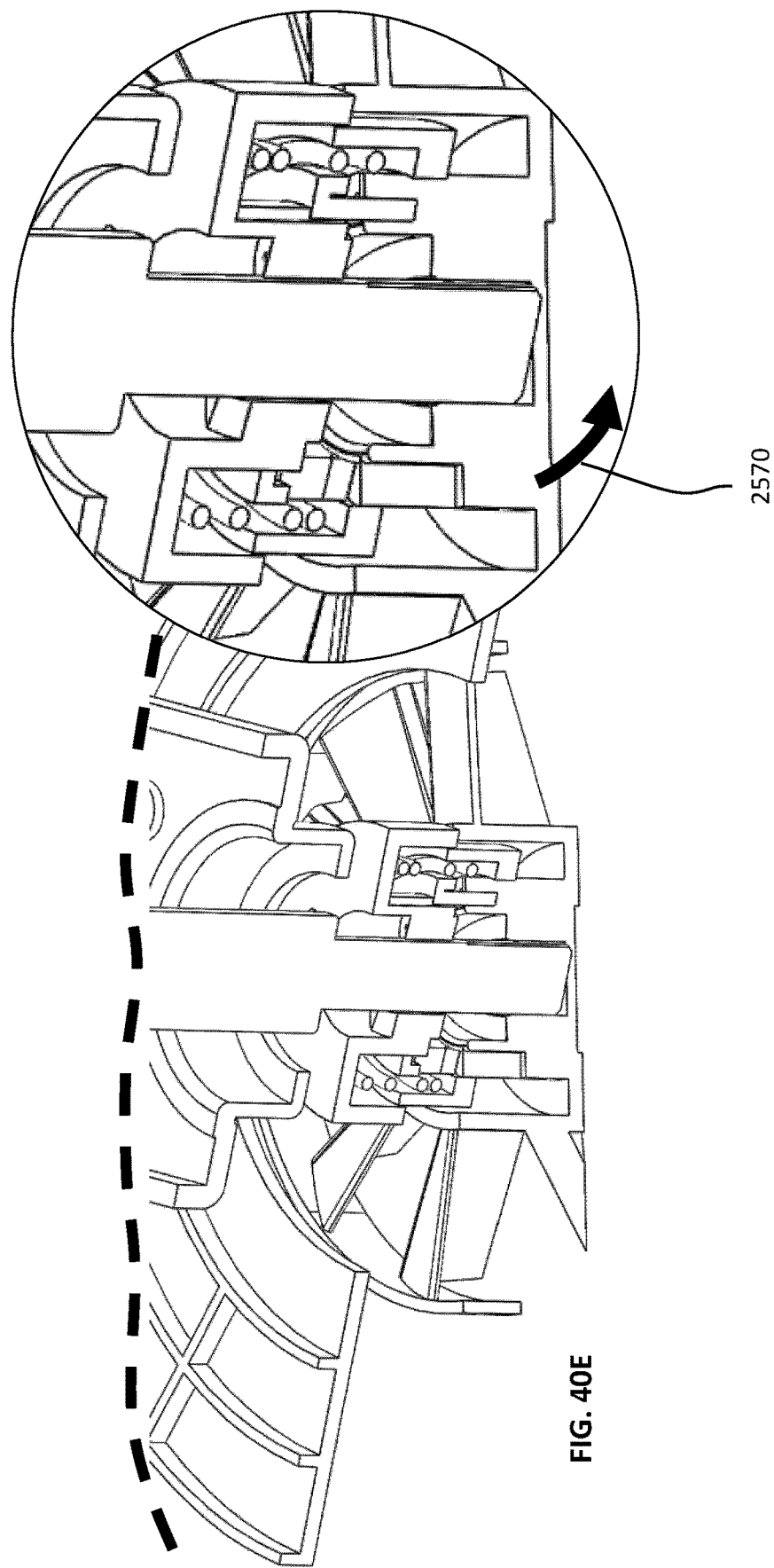

FIGS. 40C and 40D show an operative orientation of linearly driven rotating ventilating element 1916 so as to rotatably reposition the teeth 2444 of the linearly driven rotating ventilating element 1916, as indicated by an arrow 2570, in FIG. 40E so that they are about to engage the corresponding teeth 2334 of motor lifting element 1910.

FIG. 40D illustrates the interference between surfaces 2356 and 2426 which produce the rotation indicated by arrow 2570 in FIG. 40E.

FIG. 40F shows an operative orientation of axially displaceable rotary drive assembly 1530 in which the motor lifting element 1910 and the linear to rotary converting adaptor 1912 are shifted still further downward relative to linearly driven rotating ventilating element 1916 as indicated by an arrow 2580 and in which the relative rotational orientation of linear to rotary converting adaptor 1912 and linearly driven rotating ventilating element 1916 is changed as indicated by an arrow 2590 such that inclined downward facing end surfaces 2356 of linear to rotary converting adaptor 1912 lie alongside corresponding inclined upward surfaces 2426 of linearly driven rotating ventilating element 1916 and no longer interfere with engagement of teeth 2334 of motor lifting element 1910 and teeth 2444 of linearly driven rotating ventilating element 1916.

Figure 40G:
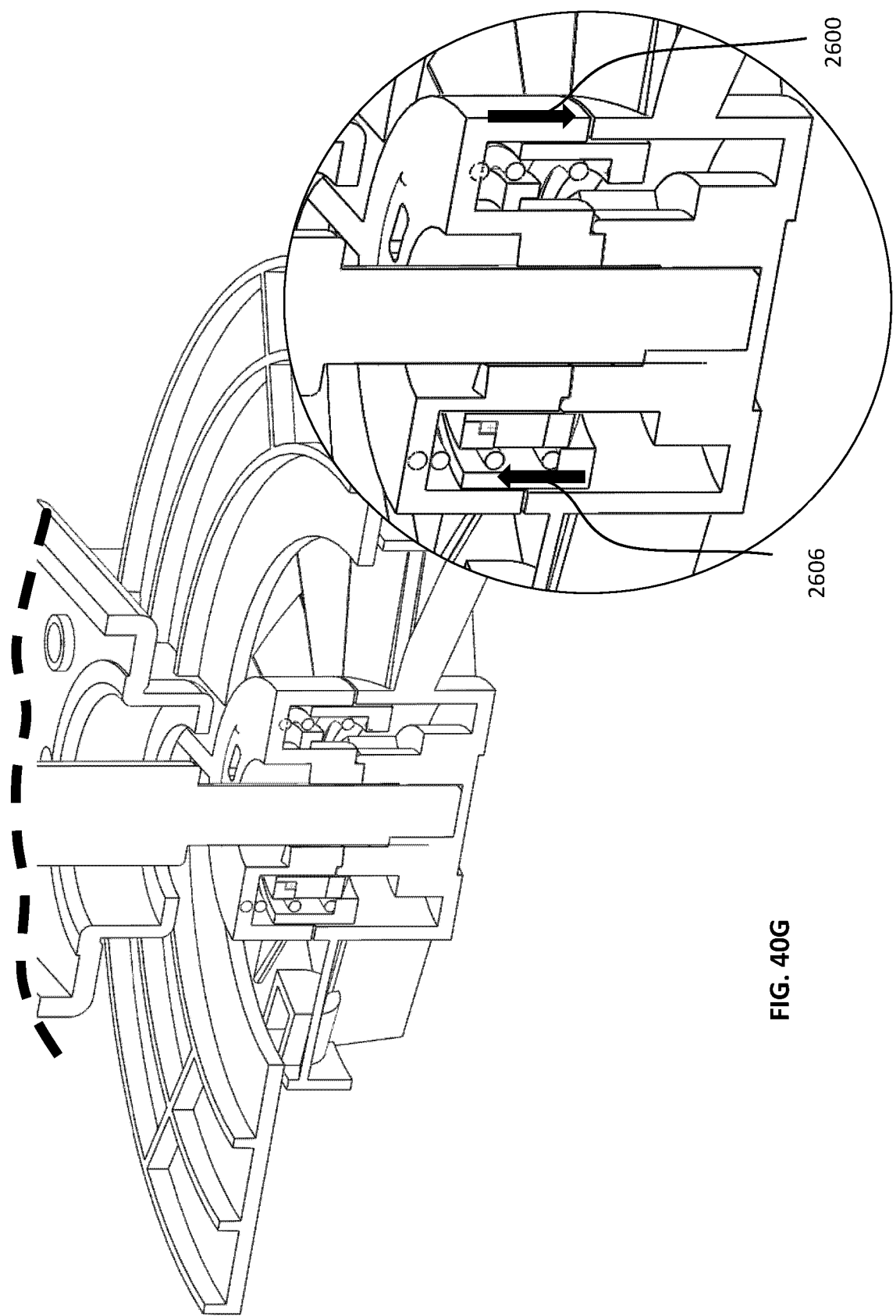

FIG. 40G shows an operative orientation of axially displaceable rotary drive assembly 1530 in which the motor lifting element 1910 is shifted still further downward relative to linearly driven rotating ventilating element 1916 as indicated by an arrow 2600 and teeth 2334 of motor lifting element 1910 drivingly engage teeth 2444 of linearly driven rotating ventilating element 1916. In this operative orientation, the linear to rotary converting adaptor 1912 is shifted upwardly, as indicated by an arrow 2602 against the urging of spring 1914.

Figure 19D:
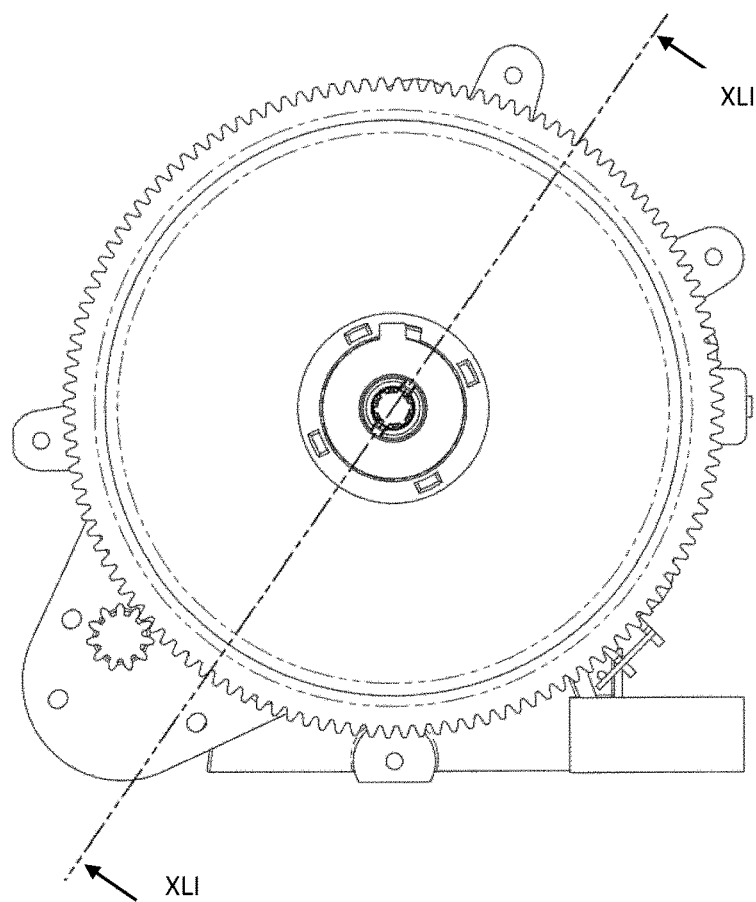
Figure 19E:
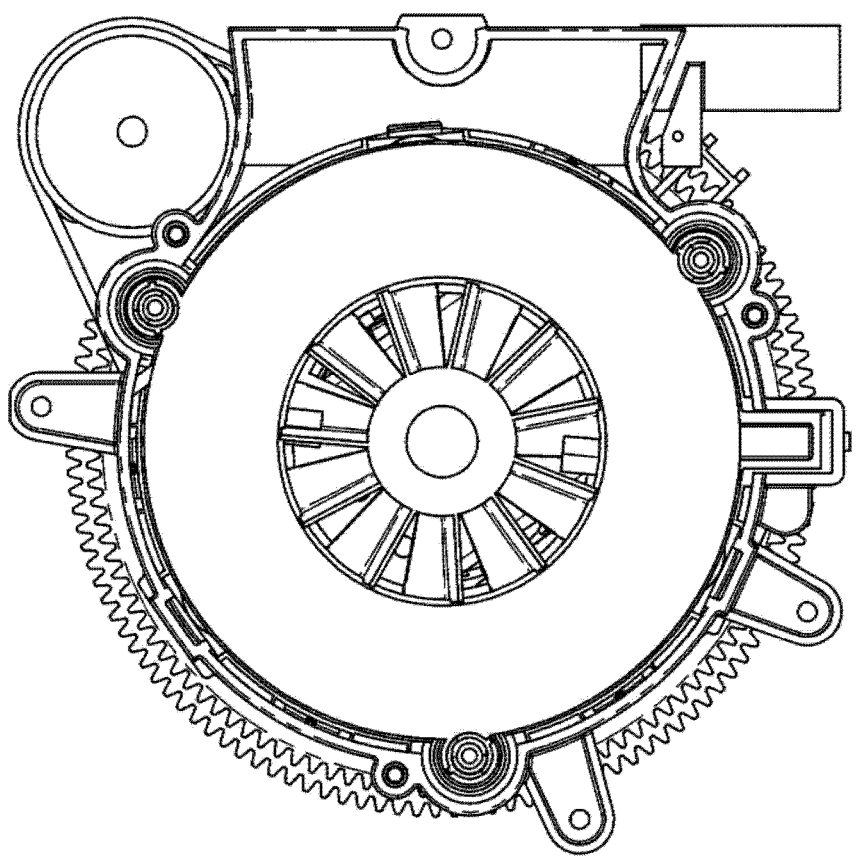
Figure 19F:
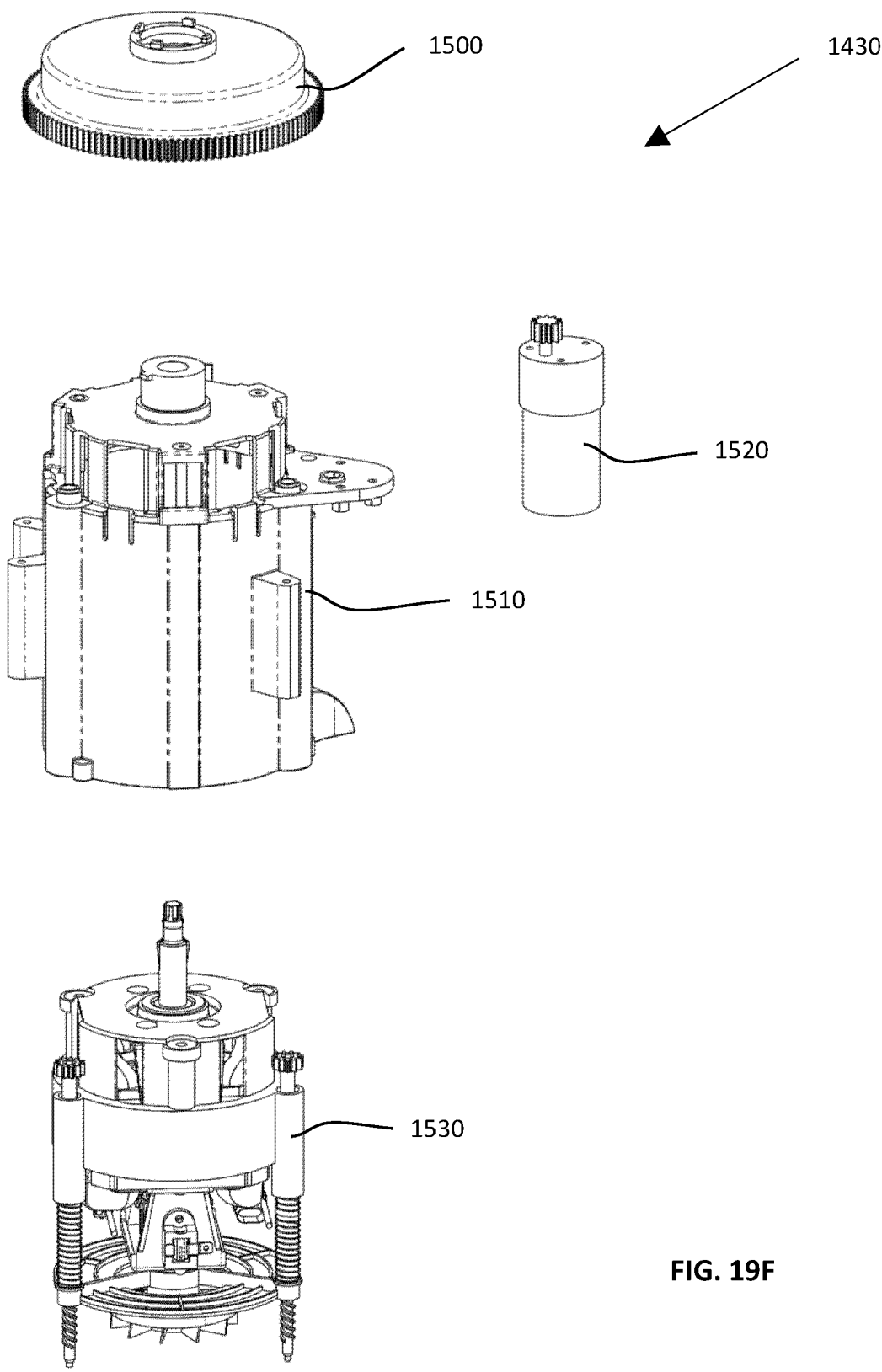
Figure 41A:
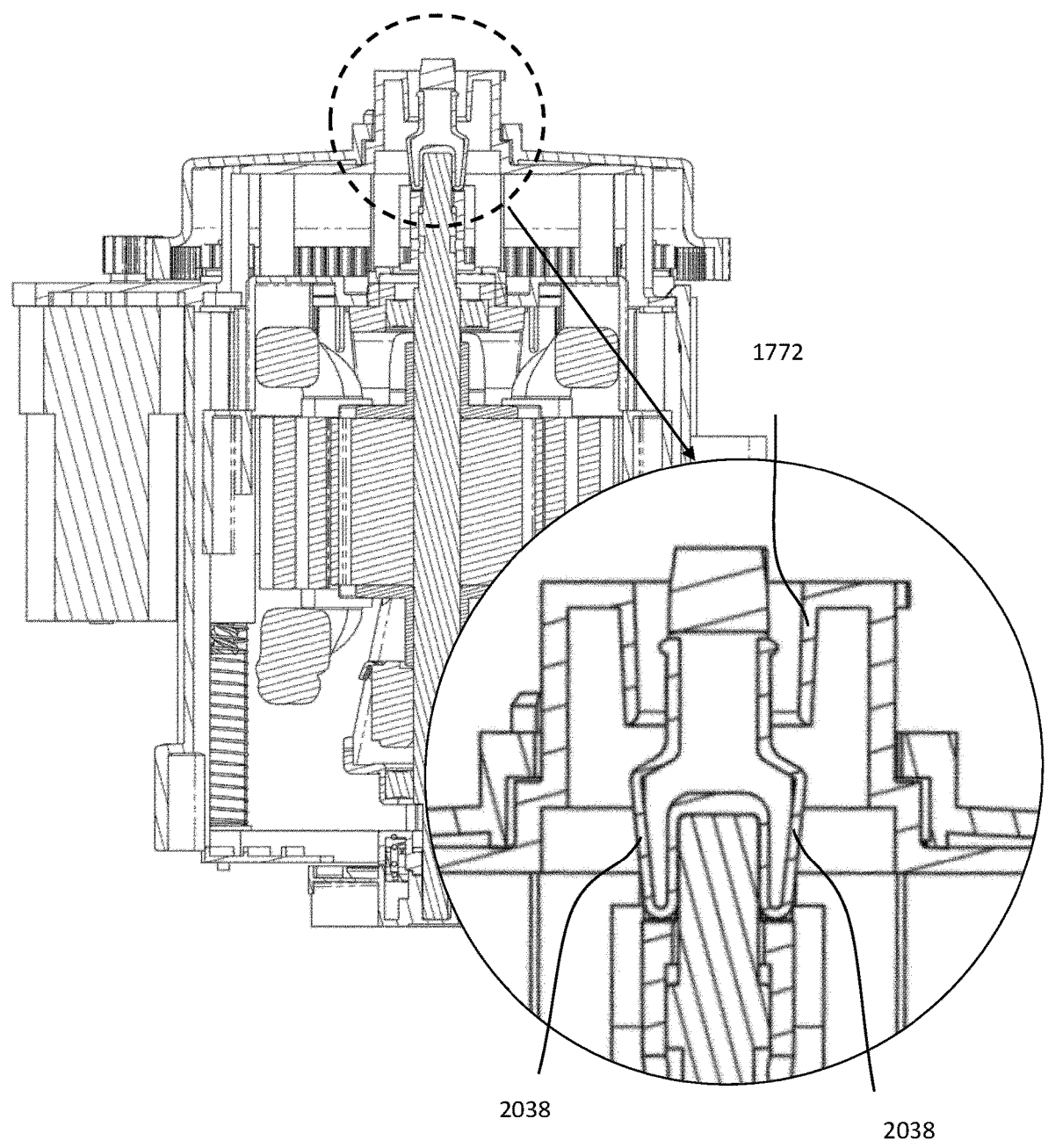
FIGS. 41A, 41B and 41C are sectional illustrations taken along section line XLI-XLI in FIG. 19D showing part of the vertically displacing rotary drive motor assembly in three operative orientations.
Figure 41B:
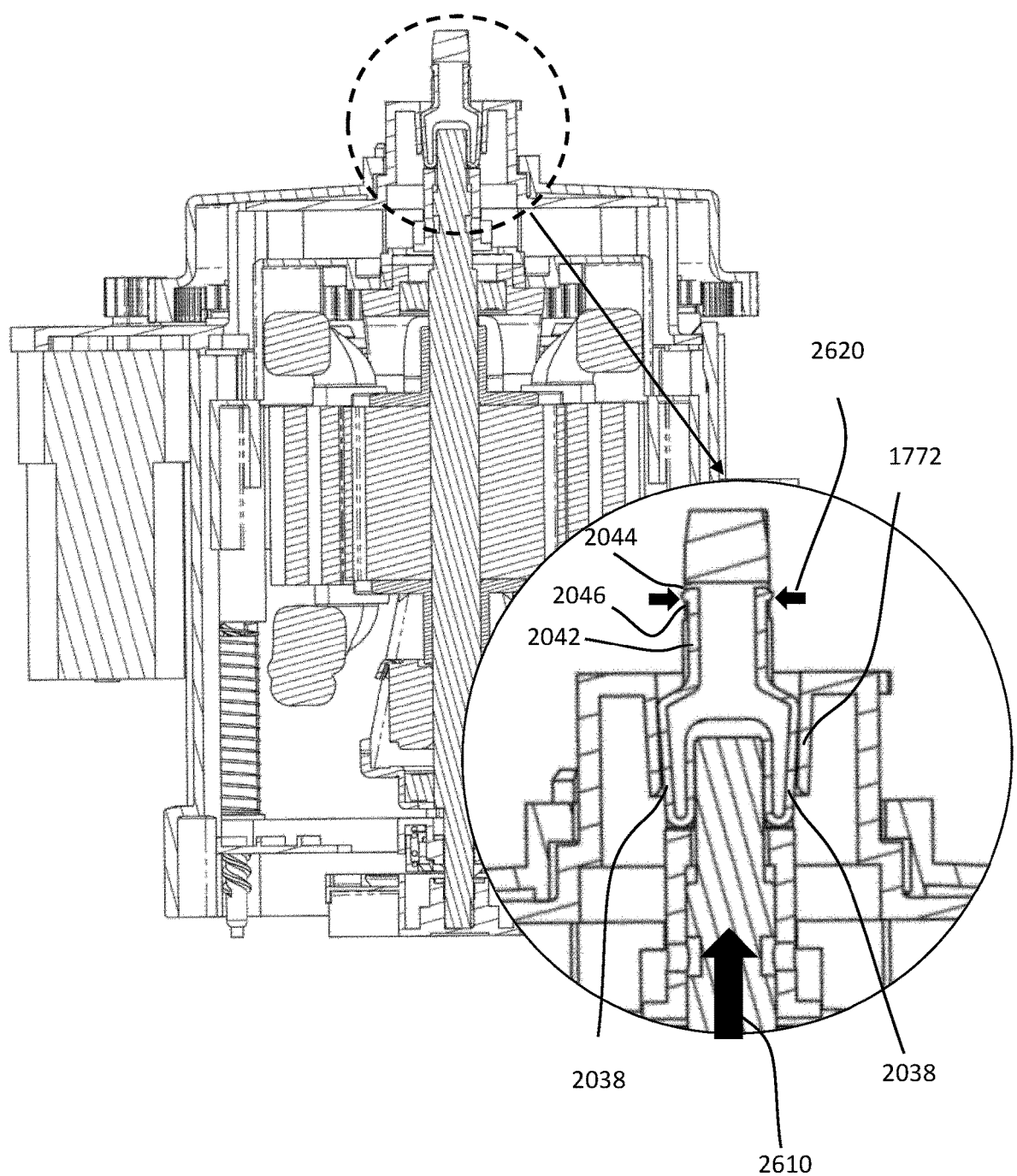
Figure 41C:
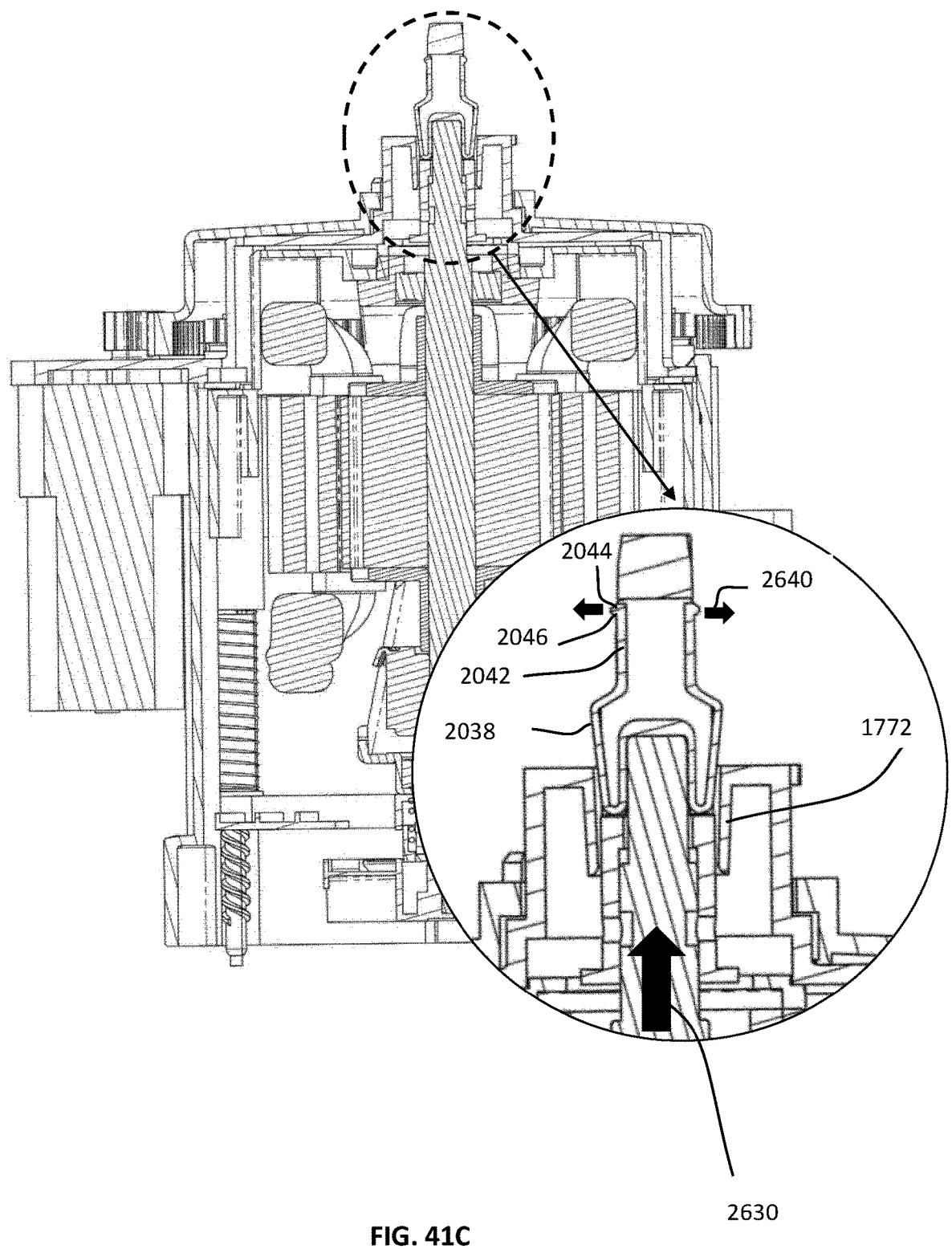

Reference is now made to FIGS. 41A, 41B and 41C, which are sectional illustrations taken along section line XLI-XLI in FIG. 19D showing part of the vertically displacing rotary drive motor assembly in three operative orientations.

FIG. 41A illustrates an additional aspect of the operative orientation indicated at I in FIGS. 38 and 39A and shows outer drive shaft locking engagement element 2002 in its lowest operative orientation at rest.

FIG. 41B shows upward vertical displacement of drive shaft locking engagement element 2002, as indicated by an arrow 2610 such that slightly outwardly tapered upwardly extending portions 2038 comes into engagement with an inner cylindrical surface of circumferential wall 1772 of top element 1650, thus forcing upstanding top portions 2042, each having at a top edge 2044 thereof an outwardly extending protrusion portion 2046 towards each other as indicated by arrows 2620 into an operative orientation allowing the drive shaft assembly to be able to engage blade element 160.

FIG. 41C shows further upward vertical displacement of drive shaft locking element 2002, as indicated by an arrow 2630, such that slightly outwardly tapered upwardly extending portions 2038 come out of engagement with the inner cylindrical surface of circumferential wall 1772 of top element 1650, thus enabling upstanding top portions 2042, each having at a top edge 2044 thereof an outwardly extending protrusion portion 2046 to spring back away from each other as indicated by arrows 2640 into an operative orientation wherein the drive shaft assembly 1900 is linearly locked to blade element 160 against vertical separation thereof.

Figure 42A:
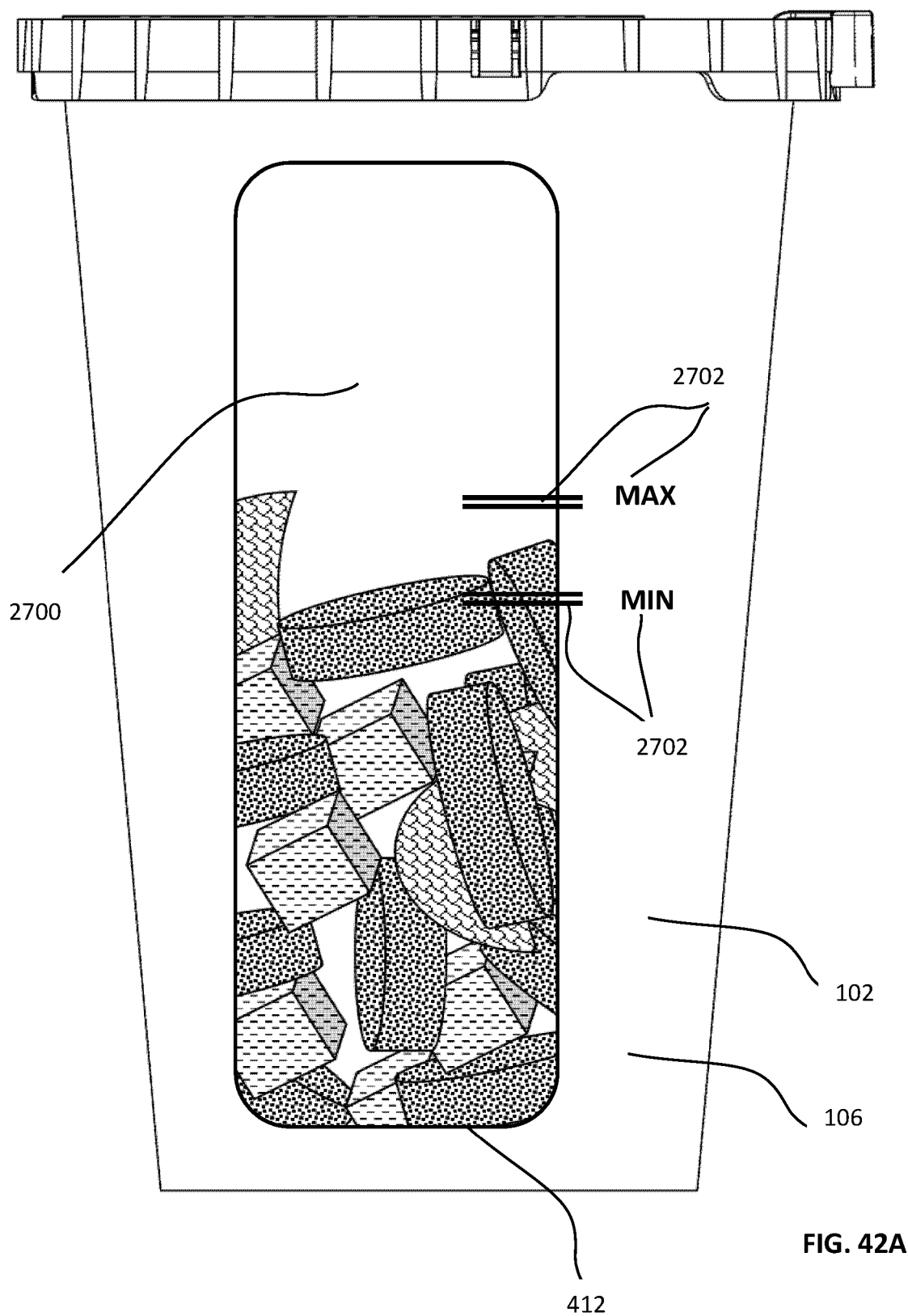
FIGS. 42A and 42B are simplified respective planar side and central cross-sectional illustrations of the SUPCA of FIGS. 1A-9B filled with a frozen food product.
Figure 42B:
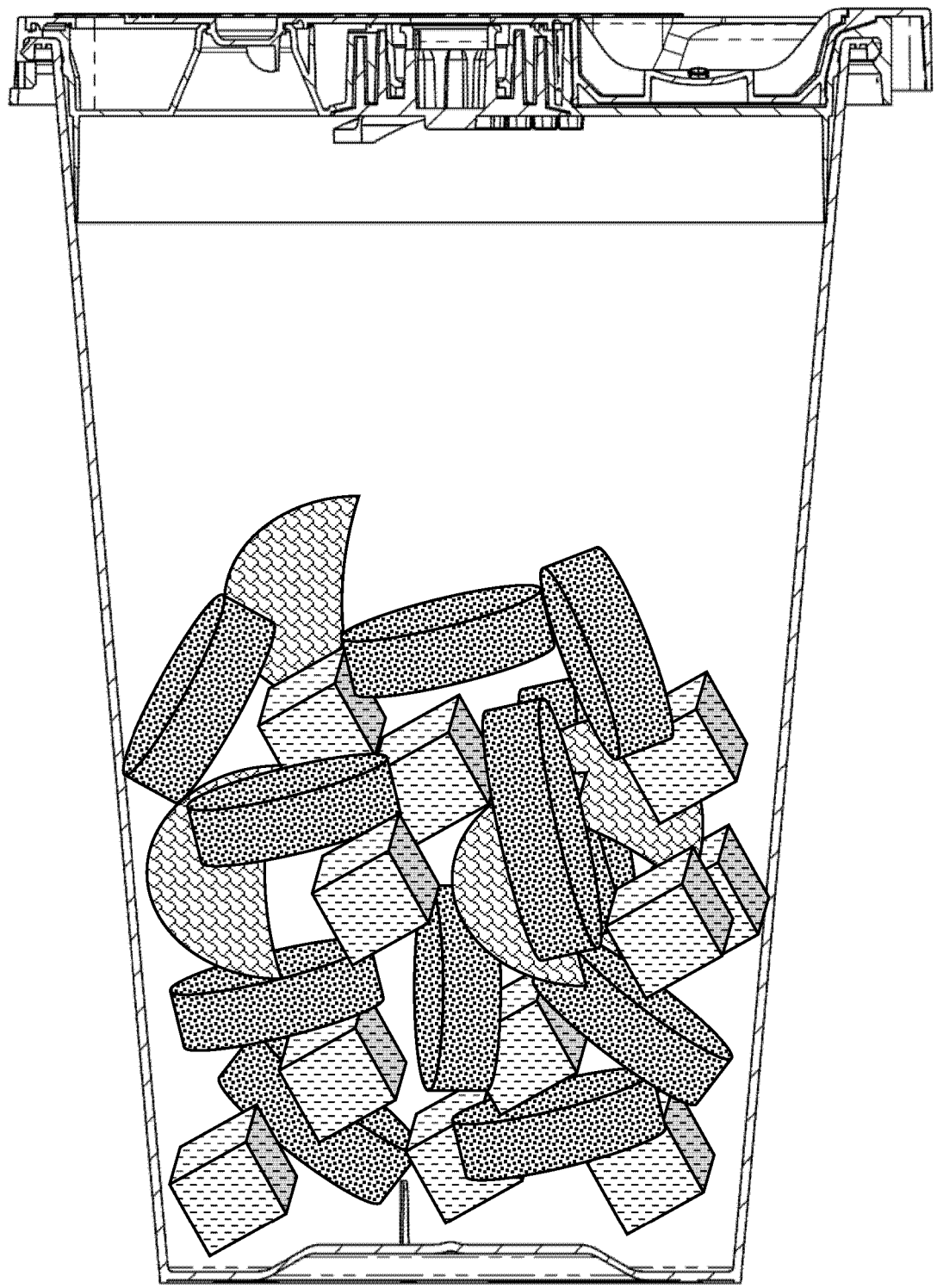
Figure 43A:
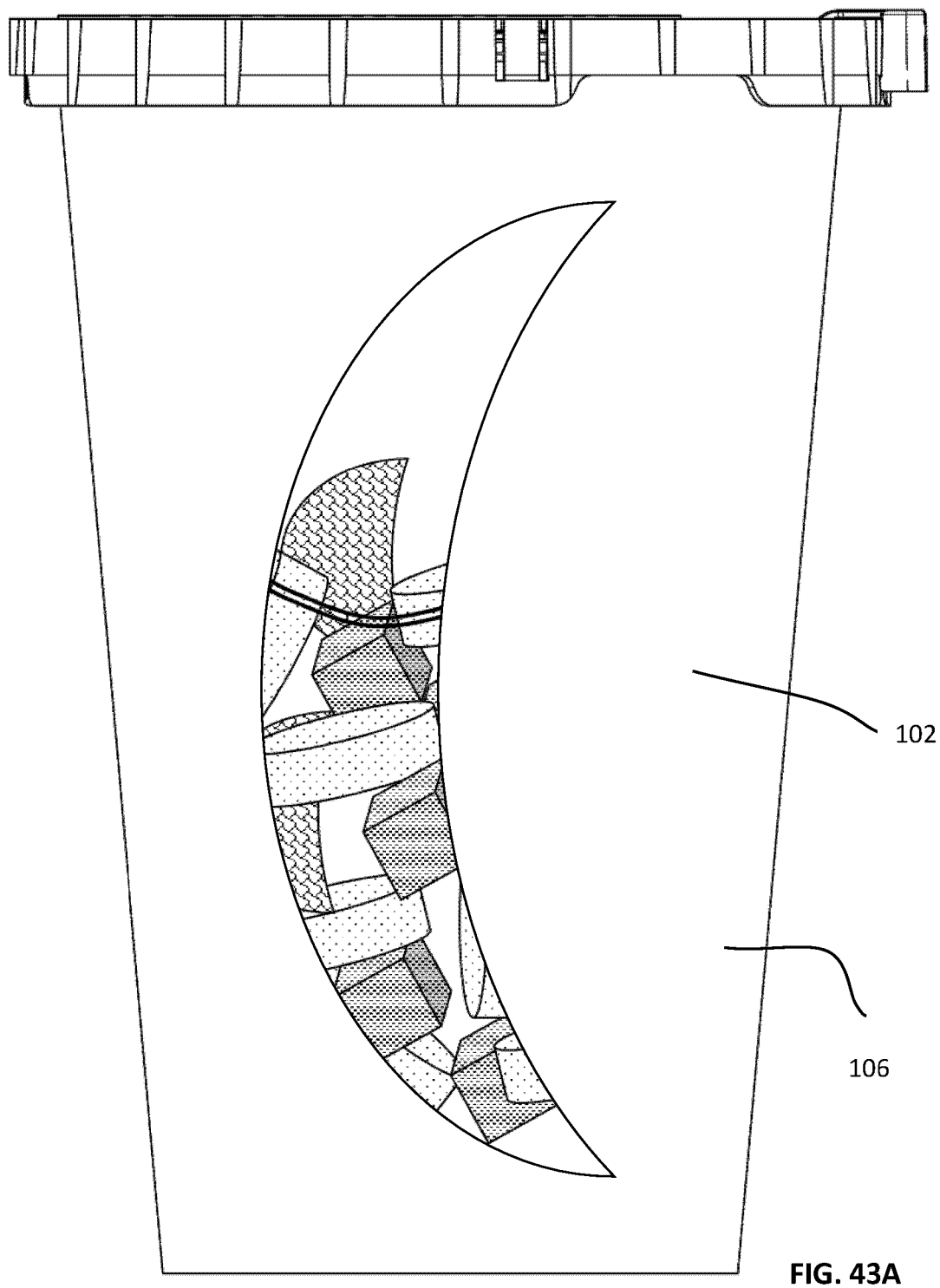
FIGS. 43A and 43B are respective simplified planar side and central cross-sectional illustrations of the SUPCA of FIGS. 1A-9B filled with a non-frozen food product.
Figure 43B:
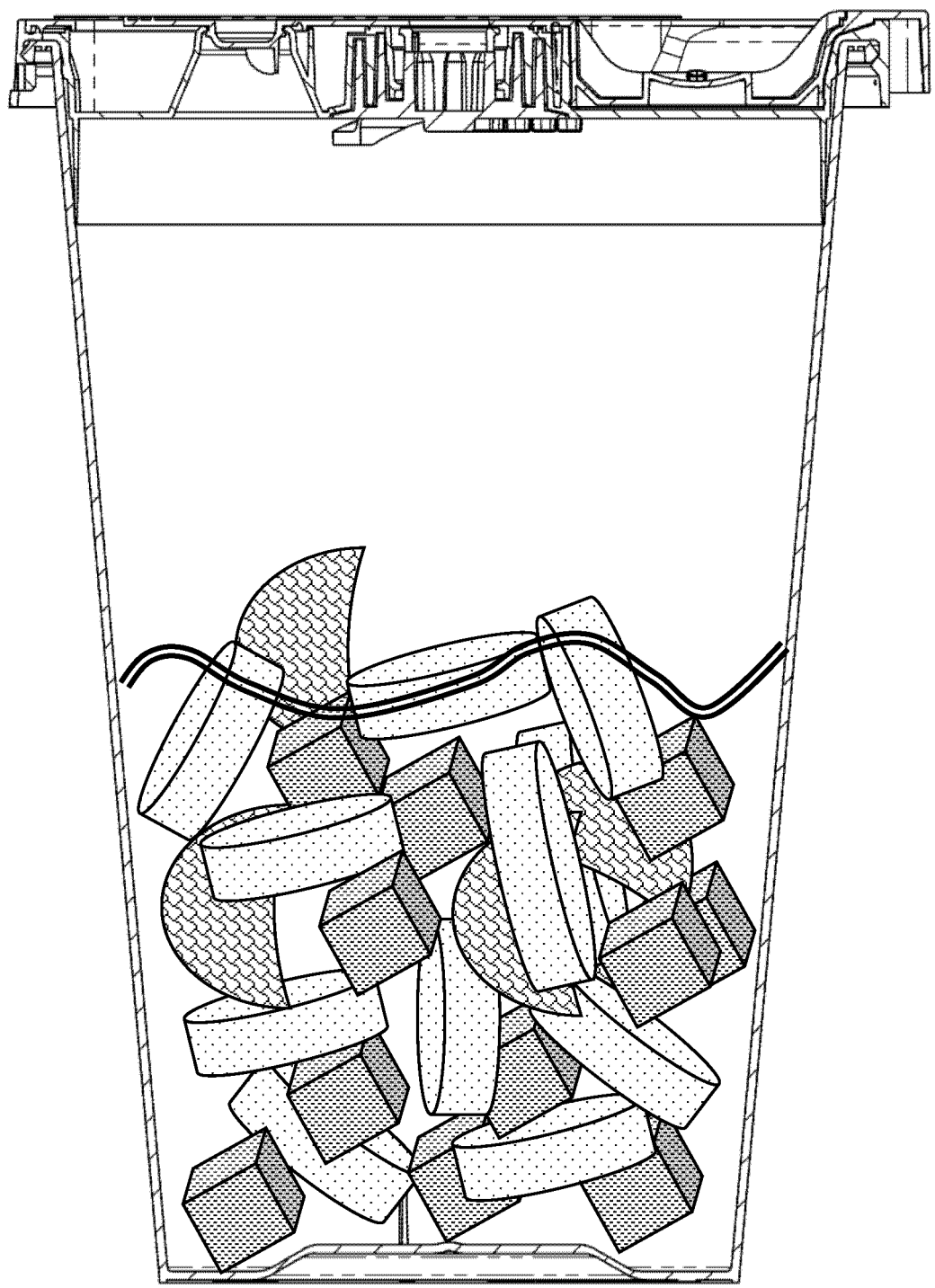

Reference is now made to FIGS. 42A and 42B, which are simplified respective planar side and central cross-sectional illustrations of the SUPCA 100 of FIGS. 1A-9B filled with a frozen food product, and to FIGS. 43A and 43B, which are respective simplified planar side and central cross-sectional illustrations of the SUPCA 100 of FIGS. 1A-9B filled with a non-frozen food product. The description that follows relates to use of the SUPCA 100 and the MMIDD 1000 with a food product, it being appreciated that SUPCA 100 and MMIDD 1000 are not limited to applications to food products although use thereof with food products is a preferred use.

As seen in FIGS. 42A & 42B, preferably the single use container body 102 includes on wall 106 thereof a transparent or translucent window, 2700, which enables a food product contained therein and a liquid level to be seen. As seen in FIG. 42A, the container body 102 preferably includes markings 2702 preferably indicating minimum and maximum fill levels to be reached when adding liquid thereto. As seen in FIG. 43A, when the container body 102 includes a non-frozen food product, normally no liquid filling is required and no markings are provided. Alternatively, even in the case of FIG. 43A, when the container body 102 includes a non-frozen food product, additional liquid may be added and markings 2702 such as those in FIG. 42A may be provided.

It is a particular feature of the present invention that normally, the SUPCA 100 is received by the user with SUCSERDREA 120 attached thereto and intact, such that tabs 214 are in the relatively radially inward orientation seen in enlargement A of FIG. 5A, indicating that SUCSERDREA 120 has not been disengaged from container body 102. Should SUCSERDREA 120 have been earlier disengaged from container body 102 or should SUPCA 100 have earlier been processed by MMIDD 1000, tabs 214 are in the relatively radially outward orientation seen in enlargement B of FIG. 5A, providing a visible and a machine sensible indication of prior use or tampering, which prevents subsequent processing thereof by MMIDD 1000.

Figure 44A:
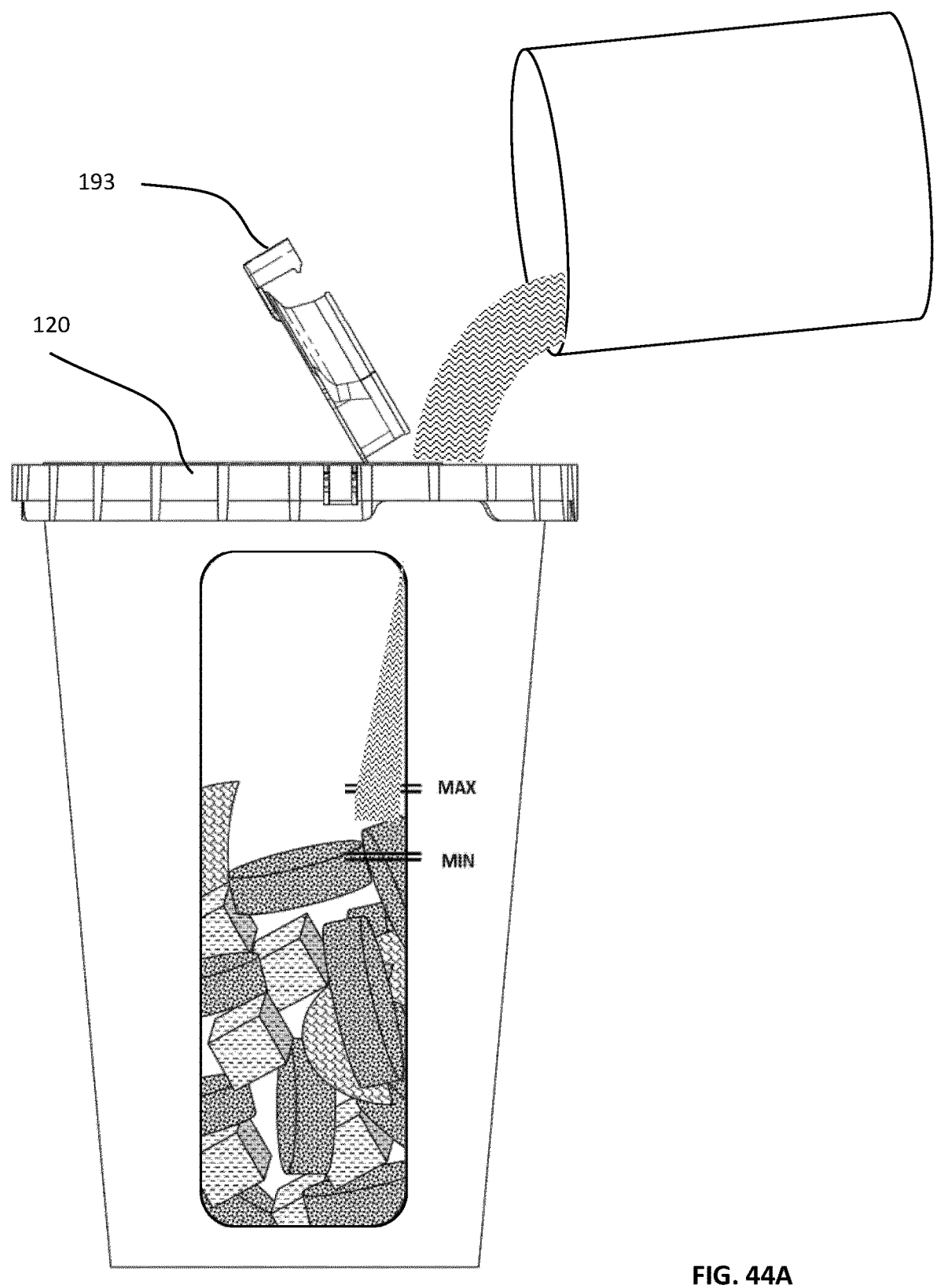
FIGS. 44A and 44B are simplified respective planar side and sectional illustrations of the SUPCA filled with a frozen food product of FIGS. 42A & 42B wherein liquid is being added to the frozen food product via a resealable opening in the SUCSERDREA of FIGS. 2A-3B.
Figure 44B:
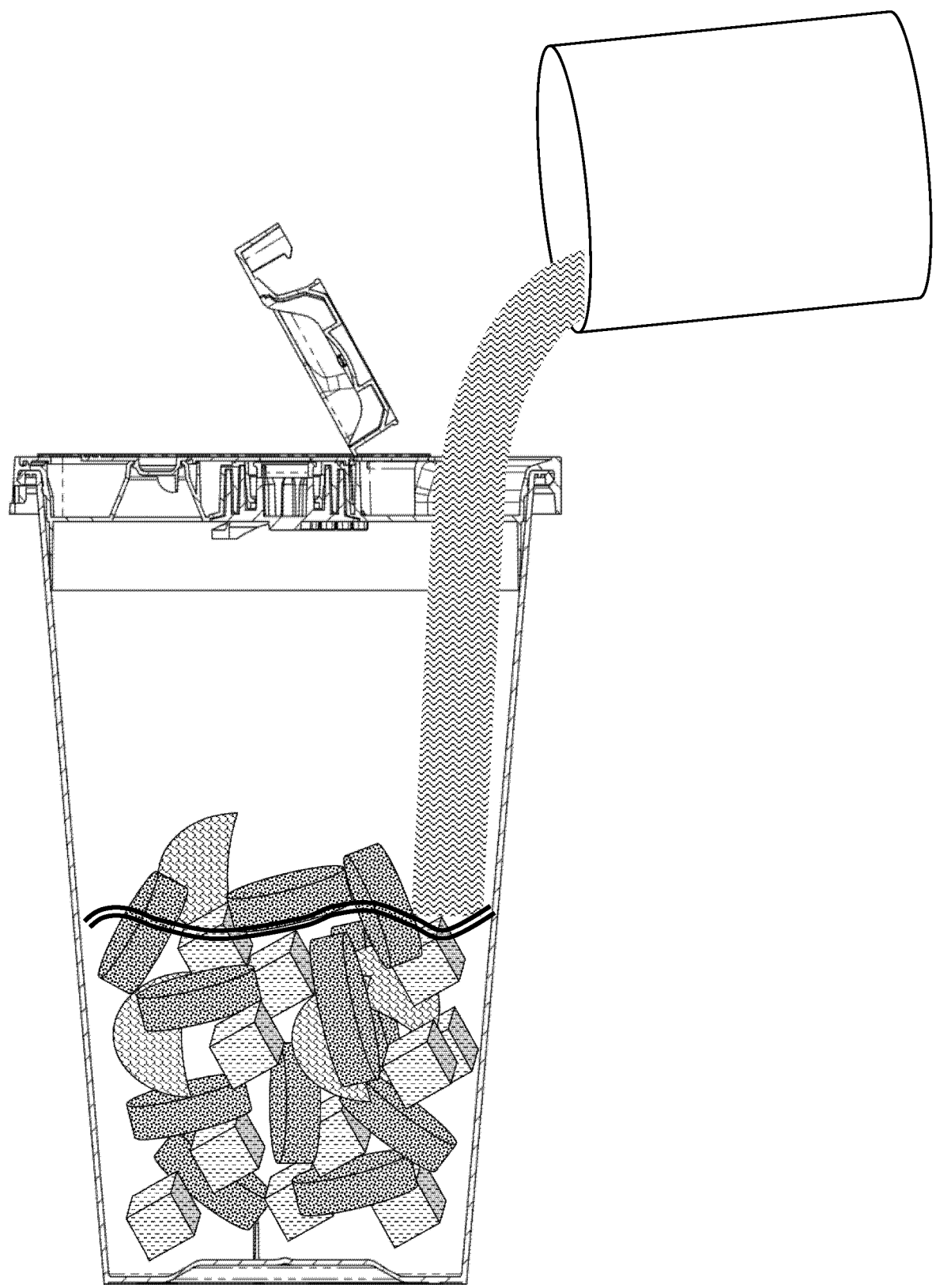
Figure 45A:
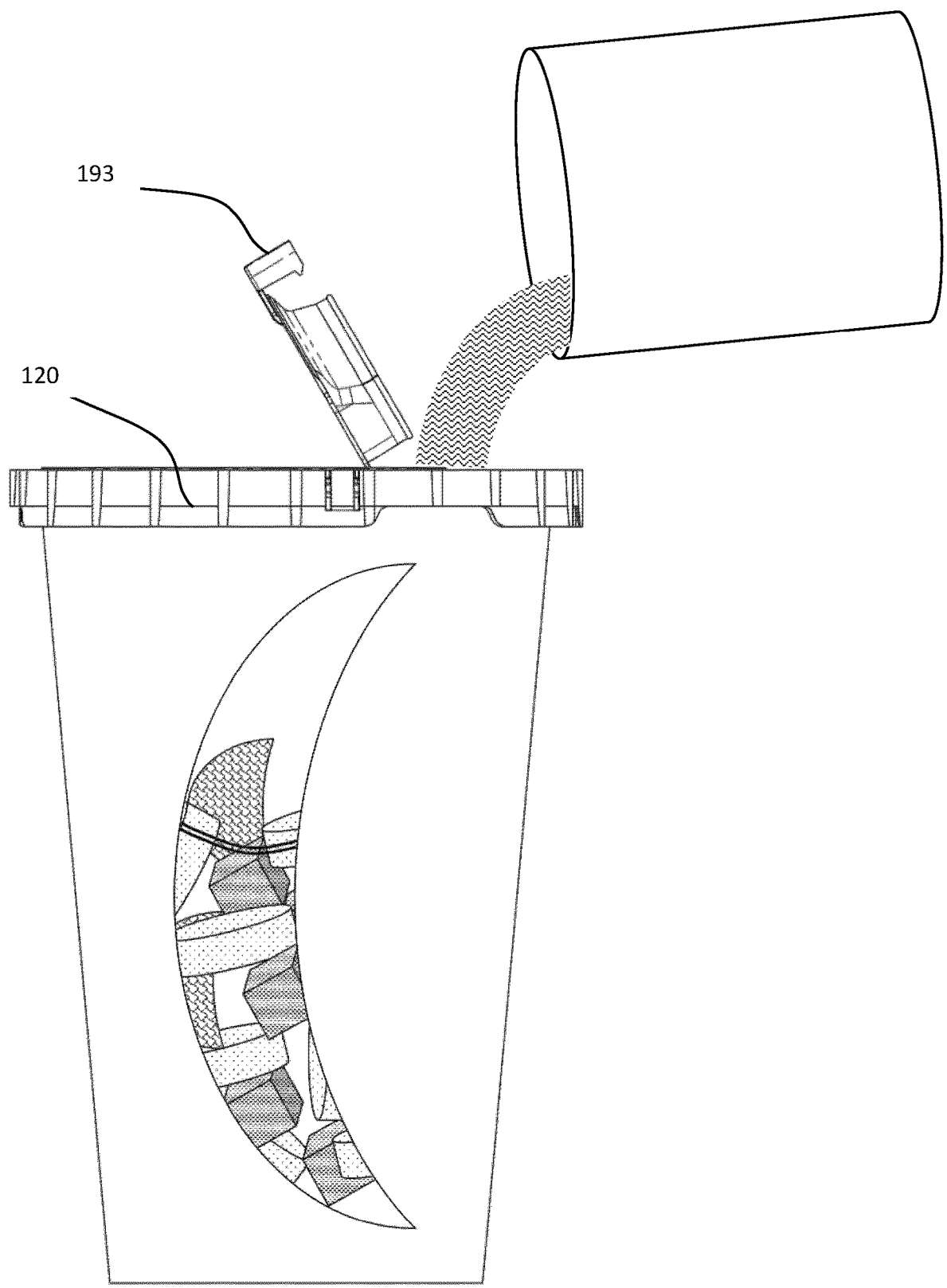
FIGS. 45A and 45B are simplified respective planar side and sectional illustrations of the SUPCA filled with a non-frozen food product of FIGS. 43A & 43B wherein liquid is being added to the non-frozen food product via a resealable opening in the SUCSERDREA of FIGS. 2A-3B.
Figure 45B:
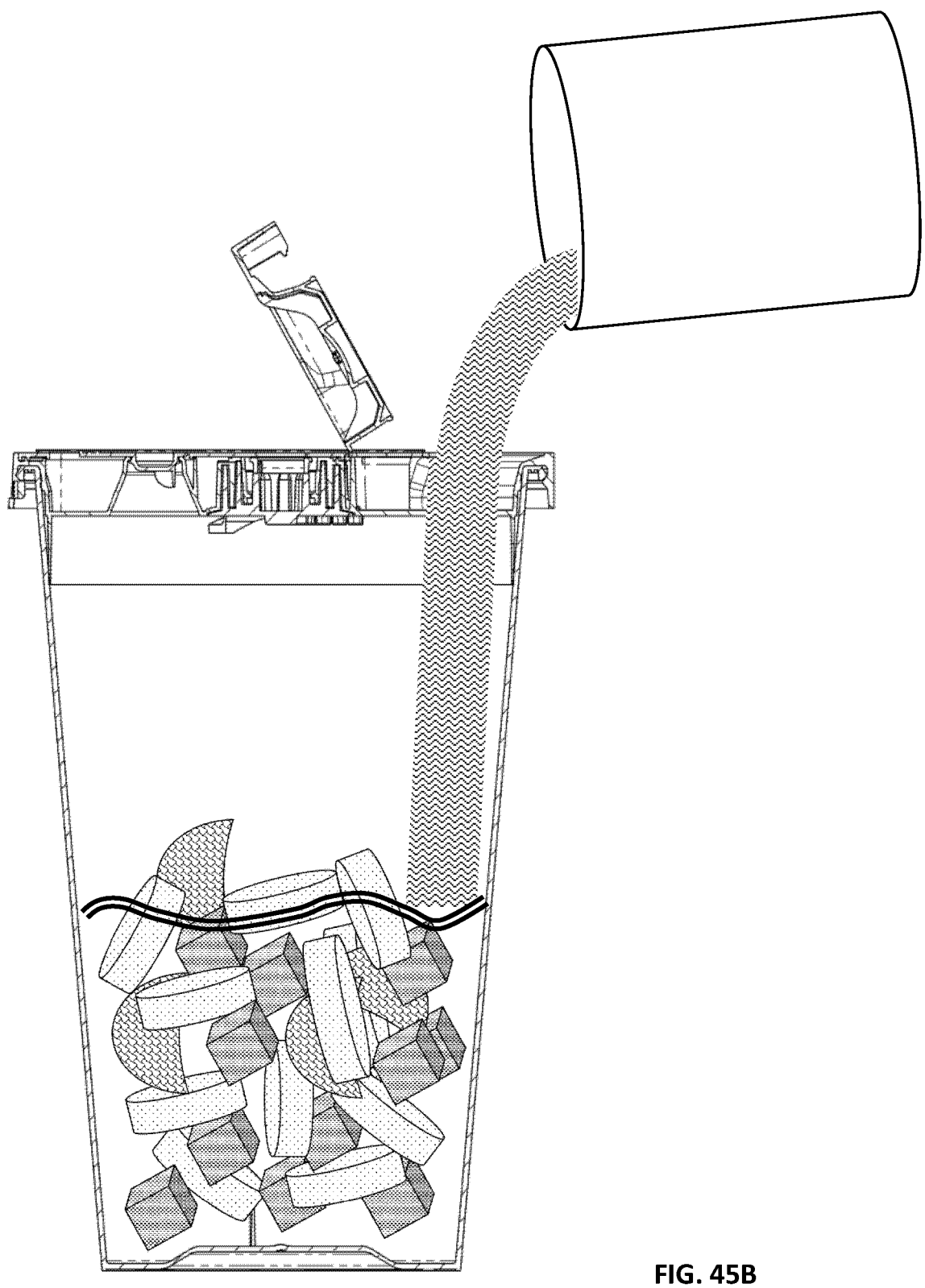

Reference is now made to FIGS. 44A and 44B, which are simplified respective planar side and sectional illustrations of the SUPCA 100 filled with a frozen food product of FIGS. 42A & 42B wherein liquid is being added to the frozen food product via a resealable opening in the SUCSERDREA 120 of FIGS. 2A-3B and to FIGS. 45A and 45B, which are simplified respective planar side and sectional illustrations of the SUPCA 100 filled with a non-frozen food product of FIGS. 43A & 43B wherein liquid is being added to the non-frozen food product via a liquid ingress opening 242 in the SUCSERDREA 120 of FIGS. 2A-3B As seen in FIGS. 44A-45B, liquid is being added to the food product contained in SUPCA 100 via pivotably openable liquid ingress opening cover 193, in cover 130.

Figure 46A:
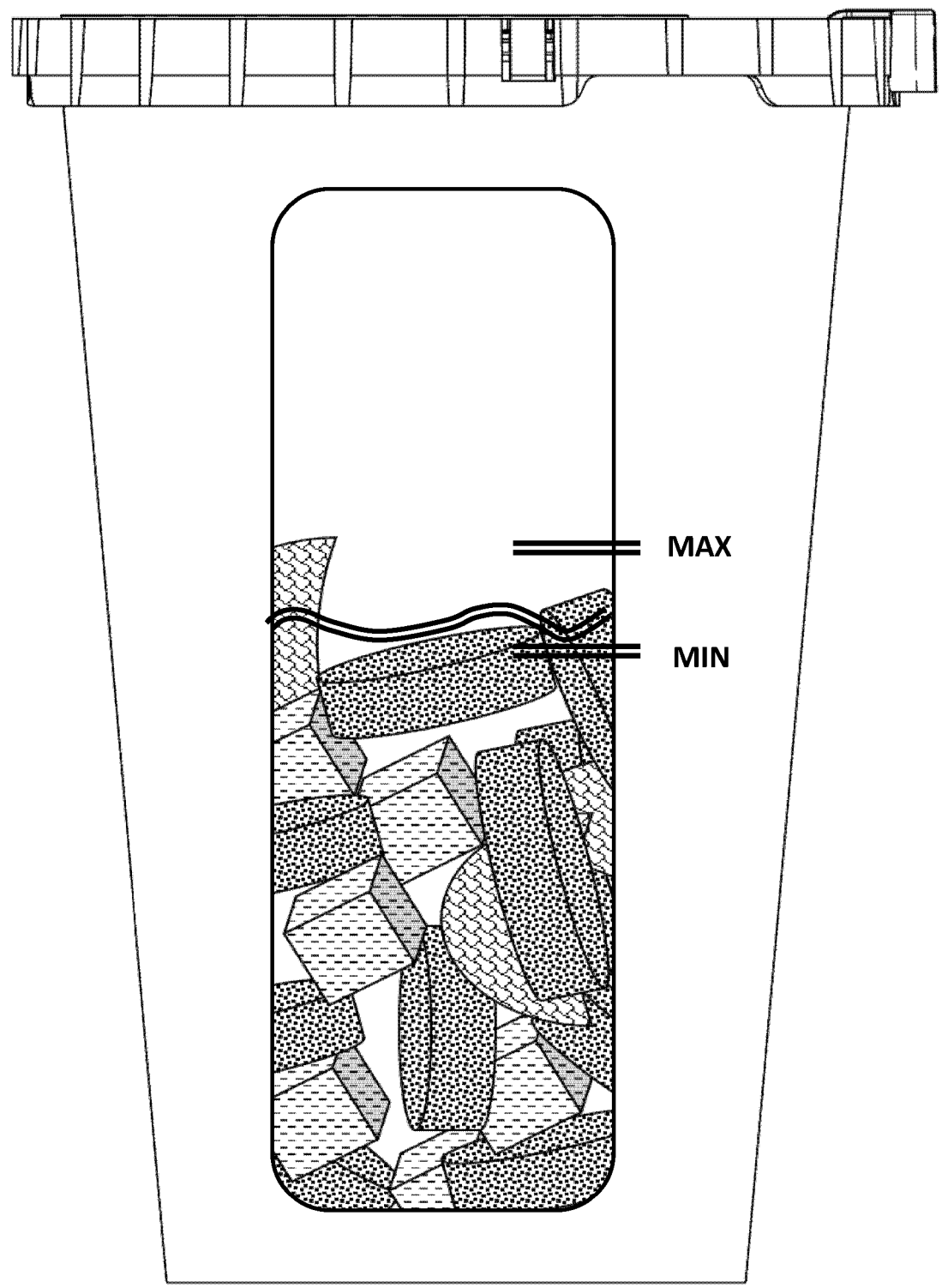
FIGS. 46A and 46B are simplified respective planar side and sectional illustrations of the SUPCA filled with a frozen or non-frozen food product as well as liquid, ready for processing by the MMIDD of FIGS. 10A-41C.
Figure 46B:
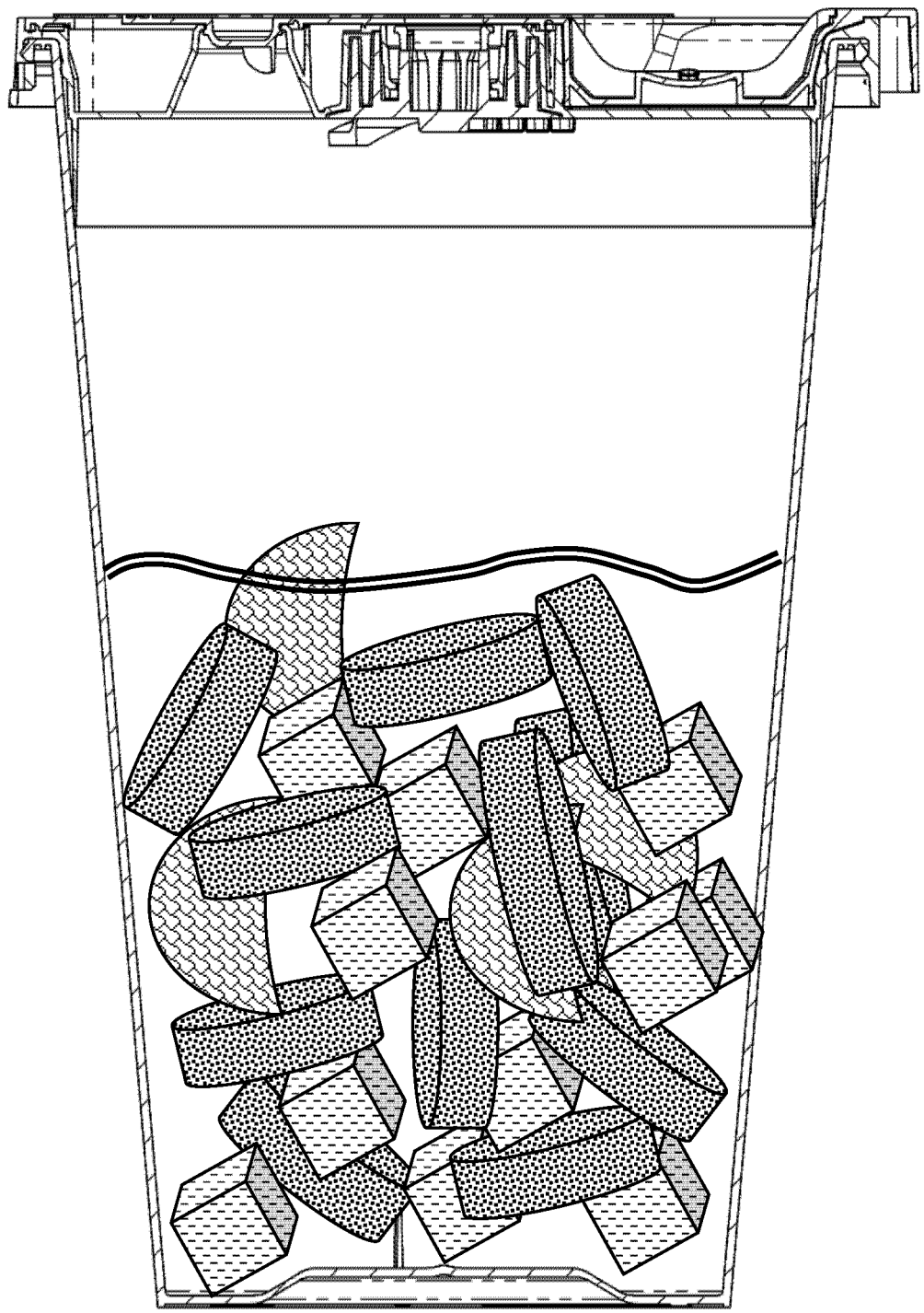

Reference is now made to FIGS. 46A and 46B, which are simplified respective planar side and sectional illustrations of SUPCA 100 filled with a frozen or non-frozen food product as well as liquid, ready for processing by the MMIDD 1000 of FIGS. 10A-41C.

As seen in FIGS. 46A & 46B, filled SUPCA 100 is in its upstanding orientation as shown in FIGS. 1A & 1B and liquid ingress opening cover 193 is closed and thereby tightly sealed.

Figure 47A:
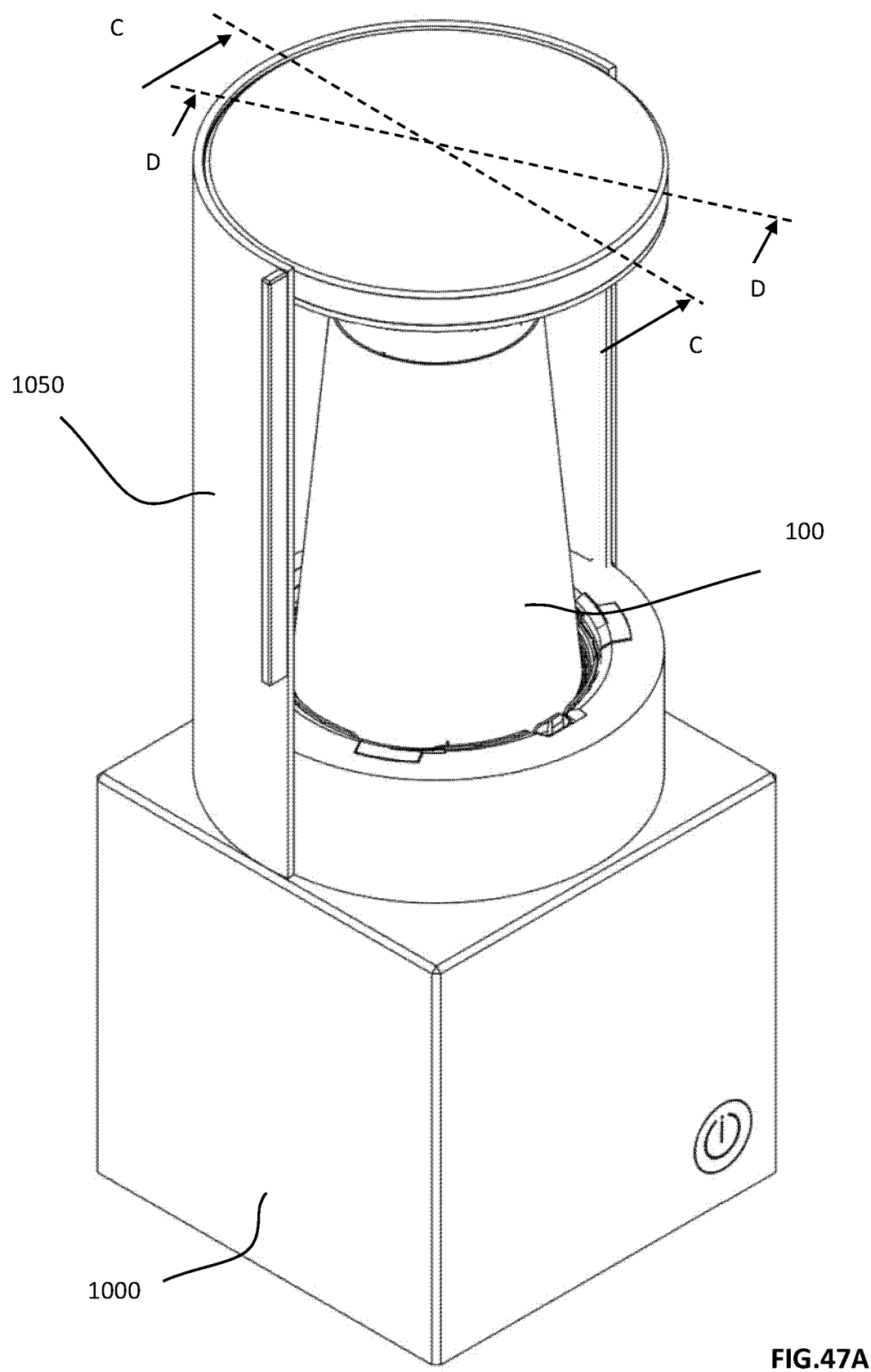
FIGS. 47A, 47B and 47C are simplified respective pictorial, planar side and sectional illustrations of the SUPCA of FIGS. 1A-9B, filled with a food product (not shown) in an upside-down unclamped orientation in typical initial operative engagement with the MMIDD with the door open, FIG. 47C being taken along lines C-C in FIG. 47A.
Figure 47B:
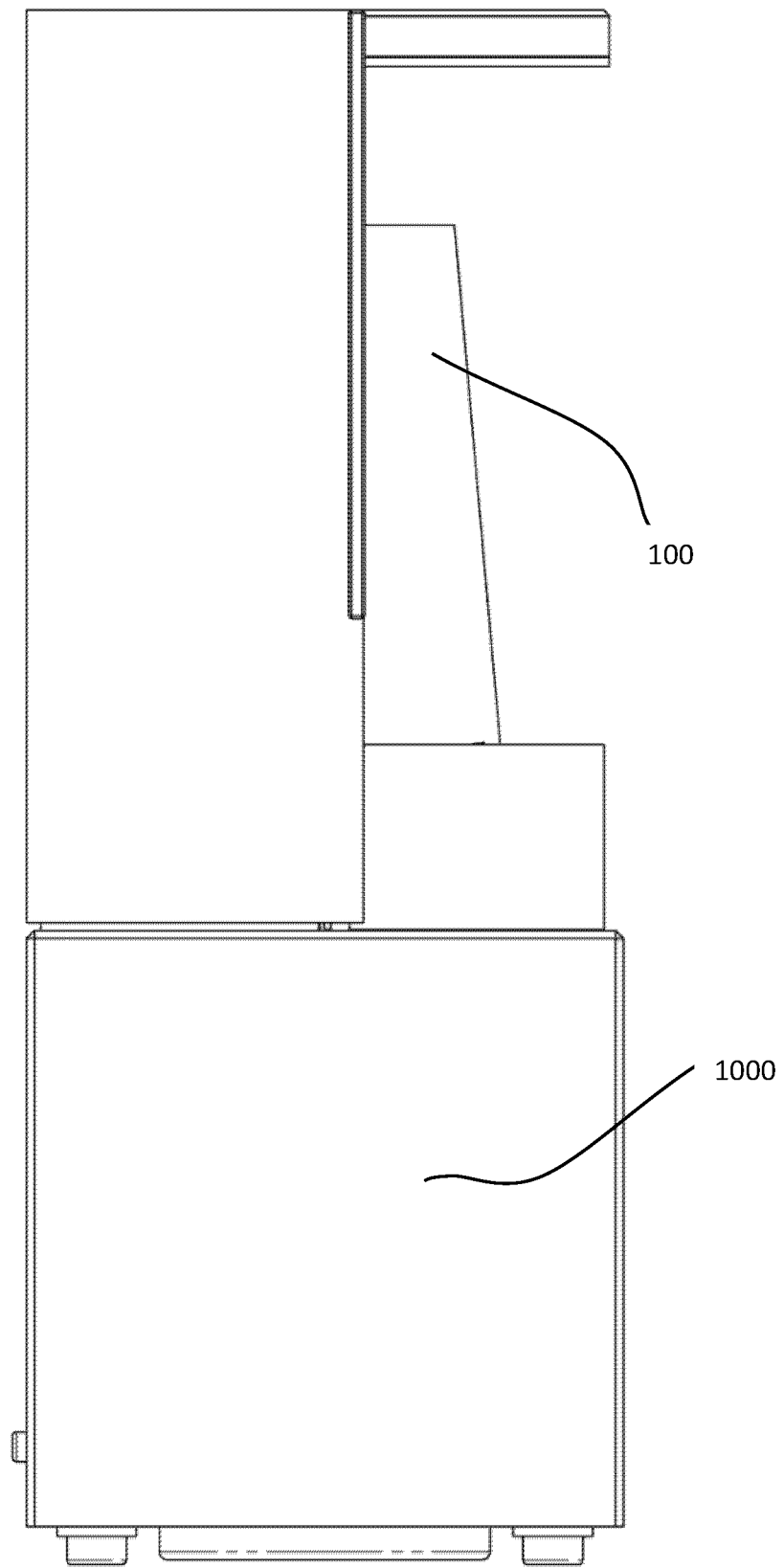
Figure 47C:
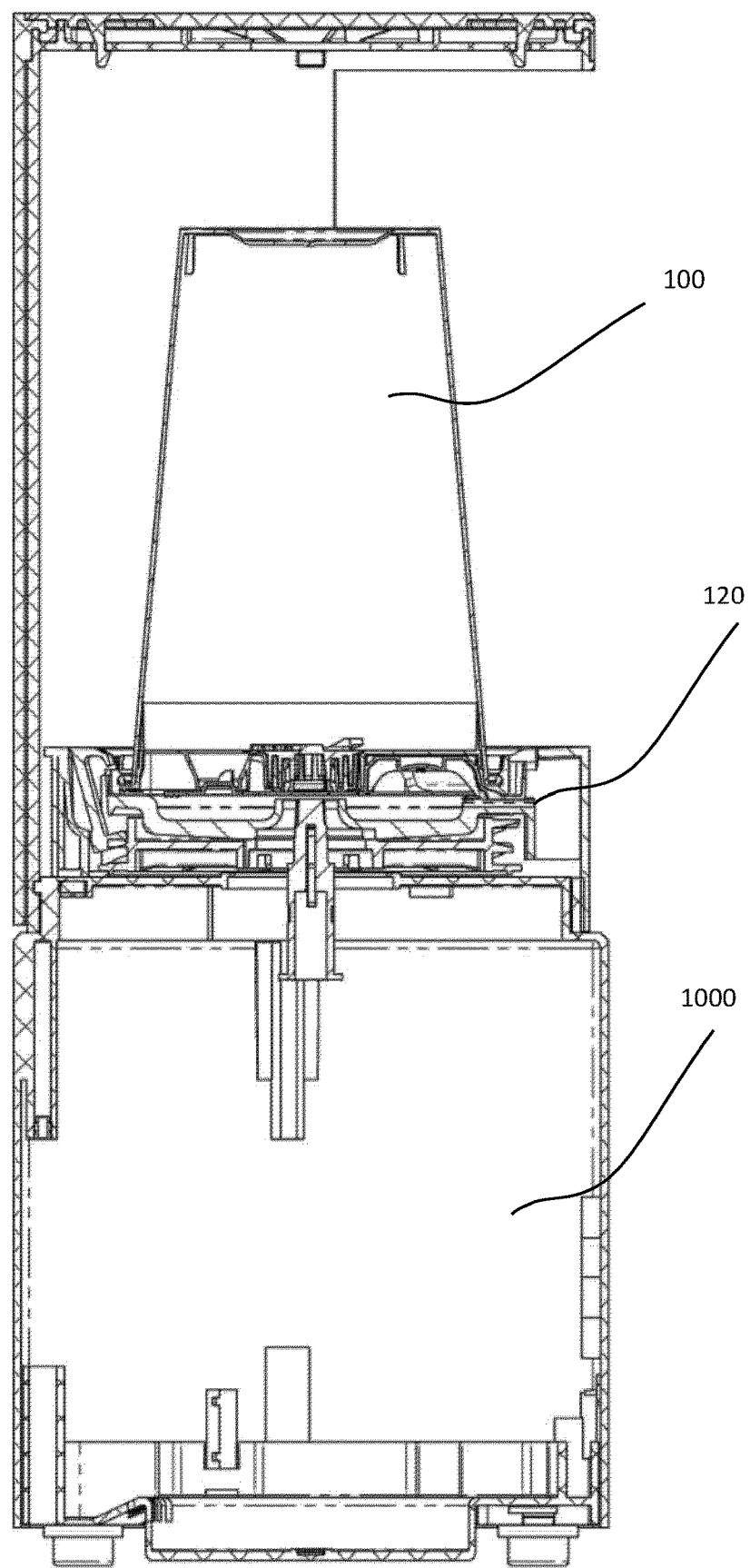

Reference is now made to FIGS. 47A, 47B and 47C, which are simplified respective pictorial, planar side and sectional illustrations of SUPCA 100 of FIGS. 1A-9B filled with a food product (not shown) in an upside-down unclamped orientation in typical initial operative engagement with MMIDD 1000 with the door assembly 1050 in an open operative orientation. It is seen that SUCSERDREA 120 is supported on annular planar container support surface 1210 and centered thereon by tapered wall 1240 of support element 1100. A predetermined azimuthal orientation of SUPCA 100 on MMIDD 1000 is achieved by insertion of finger engagement portion 196 of cover 193 forming part of SUCSERDREA 120, in SUPCA azimuthal locating channel 1250 of support element 1100. The various elements of the MMIDD 1000 are in their respective rest positions as shown at I in FIG. 38 and in FIG. 39A.

Figure 48A:
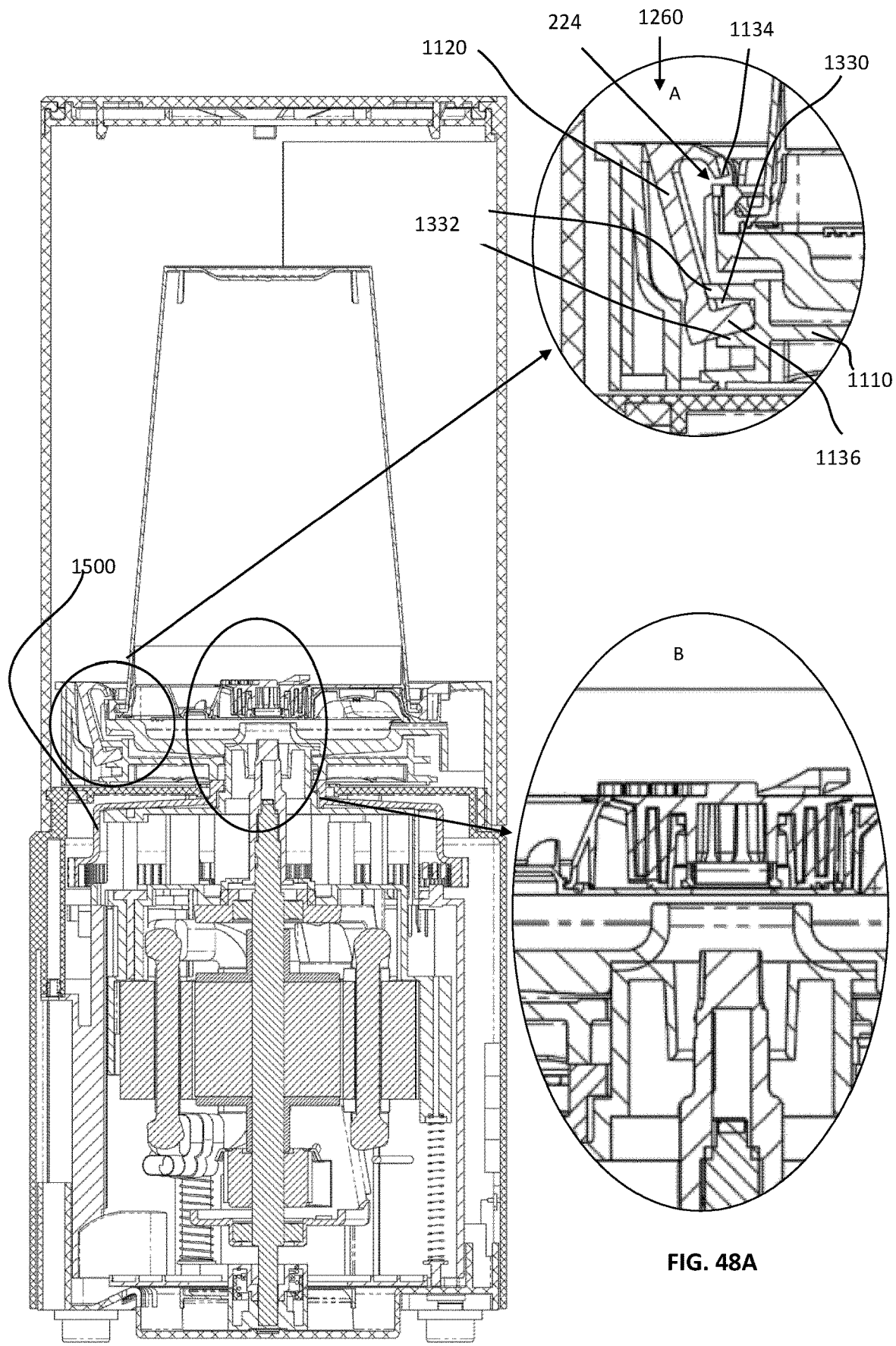
FIGS. 48A and 48B are simplified first and second sectional illustrations of the SUPCA of FIGS. 47A-47C in an upside-down unclamped orientation in operative engagement with the MMIDD with the door closed, FIGS. 48A and 48B being taken along respective lines C-C and D-D in FIG. 47A.
Figure 48B:
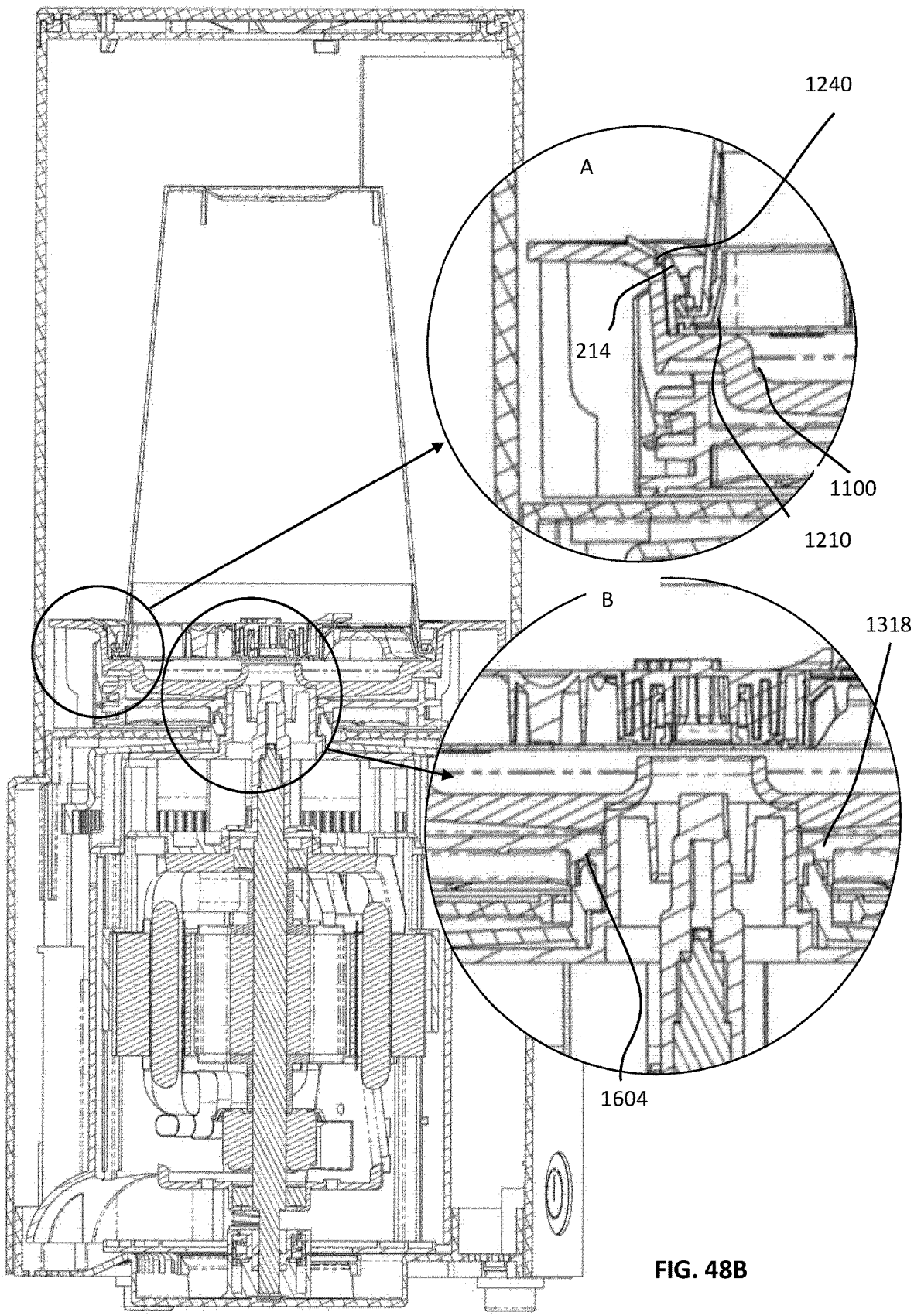

Reference is now made to FIGS. 48A-48B, which are simplified respective first and second sectional illustrations of SUPCA 100 of FIGS. 47A-47C in an upside-down unclamped orientation in operative engagement with MMIDD 1000 with the door assembly 1050 in a closed operative orientation, prior to operation of the MMIDD 1000.

As seen particularly clearly in an enlargement B in FIG. 48B, protrusions 1604 on rotary drive gear 1500 are seated in notches 1318 of cam element 1110 in order to transfer rotational motion of rotary drive gear 1500 to cam element 1110. The various elements of the MMIDD 1000 remain in their respective rest positions as shown at I in FIG. 38 and in FIG. 39A.

As seen particularly clearly in an enlargement A in FIG. 48A, clamp elements 1120 are in a retracted operative orientation, each clamp being arranged with respect to cam element 1110 whereby a cam engagement protrusion 1136 thereof lies at a first location 1334 of a corresponding cam channel 1330, whereby the radial extent of the upper circumferential wall 1332 defining the cam channel 1330 is at a maximum, forcing the clamp element 1120 located in the cam channel 1330 at the first location 1134 radially outwardly in pocket 1260 as shown in enlargement A of FIG. 48A. This orientation of the clamp elements 1120 enables the SUCSERDREA 120 of SUPCA 100 to clear the clamp elements 1120 upon insertion of the SUPCA 100 into engagement with MMIDD 1000.

As seen in enlargement A of FIG. 48B, tabs 214 of SUCSERDREA 120 which has not been tampered with or previously processed by the MMIDD 1000 are intact and located as shown in enlargement A of FIG. 5A. In cases where SUCSERDREA 120 has either been tampered with or previously processed by the MMIDD 1000, the tabs 214 are in a radially outwardly extending operative orientation as seen in enlargement B of FIG. 5A and thus prevent the SUCSERDREA 120 from being able to seat on annular planar container support surface 1210 within tapered wall 1240 of support element 1100.

It is noted that when SUCSERDREA 120 is properly seated on annular planar container support surface 1210 within tapered wall 1240 of support element 1100, as seen in enlargement A of FIG. 48A, recessed edges of SUCSERDREA 120 at cut outs 224 underlie edges 1134 of clamp elements 1120.

Figure 49A:
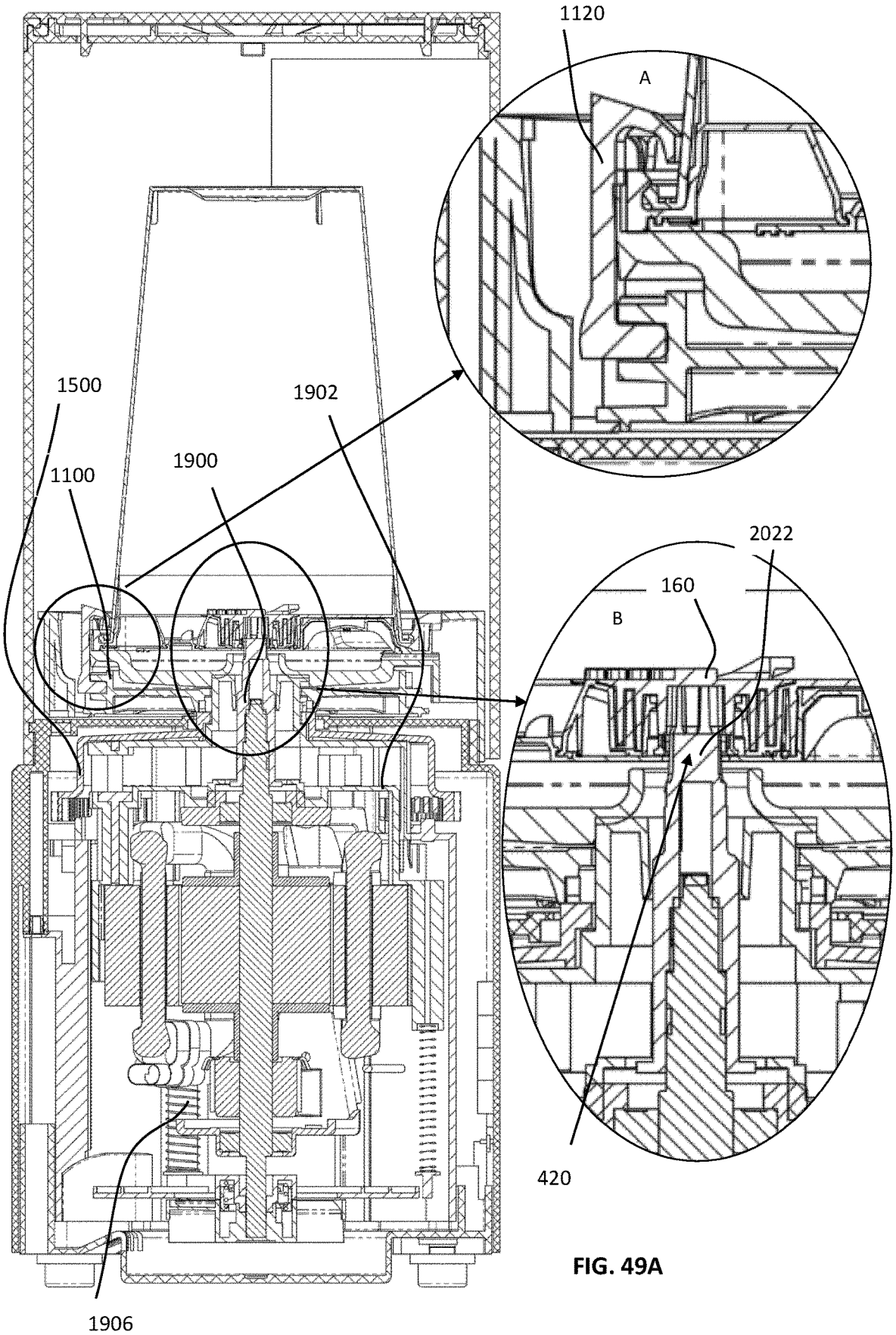
FIGS. 49A and 49B are simplified first and second sectional illustrations, corresponding to FIGS. 48A and 48B but showing the SUPCA of FIGS. 47A-47C in upside-down partially clamped operative engagement with the MMIDD.
Figure 49B:
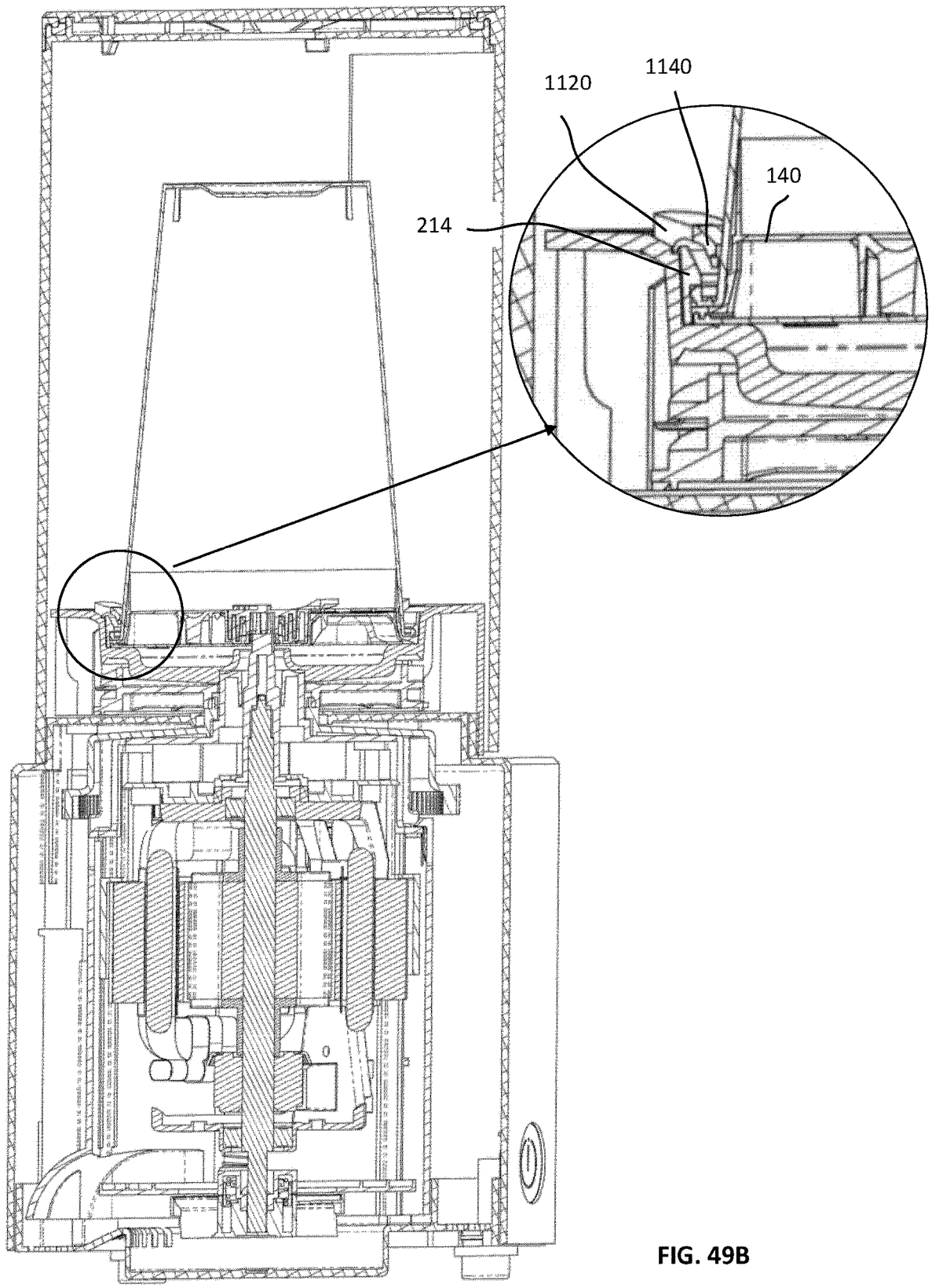

Reference is now made to FIGS. 49A and 49B, which are simplified first and second sectional illustrations, corresponding to FIGS. 48A and 48B but showing SUPCA 100 of FIGS. 47A-47C in upside-down partially clamped operative engagement with the MMIDD 1000.

As seen in FIGS. 49A & 49B, the operation of auxiliary motor 1520 in operative engagement with rotary drive gear 1500 causes rotation of spindles 1906 which raises motor support bracket assembly 1902 producing corresponding raising of outer drive shaft assembly 1900, while rotating cam element 1110, which reorients clamp elements 1120 to their inward clamping orientation as shown in enlargement A of FIG. 49A.

It is seen that the vertically splined top generally cylindrical portion 2022 of outer drive shaft assembly 1900 is partially seated in a drive shaft seating recess 420 of blade element 160 as seen in enlargement B of FIG. 49A.

As seen in an enlargement of FIG. 49B, a tab engagement protrusion 1140 of clamp element 1120 operatively engages tab 214 of lid 140 in response to clamping operation of clamp element 1120 and causes irreversible radially outward displacement of tab 214, thereby providing single-use functionality for SUPCA 100.

Figure 50:
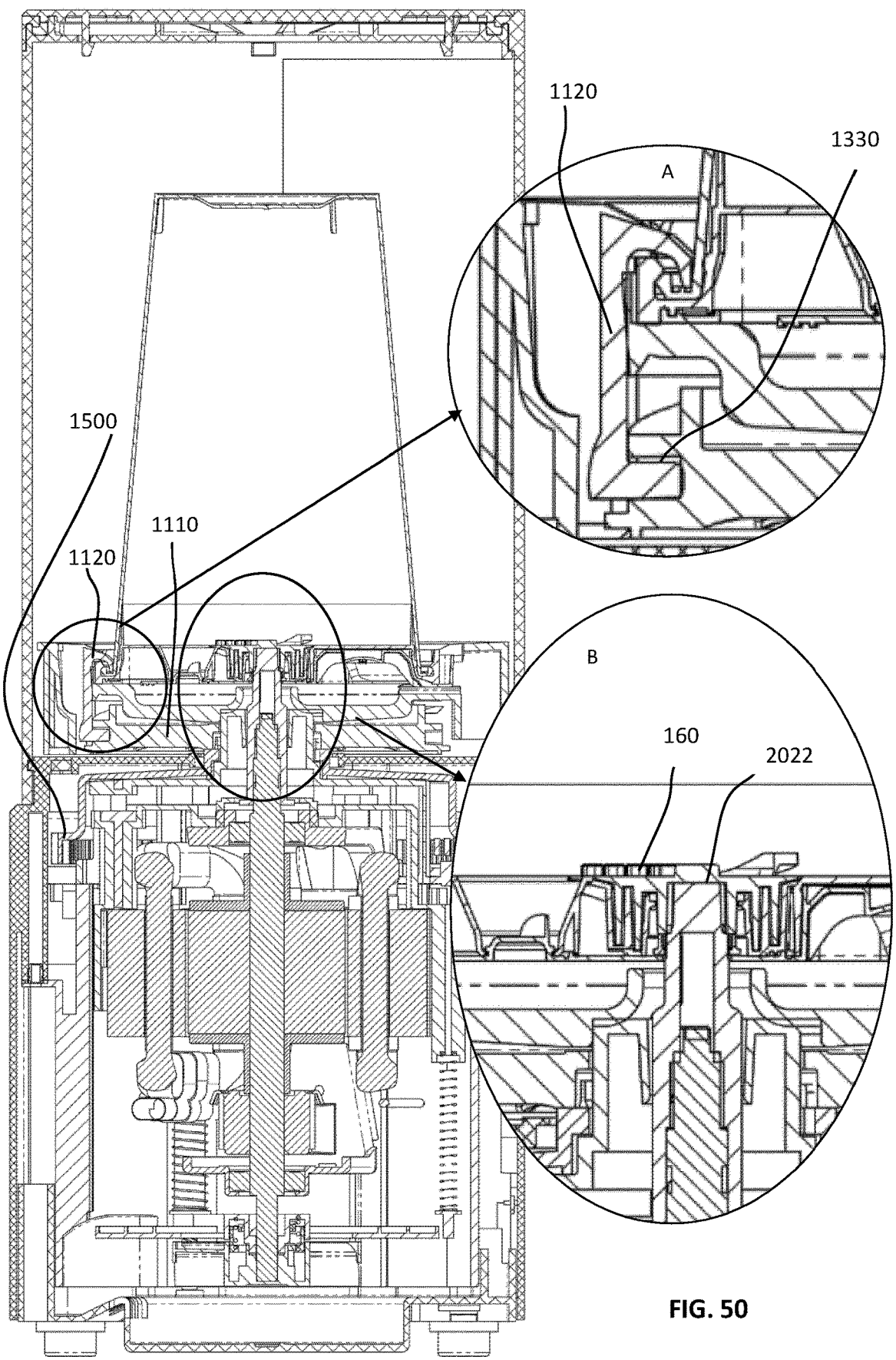
FIG. 50 is a simplified sectional illustration, corresponding to FIG. 49A but showing the SUPCA of FIGS. 47A-47C in upside-down fully clamped operative engagement with the MMIDD.

Reference is now made to FIG. 50, which is a simplified sectional illustration, corresponding to FIG. 49A, but showing the SUPCA 100 of FIGS. 47A-47C in upside-down fully clamped operative engagement with the MMIDD 1000, as seen in an enlargement A of FIG. 50. The full clamping is a result of the clamping element 1120 being located at a lower portion of the cam channel 1330 as the result of rotation of the cam element 1110.

It is seen in an enlargement B of FIG. 50 that the vertically splined top generally cylindrical portion 2022 of outer drive shaft assembly 1900 is fully seated in a drive shaft seating recess 420 of blade element 160 but the blade element 160 remains in recess 310.

Figure 51:
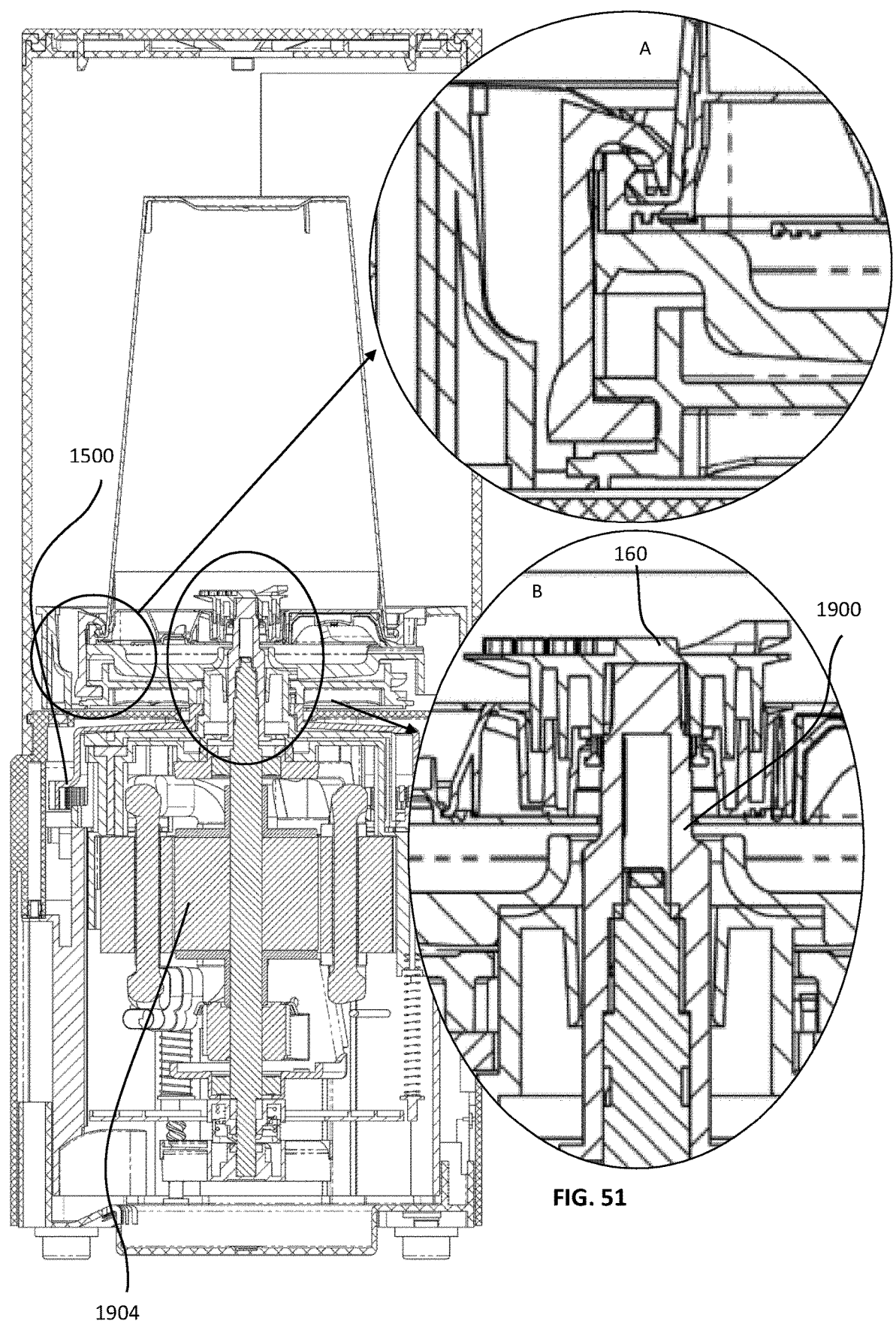
FIG. 51 is a simplified sectional illustration, corresponding to FIG. 50 but showing the SUPCA of FIGS. 47A-47C in operative engagement with the MMIDD wherein the blade element of the SUPCA is extended and rotatable.

Reference is now made to FIG. 51, which is a simplified sectional illustration, corresponding to FIG. 50 but showing the SUPCA 100 of FIGS. 47A-47C in operative engagement with MMIDD 1000 wherein the blade element of the SUPCA 100 is extended and rotatable.

As seen in FIG. 51, the outer drive shaft assembly 1900, which is fully seated in drive shaft seating recess 420 of blade element 160, is raised causing blade element 160 to be raised out of recess 310. It is noted that the operative orientation of the elements of MMIDD 1000 shown in FIG. 51 is that shown at IV in FIG. 38 and in FIG. 39D. The transition between operative orientations I and IV shown in FIG. 38 occurs during transitions between the operative orientations shown in FIGS. 48A and 48B and FIG. 51. A corresponding transition occurs between the operative orientations shown in FIGS. 41A-41C. At this stage AC motor 1904 may be operative to drive blade element 160 in rotational motion within the container body 102 for processing the contents thereof.

Figure 52A:
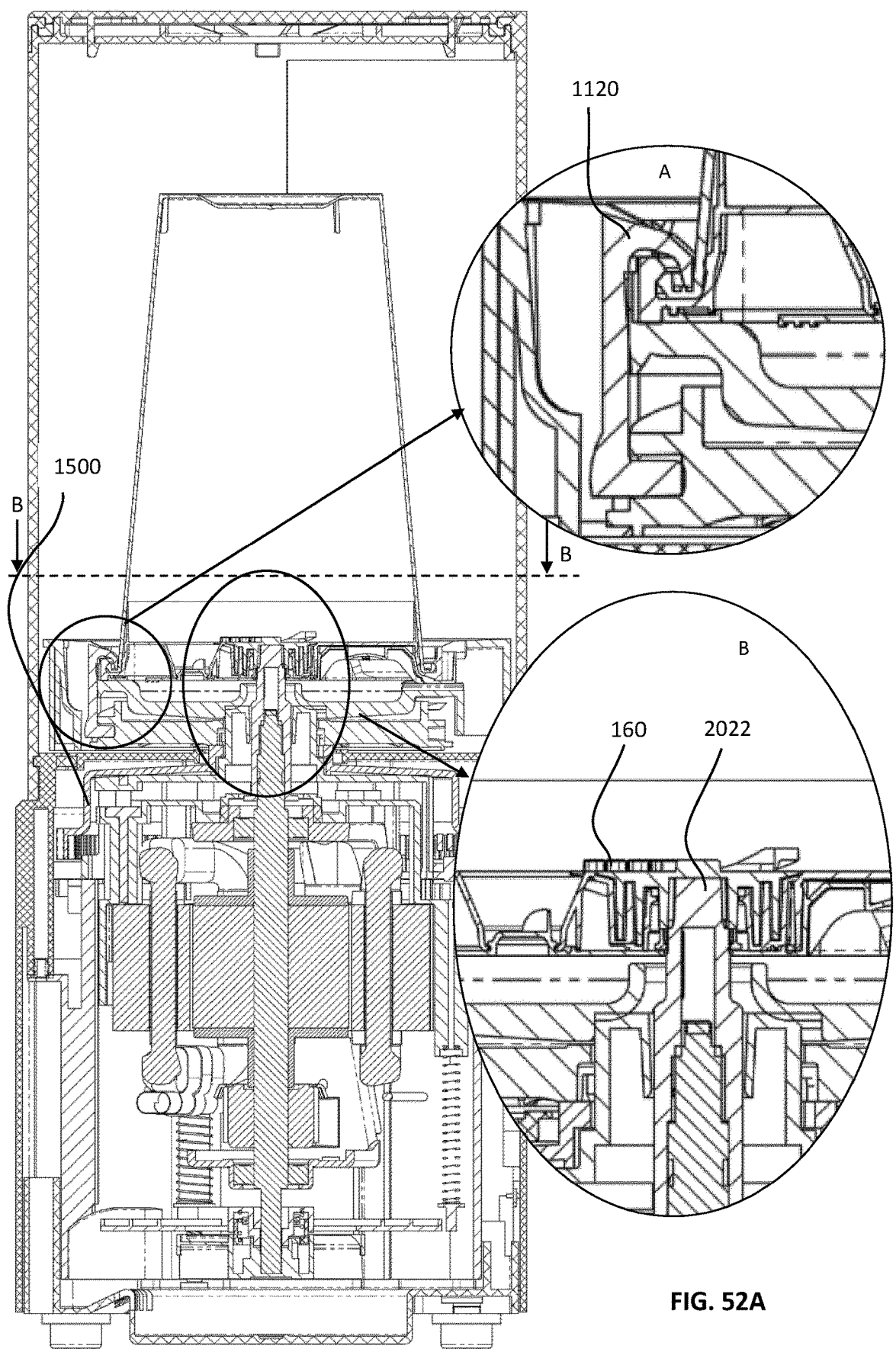
FIGS. 52A and 52B are simplified first and second sectional illustrations, wherein FIG. 52A corresponds to FIG. 51, but shows the SUPCA of FIGS. 47A-47C in operative engagement with the MMIDD wherein the blade element of the SUPCA is retracted, after having been rotated, to be aligned with a blade element recess, FIG. 52B being taken along lines B-B in FIG. 52A.
Figure 52B:
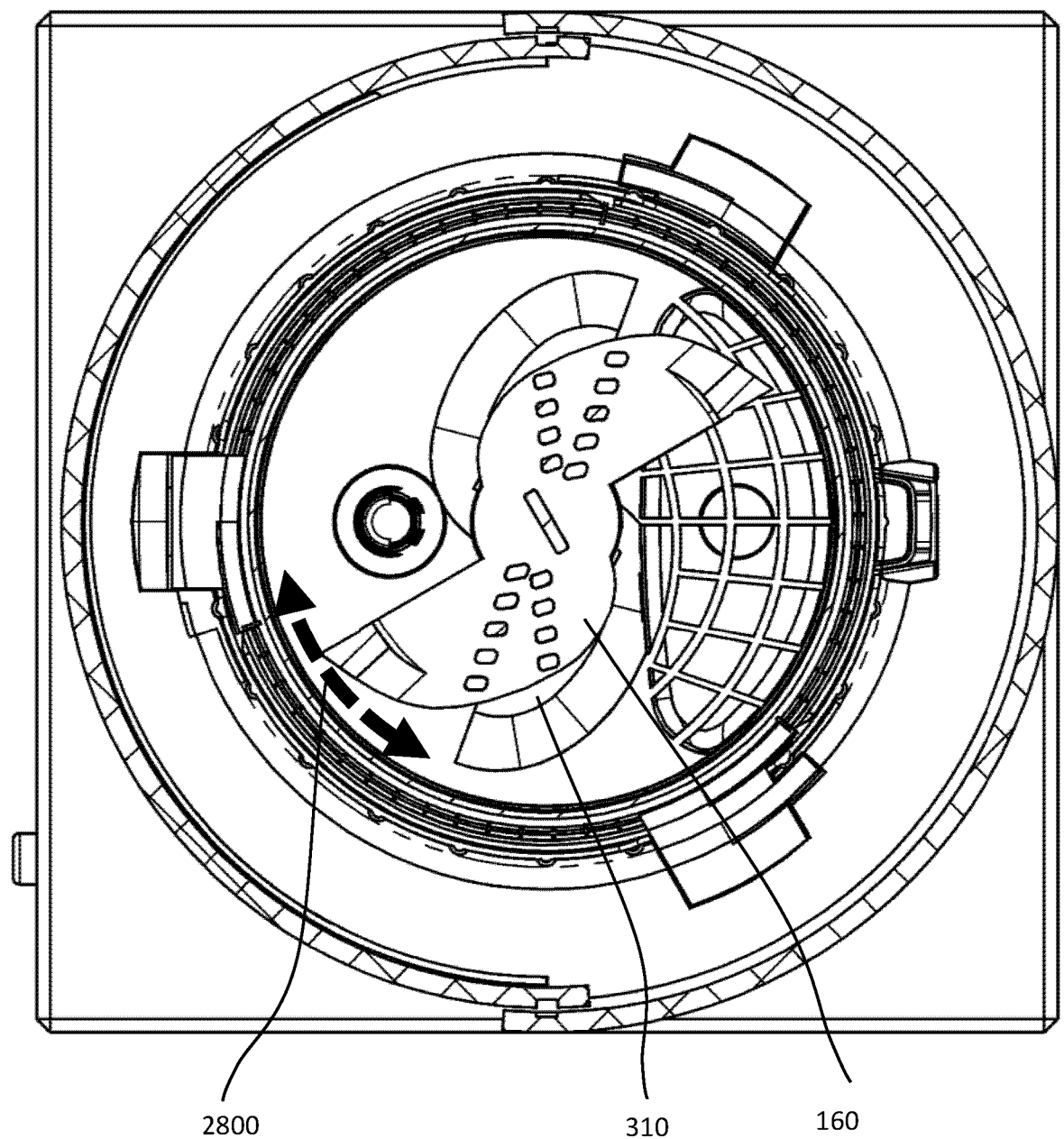

Reference is now made to FIGS. 52A and 52B, which are simplified first and second sectional illustrations, wherein FIG. 52A corresponds to FIG. 51 but show the SUPCA 100 of FIGS. 47A-47C in operative engagement with MMIDD 1000 wherein the blade element of the SUPCA 100 is retracted after having been rotated to be aligned with a blade element recess. FIG. 52B shows an arbitrary azimuth orientation of the blade element 160 relative to recess 310 prior to this rotation. The rotation, which may be in either a clockwise or counterclockwise direction, as indicated by arrow 2800 is produced by mechanical interaction of teeth 2334 of motor lifting element 1910 and teeth 2444 of linearly driven rotating ventilating element 1916 as described hereinabove with reference to FIGS. 40A-40G which may be preceded by a mechanical interaction of surfaces 2356 and 2426 of linear to rotary converting adaptor 1912 and linearly driven rotating ventilating element 1916, respectively, depending on the precise azimuth location of blade element 160 prior to rotation as shown generally in FIG. 52B. SUPCA 100 remains fully clamped to MMIDD 1000.

Figure 53:
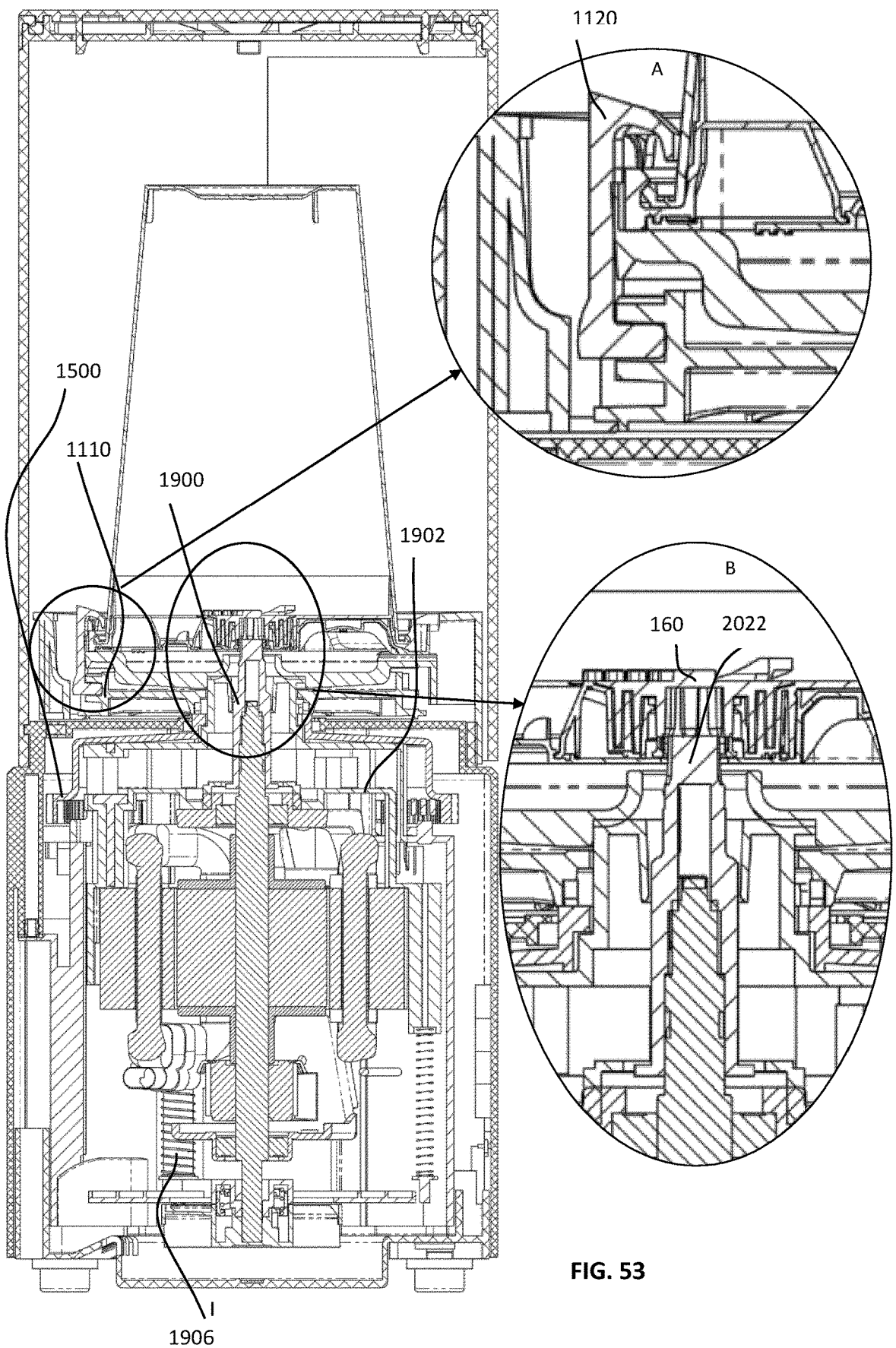
FIG. 53 is a simplified sectional illustration, corresponding to FIG. 52A but showing the SUPCA in upside-down partially clamped operative engagement with the MMIDD.
Figure 54:
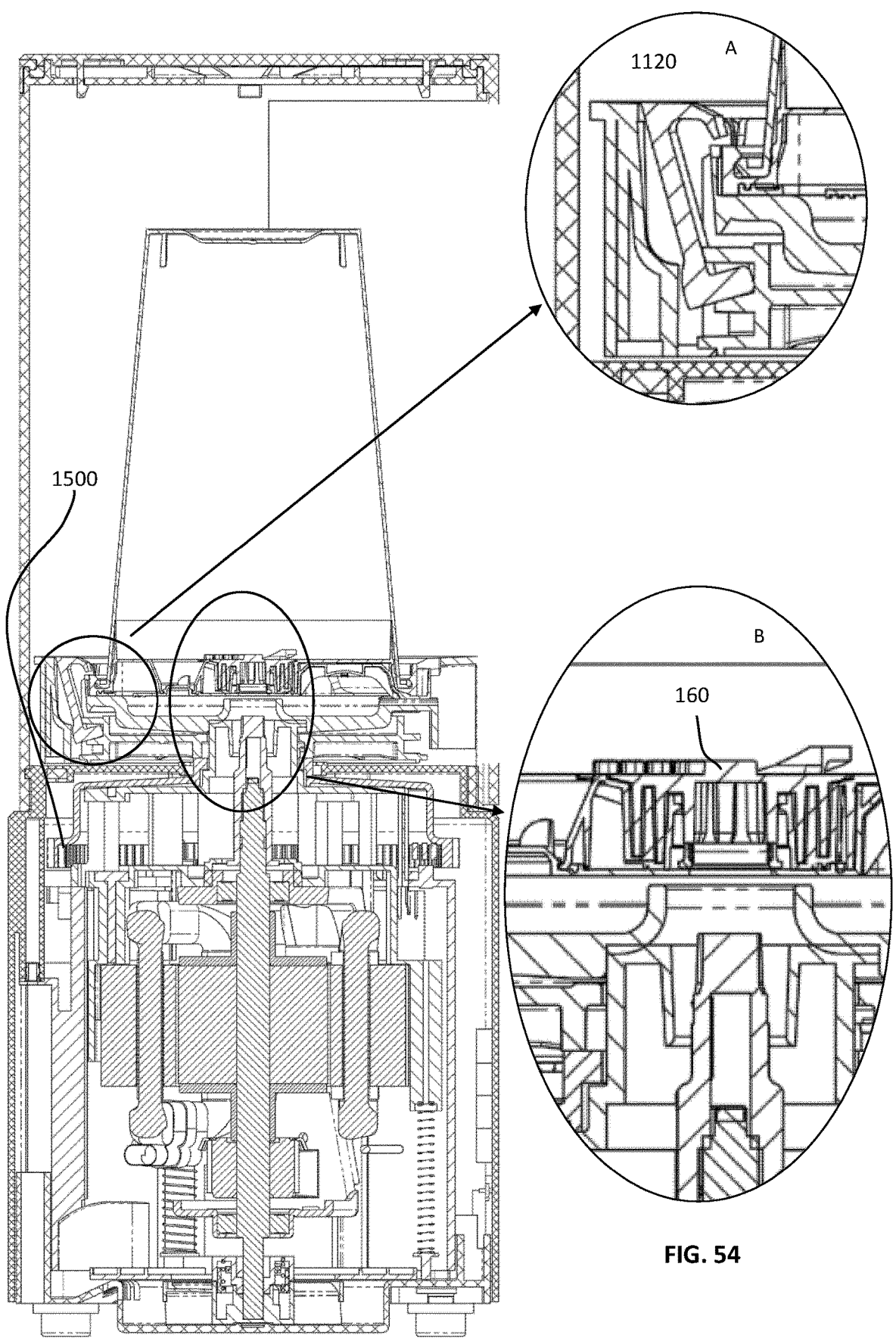
FIG. 54 is a simplified sectional illustration, corresponding to FIG. 53 but showing the SUPCA in upside-down unclamped operative engagement with the MMIDD with the door open.

Reference is now made to FIGS. 53 and 54, which are simplified sectional illustrations, corresponding to FIG. 52A. FIG. 53 shows partial unclamping, which is produced by rotation of the cam element 1110 as driven by the auxiliary motor 1520 via rotary drive gear 1500.

It is seen in enlargement B of FIG. 53 that the outer drive shaft assembly 1900 is no longer fully seated in a drive shaft seating recess 420 of blade element 160 by virtue of reverse operation of auxiliary motor 1520 in operative engagement with rotary drive gear 1500, which causes reverse rotation of spindles 1906, which, in turn, lowers motor support bracket assembly 1902 producing corresponding lowering of outer drive shaft assembly 1900, while rotating cam element 1110, which reorients clamp elements 1120 to their outward non-clamping orientation as shown in enlargement A of FIG. 54.

It is appreciated that a transition between operative orientations IV and I shown in FIG. 38 occurs during transitions between the operative orientations shown in FIGS. 51 and 54. A corresponding transition occurs between the operative orientations shown in FIGS. 41C-41A.

Figure 55A:
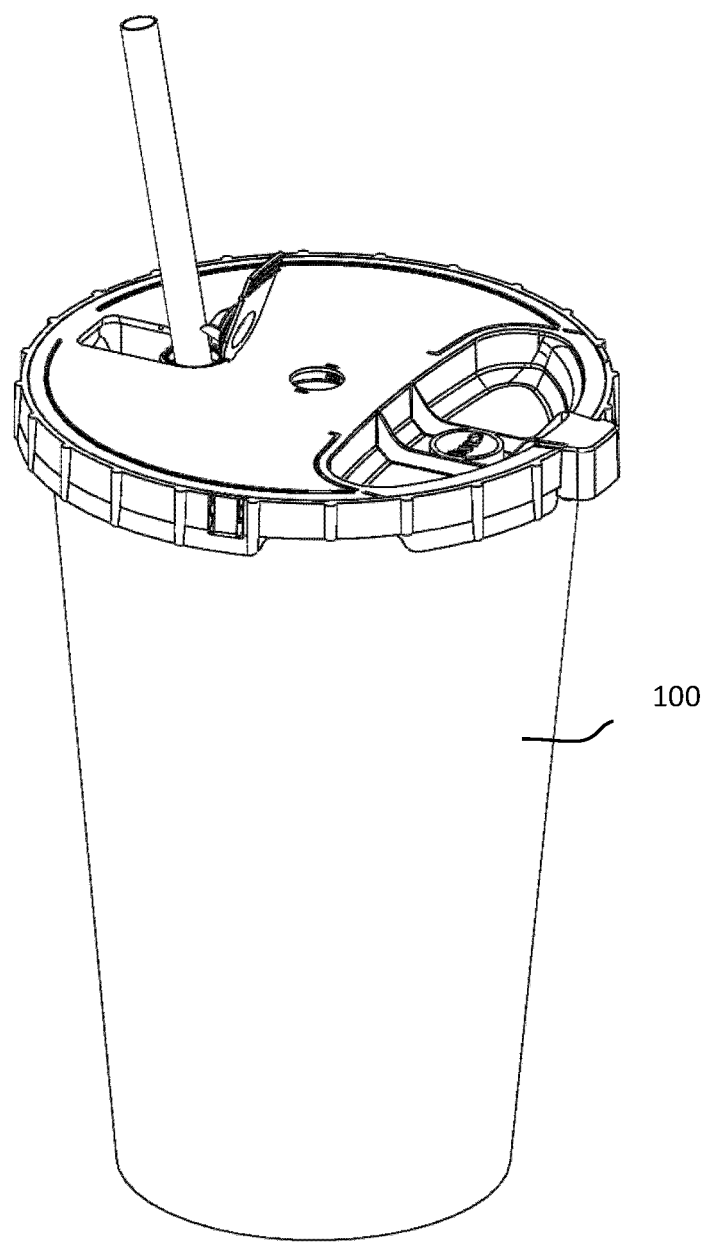
FIGS. 55A and 55B are simplified respective pictorial and pictorial central cross-sectional illustrations of the SUPCA after removal from the MMIDD having a straw extending through a straw communication aperture.
Figure 55B:
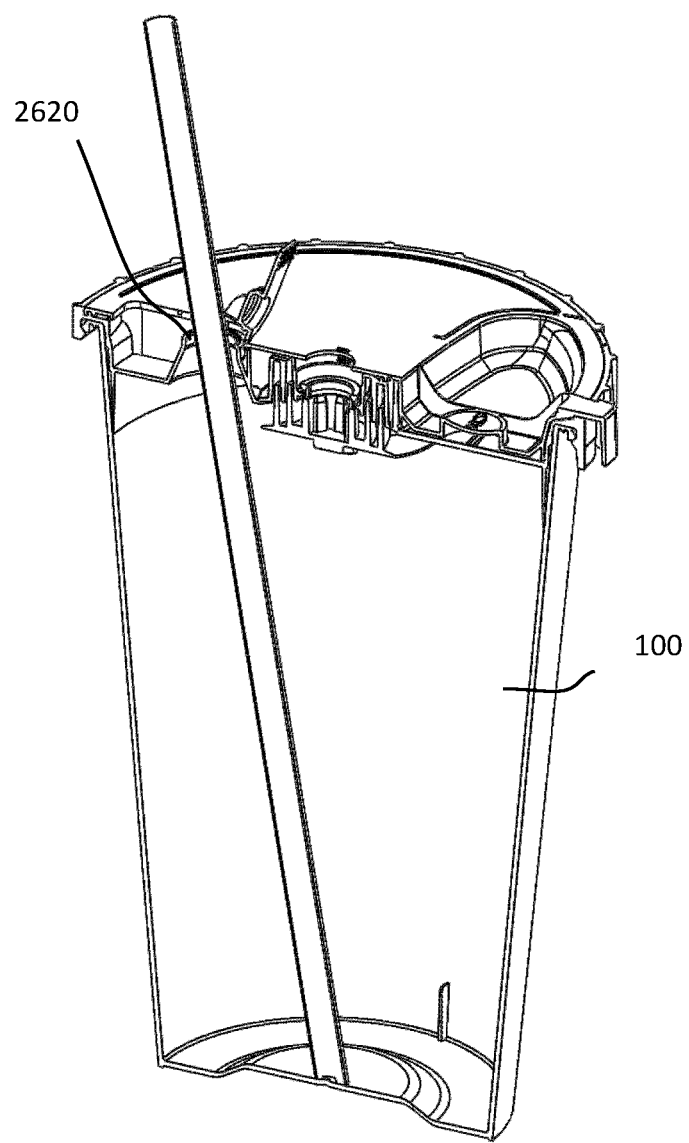

Reference is now made to FIGS. 55A and 55B, which are simplified respective pictorial and sectional illustrations of SUPCA 100 after removal from MMIDD 1000 having a straw extending through straw communication aperture 262 of lid 140.

This completes a general description of the operation of the MMIDD 1000 in accordance with a preferred embodiment of the invention.

It is a particular feature of the above-described embodiment of the present invention that leakage of liquids from the SUPCA 100 when it is in an upside-down state in engagement with MMIDD 1000 is prevented. This leakage prevention is preferably provided by a static/dynamic sealing produced by the interaction of blade element 160 and lid 140, whose structures have been described hereinabove with reference to FIGS. 6A-6E and FIGS. 5A-5M, respectively.

Figure 56A:
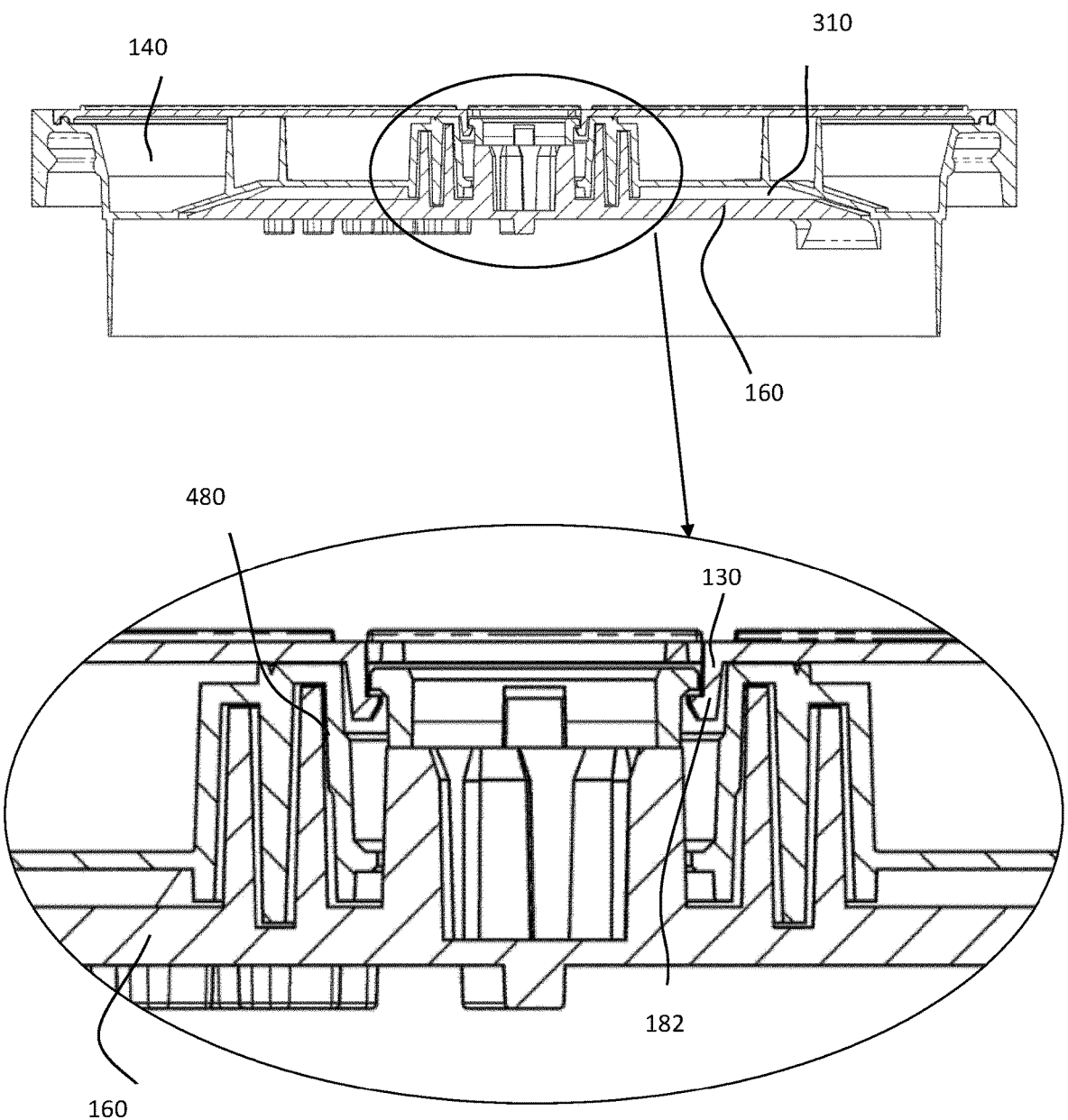
FIGS. 56A and 56B are simplified central cross-sectional illustrations, taken along lines D-D in FIG. 2A, of the SUCSERDREA showing two operative orientations providing static/dynamic sealing functionality.
Figure 56B:
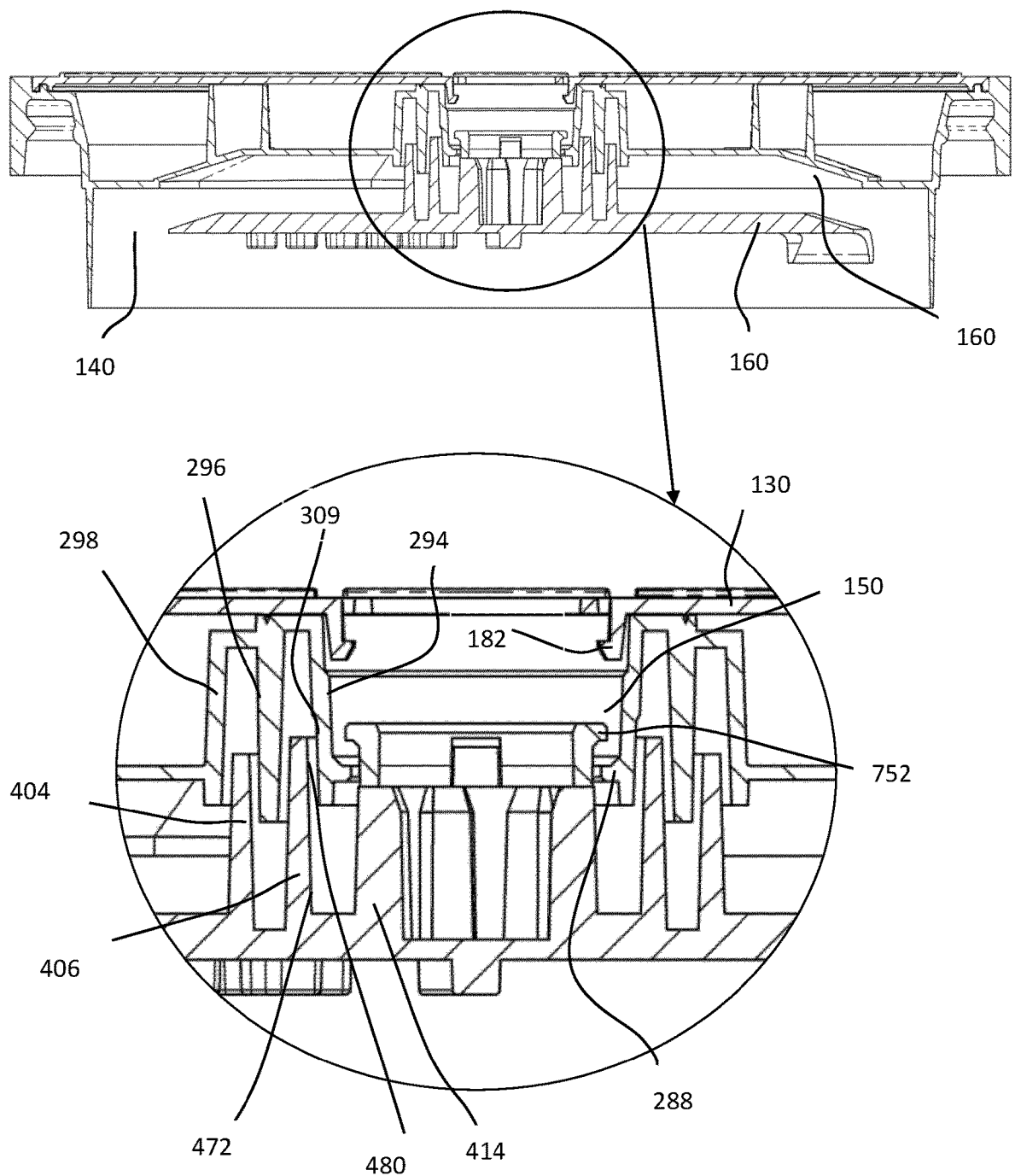

Reference is now made to FIGS. 56A and 56B, which are simplified central cross-sectional illustrations of the SUCSERDREA 120 showing two operative orientations in the static/dynamic sealing. It is noted that FIGS. 56A and 56B are upwardly oriented in the sense of FIGS. 1A-1B.

Turning initially to FIG. 56A, it is seen that prior to rotational operation of blade element 160, blade element 160 is fully seated in downwardly-facing blade receiving recess 310 of lid 140. In this operative orientation, which corresponds to operative orientation I, a static seal is defined by pressure engagement between static sealing surface 480 of blade element 160 and a corresponding static sealing surface 309 of lid 140. It is appreciated that in this operative orientation, blade element 160 is mechanically locked to cover 130 against linear mutual displacement therebetween by engagement of downward and inwardly facing hook protrusions 182 of cover 130 with surface 752 of hub 150, which is in turn fixed to blade element 160.

Turning now to FIG. 56B, it is seen that prior to rotational operation of blade element 160, blade element 160 is now no longer seated in downwardly-facing blade receiving recess 310 of lid 140 by virtue of raising of outer drive shaft assembly 1900. In this operative orientation, which corresponds to operative orientation IV of FIG. 38, a static seal is no longer defined by pressure engagement between static sealing surface 480 of blade element 160 and a corresponding static sealing surface 309 of lid 140. However, static sealing is provided by a slight underpressure produced within the region of walls 404, 406, 414 of blade element 160 and walls 294, 296 and 298 of lid 140 of SUPCA 100 by virtue of raising of the blade element 160 and possibly also resulting from defrosting of frozen contents of SUPCA 100. This underpressure, combined with capillary effects between adjacent surfaces of walls 404, 406, 414 of blade element 160 and walls 294, 296 and 298 resists the leakage of liquid from the interior of SUPCA 100 through the region defined by walls 404, 406, 414 of blade element 160 and walls 294, 296 and 298 of lid 140 of SUPCA 100.

It is appreciated that in this operative orientation, blade element 160 is no longer mechanically locked to cover 130 against linear mutual displacement therebetween by engagement of downward and inwardly facing hook protrusions 182 of cover 130 with surface 752 of hub 150. The unlocking results from the axial force provided by raising of the outer drive shaft assembly 1900. It is noted that, as seen in FIG. 56B, in this operative orientation, to reduce friction, upwardly-facing partially tapered and partially flat annular surface 288 of lid 140 is located at a vertical distance from tapered annular radially outwardly-facing surface 752 of hub 150, which is joined to blade element 160. It is appreciated that during normal operation of MMIDD 1000 and normal handling of SUPCA 100, provision of upwardly-facing partially tapered and partially flat annular surface 288 of lid 140 prevents disengagement of blade element 160 from lid 140.

During rotational operation of blade element 160, the configuration shown in FIG. 56B is the same and here dynamic sealing is provided by virtue of centrifugal forces resulting from the rotation of blade element 160 relative to lid 140.

Preferably following completion of rotational operation of blade element 160, the SUCSERDREA 120 returns to the operative orientation shown in FIG. 56A.

It is appreciated that any liquid leaking from the SUPCA 100 via the SUCSERDREA 120 is preferably channeled via leak fluid egress apertures 282 into sealed leaked fluid reservoir volumes 260 of lid 140.

Figure 57A:
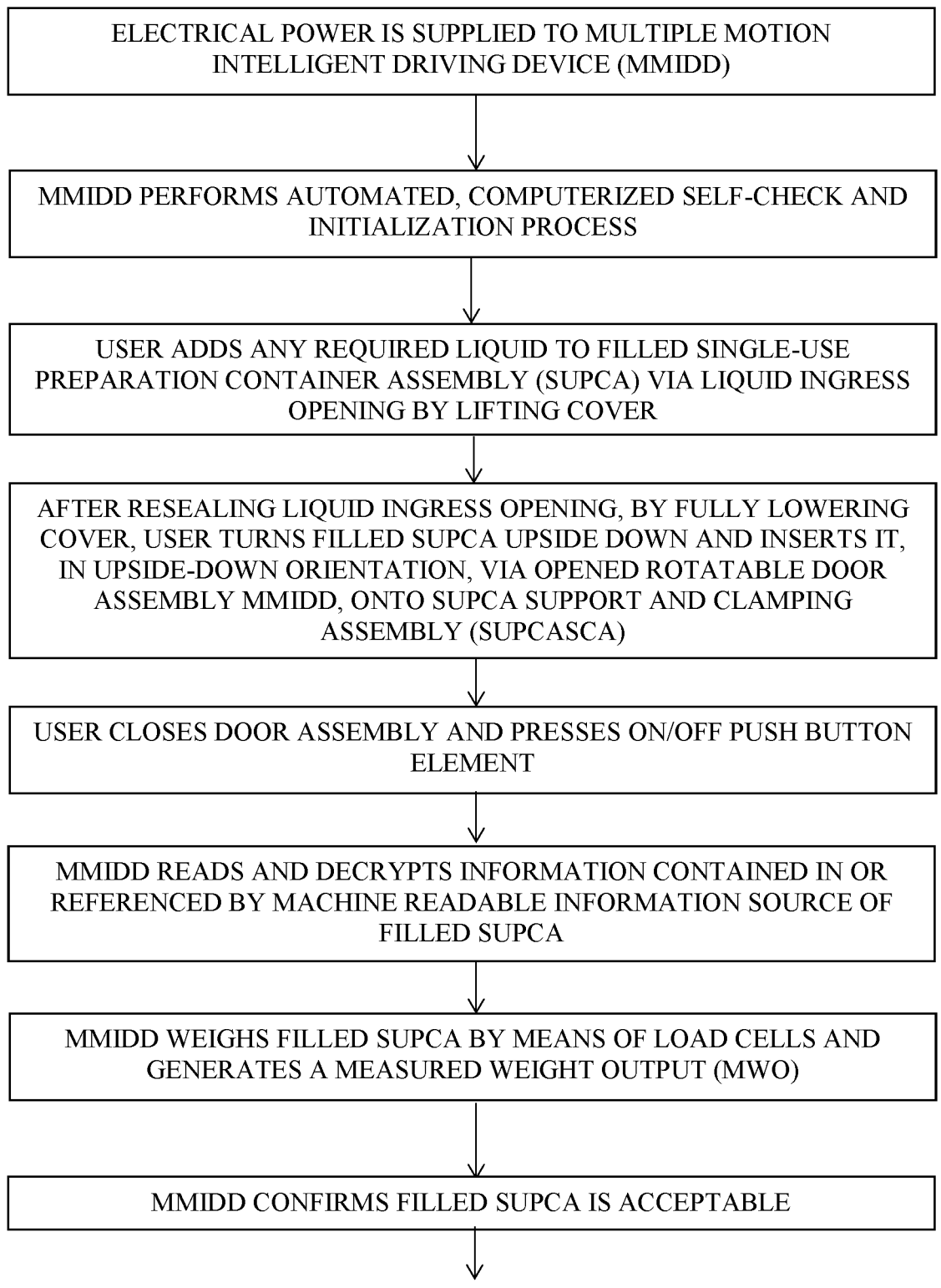
FIGS. 57A and 57B are together a simplified flowchart illustrating control operation of the MMIDD in accordance with a preferred embodiment of the present invention.
Figure 57B:
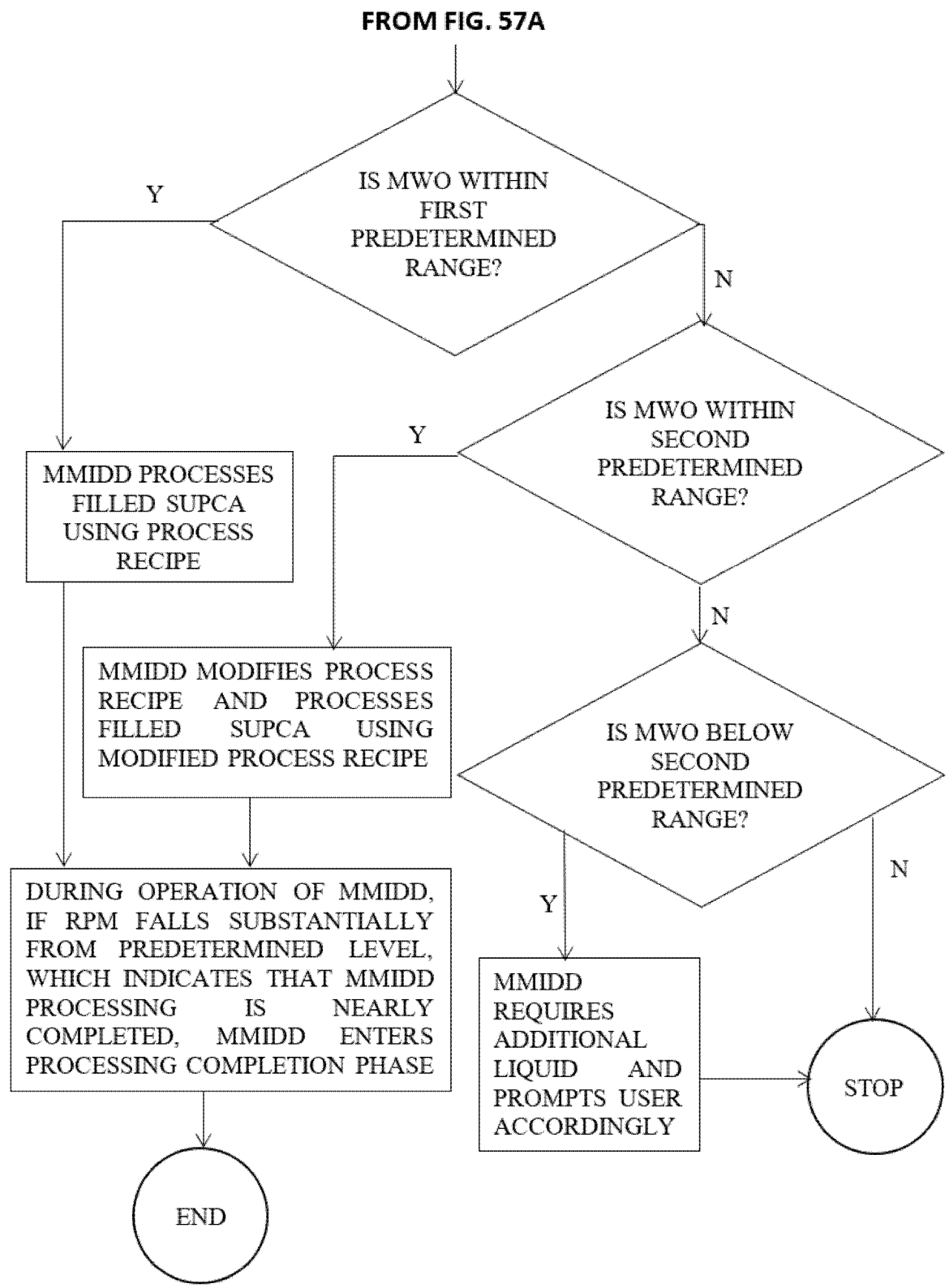

Reference is now made to FIGS. 57A and 57B, which are together a simplified flowchart illustrating control operation of the MMIDD 1000 in accordance with the above-described preferred embodiment of the present invention.

As seen in FIGS. 57A & 57B, the principal steps in the operation of the system described hereinabove in FIGS. 1A-56B may be summarized as follows:

Electrical power is supplied to the MMIDD 1000, as by user operation of a power switch (not shown). The MMIDD 1000 performs an automated, computerized self-check and initialization process.

The user adds any required liquid to the filled single-use preparation container assembly (SUPCA) 100 of FIGS. 1A-9B via liquid ingress opening 242 by lifting cover 193.

After resealing liquid ingress opening 242 by fully lowering cover 193, the user turns the filled SUPCA 100 of FIGS. 1A-9B containing any added liquid upside down and inserts it, in an upside-down orientation, via an opened rotatable door assembly 1050 of the MMIDD 1000 onto SUPCASCA 1030 of the MMIDD 1000.

The user closes the door assembly 1050 and presses the push button element 1420.

The MMIDD 1000 reads and decrypts information contained in or referenced by machine readable information source 162 of the filled SUPCA 100 of FIGS. 1A-9B. This information preferably contains some or all of the following information:

A process recipe for processing of the contents of filled SUPCA 100, including, inter alia, time sequencing of rotation of the blade element 160 including intended rpm, rpm threshold levels and timing;

Reference weight of the filled SUPCA 100 (RWF);

Reference weight of the liquid (RWL) to be added by the user to the filled SUPCA 100 prior to processing by the MMIDD 1000;

Type of filled SUPCA 100 specificID;

Unique individual filled SUPCA 100 specific ID; and

Internet links to information of possible interest.

The MMIDD 1000 weighs the filled SUPCA 100 by means of load cells 1560, including any additional user added liquid and generates a Measured Weight Output (MWO).

Based on some or all of the above information, MMIDD 1000 confirms that an acceptable filled SUPCA 100 has been inserted into operative engagement therewith.

If the MWO of an otherwise acceptable filled SUPCA 100 is within a predetermined range of the sum of the RWO and RWL, the MMIDD 1000 processes the filled SUPCA 100 in accordance with the process recipe.

If the MWO of an otherwise acceptable filled SUPCA 100 exceeds the sum of the RWO and RWL or is below the sum of the RWO and RWL within a predetermined range, the MMIDD 1000 modifies the process recipe accordingly and then processes the filled SUPCA 100 in accordance with the modified process recipe.

If the MWO of an otherwise acceptable filled SUPCA 100 is below the sum of the RWO and RWL or is below the sum of the RWO and RWL beyond the predetermined range, the MMIDD 1000 requires addition of further liquid to the filled SUPCA 100 and prompts the user accordingly and only once this is done processes the filled SUPCA 100 in accordance with the process recipe or a suitably modified process recipe.

During operation of the MMIDD 1000, if the RPM falls substantially from a predetermined level as set forth in the appropriate process recipe, which indicates that MMIDD processing is nearly completed, MMIDD 1000 enters a processing completion phase as set forth in the appropriate process recipe and terminates rotation of the blade element 160 and notifies the user that filled SUPCA 100 may be removed from MMIDD 1000 and consumed.

Figure 58A:
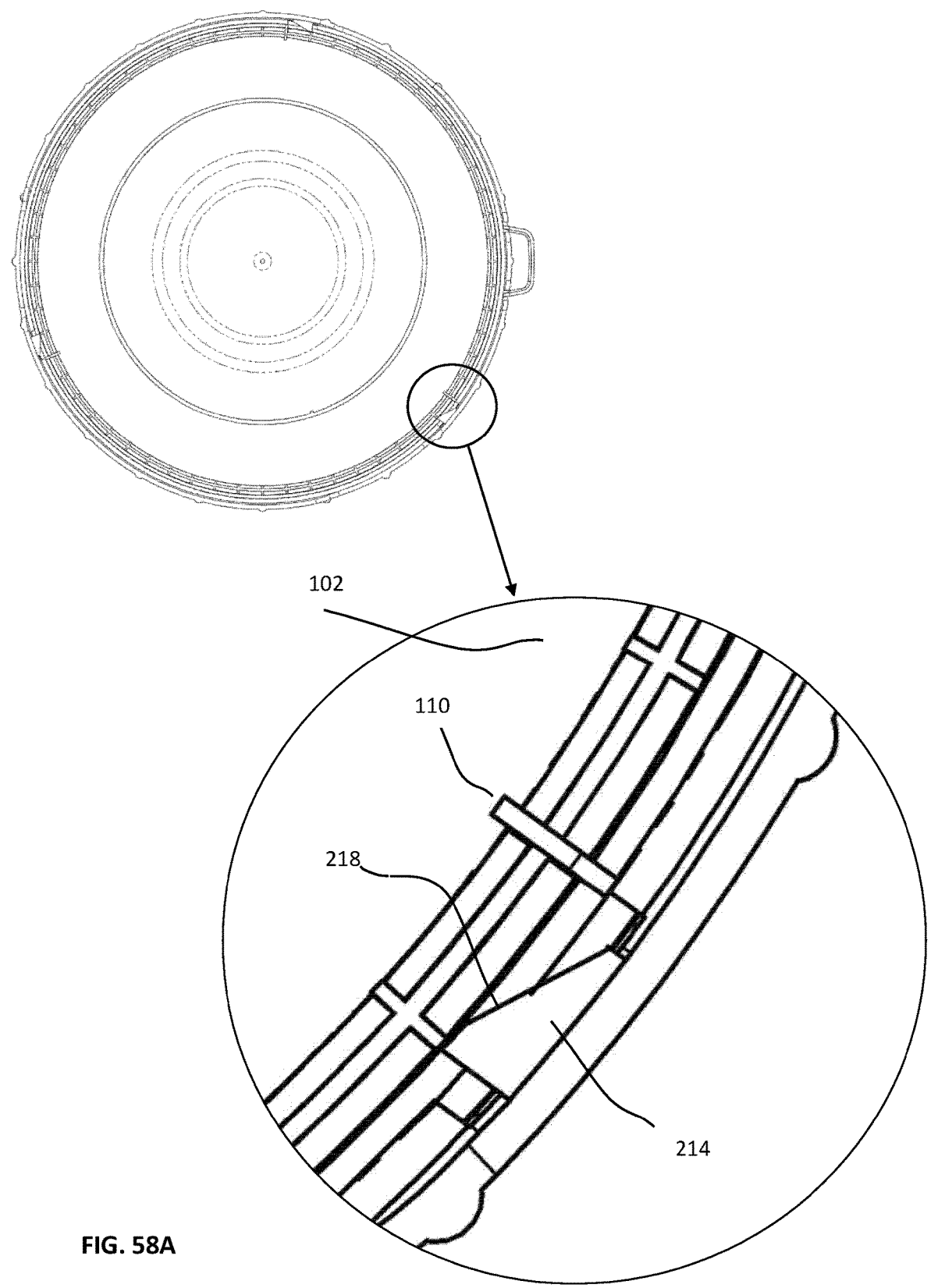
FIGS. 58A and 58B are simplified illustrations of the disengagement of the SUCSERDREA from the container body of the SUPCA in a situation where the SUPCA was not earlier processed by the MMIDD or in accordance with an alternative embodiment of the present invention.
Figure 58B:
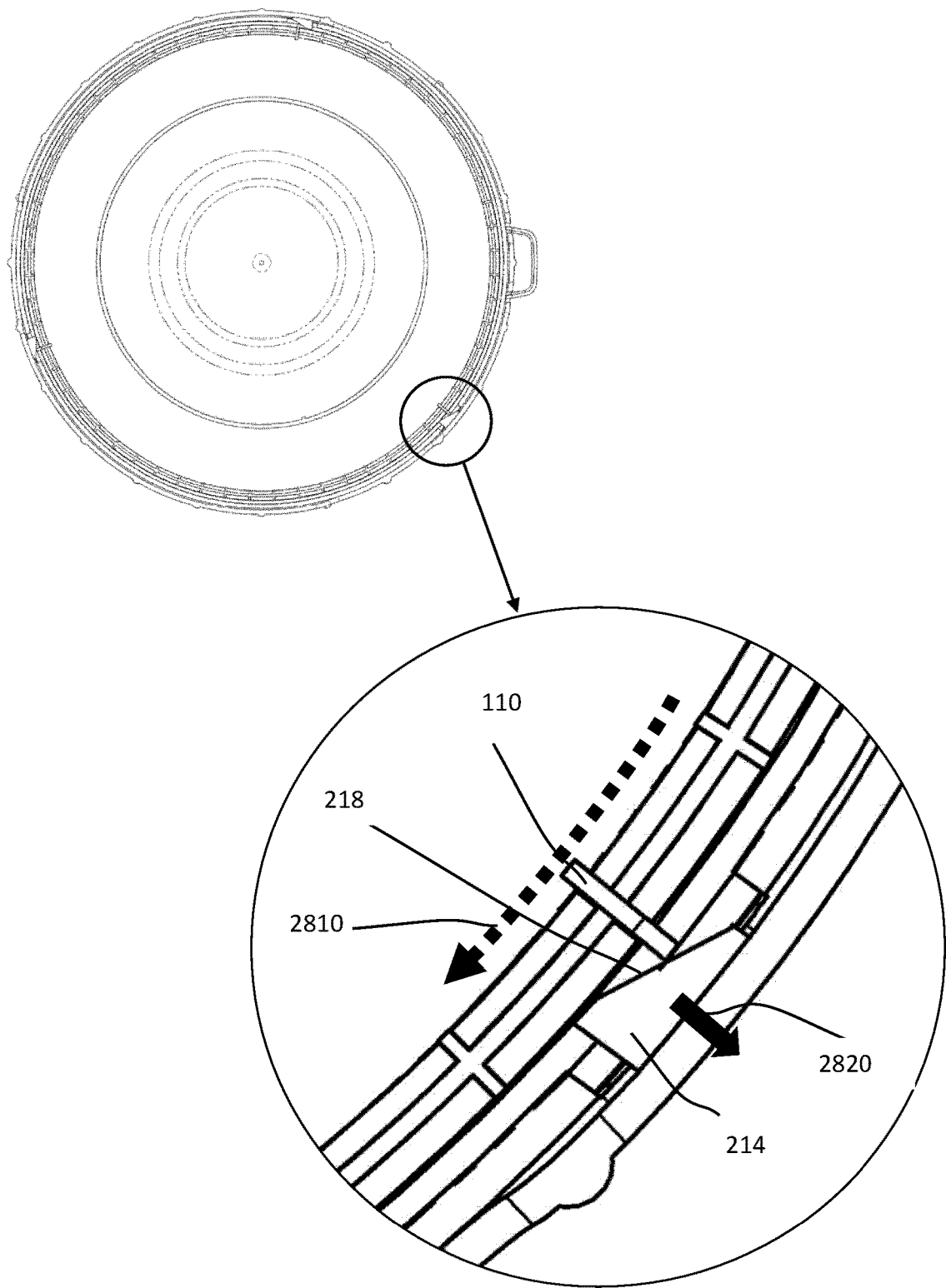

Reference is now made to FIGS. 58A & 58B, which are simplified illustrations of disengagement of the SUCSERDREA 120 from the container body 102 of SUPCA 100, in a situation where either the SUPCA 100 was not earlier processed by the MMIDD 1000 or in an alternative embodiment of the invention in which MMIDD 1000 did not include the tamper/reuse prevention functionality described hereinabove with reference to FIG. 49B but instead relied on use of machine readable information 162 for preventing reuse of the SUPCA 100.

As seen in FIG. 58A, prior to disengagement of the SUCSERDREA 120 from the container body 102 of SUPCA 100, tamper indicating tabs 110 of container body 102 are located adjacent to corresponding cam engagement surfaces 218 of tabs 214 of lid 140 of SUCSERDREA 120.

As seen in FIG. 58B, upon rotation of the SUCSERDREA 120 in a direction indicated by an arrow 2810 relative to container body 102 of SUPCA 100, the rotational engagement of tabs 110 with cam engagement surfaces 218 of tabs 214 causes tabs 214 to be irreversibly forced radially outwardly in the direction of an arrow 2820. The transition in the operative orientation of tabs 214 can be visualized by comparing enlargements A and B in FIG. 5A.

It will be appreciated by persons skilled in the art that the present invention is not limited to what has been particularly shown and described hereinabove. Rather the scope of the present invention includes both combinations and subcombinations of various features described hereinabove and modifications thereof, which are not in the prior art.

The invention claimed is:

1. A single-use product preparation container assembly comprising:

a container body for containing a product prior to, during and following preparation thereof; and a single-use container body closure assembly defining with said container body a product preparation enclosure and including an externally rotatably drivable rotary product engagement assembly, including a rotatable blade assembly, said single-use container body closure assembly including a lid having a recess formed therein, wherein
said externally rotatably drivable rotary product engagement assembly limits-ingress therethrough of contaminants from outside into said product preparation enclosure;
said externally rotatably drivable rotary product engagement assembly limits-egress therethrough of product from said enclosure; and
said rotatable blade assembly and said lid being relatively at least linearly moveable with respect to each other at least between a first retracted orientation wherein said rotatable blade assembly is at least partially located within said recess and a second extended orientation wherein said rotatable blade assembly is outside of said recess.

2. The single-use product preparation container assembly according to claim 1, wherein at least one of said lid and said container body define a mechanical indicator indicating previous disengagement of said container body and said lid.

3. The single-use product preparation container assembly according to claim 1, wherein said externally rotatably drivable rotary product engagement assembly comprises a liquid ingress/egress preventing blade mounting and rotatable sealing assembly for mounting said rotatable blade assembly onto said single-use container body closure assembly, said externally rotatably drivable rotary product engagement assembly having a first static liquid sealing operative orientation and having a second dynamic low friction liquid sealing operative orientation.

4. The single-use product preparation container assembly according to claim 2 and wherein said externally rotatably drivable rotary engagement assembly comprises a liquid ingress/egress preventing blade mounting and rotatable sealing assembly for mounting said rotatable blade assembly onto said container body closure assembly, said externally rotatably drivable rotary product engagement assembly having a first static liquid sealing operative orientation and having a second dynamic low friction liquid sealing operative orientation.

5. The single-use product preparation container assembly according to claim 1, wherein said single-use container body closure assembly comprises a single-use cover seal providing both human and machine sensible, tamper-evident and reuse preventing, fluid sealing engagement with said container body.

6. The single-use product preparation container assembly according to claim 1, wherein said single-use container body closure assembly comprises a machine-readable information source.

7. The single-use product preparation container assembly according to claim 5, wherein said single-use container body closure assembly comprises a machine-readable information source.

8. An apparatus comprising:
at least one single-use product preparation container assembly according to claim 1; and
a multiple motion intelligent driving device for processing contents of said at least one single-use product preparation container assembly.

9. The apparatus according to claim 8, wherein said multiple motion intelligent driving device is responsive to a plurality of different control instructions associated with corresponding different ones of said at least one single-use product preparation container assembly.

10. The apparatus according to claim 8, wherein when said single-use product preparation container assembly and said multiple motion intelligent driving device are in a product processing operative orientation, said single-use product preparation container assembly is in upside-down fully clamped operative engagement with said multiple motion intelligent driving device.

11. The apparatus according to claim 10, wherein the apparatus provides static/dynamic sealing for prevention and or collection of liquid leaking from said single-use product preparation container assembly when said single-use product preparation container is in an upside down state in operative engagement with said multiple motion intelligent driving device.

12. The apparatus according to claim 11, wherein said static/dynamic sealing is provided via an interaction of said rotatable blade assembly with other portions of said single-use product preparation container assembly.

* * * * *